(12) United States Patent
Nakadaira et al.

(10) Patent No.: US 7,880,726 B2
(45) Date of Patent: Feb. 1, 2011

(54) 3D POINTING METHOD, 3D DISPLAY CONTROL METHOD, 3D POINTING DEVICE, 3D DISPLAY CONTROL DEVICE, 3D POINTING PROGRAM, AND 3D DISPLAY CONTROL PROGRAM

(75) Inventors: Atsushi Nakadaira, Suginami-ku (JP); Naobumi Suzuki, Mitaka (JP); Daisuke Ochi, Higashimurayama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1059 days.

(21) Appl. No.: 10/586,447

(22) PCT Filed: Oct. 12, 2005

(86) PCT No.: PCT/JP2005/018799

§ 371 (c)(1),
(2), (4) Date: Jul. 18, 2006

(87) PCT Pub. No.: WO2006/041097

PCT Pub. Date: Apr. 20, 2006

(65) Prior Publication Data

US 2008/0225007 A1    Sep. 18, 2008

(30) Foreign Application Priority Data

| Oct. 12, 2004 | (JP) | ............................ 2004-297927 |
| Oct. 21, 2004 | (JP) | ............................ 2004-306636 |
| Oct. 25, 2004 | (JP) | ............................ 2004-309667 |
| Jun. 24, 2005 | (JP) | ............................ 2005-185131 |

(51) Int. Cl.
*G06F 3/041* (2006.01)
*G06F 3/033* (2006.01)
*G09G 5/00* (2006.01)
*G06T 15/00* (2006.01)

(52) U.S. Cl. ................. 345/173; 345/179; 345/156; 345/419

(58) Field of Classification Search .......... 345/156–179
See application file for complete search history.

(56) References Cited

U.S. PATENT DOCUMENTS 6,023,275 A    2/2000   Horvitz et al.

(Continued)

FOREIGN PATENT DOCUMENTS

EP    1 109 091 A1   6/2001

(Continued)

OTHER PUBLICATIONS

Yukihiro Hirata, et al. "3-Dimensional Interface Device for Virtual Work Space", Proceedings of the 1992 IEEE/RSJ International Conference on Intelligent Robots and Systems, 2, pp. 889-896, 1992.

(Continued)

*Primary Examiner*—Sumati Lefkowitz
*Assistant Examiner*—Charles Hicks
(74) *Attorney, Agent, or Firm*—Oblon, Spivak, McClelland, Maier & Neustadt, L.L.P.

(57) ABSTRACT

A three-dimensional pointing method is disclosed. In the three-dimensional pointing method of the present invention, a desired point in a three-dimensional space represented on a display apparatus is pointed at based on two-dimensional coordinates of a position that is pointed at by a pen tip of an input pen on a predetermined detection plane, and, based on pen pressure that is pressure applied to the pen tip of the input pen, time for continuing to point or operation of an operation means provided in the input pen. In addition, in the three-dimensional pointing method of the present invention, a depth direction coordinate of a three-dimensional pointer to be displayed in the three-dimensional space is changed according to the pen pressure of the input pen, the time for continuing to point or the operation of the operation means provided in the input pen, and the three-dimensional pointer is displayed.

3 Claims, 104 Drawing Sheets

U.S. PATENT DOCUMENTS

| | | | |
|---|---|---|---|
| 6,590,573 B1* | 7/2003 | Geshwind | 345/419 |
| 2004/0021663 A1* | 2/2004 | Suzuki et al. | 345/419 |
| 2005/0057497 A1 | 3/2005 | Kawahara | |
| 2005/0168437 A1* | 8/2005 | Carl et al. | 345/156 |

FOREIGN PATENT DOCUMENTS

| | | |
|---|---|---|
| JP | 58-100177 | 6/1983 |
| JP | 63-257784 | 10/1988 |
| JP | 5-73208 | 3/1993 |
| JP | 6-75693 | 3/1994 |
| JP | 8-16137 | 1/1996 |
| JP | 8-248938 | 9/1996 |
| JP | 9-218963 | 8/1997 |
| JP | 10-69367 | 3/1998 |
| JP | 11-7372 | 1/1999 |
| JP | 2000-185179 | 7/2000 |
| JP | 2001-331245 | 11/2001 |
| JP | 2003 085590 | 3/2003 |
| JP | 2004 070920 | 3/2004 |
| JP | 2004-362408 | 12/2004 |
| WO | WO 02/084637 A1 | 10/2002 |

OTHER PUBLICATIONS

K. Watanabe, et al. "RUI: Realizable User Interface—The Information Realization by Using Cursor", Human Interface Symposium 2003, 2003, pp. 541-544 (w/English Abstract).

George Robertson, et al. "The Task Gallery: A 3D Window Manager", Proceedings of CHI2000, Apr. 1-6, 2000, pp. 494-501.

Atsushi Nakadaira, et al. "Study on Depth Pointing Method Using Stereoscopic Display Device", IPSJ Symposium Series, vol. 2005, No. 4, Feb. 28 and Mar. 1, 2005.

Daisuke Ochi, et al. "Interface for Manipulating Stereoscopically Displayed Object Using Pen Tablet", IPSJ Symposium Series, vol. 2005, No. 4, Feb. 28 and Mar. 1, 2005.

* cited by examiner

3D POINTING METHOD, 3D DISPLAY CONTROL METHOD, 3D POINTING DEVICE, 3D DISPLAY CONTROL DEVICE, 3D POINTING PROGRAM, AND 3D DISPLAY CONTROL PROGRAM

TECHNICAL FIELD

The present invention relates a technology for performing three-dimensional pointing. More particularly, the present invention relates to a technology for performing pointing in a three-dimensional space, represented by a display apparatus, using an input apparatus including a pen-shaped operation unit. In addition, the present invention relates to a technology for three-dimensionally pointing at an object, with a pointer, placed (displayed) in a three-dimensional space represented on the display apparatus. Further, the present invention relates to a technology for three-dimensional display control for selecting an object placed and displayed in a three-dimensional space or for pointing at an object placed and displayed in the three-dimensional space.

BACKGROUND ART

In recent years, with remarkable improvement of calculation performance and processing speed, and with enhancement of graphic functions for PCs (personal computers), any of display, function and operation in GUI (graphical user interface) become complicated more than ever. Thus, there are many cases where efficient operation is hindered by the complexity as a fetter when an operator operates the computer to perform objective operation.

To improve such situations, presenting and operating information using a three-dimensional space are contrived. This is often called as three-dimensional GUI, which is a mechanism in which an object is three-dimensionally placed in the three-dimensional space, and the object is operated using a predetermined input device. Although, other than this three-dimensional GUI, a similar mechanism may be used in CAD and CG for performing design and the like in the three-dimensional space, explanations are given taking the three-dimensional GUI as an example hereinafter from the point of view of operating and pointing similar three-dimensional objects. By using the three-dimensional GUI, it becomes possible to three-dimensionally place objects that were arranged two-dimensionally or overlapped each other so far. Thus, a working space can be used efficiently. In addition, since the real world surrounding us is the three-dimensional space, by adopting the three-dimensional function into the GUI, the GUI becomes one that can be handled with more perceptiveness compared with the two-dimensional GUI.

Pointing at objects that exist in various depth positions is one problem for operating the three-dimensional GUI. In technologies so far, pointing in the three-dimensional space is realized by adding a new function necessary for depth movement of the pointer, using a mouse, a keyboard, a joystick and the like that have been used for the two-dimensional GUI. However, when using these input devices, since the space in which the operator performs operation with the input device is different from the space where the pointer is actually displayed, there are disadvantages in that it is necessary for the operator to perform additional operation for associating the spaces with each other intentionally, and that the operation itself becomes complicated due to addition of the function for depth movement.

Another problem for operating the three-dimensional GUI exists in operation of objects in the three-dimensional space.

In technologies so far, there may be a case in which object operation in the three-dimensional space is performed using a three-dimensional input device such as PHANToM (SensAble Technologies, Inc.) and SPIDER (refer to non-patent document 1, for example). However, like the above-mentioned problem for pointing, since the space in which the operator performs operation using the input device is different from the space in which the pointer is actually displayed, it is necessary for the operator to perform additional operation for intentionally associating the spaces with each other. In addition to that, the space in which the operator can perform operation is limited since an arm and a fixing wire exist. Thus, it is inevitable to use a large-scale apparatus for widening the space. Further, the device is not generally widespread and it cannot be said that the device is familiar to people.

On the other hand, there is a pen-shaped input device as a device having a shape familiar to us. In recent years, there is a pen tablet as one used for pointing and for object operation in two-dimensional GUI. Particularly, an electromagnetic induction type pen tablet (refer to patent document 1, for example) is being adopted in PCs, PDAs (Personal Digital Assistant), and in mobile phones in recent years as an input device that replaces the mouse for reasons that the electromagnetic induction type pen tablet has portability because of its simplicity, and a screen can be directly pointed at with the pen, and that information that can be obtained are abundant (such as two-dimensional position, pen pressure, angle of the case of the pen, states of button and wheel and the like of the pen).

However, there are not many examples in which the pen tablet (pen-shaped input device) that is widely used as the two dimensional input device is used as a three-dimensional input device. As an example, there was a trial in which a pen-shaped device that can obtain its slant and its three-dimensional position is held with a hand in the air, and a display apparatus that exists ahead of the pen virtually displays the pen tip (pointer) so as to realize pointing in the three-dimensional space using the virtually displayed pen tip as a pointer (refer to patent document 2, for example). In this example, although the space in which the operator performs operation is separated from the space in which the pointer is actually displayed, this technology is superior to other conventional technologies since the operator can feel the virtually displayed pen tip almost like a part of a pen held by the operator. However, since the operator must hold the pen-shaped input device with the hand in the air, this technology does not applicable for pointing work for a long time from the viewpoint of exhaustion. In addition, since the hand is in the air, it is hard that the position of the hand stays at one point, so that there is a remarkable disadvantage that the operator cannot hold the pen tip at a target position. That is, since the space in which the operator performs operation with the input device is different from the space in which the pointer and the object are actually displayed, the operator needs to perform additional work for intentionally associating the spaces with each other. Thus, it is substantially difficult to perform detailed operation for objects using this system.

From the above-mentioned viewpoints, a three-dimensional pointing method and a three-dimensional object operation method are required for performing pointing or object operation in the same feeling as in the real world using a three-dimensional GUI that is nearer to the real world than the two-dimensional GUI, in which the apparatus configuration is simple, and the operator can perform pointing and object operation in the three-dimensional space efficiently, accurately and without being fatigued, and processing and editing of the pointed object can be easily performed.

Next, background technologies related to displaying the pointer in the three-dimensional space are described. As described before, in the technologies so far, pointer movement in the three-dimensional space is realized by adding a new function necessary for movement of depth direction to operations by the mouse, keyboard, joystick and the like that are used in the two-dimensional GUI. In addition, the position of the pointer in the depth direction is represented by enlarging or reducing the pointer, for example, so as to realize pointing at an object that is in the back of the space (refer to non-patent document 2, for example). That is, when the pointer is in the front side, the pointer is displayed as a large one, and when the pointer is in the back side, the pointer is displayed as a small one.

However, in many of these methods, the pointer that is displayed in the three-dimensional space can freely move in the depth direction. Thus, even though the pointer is displayed on the display apparatus, there are many cases in which the operator cannot perceive (recognize) the depth position of the pointer so that the operator cannot recognize where the pointer points.

To solve this problem, for example, there is a method for easily perceiving the depth position by displaying a reference, near the pointer, indicating xyz axes of which the depth position does not change (refer to patent document 3, for example). However, since the reference appears on the display plane so that the operator's view is blocked, there may be a case in which working efficiency is lowered. In addition, the reference does not appear when pointing at an object of the real world. Therefore, the method for displaying the reference is not an optimal method from the viewpoint of operating the GUI with a feeling the same as that in the real world.

For reasons mentioned above, for operating the three-dimensional GUI with the feeling the same as that in the real world, an efficient pointing method is required for the operator to be able to recognize quickly and accurately the depth position of the pointer and to recognize where the pointer is pointing, in pointing work using the pointer in the three-dimensional GUI.

In pointing work using a pointer in the conventional three-dimensional GUI, there is a problem in that it is difficult for the operator to intuitively and accurately recognize the depth position of the pointer and recognize where the pointer is pointing.

Next, still another background technology relating to pointer display in the three-dimensional space is described.

As a widely used example of GUI of a computer, a desktop metaphor is known in which an image of a desktop is displayed on a display screen of the computer. Currently, many computers adopt user interfaces using this desktop screen as a core. The desktop screen has been commercialized since latter half of 1980s. Since the processing ability of the computer and the display apparatus are enhanced, fine graphic representation is adopted in the two-dimensional desktop screen. At the same time, the function of the two-dimensional desktop screen is advanced, and the appearance of the screen becomes brilliant, and stereoscopic visual effects become diversified. In addition, recently, a trial is proposed for widening the desktop to the three-dimensional space so as to arrange objects such as icons and windows three-dimensionally (refer to non-patent document 3, for example).

In the three-dimensional desktop, since degree of freedom in the depth direction is added to the conventional two-dimensional plane-like space, there is a merit that the icons and the windows can be arranged functionally. However, even though the desktop is three-dimensionalized, pointing using the pointer is still limited to two-dimensional movement. Therefore, it is difficult to fully utilize the degree of freedom in the depth direction.

On the other hand, it is considered to move the pointer three-dimensionally. However, when the pointer moves three-dimensionally in the space where the object is placed in the three-dimensional space, the pointer is hidden behind the object that is in front of the pointer so that there is a problem in that the operator loses sight of the pointer.

In the desktop interface, it is indispensable that the user always recognize the position of the pointer. In the two-dimensional GUI, it is common that the pointer is always displayed on the foreground. But, when a color of an object at the back of the pointer is the same as a color of the pointer, it becomes difficult to differentiate the pointer from the object, so that it becomes difficult to recognize where the pointer is pointing. For avoiding such problem, it is common to use equal to or more than two kinds of colors for the pointer. When the pointer has colors of black bordered with white, if the color of the background is white, a pointing position can be clearly recognized by the black part, and if the color of the background is black, the pointing position can be clearly recognized by the bordering white part. As mentioned above, in the desktop interface, it is necessary to make the operator always recognize where the pointer is pointing, so that the above-mentioned device is applied in the conventional desktop.

Then, also in the three-dimensional desktop, it is indispensable to make the operator always recognize the position of the pointer. However, in the nature of the three-dimensional space, when the pointer is moved to a position that is in the back (rear side) of an object as seen from the operator, the pointer is hidden behind the object so that there is a problem that the operator loses sight of the position of the pointer. Therefore, it is difficult to recognize where the pointer is pointing, as a result, a fatal problem in the desktop interface in that selection of an object cannot be performed occurs. As mentioned above, even though the desktop is three-dimensionalized, it is difficult to three-dimensionalize the movement of the pointer, so that there is a problem that the merit obtained by three-dimensionalizing the desktop cannot be fully utilized in the three-dimensional desktop.

That is, in the three-dimensional space represented on the display apparatus such as the conventional three-dimensional desktop and the like, there is a problem in that, when a pointer is moved in the three-dimensional space, the pointer is hidden behind the object so that the operator cannot recognize the position of the pointer.

In addition, like the problem that the pointer is hidden behind the object so that the pointer cannot be recognized, in the three-dimensional space represented on the display apparatus such as the conventional three-dimensional desktop and the like, when there is another object (back object) exists in the back of an object (front object), the back object cannot be directly recognized. Thus, for recognizing the position of the back object or for operating the back object, it is necessary to move the front object, or reduce the display region of the front object, or changing the display state of the front object to a hidden state. In addition, when performing the operation to reduce the display region of the front object or to change the display state to the hidden state, for recognizing display information of the front object, it is necessary to perform operation for recovering the display region to the original size and for restoring the display state to the original displaying state. Therefore, there is a problem in that the convenience of the operator is bad.

[Patent document 1] Japanese Laid-Open Patent Application No. 5-073208

[Patent document 2] Japanese Laid-Open Patent Application No. 6-75693

[Patent document 3] Japanese Laid-Open Patent Application No. 8-248938

[Non-patent document 1] Y. Hirata and M. Sato, "3-Dimensional Interface Device for Virtual Work Space," Proc. of the 1992 IEEE/RSJ Int. Conf. on IROS, 2, pp. 889-896, 1992.

[Non-patent document 2] K. Watanabe, M. Yasumura, "RUI: Realizable User Interface—information realization using cursor", Human interface symposium 2003, 2003, p. 541-544

[Non-patent document 3] George Robertson, et al. "The Task Gallery: A 3D Window Manage", Proceedings of CHI2000, 1-6 APRIL 2000, pp. 494-501

DISCLOSURE OF THE INVENTION

Problem to be Solved by the Invention

A first object of the present invention is to provide a three-dimensional pointing technique in which an operator can three-dimensionally operate a pointer and an object located at arbitrary positions in a three-dimensional space on three-dimensional GUI efficiently and intuitively without fatigue using a device that the operator is familiar with.

A second object of the present invention is to provide a pointing technique in which the operator can recognize the depth position of the pointer and where the pointer is pointing intuitively and accurately in pointing using the pointer in the three-dimensional GUI.

A third object of the present invention is to provide a technique for easily recognizing the position of the pointer even though the pointer moves to a position in the back (rear) side of another object when moving the pointer three-dimensionally in the three-dimensional space represented on the display apparatus. In addition, another third object of the present invention is to provide a technique for easily recognizing and operating an object hidden behind another object displayed in the front side in the three-dimensional space represented on the display apparatus so as to improve convenience of the operator.

Means for Solving the Problem

The first object of the present invention is achieved by a three-dimensional pointing method for pointing at a desired point in a three-dimensional space represented on a display apparatus based on two-dimensional coordinates of a position that is pointed at by a pen tip of an input pen on a predetermined detection plane and based on pen pressure that is pressure applied to the pen tip of the input pen, including the step of:

changing a depth direction coordinate of a three-dimensional pointer to be displayed in the three-dimensional space according to the pen pressure of the input pen, and displaying the three-dimensional pointer.

The first object is also achieved by a three-dimensional pointing method for pointing at a desired point in a three-dimensional space represented on the display apparatus based on two-dimensional coordinates of a position that is pointed at by a pen tip of an input pen on a predetermined detection plane, pen pressure that is pressure applied to the pen tip of the input pen, an inclination angle that is an angle between an axis of the input pen and the detection plane, and an direction angle that is an angle between a projection of the axis of the input pen onto the detection plane and a predetermined line on the detection plane, including the steps of:

obtaining an extension of the axis of the input pen in the three-dimensional space based on the inclination angle and the direction angle of the input pen;

displaying a three-dimensional pointer on the extension in the three-dimensional space; and changing a coordinate of a three-dimensional pointer in the direction of the extension in the three-dimensional space according to the pen pressure of the input pen, and displaying the three-dimensional pointer.

In addition, the first object is achieved by a three-dimensional pointing method for pointing at a desired point in a three-dimensional space represented on the display apparatus based on two-dimensional coordinates of a position that is pointed at by a pen tip of an input pen on a predetermined detection plane, and based on time for continuing to point or operation of an operation means provided in the input pen, including the step of:

changing a depth direction coordinate of a three-dimensional pointer to be displayed in the three-dimensional space according to the time for continuing to point with the pen tip of the input pen or the operation of the operation means of the input pen, and displaying the three-dimensional pointer.

In addition, the first object is achieved by a three-dimensional pointing method for pointing at a desired point in a three-dimensional space represented on the display apparatus based on two-dimensional coordinates of a position that is pointed at by a pen tip of an input pen on a predetermined detection plane, time for continuing to point or operation of an operation means provided in the input pen, an inclination angle that is an angle between an axis of the input pen and the detection plane, and an direction angle that is an angle between a projection of the axis of the input pen onto the detection plane and a predetermined line on the detection plane, including the steps of:

obtaining an extension of the axis of the input pen in the three-dimensional space based on the inclination angle and the direction angle of the input pen;

displaying a three-dimensional pointer on the extension in the three-dimensional space; and changing a coordinate of a three-dimensional pointer in the direction of the extension in the three-dimensional space according to the time for continuing to point with the pen tip of the input pen or according to the operation of the operation means of the input pen, and displaying the three-dimensional pointer.

In the above configuration, it can be determined that an object is pointed at when the object exists within a predetermined distance from three-dimensional coordinates of a point at which the three-dimensional pointer points.

When an object displayed in the three-dimensional space is pointed at with the three-dimensional pointer, if operation for selecting or holding the object is performed, the three-dimensional position of the object may be changed according to change of the three-dimensional position of the three-dimensional pointer after the operation for selecting or holding the object is performed, and the object is displayed.

In addition, when an object displayed in the three-dimensional space is pointed at with the three-dimensional pointer, if operation for starting to operate, edit or process the object is performed, the object that is pointed at my be displayed two-dimensionally on a plane, of the display apparatus, that is closest to an operator, and the two-dimensionally displayed object may accept the two-dimensional operation, editing, or processing by the input pen.

The two-dimensional coordinates of the position at which the pen tip of the input pen points on the detection plane may be regarded as two-dimensional coordinates of the point at which the three-dimensional pointer points, and the depth direction coordinate of the three-dimensional pointer may be changed while keeping the two-dimensional coordinates of the point at which the three-dimensional pointer points to be constant.

The present invention can be also configured as a three-dimensional pointing apparatus for generating a pointer based on two-dimensional coordinates of a position that is pointed at by a pen tip of an input pen on a predetermined detection plane and based on pen pressure that is pressure applied to the pen tip of the input pen, and displaying the generated pointer at a desired point in three-dimensional space represented on a display apparatus to perform pointing, including:

input information obtaining means for obtaining information of the two-dimensional coordinates and the pen pressure of the input pen;

pointer position/rotation angle calculation means for calculating a position and an rotation angle of the pointer to be displayed in the three-dimensional space represented on the display apparatus based on the information obtained by the input information obtaining means;

pointer generation means for generate the pointer based on the calculation result of the pointer position/rotation angle calculation means;

pointing determination means for determining whether there is an object that is pointed at by the pointer generated by the pointer generation means in the three-dimensional space represented on the display apparatus;

object generation means for generating the object to be displayed in the three-dimensional space represented on the display apparatus; and display control means for displaying the pointer generated by the pointer generation means and the object generated by the object generation means in the three-dimensional space represented on the display apparatus, wherein the pointer position/rotation angle calculation means changes a depth direction coordinate of the three-dimensional pointer to be displayed in the three-dimensional space according to the pen pressure of the input pen in the calculation.

The input pen has a structure in which the length of the pen tip is shortened according to the pen pressure, and the three-dimensional pointer may have a shape similar to the pen tip of the input pen, or a shape similar to a part of the pen tip.

Further, the present invention can be configured as a three-dimensional pointing apparatus for generating a pointer based on two-dimensional coordinates of a position that is pointed at by a pen tip of an input pen on a predetermined detection plane and based on time for continuing to point or operation of an operation means provided in the input pen, and displaying the pointer at a desired point in a three-dimensional space represented on a display apparatus to perform pointing, including:

input information obtaining means for obtaining information of the two-dimensional coordinates of the input pen, and information of contact/noncontact status of the pen tip of the input pen or information of operation of an operation means of the input pen;

input information process means for calculating the time for continuing to point with the pen tip of the input pen or an amount by which the operation means is operated based on the information obtained by the input information obtaining means;

pointer position/rotation angle calculation means for calculating a position of the pointer to be displayed in the three-dimensional space represented on the display apparatus based on the information obtained by the input information obtaining means;

pointer generation means for generating the pointer based on the calculation result of the pointer position/rotation angle calculation means;

pointing determination means for determining whether there is an object that is pointed at by the pointer generated by the pointer generation means in the three-dimensional space represented on the display apparatus;

object generation means for generating the object to be displayed in the three-dimensional space represented on the display apparatus; and display control means for displaying the pointer generated by the pointer generation means and the object generated by the object generation means in the three-dimensional space represented on the display apparatus, wherein the pointer position/rotation angle calculation means performs the calculation by changing a depth direction coordinate of the three-dimensional pointer to be displayed in the three-dimensional space according to the time for continuing to point or according to the operation of the operation means provided in the input pen.

The input pen may have a structure in which the length of the pen tip is shortened according to the time for continuing to point with the pen tip or according to the operation of the operation means, and the three-dimensional pointer may have a shape similar to the pen tip of the input pen, or a shape similar to a part of the pen tip.

The present invention can be also configured as a three-dimensional pointing program for causing a computer to execute processes in each means of the three-dimensional pointing apparatus.

The second object is achieved by a three-dimensional pointing method for moving a pointer, in a three-dimensional space, that is displayed in the three-dimensional space of a display apparatus that can represent the three-dimensional space, and pointing at a desired point in the three-dimensional space, including:

a step 1 of moving or rotating the pointer on a two-dimensional plane that is perpendicular to a depth direction of the three-dimensional space of the display apparatus, and moving the pointer in the depth direction;

a step 2 of moving a part for performing pointing in the pointer in the depth direction while keeping, to be constant, a depth direction position of a predetermined point of the pointer other than the part for performing pointing in the pointer, and while keeping a shape and a size of the pointer to be constant, wherein the part for performing pointing in the pointer includes a point for performing pointing and the neighborhood; and a step 3 for causing the display apparatus to display the pointer moved in the step 1 and the step 2.

In the three-dimensional pointing method, in step 2, the pointer nay be rotated around a predetermined center point or center axis, wherein points on the surface or the inside of the pointer are excluded for the predetermined center point or the center axis.

The second object can be also achieved by a three-dimensional pointing method for moving a pointer, in a three-dimensional space, that is displayed in the three-dimensional space of a display apparatus that can represent the three-dimensional space, and pointing at a desired point in the three-dimensional space, including:

a step 1 of moving or rotating the pointer on a two-dimensional plane that is perpendicular to a depth direction of the three-dimensional space of the display apparatus, and moving the pointer in the depth direction;

a step 4 of moving a part for performing pointing in the pointer in the depth direction while keeping a depth direction position of a predetermined point of the pointer other than the part for performing pointing in the pointer to be constant, and while deforming a shape and a size of the pointer; and a step 3 for causing the display apparatus to display the pointer moved in the step 1 and the step 4.

In the three-dimensional pointing method, in step 4, the pointer may be rotated around a predetermined center point or center axis, wherein points on the surface or the inside of the pointer are excluded for the predetermined center point or the center axis. In addition, the center point or the center axis around which the pointer is rotated may move according to a rotation angle when the pointer rotates.

The pointer may include:

a first part in which the depth direction position, a position on the two-dimensional plane, the shape and the size are constant;

a second part in which at least the depth direction position changes; and a third part for connecting the first part with the second part, wherein, in the step 4, the second part of the pointer is moved in the depth direction. In addition, in the step 4, the second part may be moved in the depth direction while changing the position of the second part in the two-dimensional plane, or a shape of the second part, or a size of the second part of the three-dimensional pointer.

When a part of the pointer lies off the three-dimensional space that can be represented by the display apparatus when the pointer moves in the depth direction, the lain-off part may be projected onto a two-dimensional plane, of two-dimensional planes that can be represented by the display apparatus, that is close to the lain-off part, or the lain-off part may be bent, so as to display the part.

In addition, in step 3, the display apparatus may be caused to display a reference pointer, with the pointer, in which the depth direction position is constant.

The present invention can be also configured as a three-dimensional pointing apparatus for displaying a pointer in a three-dimensional space represented on a display apparatus that can represent the three-dimensional space, moving the pointer three-dimensionally based on input information from an input apparatus, and pointing at an arbitrary point in the three-dimensional space, including:

input information obtaining means for obtaining input information from the input apparatus;

pointer position/deformation amount calculation means for calculating a display position and a deformation amount of the pointer based on the input information obtained by the input information obtaining means;

pointer generation means for generating a pointer to be displayed at the display position calculated by the pointer position/deformation amount calculation means;

pointing determination means for determining whether there is an object at a point at which the pointer points based on the display position calculated by the pointer position/deformation amount calculation means;

object generation means for changing the object to a state indicating that the object is pointed at when it is determined that there is the object that is pointed at in the pointing determination means; and display control means for causing the display apparatus to display the pointer generated by the pointer generation means and the object generated by the object generation means.

The present invention can be also configured as a three-dimensional pointing program for causing a computer to execute processes in each means of the three-dimensional pointing apparatus.

The third object is achieved by a three-dimensional display control method for controlling display states of a pointer and one or more objects, when displaying the pointer and one or more objects in a three-dimensional space represented on a display apparatus that can represented the three-dimensional space, moving the pointer three-dimensionally based on input information from an input apparatus, and pointing at an arbitrary point in the three-dimensional space, including:

a step 1 of calculating a display position of the pointer based on the input information;

a step 2 of displaying the pointer at the display position calculated in the step 1; and a step 3 of determining whether there is an object in the front side of the depth position of the pointer based on the display position of the pointer calculated in the step 1, and transparentizing the object in the front side of the depth position of the pointer and displaying the object.

In step 3 in the three-dimensional display method, only an object, of objects located in the front side of the depth position of the pointer, that overlaps with the pointer may be transparentized and displayed.

In addition, the step 3 may include:

transparentizing and displaying an object of the objects located in the front side of the depth position of the pointer, from which objects that are specified or selected based on predetermined input information received from the input apparatus are excluded.

In addition, the step 3 may include:

changing transparency of an object according to depth direction distance between the object located in the front side of the depth position of the pointer and the pointer so as to increase the transparency as the depth direction distance between the object and the pointer becomes larger.

In addition, the step 3 may include:

transparentizing only a region within a predetermined shape having a center point, on the object, that overlaps with a point at which the pointer point, and displaying the object. The predetermined shape to be transparentized may change according to the depth direction distance between the pointer and the object, such that the larger the depth direction distance is, the larger the predetermined shape.

In addition, the step 3 may include:

a step of, when the pointer stands still for a predetermined time, restoring the transparentized object to the opaque state that is a state before being transparentized, and displaying the object.

The present invention can be also configured as a three-dimensional display control apparatus for controlling display states of a pointer and one or more objects, when displaying the pointer and one or more objects in a three-dimensional space represented on a display apparatus that can represented the three-dimensional space, moving the pointer three-dimensionally based on input information from an input apparatus, and pointing an arbitrary point in the three-dimensional space, including:

input information obtaining means for obtaining input information from the input apparatus;

pointer position calculation means for calculating a display position of the pointer based on the input information obtained by the input information obtaining means;

pointer generation means for generating a pointer to be displayed at the display position calculated by the pointer position calculation means;

object change determination means for determining whether there is an object in the front side of the depth position of the pointer based on the display position of the pointer calculated by the pointer position calculation means, and determining whether to transparentize the object in the front side of the depth position of the pointer;

object generation/transparentizing means for generating the object to be displayed on the display apparatus and transparentizing the object that is determined to be transparentized by the object change determination means; and display control means for causing the display apparatus to display the pointer generated by the pointer generation means or the object transparentized by the object generation/transparentizing means. In addition, the present invention can be also configured as a three-dimensional pointing program for causing a computer to execute processes in each means of the three-dimensional display control apparatus.

Effect of the Invention

According to the invention for achieving the first object, an arbitrary point in the three-dimensional space represented on the display apparatus is pointed at by generating a pointer and display it on the display apparatus, wherein the pointer reflects the position of the pen tip of the input pen and pen pressure, or, the time for continuing to push the pen tip of the input pen, or information obtained by operating the operation means (button, wheel, slide bar and the like) of the input pen, and information such as inclination and direction of the input pen. The input pen is an operation pen (electronic pen) of a pen tablet, a stylus pen for operating a touch panel, or the like, and the input pen can be operated while the input pen is contacting a predetermined detection plane. Therefore, accurate pointing operation can be easily performed, so that fatigue due to pointing operation for a long time can be reduced.

In addition, by overlapping the detection means (digitizer) of the pen tablet on a display plane of the display apparatus, or by using a touch panel, the pointing operation can be performed while contacting the input pen on the display plane of the display apparatus. Therefore, three-dimensional pointing operation can be performed more accurately and intuitively.

In addition, when generating the pointer in which the position and the orientation are changed by reflecting change of the inclination angle, direction angle and rotation angle around the axis of the input pen, an object is generated and displayed in which the position and the orientation are changed according to the change of the pointer. Therefore, it is not necessary to learn special operation for changing the position and the orientation of the object, so that convenience of the operator improves.

In addition, when pointing at the object, by performing operation for starting operation, editing, or processing for the object, the state of the system can be changed to a state in which processes such as two-dimensional GUI-like operation, editing and processing for the pointed object are available, in other words, the state of the system can be changed to a state in which an object on the conventional two-dimensional GUI can be operated using the pen-shaped input apparatus. Therefore, processing of the three-dimensional object can be realized by operation similar to the conventional two-dimensional GUI operation. Therefore, the operation does not need to learn new three-dimensional operation for processing the object. In addition, after the processes of the two-dimensional GUI-like operation, editing and processing are completed, the object can be handled as the three-dimensional object again. Therefore, after the operation (process) of the two-dimensional GUI is completed, the object can be easily moved again to a three-dimensional position that the operator desires.

According to the invention for achieving the second object, change of the depth direction position of the part for performing pointing in the pointer is recognized by changing the depth position of the part for performing pointing in the pointer while keeping the depth position of a point on the pointer to be constant. At this time, the operator can recognize the depth position at which the pointer is pointing accurately and intuitively based on the states of the part in which the depth position is kept constant and the part for performing pointing.

In addition, by using the method for rotating the pointer when moving the part for performing pointing in the depth direction, the inclination of the pointer in the depth direction changes each tome when the pointer rotates. Thus, the depth position that is pointed at can be easily recognized. The center point or the center axis around which the pointer is rotated may be fixed or may be moved according to the rotation angle of the pointer.

In addition in the configuration in which the pointer includes the first part, the second part and the third part, a pointer is provided in which only the part for performing pointing is bent in the depth direction. Therefore, the depth position that is pointed at can be easily recognized from the state of the first part, the second part and the third part. In addition, the depth position can be accurately recognized by moving the second part in the depth direction while changing the position of the second part in the two-dimensional plane, the shape and the size.

According to the invention for achieving the third object, an object placed in front of the depth position of the pointer is transparentized and displayed. Therefore, the pointer is not hidden behind the object in front of the pointer when the pointer is moved three-dimensionally. Thus, even when the pointer moves at a position in the back side of the object, the position of the pointer can be easily recognized. In addition, by transparentizing the object in front of the pointer, the position of another object behind the transparentized object can be easily recognized, and the another object can be pointed at. In addition, by moving the pointer toward the front side, the object that is transparentized is restored to the original opaque state. Thus, the display information of the transparentized object can be easily recognized. Further, such transparentizing/opacifying of the object can be controlled by the movement of the pointer in the depth direction, convenience of the operator of the object improves.

In addition, by configuring the system such that an object that is in a selected state is not transparentized even though the object is in the front side of the pointer, the selected object can be easily recognized. In addition, by increasing the transparency of the object as the depth direction distance between the object and the pointer becomes larger, the depth position of the pointer and objects near the pointer can be easily recognized.

In addition, by transparentizing only a region within an arbitrary shape such as a circle, an ellipse and a polygon centering on a point that overlaps with a point at which the pointer is pointing, it can be avoided that the whole object is transparentized, and visual botheration due to continuous switching of transparentizing/opacifying can be reduced.

Further, by restoring the transparentized object to the original opaque state when a predetermined time elapses after the pointer stops, the display information of the transparentized object can be recognized without moving the pointer to the front side of the transparentized object, so that convenience of the operator further improves.

BRIEF DESCRIPTION OF THE DRAWINGS

FIG. 63B is a schematic diagram for explaining a fourth application example of the three-dimensional pointing method of the embodiment 3-1, and shows an application example in the case for tracing a straight line-like path;

FIG. 64A is a schematic diagram for explaining a fourth application example of the three-dimensional pointing method of the embodiment 3-1, and shows an application example in the case for tracing a straight line-like path;

FIG. 64B is a schematic diagram for explaining a fourth application example of the three-dimensional pointing method of the embodiment 3-1, and shows an application example in the case for tracing a straight line-like path;

FIG. 65A is a schematic diagram for explaining a fourth application example of the three-dimensional pointing method of the embodiment 3-1, and shows an application example in a case for tracing an arc-like path;

FIG. 65B is a schematic diagram for explaining a fourth application example of the three-dimensional pointing method of the embodiment 3-1, and shows an application example in a case for tracing an arc-like path;

FIG. 66A is a schematic diagram for explaining a fourth application example of the three-dimensional pointing method of the embodiment 3-1, and shows an application example in a case for tracing an arc-like path;

FIG. 66B is a schematic diagram for explaining a fourth application example of the three-dimensional pointing method of the embodiment 3-1, and shows an application example in a case for tracing an arc-like path;

FIG. 67 is a schematic diagram for describing the three-dimensional pointing method of the embodiment 3-2, and shows a front view and a right side view showing change in the three-dimensional space when pointing at an object in the rear side of the pointer;

FIG. 68A is a schematic diagram for describing the three-dimensional pointing method of the embodiment 3-2, and for explaining a problem in the three-dimensional pointing method of the embodiment 3-2;

FIG. 68B is a schematic diagram for describing the three-dimensional pointing method of the embodiment 3-2, and for explaining an example of a method for solving the problem shown in FIG. 68A;

FIG. 69 is a schematic diagram for describing the three-dimensional pointing method of the embodiment 3-2, and for explaining a modified example of the solving method shown in FIG. 68B;

FIG. 70A is a schematic diagram for explaining an application example of the three-dimensional pointing method of this embodiment 3-2, and shows a case in which the point of the center of the rotation is fixed in the three-dimensional space;

Figure 70A:
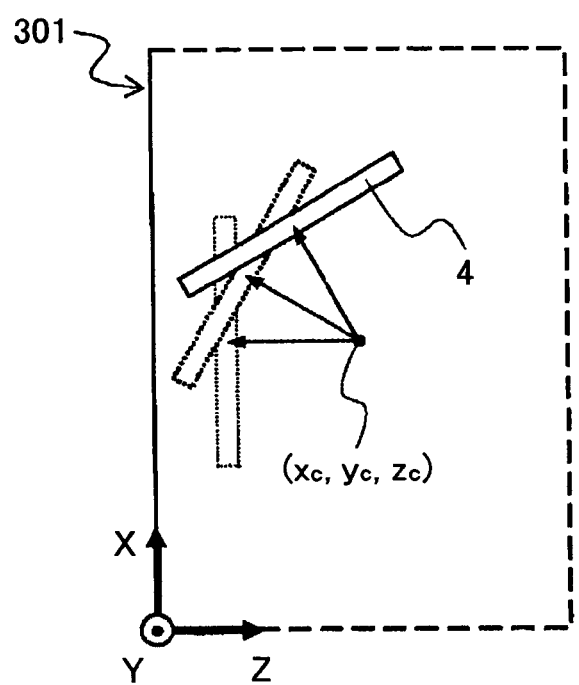
Figure 70B:
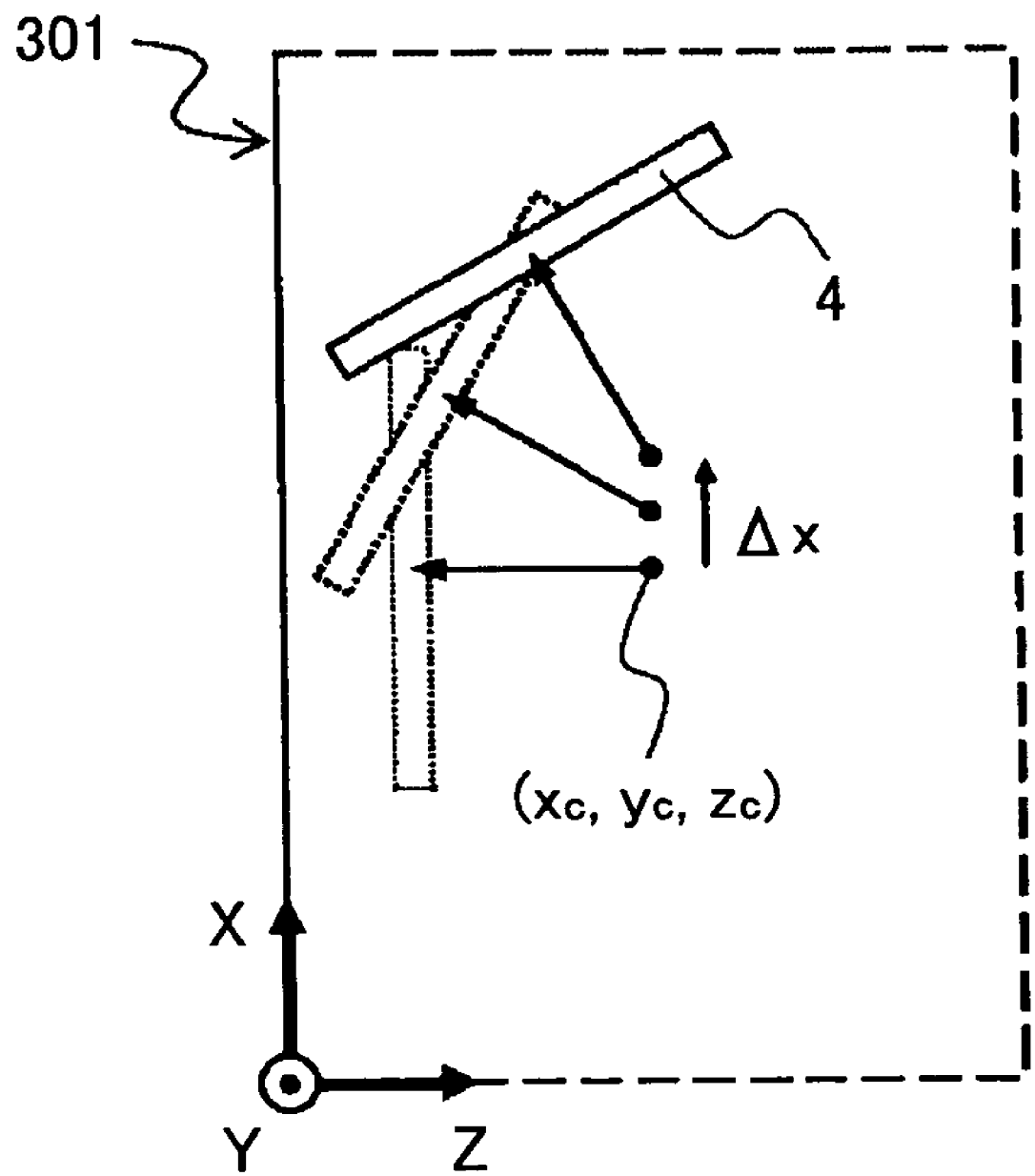
Figure 71:
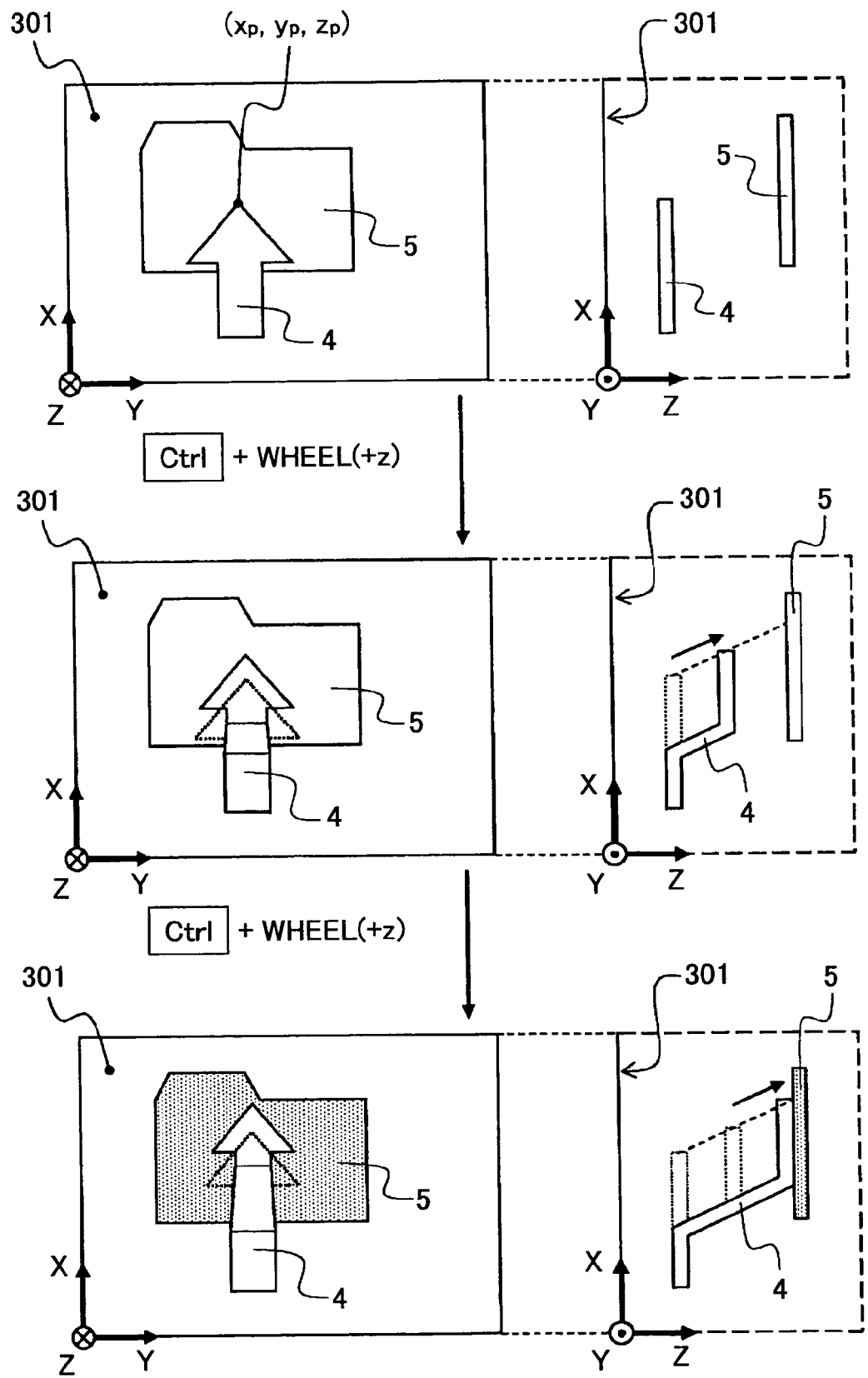
Figure 72:
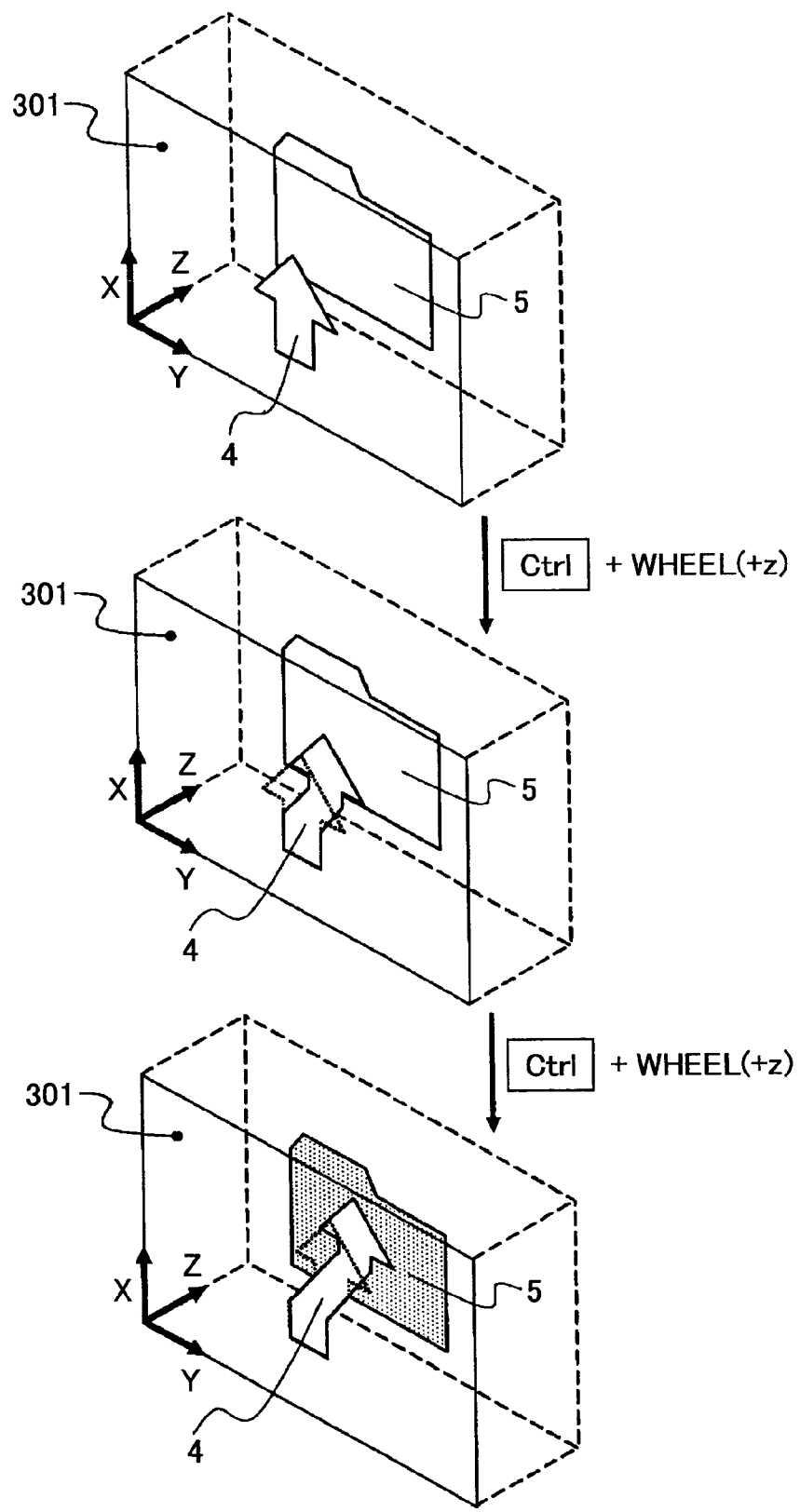
Figure 73:
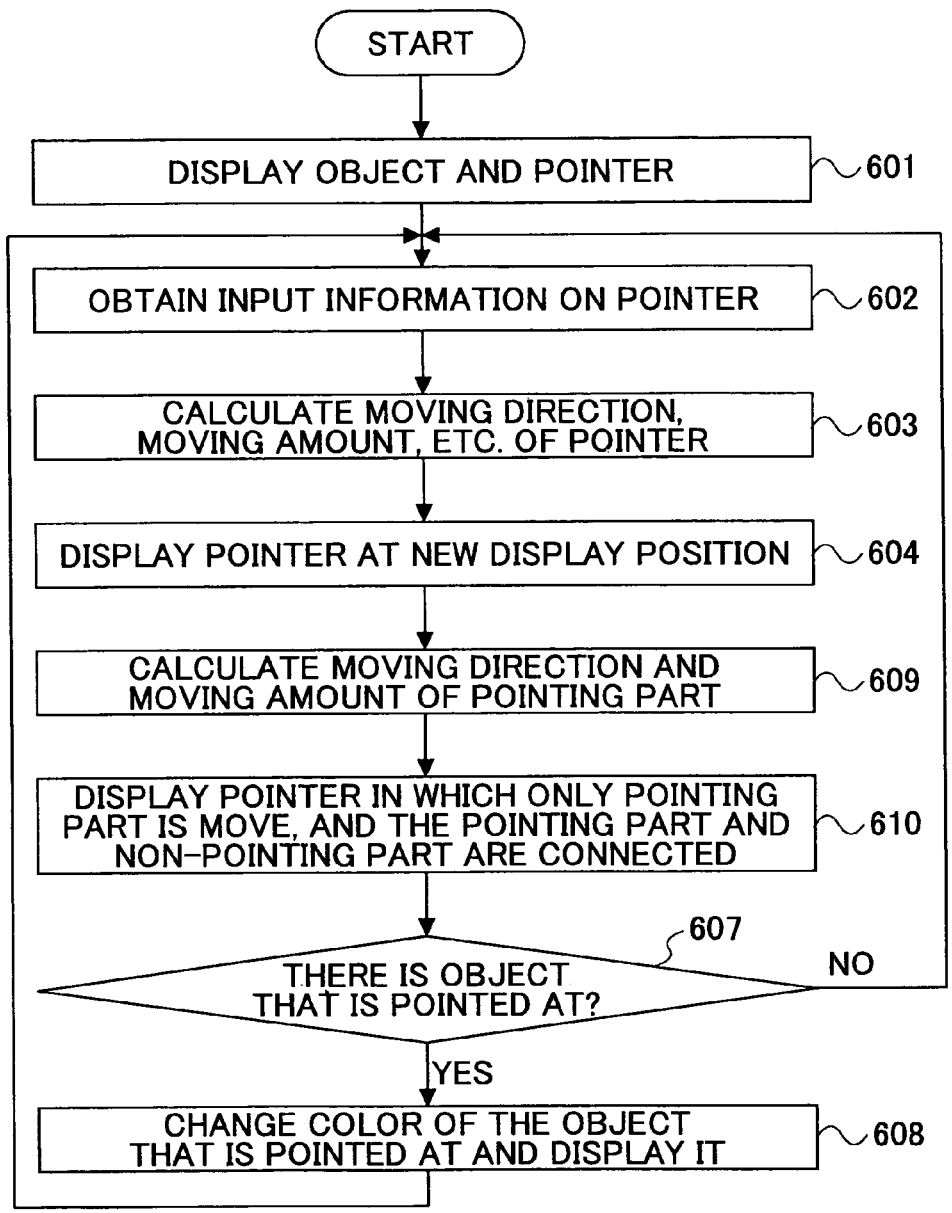
Figure 74A:
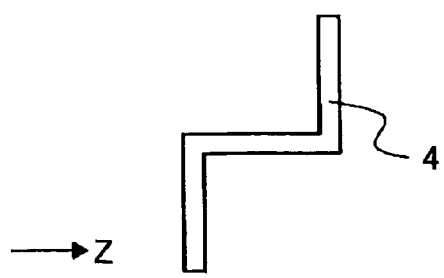
Figure 74B:
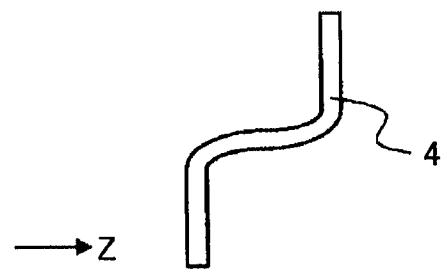
Figure 74C:
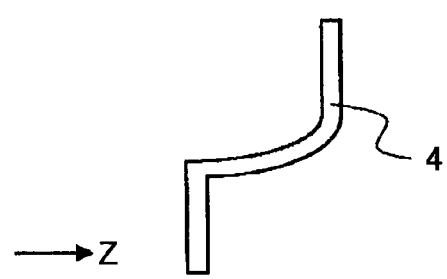
Figure 74D:
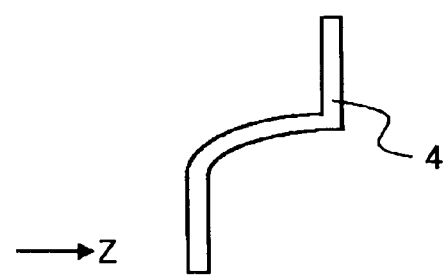
Figure 75:
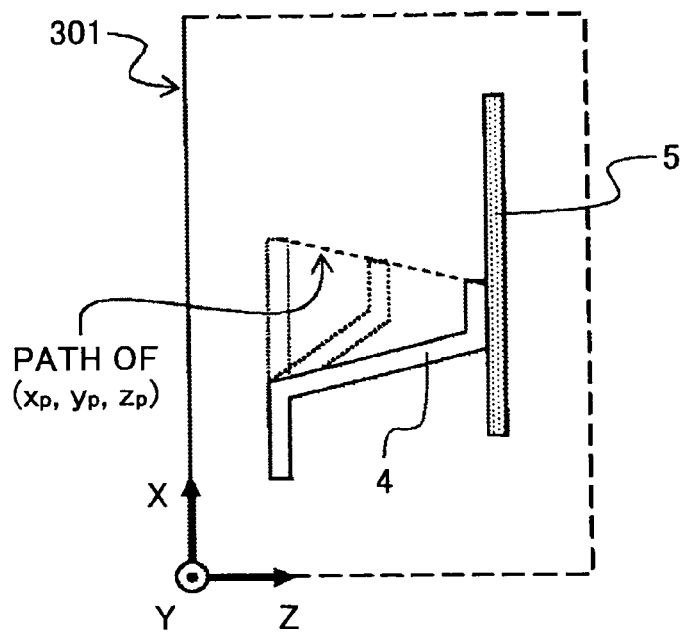
Figure 76A:
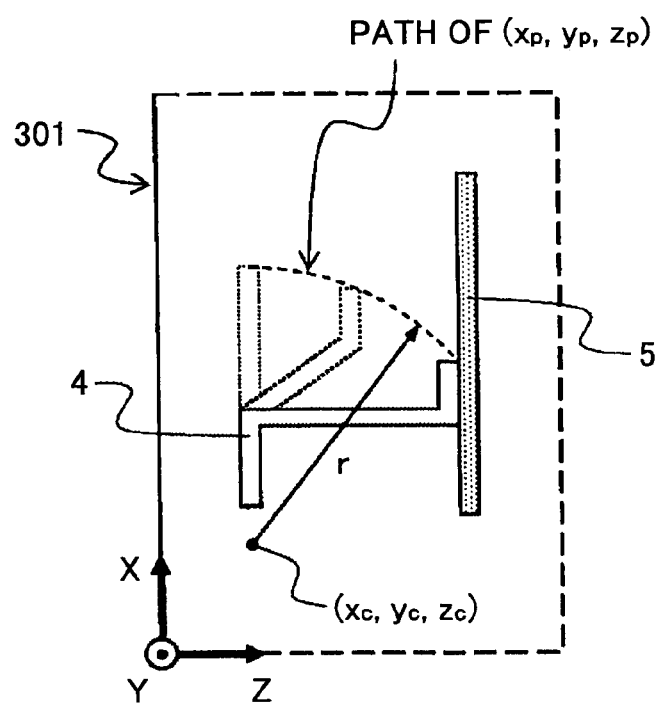
Figure 76B:
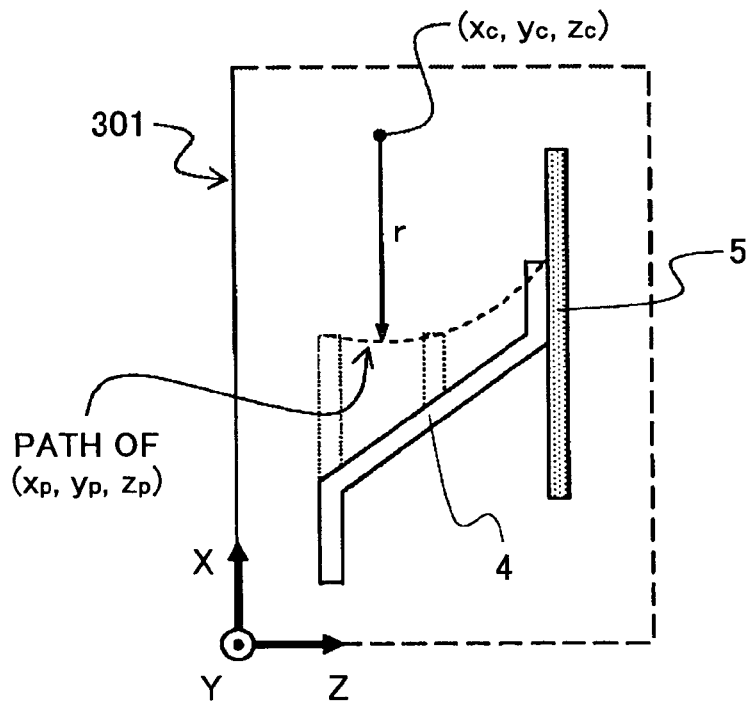
Figure 77A:
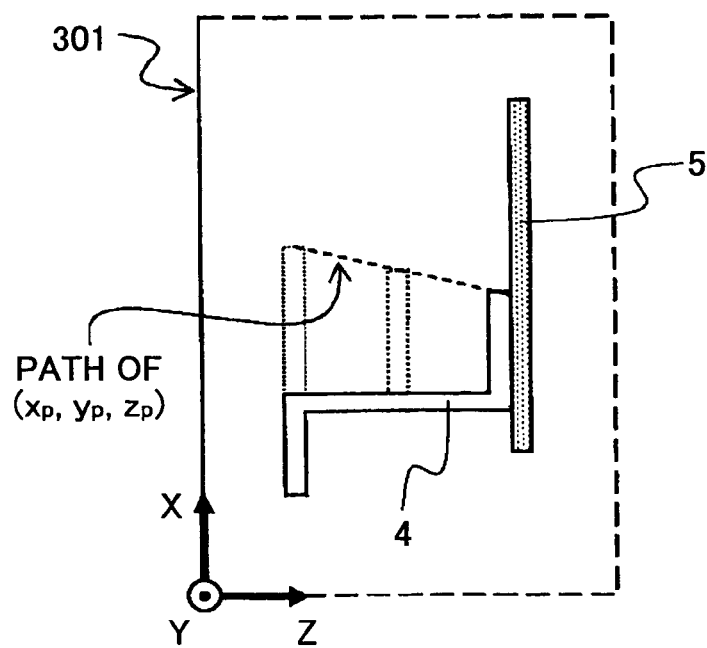
Figure 77B:
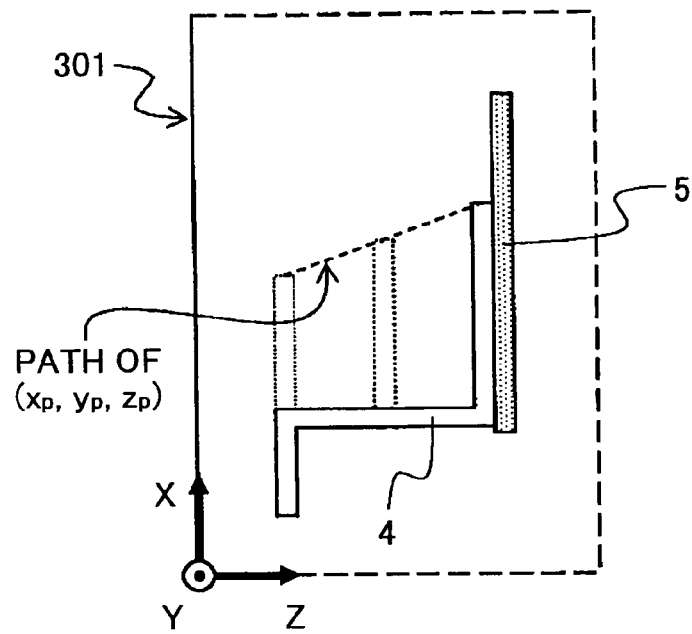
Figure 78A:
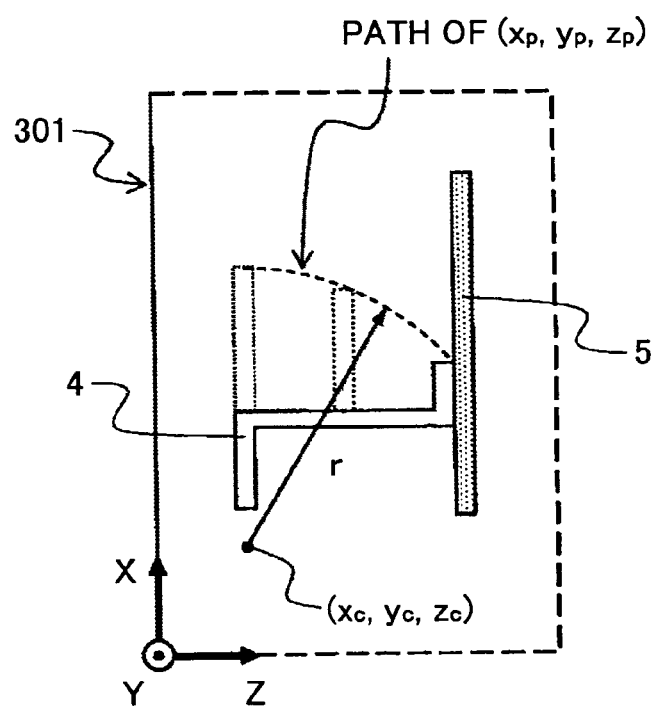
Figure 78B:
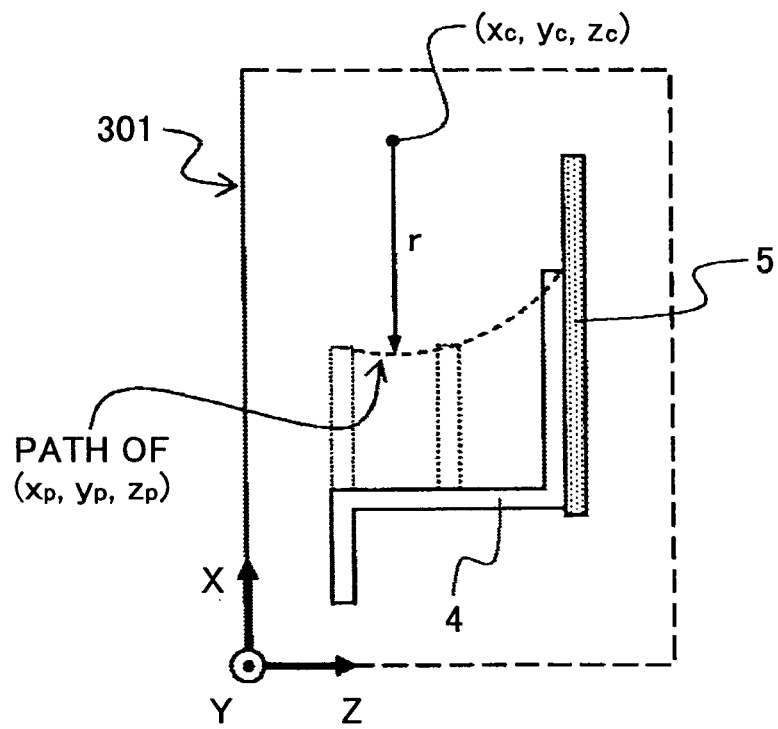
Figure 79A:
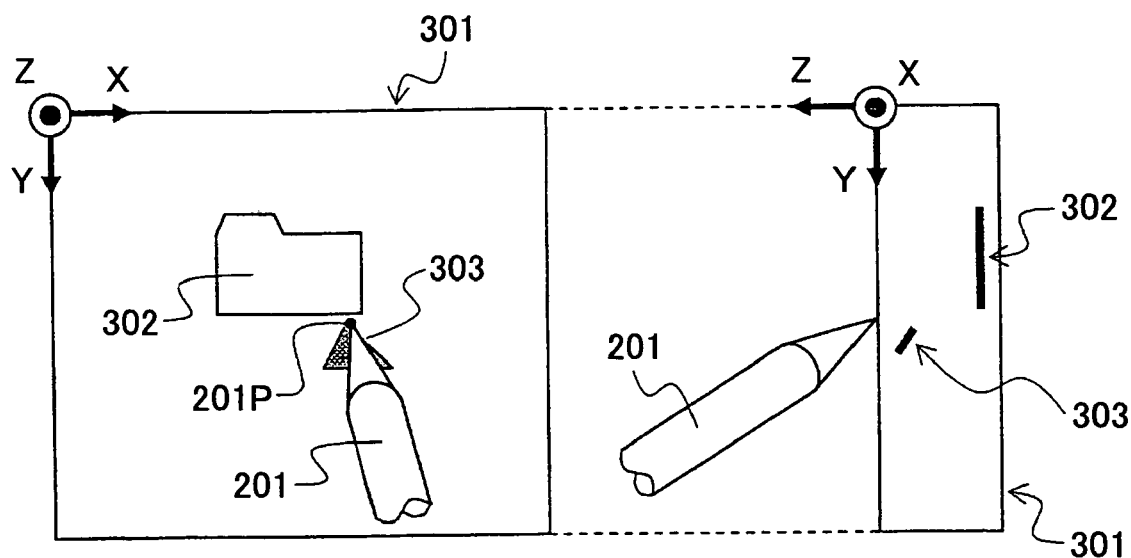
Figure 79B:
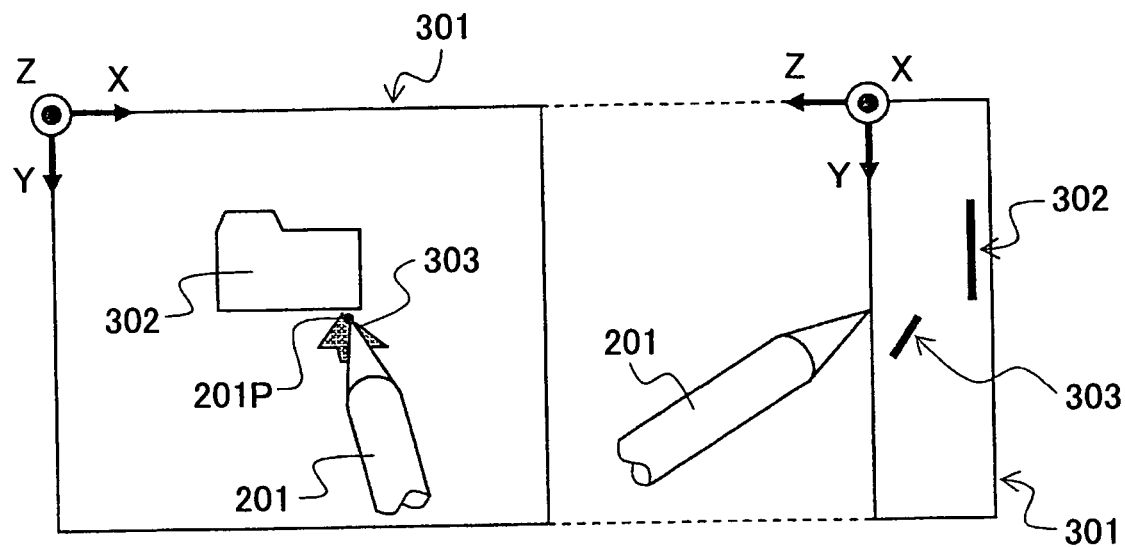
Figure 79C:
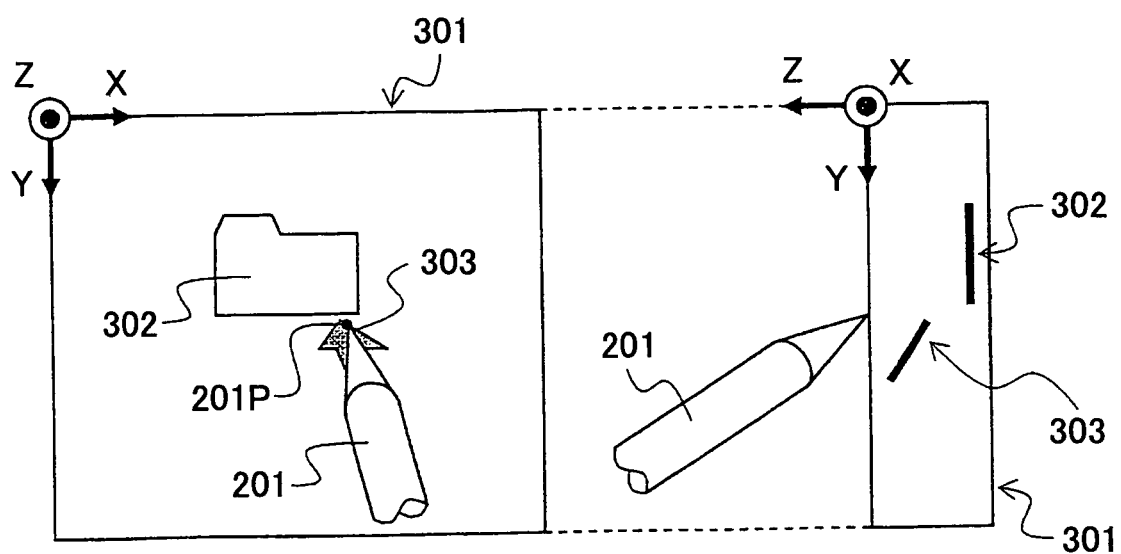
Figure 80:
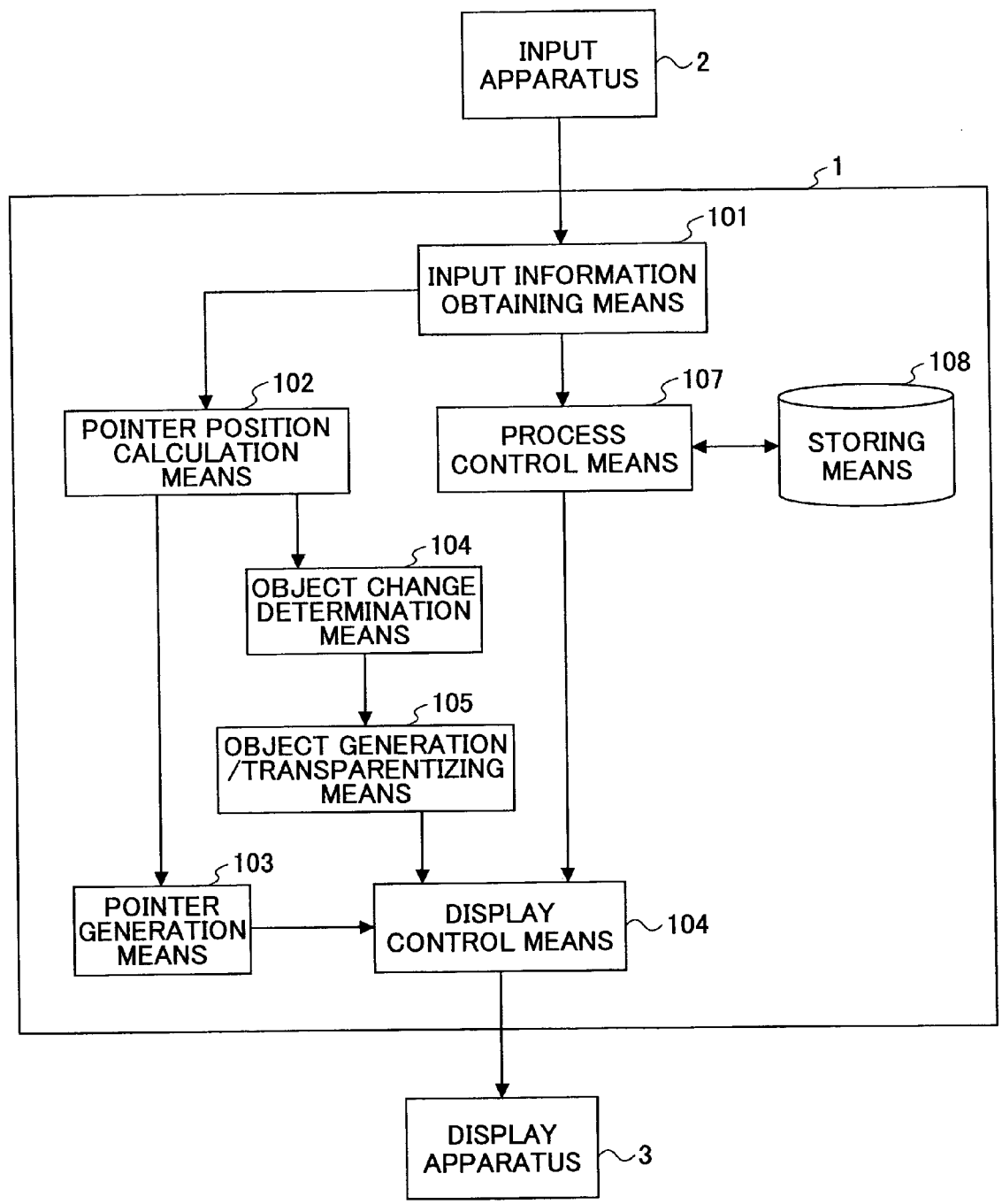
Figure 81:
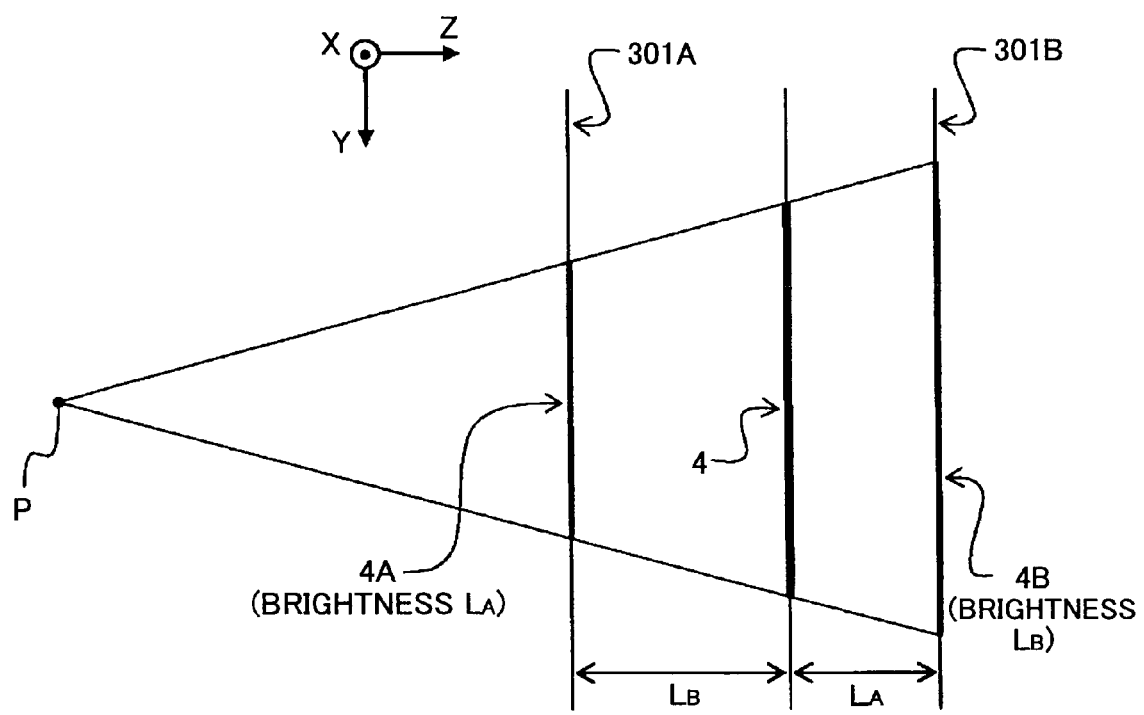
Figure 82:
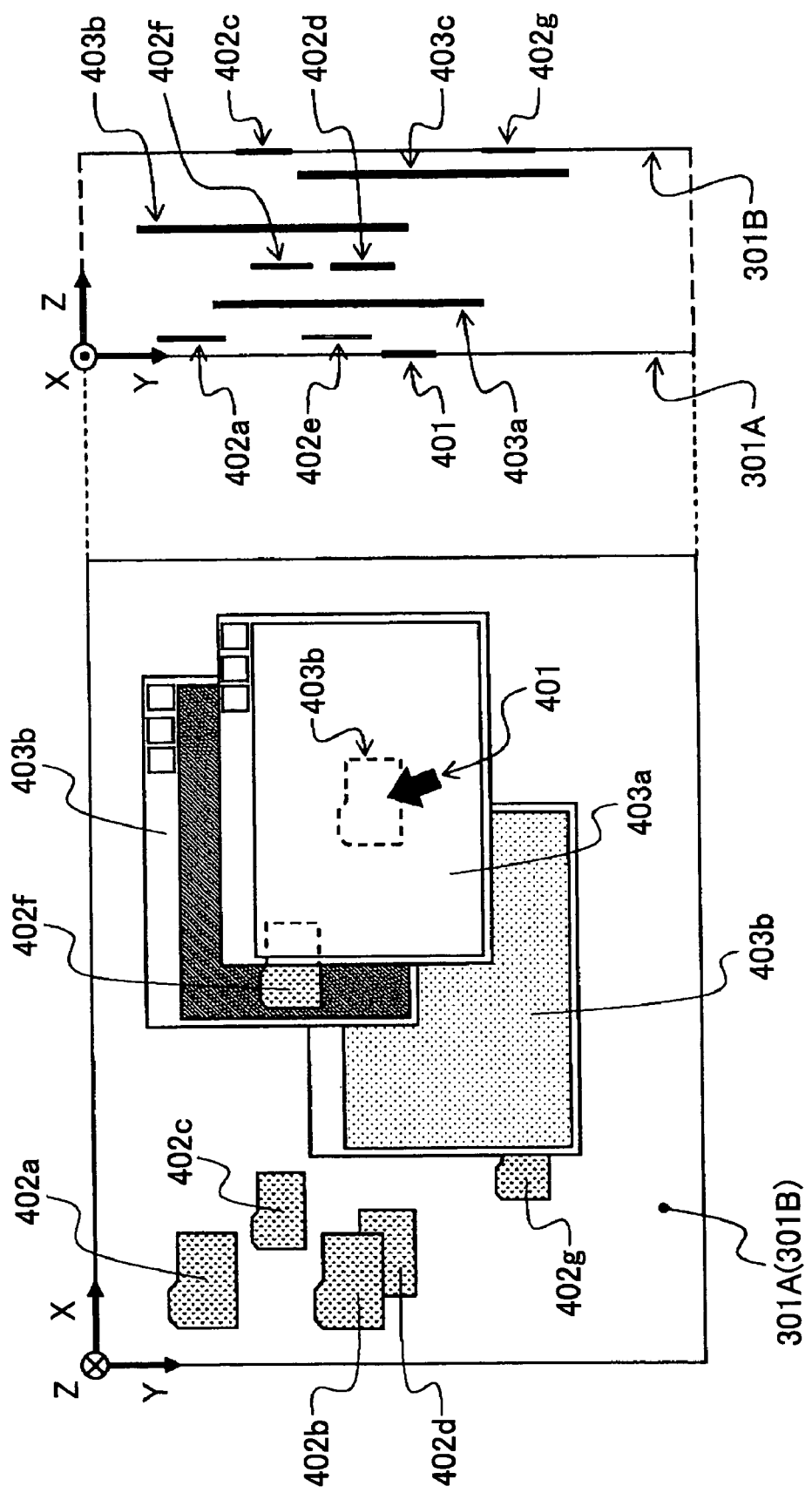
Figure 83:
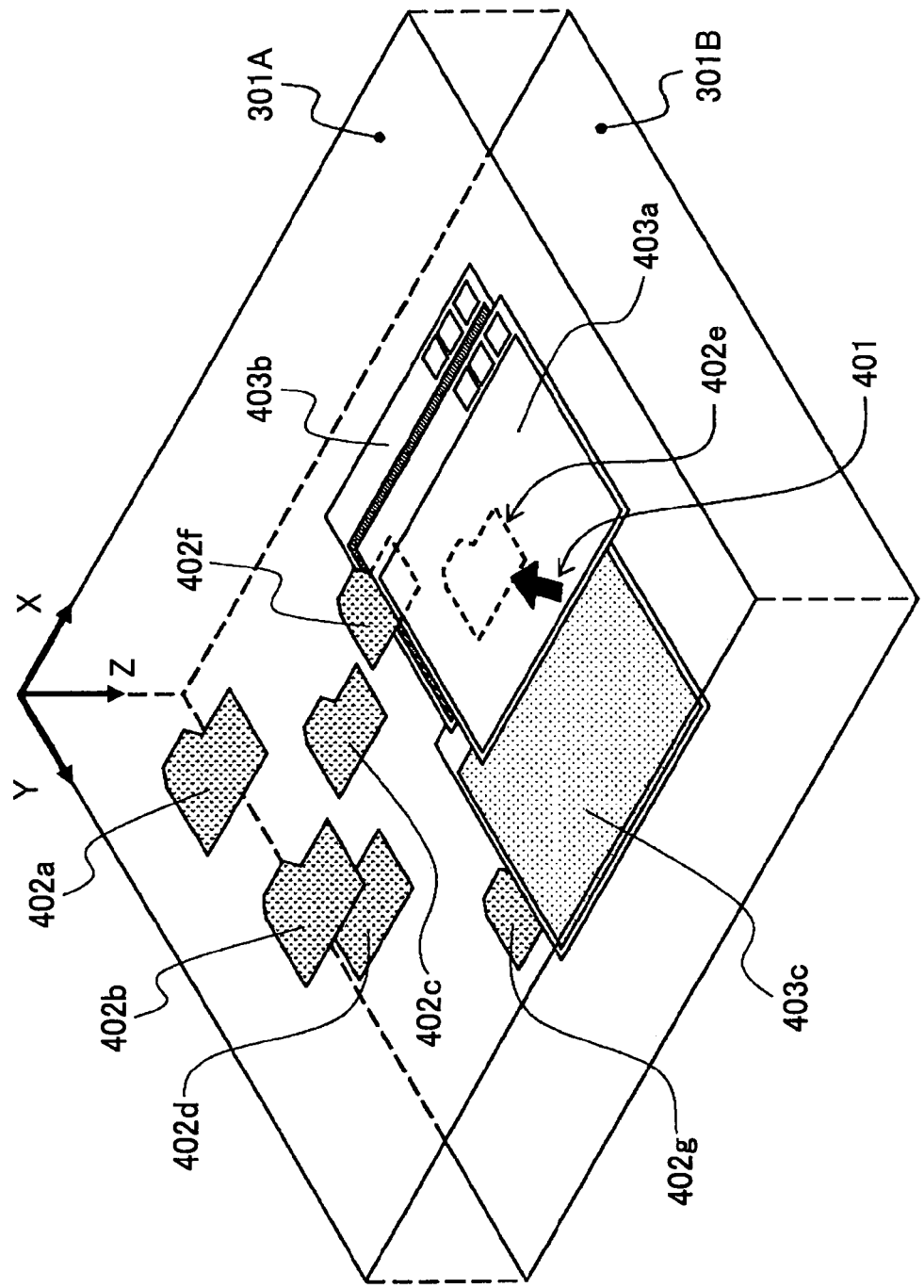
Figure 84:
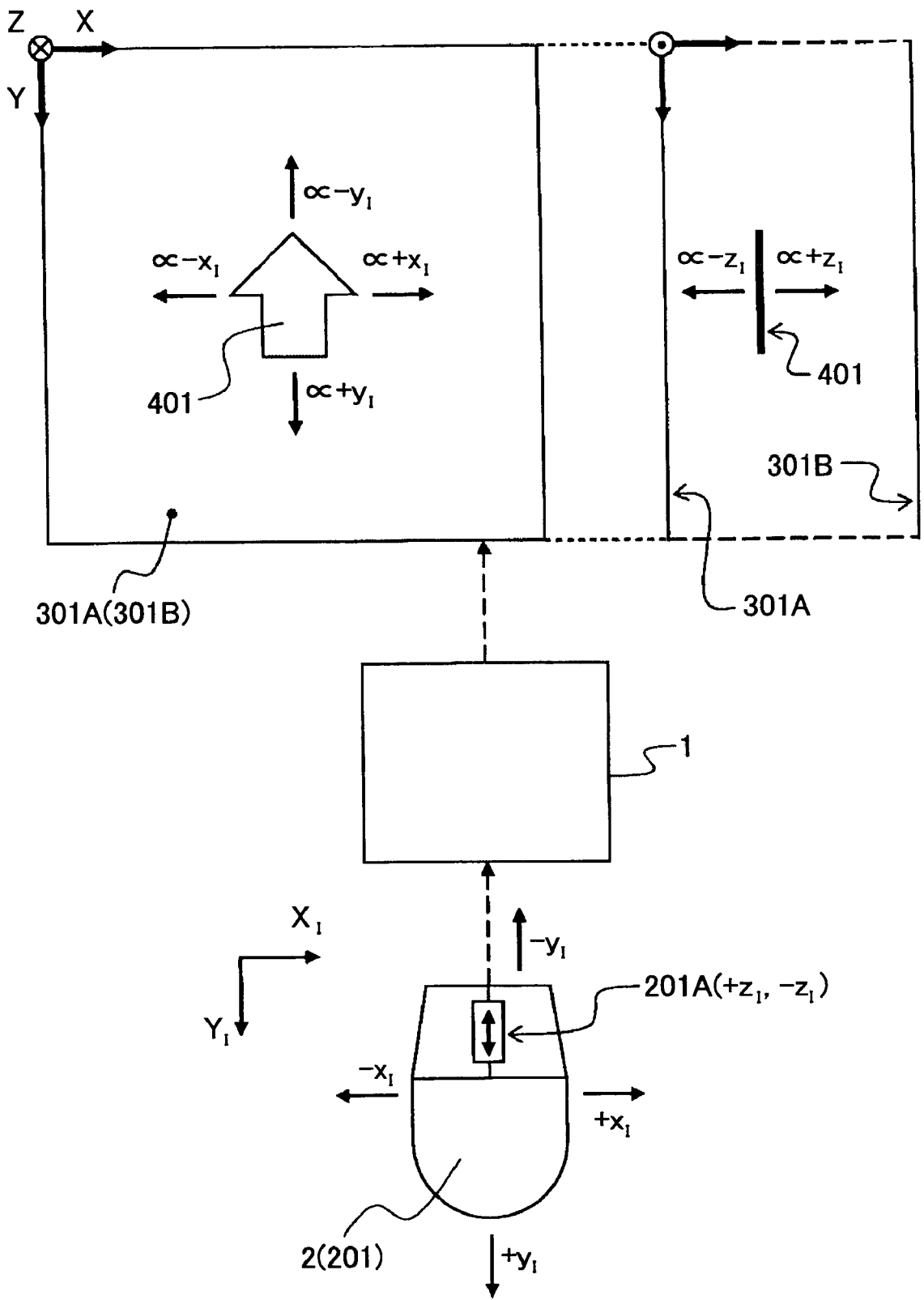
Figure 85:
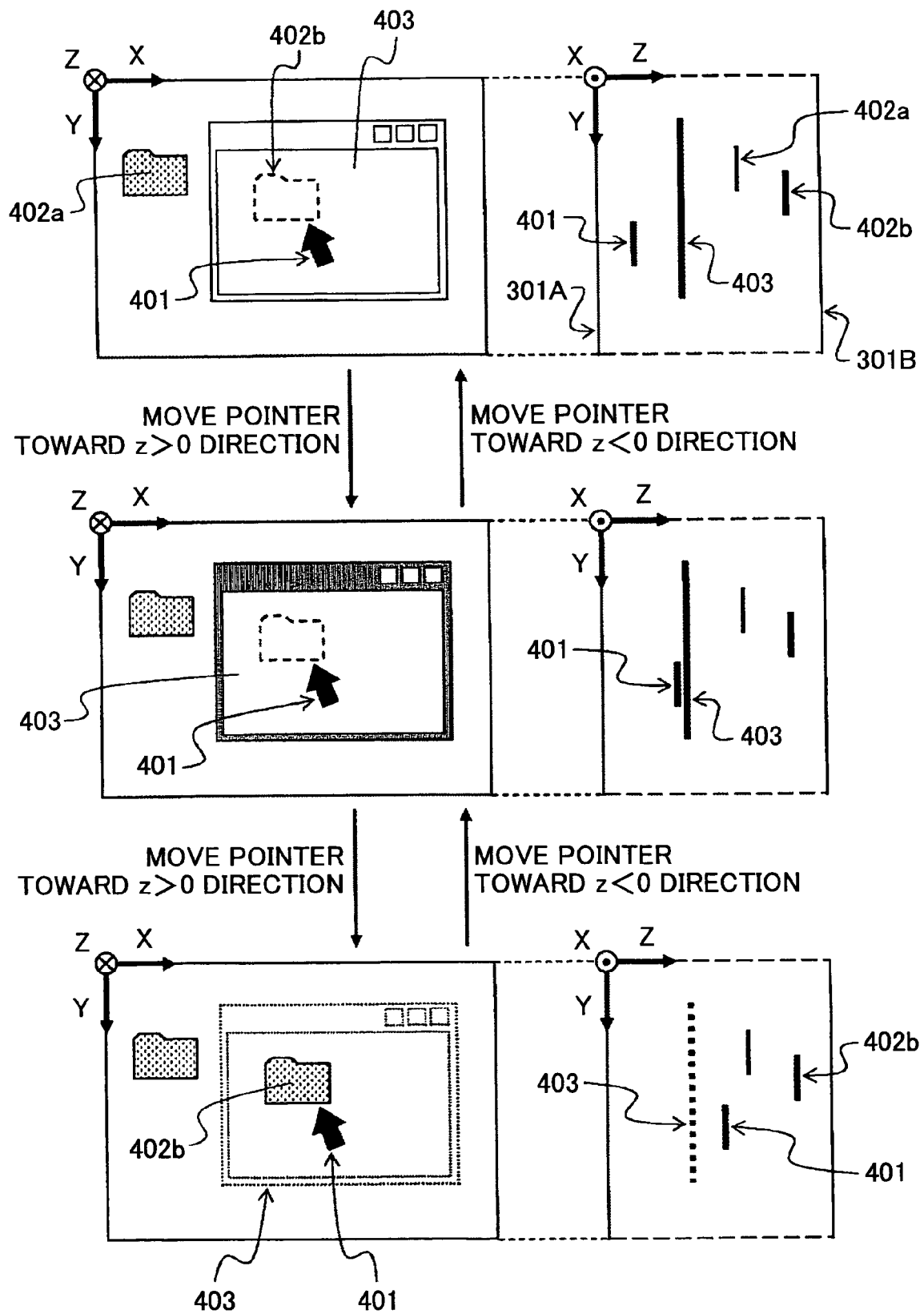
Figure 86:
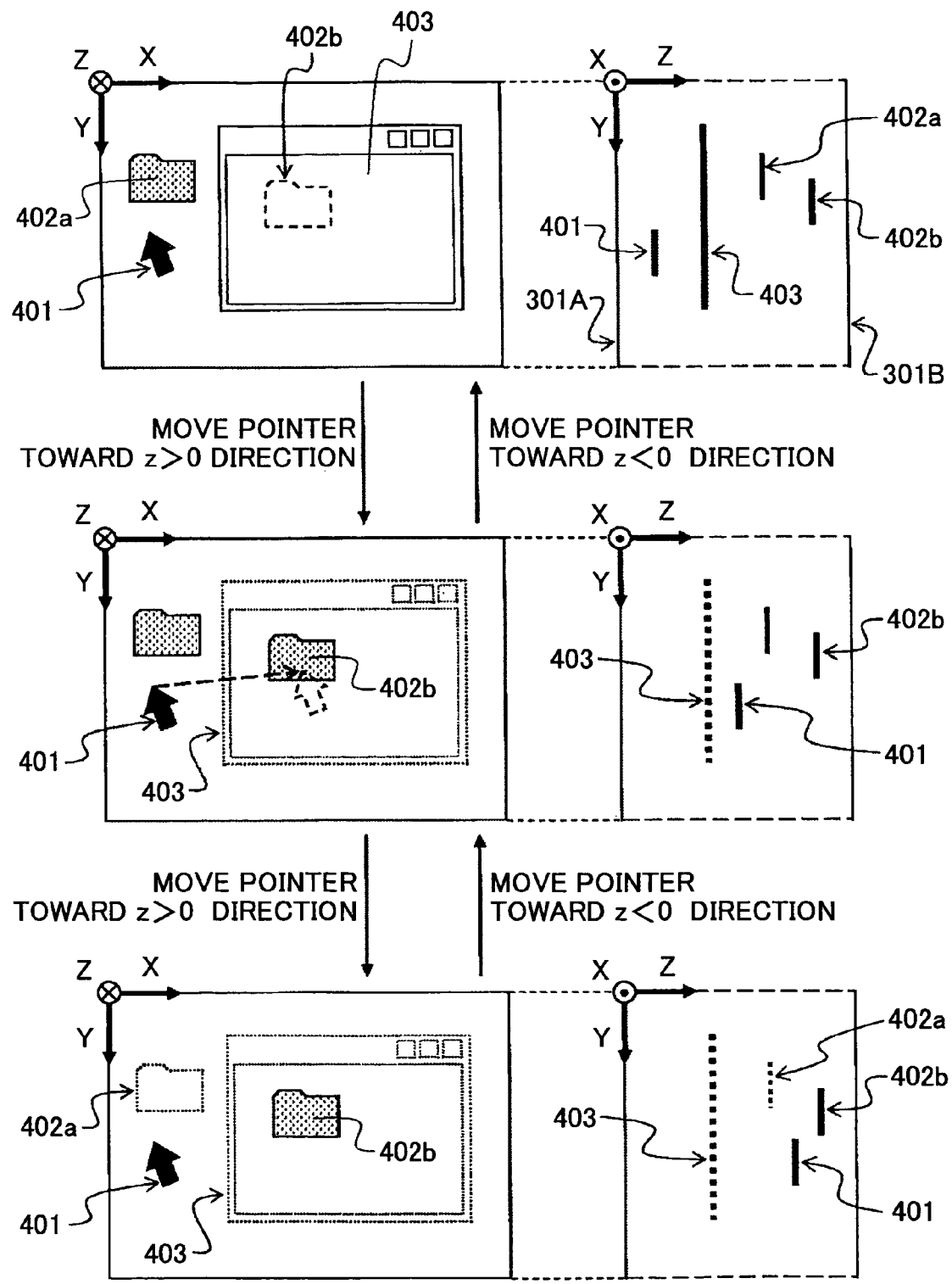
Figure 87:
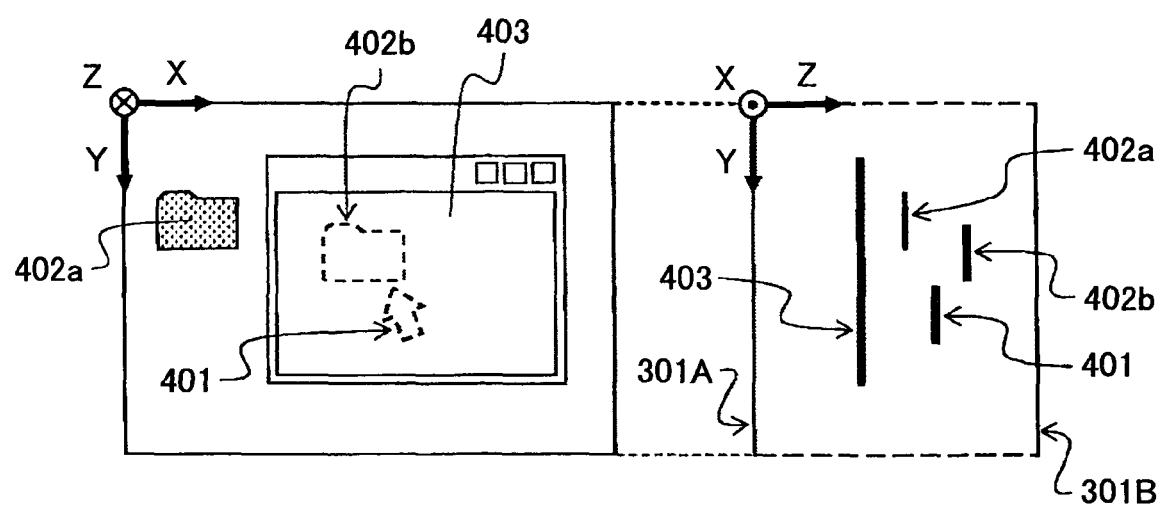
Figure 88:
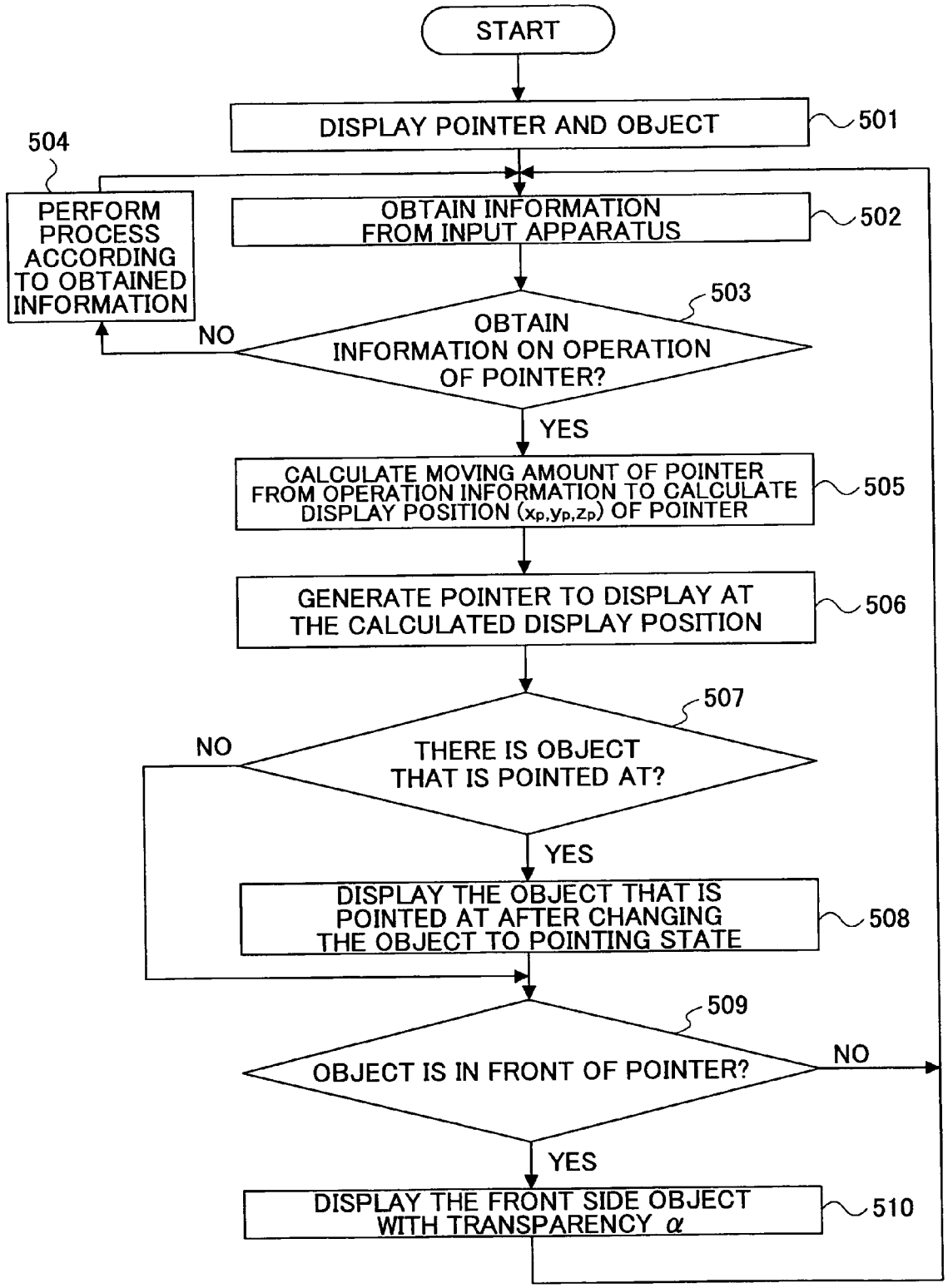
Figure 89:
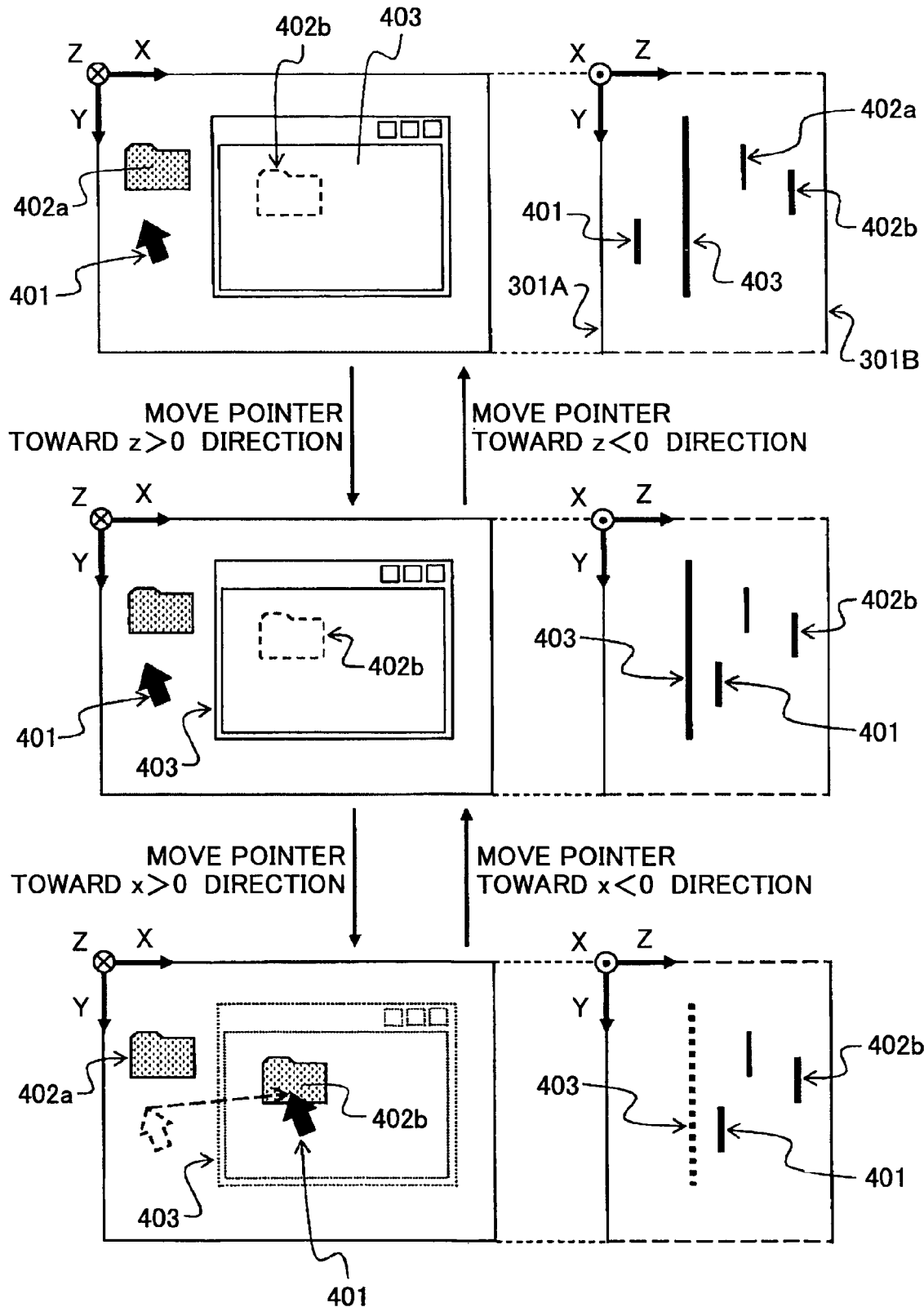
Figure 90:
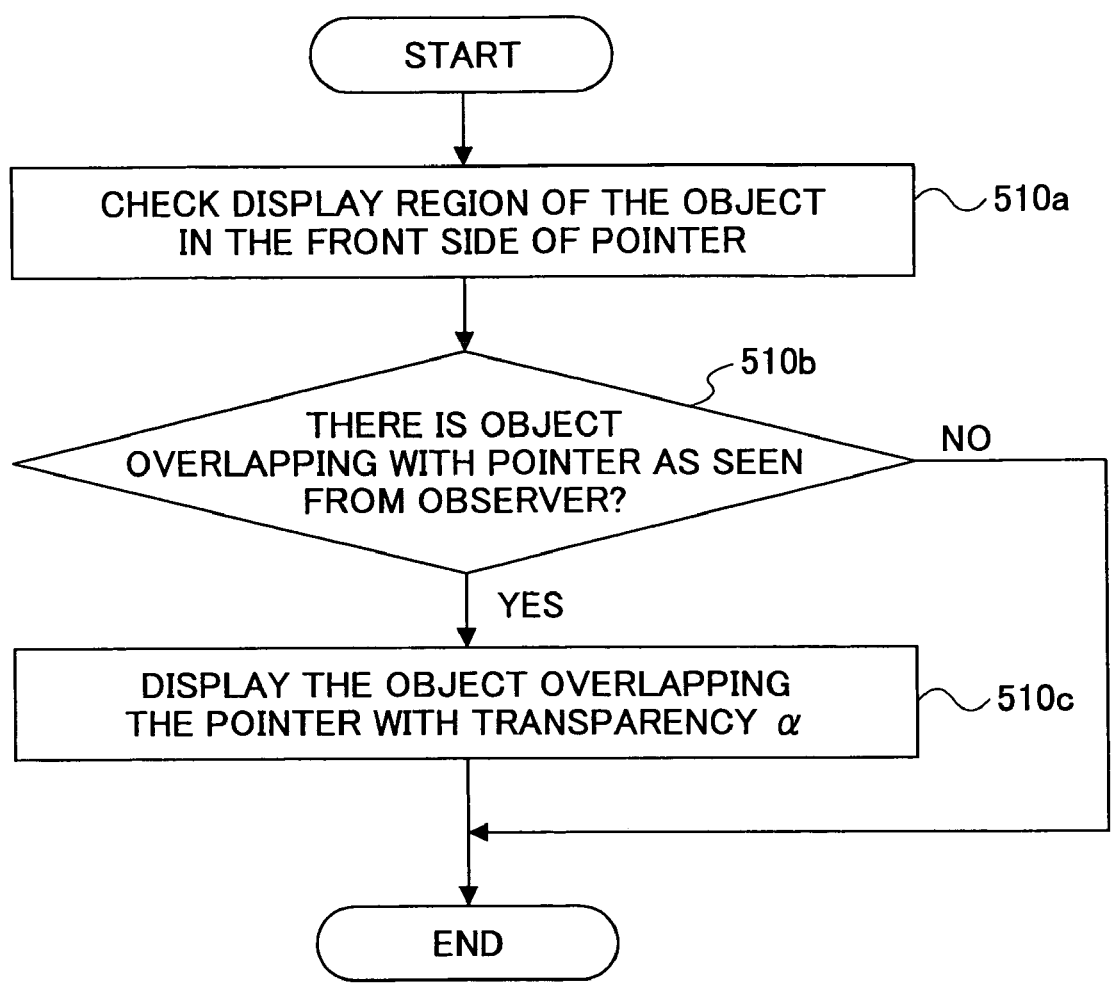
Figure 91:
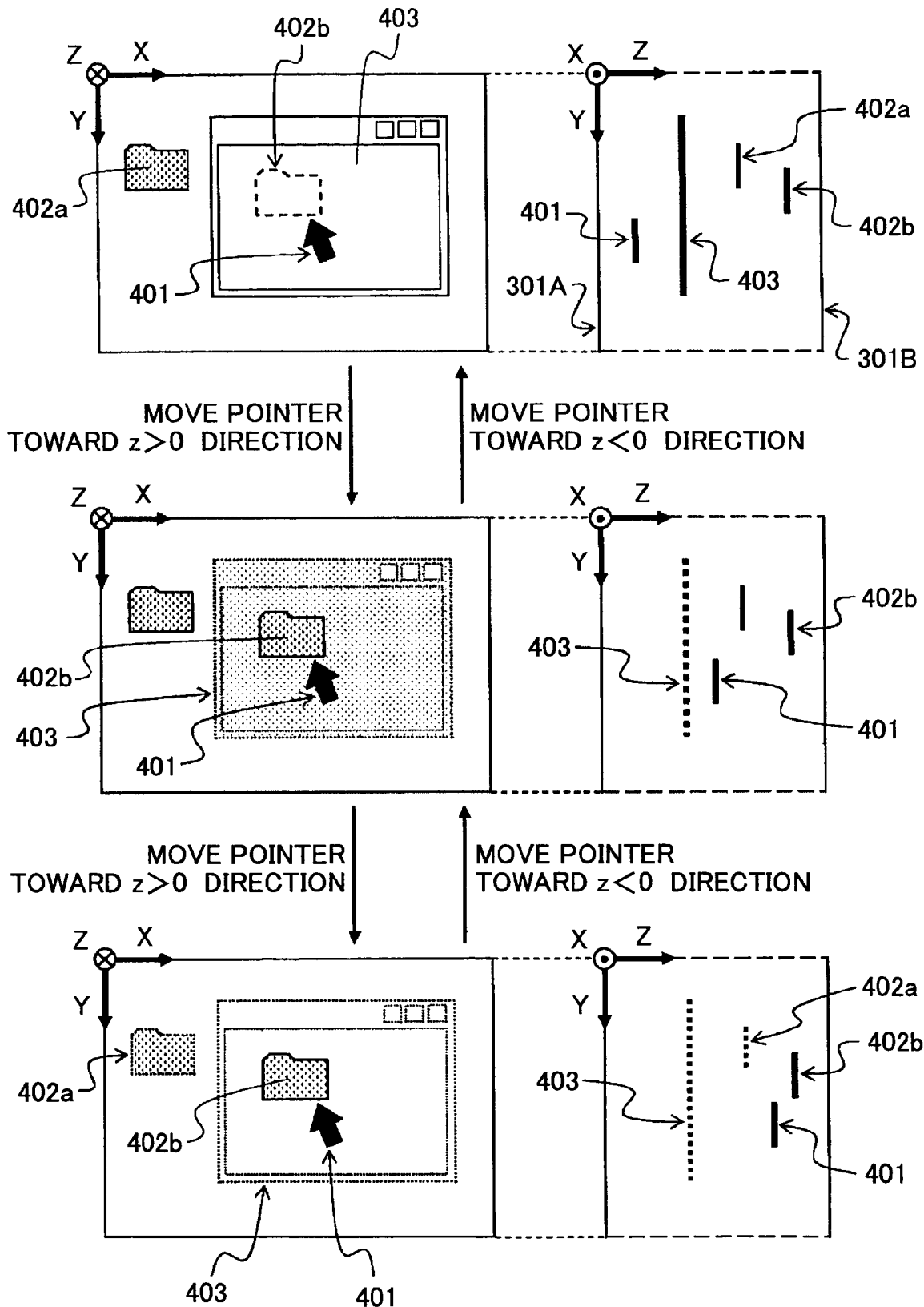
Figure 92:
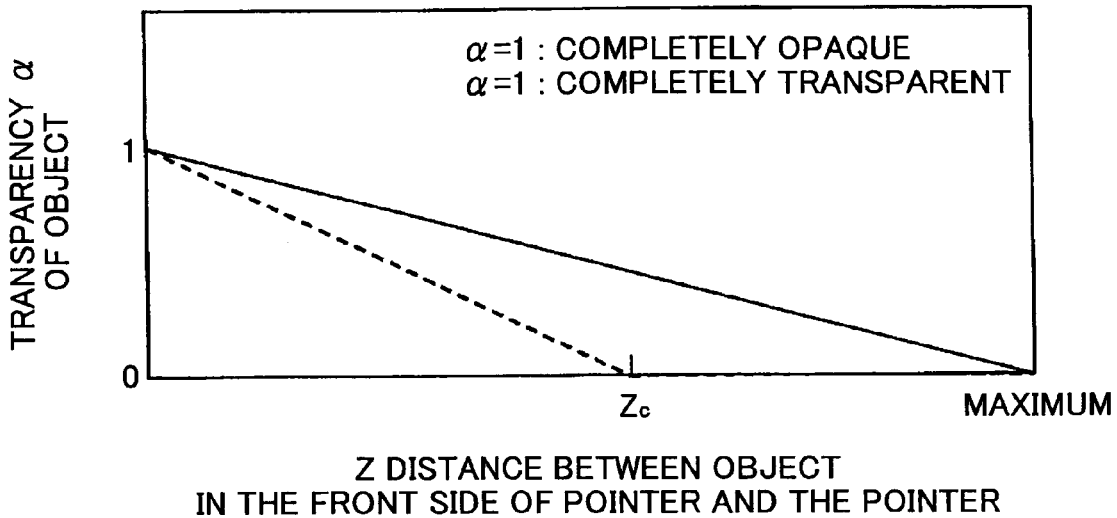
Figure 93:
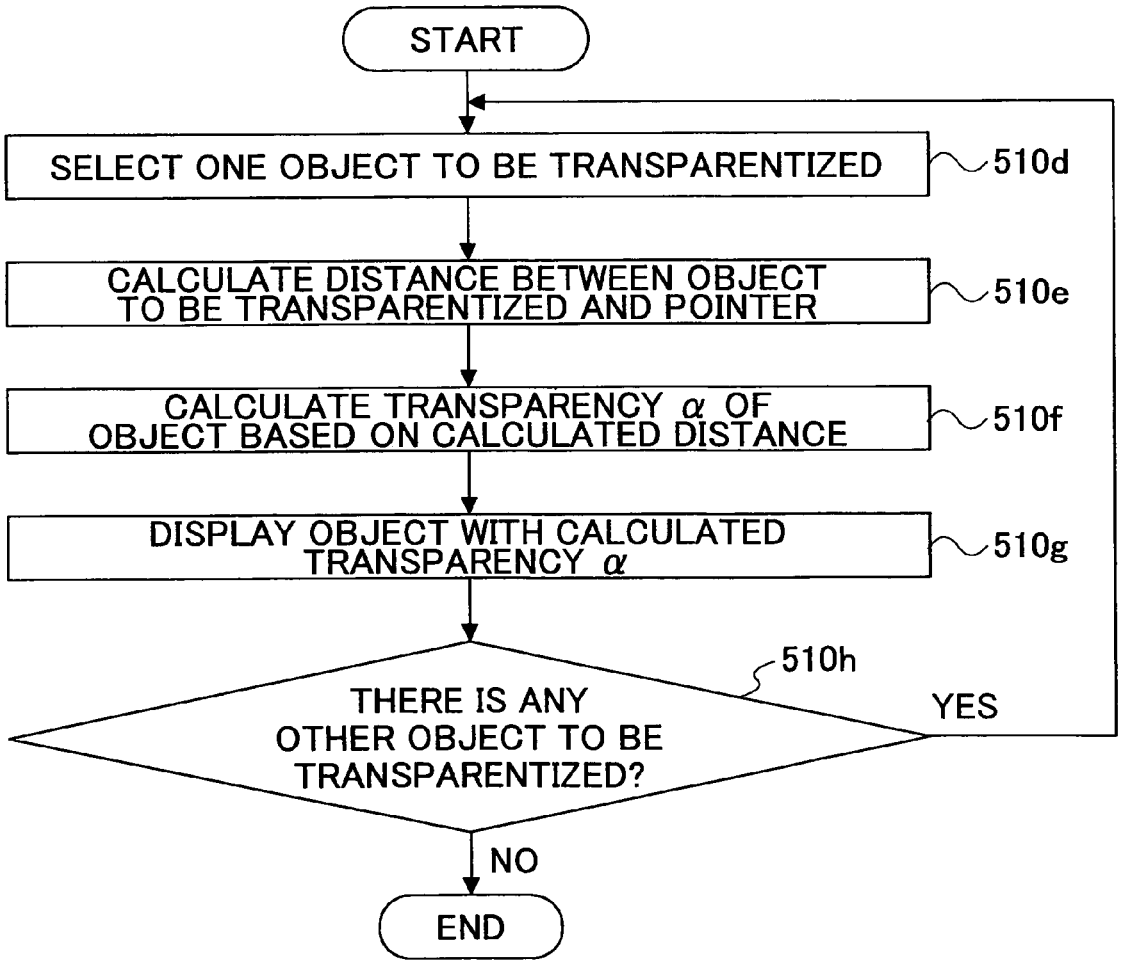
Figure 94:
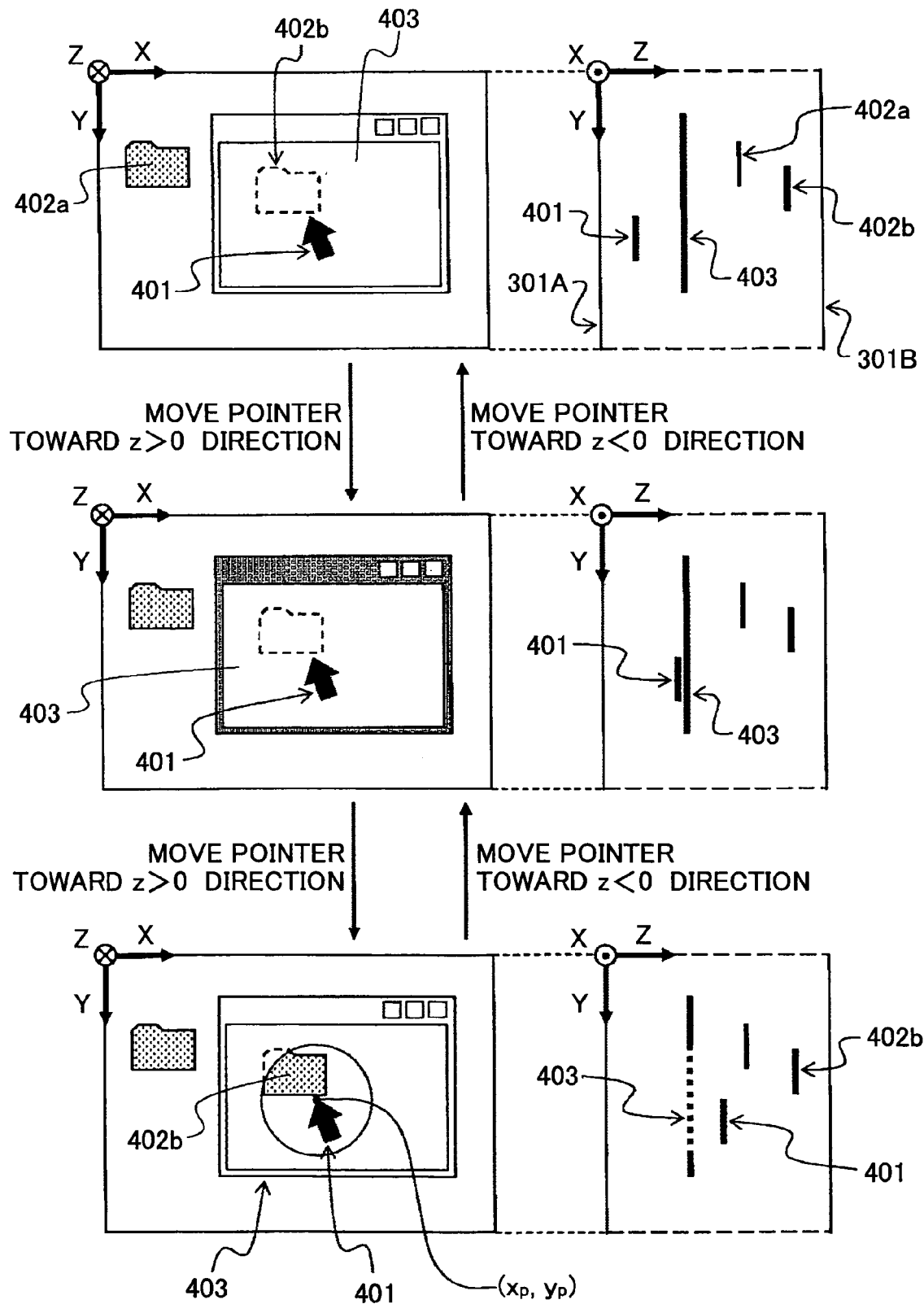
Figure 95A:
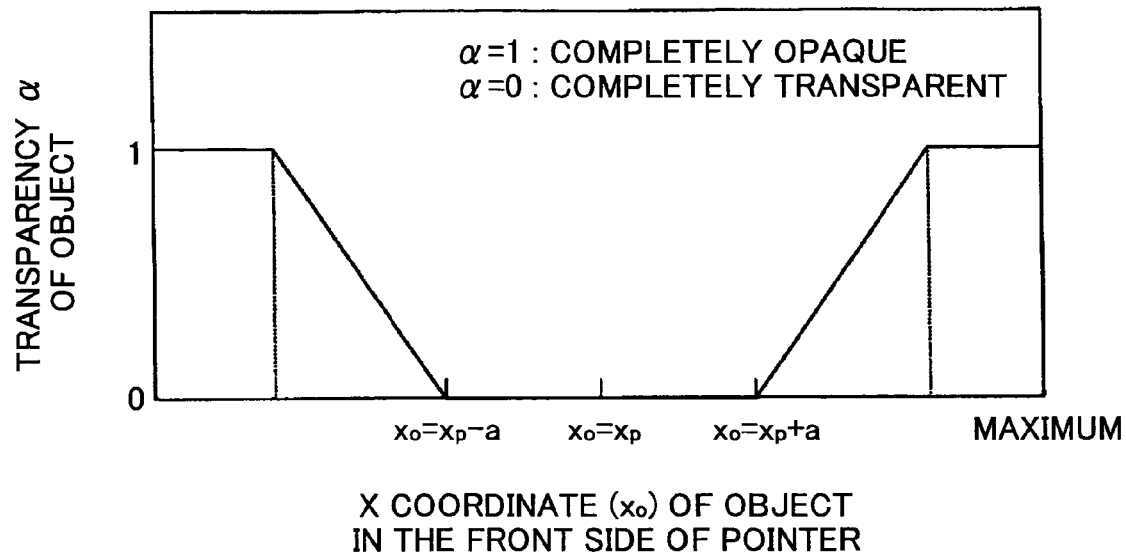
Figure 95B:
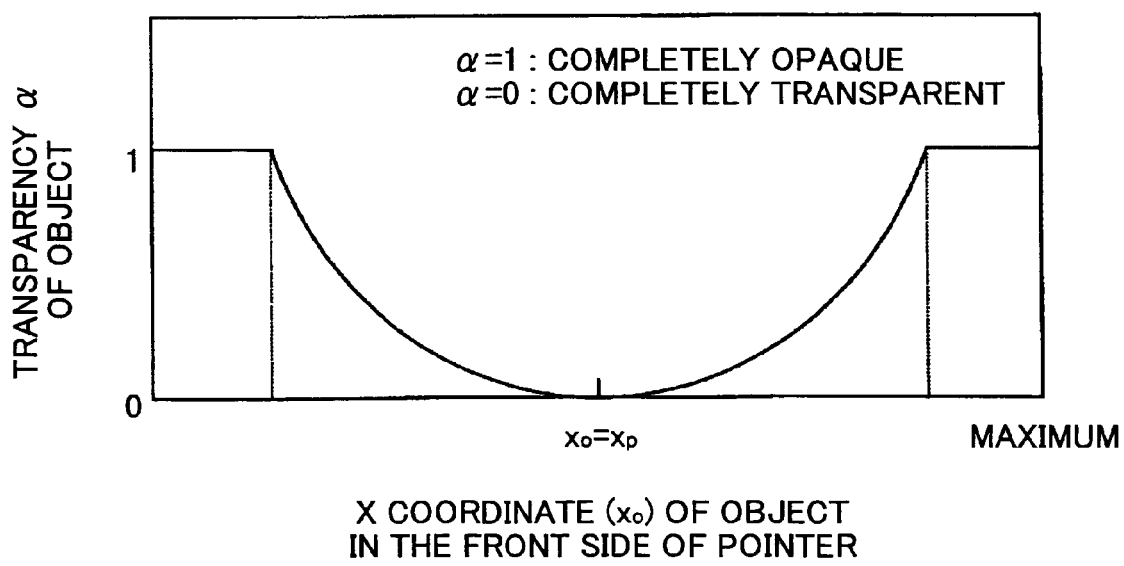
Figure 96:
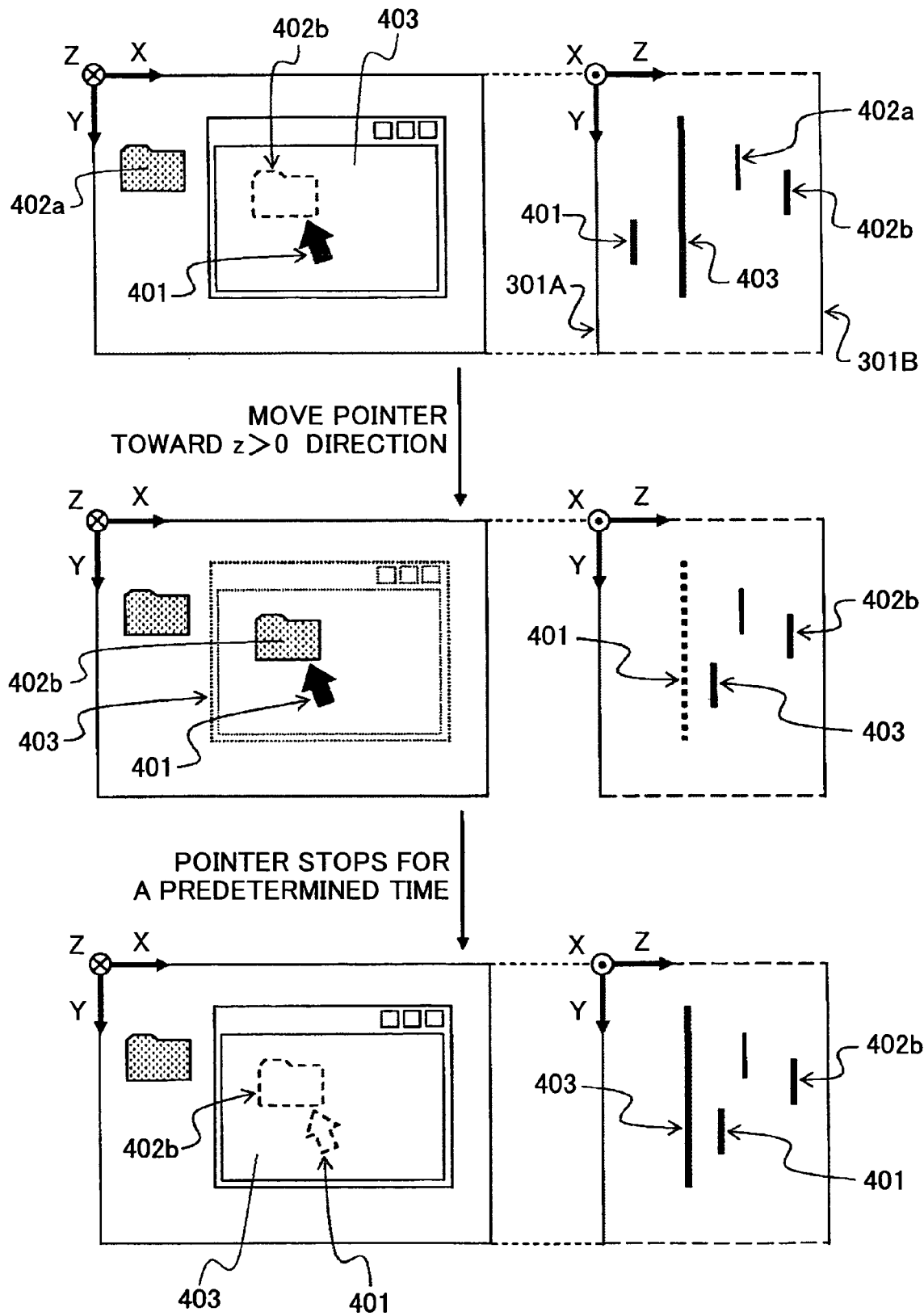
Figure 97:
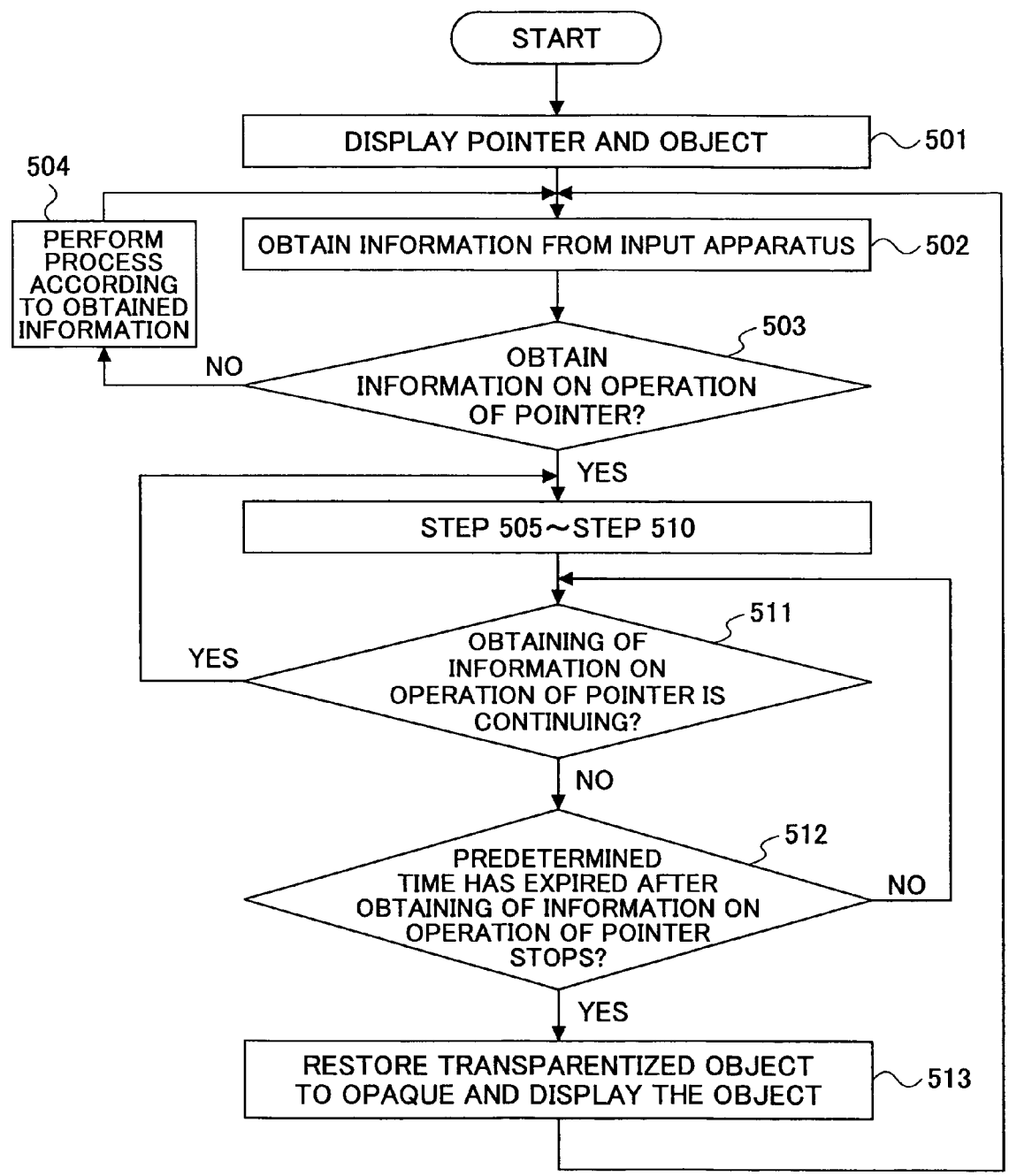
Figure 98:
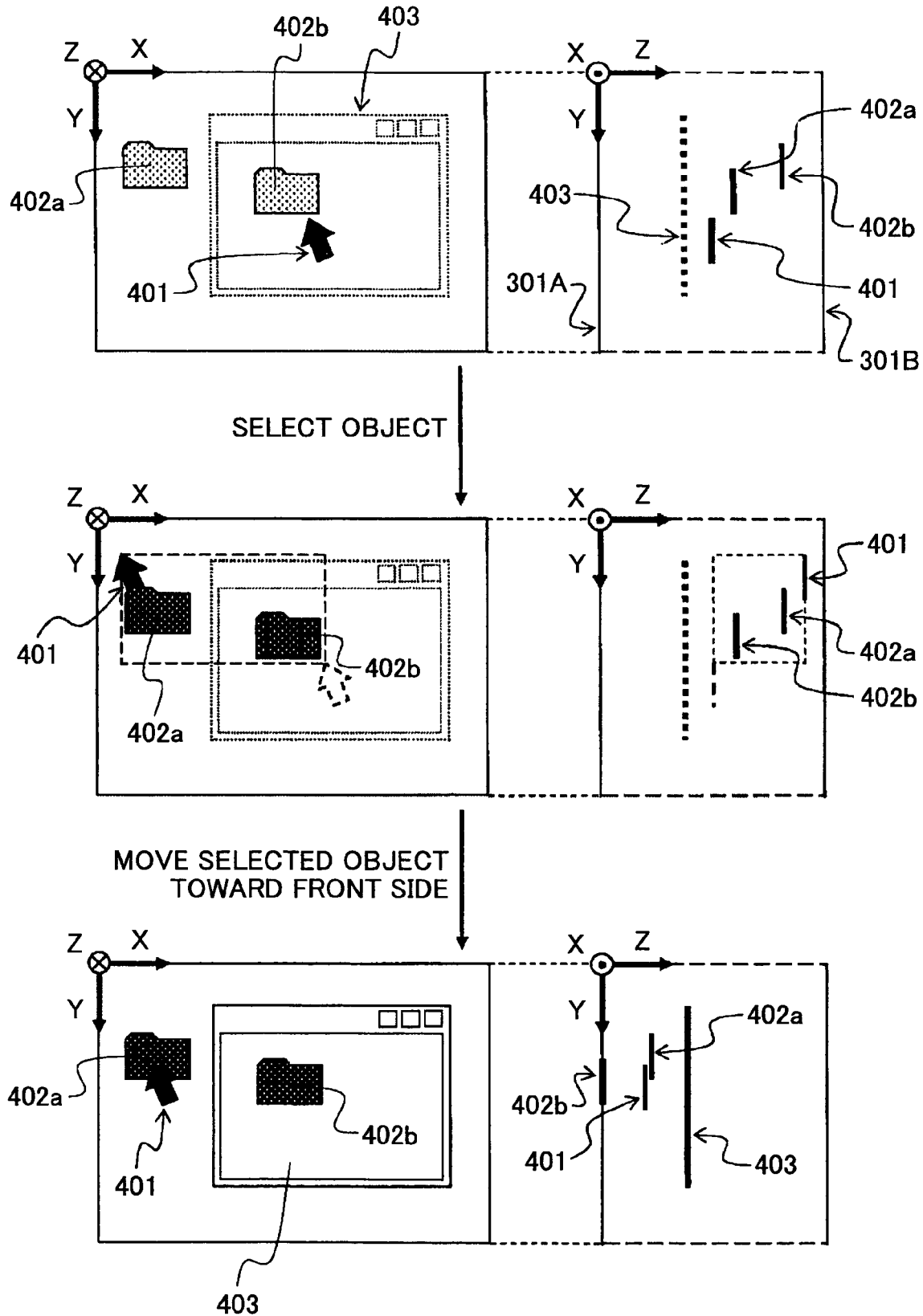
Figure 99:
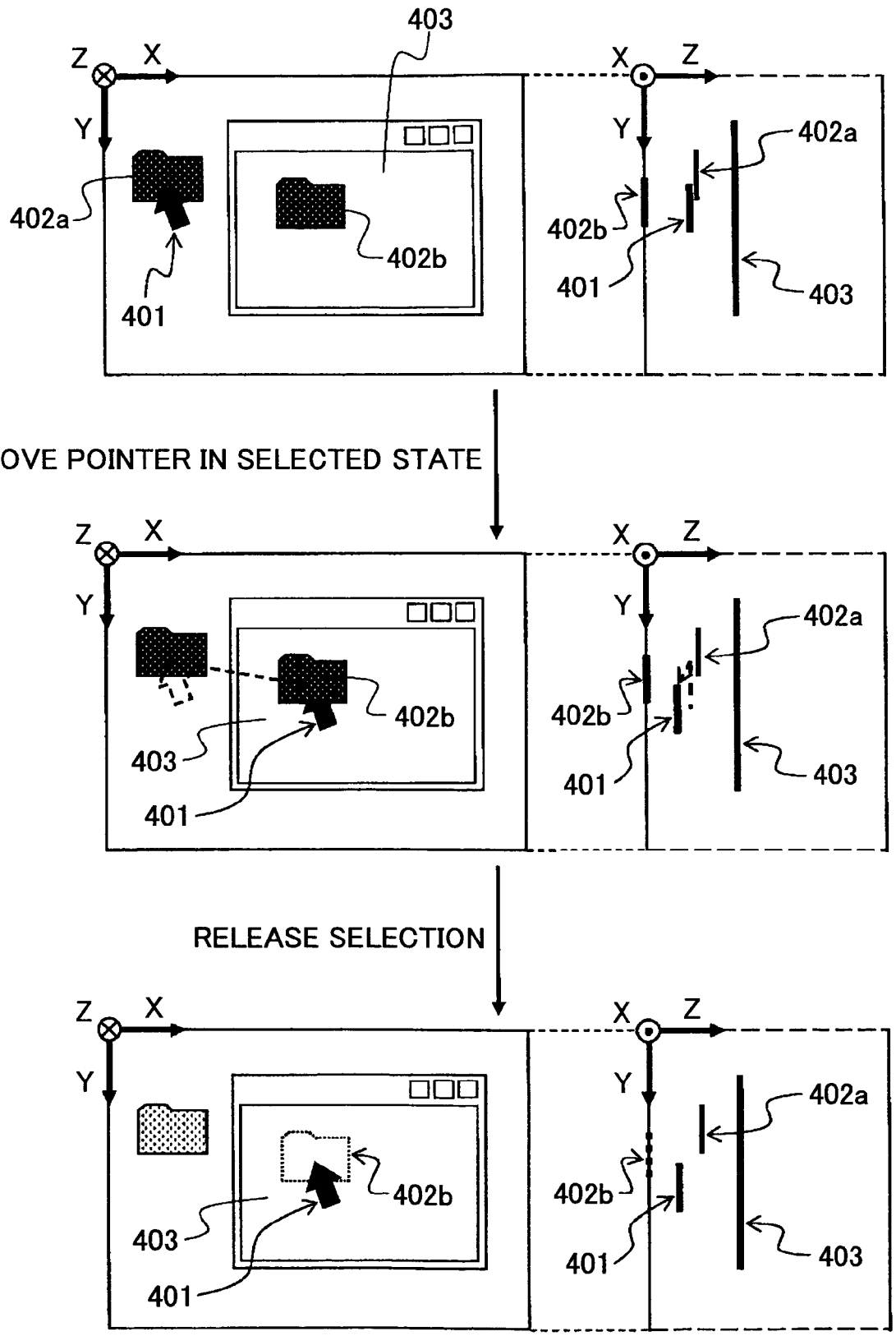
Figure 100:
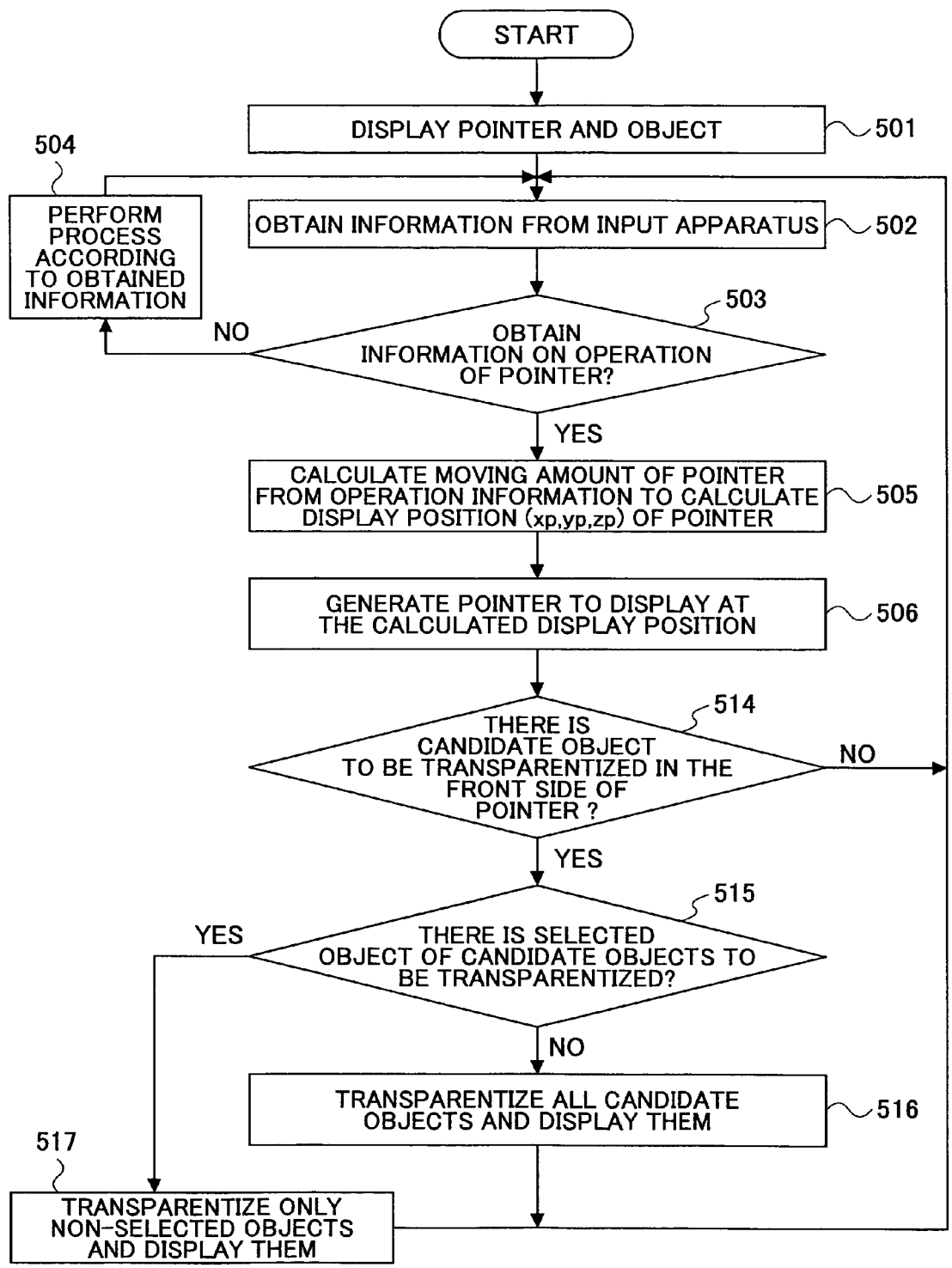

FIG. 70B is a schematic diagram for explaining an application example of the three-dimensional pointing method of the embodiment 3-2, and shows a case in which the point of the center of the rotation moves in the three-dimensional space;

FIG. 71 is schematic diagram for describing the three-dimensional pointing method of the embodiment 3-3, and shows a front view and a right side view showing change in the three-dimensional space when pointing at an object in the rear side of the pointer;

FIG. 72 is schematic diagram for describing the three-dimensional pointing method of the embodiment 3-3, and shows a perspective view of change of the three-dimensional space of FIG. 71;

FIG. 73 is schematic diagram for describing the three-dimensional pointing method of the embodiment 3-3, and shows a flowchart for explaining the process procedure when the three-dimensional pointing method of the embodiment 3-3 is executed in the system control apparatus (pointing apparatus);

FIG. 74A is a schematic diagram for explaining a pointer connecting method in the three-dimensional pointing method of the embodiment 3-3, and shows the pointer connecting method as seen from the XZ plane side;

FIG. 74B is a schematic diagram for explaining a pointer connecting method in the three-dimensional pointing method of the embodiment 3-3, and shows the pointer connecting method as seen from the XZ plane side;

FIG. 74C is a schematic diagram for explaining a pointer connecting method in the three-dimensional pointing method of the embodiment 3-3, and shows the pointer connecting method as seen from the XZ plane side;

FIG. 74D is a schematic diagram for explaining a pointer connecting method in the three-dimensional pointing method of the embodiment 3-3, and shows the pointer connecting method as seen from the XZ plane side;

FIG. 75 is a schematic block diagram for explaining an application example in the three-dimensional pointing method of the embodiment 3-3, and shows an application example for moving while the shape of the part for performing pointing is kept;

FIG. 76A is a schematic block diagram for explaining an application example in the three-dimensional pointing method of the embodiment 3-3, and shows an application example for moving while the shape of the part for performing pointing is kept;

FIG. 76B is a schematic block diagram for explaining an application example in the three-dimensional pointing method of the embodiment 3-3, and shows an application example for moving while the shape of the part for performing pointing is kept;

FIG. 77A is a schematic block diagram for explaining an application example in the three-dimensional pointing method of the embodiment 3-3, and shows an application example for changing the shape of the part for performing pointing;

FIG. 77B is a schematic block diagram for explaining an application example in the three-dimensional pointing method of the embodiment 3-3, and shows an application example for changing the shape of the part for performing pointing;

FIG. 78A is a schematic block diagram for explaining an application example in the three-dimensional pointing method of the embodiment 3-3, and shows an application example for changing the shape of the part for performing pointing;

FIG. 78B is a schematic block diagram for explaining an application example in the three-dimensional pointing method of the embodiment 3-3, and shows an application example for changing the shape of the part for performing pointing;

FIG. 79A is a figure for explaining an example of a combination of the first and second embodiments and the third embodiments;

FIG. 79B is a figure for explaining an example of a combination of the first and second embodiments and the third embodiments;

FIG. 79C is a figure for explaining an example of a combination of the first and second embodiments and the third embodiments;

FIG. 80 is a schematic diagram for explaining a three-dimensional display control method of the fourth embodiment, and shows an outline configuration of a computer system to which the three-dimensional display control method of the fourth embodiment is applied;

FIG. 81 is a schematic diagram for explaining a three-dimensional display control method of the fourth embodiment, and for explaining the operation principle of the display apparatus (DFD) that can represent the three-dimensional space FIG. 82 is a schematic diagram for explaining a three-dimensional display control method of the fourth embodiment, and shows a front view and a right side view of an example of the three-dimensional space represented on the display apparatus;

FIG. 83 is a schematic diagram for explaining a three-dimensional display control method of the fourth embodiment, and shows a perspective view (a bird's-eye view) of an example of the three-dimensional space represented on the display apparatus;

FIG. 84 is a schematic diagram for explaining a three-dimensional display control method of the fourth embodiment, and shows an example of a method for operating the pointer;

FIG. 85 is a schematic diagram for describing the three-dimensional display control method of the embodiment 4-1, and shows a situation of change of the three-dimensional space when the display control method of this embodiment 4-1 is applied;

FIG. 86 is a schematic diagram for describing the three-dimensional display control method of the embodiment 4-1, and shows a situation of change of the three-dimensional space when the display control method of this embodiment 4-1 is applied;

FIG. 87 is a schematic diagram for describing the three-dimensional display control method of the embodiment 4-1, and shows a situation of the change of the three-dimensional space for describing a conventional display control method for comparing with the display control method of the embodiment 4-1;

FIG. 88 is a flowchart showing a process procedure in the apparatus for realizing the three-dimensional display control method of the embodiment 4-1;

FIG. 89 is a schematic diagram for describing an application example of the three-dimensional display control method of the embodiment 4-1, and shows a situation of change of the three-dimensional space when the application example is applied;

FIG. 90 is a schematic diagram for describing an application example of the three-dimensional display control method of the embodiment 4-1, and shows a process procedure in the apparatus for realizing the application example;

FIG. 91 is a schematic diagram for describing the three-dimensional display control method of the embodiment 4-2, and shows a situation of change of the three-dimensional space when the display control method of the embodiment 4-2 is applied;

FIG. 92 is a schematic diagram for describing the three-dimensional display control method of the embodiment 4-2, and shows an example of a method for determining a transparency;

FIG. 93 is a schematic diagram for describing the three-dimensional display control method of the embodiment 4-2, and shows a flowchart showing a process procedure in the apparatus for realizing the three-dimensional display method of the embodiment 4-2;

FIG. 94 is a schematic diagram for describing the three-dimensional display control method of the embodiment 4-3, and shows a situation of change of the three-dimensional space when the display control method of the embodiment 4-3 is applied;

FIG. 95A is a schematic diagram for describing the three-dimensional display control method of the embodiment 4-3, and shows an example of a method for determining a transparency;

FIG. 95B is a schematic diagram for describing the three-dimensional display control method of the embodiment 4-3, and shows an example of a method for determining a transparency;

FIG. 96 is a schematic diagram for describing the three-dimensional display control method of the embodiment 4-4, and shows a situation of change of the three-dimensional space when the display control method of the embodiment 4-4 is applied;

FIG. 97 is a schematic diagram for describing the three-dimensional display control method of the embodiment 4-4, and shows a flowchart showing a process procedure in the apparatus for realizing the three-dimensional display method of this embodiment 4-4;

FIG. 98 is a schematic diagram for describing the three-dimensional display control method of the embodiment 4-5, and shows a method for selecting an object FIG. 99 is a schematic diagram for describing the three-dimensional display control method of the embodiment 4-5, and shows a situation of change of the three-dimensional space when the display control method of this embodiment 4-5 is applied; and FIG. 100 is a schematic diagram for describing the three-dimensional display control method of the embodiment 4-5, and shows a flowchart showing a process procedure in the apparatus for realizing the three-dimensional display method of the embodiment 4-5.

DESCRIPTION OF REFERENCE SIGNS

First Embodiment

1 system control apparatus
101 input information obtaining means
102 pointer position/rotation angle calculation means
103 pointer generation means
104 pointing determination means
105 object generation means
106 display control means
2 input apparatus
201 input pen
201D button of input pen
201P pen tip of input pen
201X axis of case of input pen
3 display apparatus
301 three-dimensional space represented on display apparatus
302 object
303 pointer
304 window
305 trash box object Second Embodiment

1 system control apparatus
101 input information obtaining means
102 pointer position/rotation angle calculation means.
103 pointer generation means
104 pointing determination means
105 object generation means
106 display control means
109 input information process means
2 input apparatus 201 input pen
201D operation means (button, wheel, sliding bar)
201P pen tip of input pen
201X axis of case of input pen
3 display apparatus
301 three-dimensional space represented on display apparatus
302 object
303 pointer
304 window
305 trash box object Third Embodiment 1 system control apparatus (pointing apparatus)
101 input information obtaining means
102 pointer position/deformation amount calculation means
103 pointer generation means
104 display control means
105 pointing determination means
106 object generation means
107 process control means
108 storing means
2 input apparatus
201 keyboard
202 mouse
3 display apparatus
301, 301A, 301B display plane
4 pointer
5 object Fourth Embodiment 1 system control apparatus
101 input information obtaining means
102 pointer position calculation means
103 pointer generation means
104 object change determination means
105 object generation/transparentizing means
106 display control means
2 input apparatus
201 mouse with wheel function (mouse)
201A wheel of mouse
301A front side display plane
301B back side display plane
4 object
4A object displayed on the front side display plane
4B object displayed on the back side display plane
401 pointer
401a-402g folder icon
403, 403a-403c window

PREFERRED EMBODIMENTS FOR CARRYING OUT THE INVENTION

In the following, first-fourth embodiments of the present invention are described. By the way, unless otherwise noted, reference numerals in figures are assigned independently in each embodiment.

First Embodiment

First, the first embodiment of the present invention is described. The first embodiment corresponds to the first object.

The three-dimensional pointing method of the first embodiment of the present invention is a method for pointing at an object and operating the object that is pointed at, with a pen-shaped input apparatus, in a three-dimensional space represented by a display apparatus that can perform three-dimensional display. The pen-shaped input apparatus (to be referred to as "input pen" hereinafter) includes a pen-shaped operation means for performing operation, by an operator who holds the operation means, to point at the object and to perform operation for the object, and a detection means for detecting information of the input pen such as a position of the pen tip, pen pressure, orientation of the axis and the like. Then, in the three-dimensional pointing method in the first embodiment, based on the information detected by the detection means, the position, shape and orientation etc. of the pointer are determined, so as to display the pointer in the three-dimensional space represented on the display apparatus. Accordingly, the operator can perform the pointing and the operation for the object in the three-dimensional space represented on the display apparatus in a state that the pen tip of the input pen contacts a detection surface of the detection means, so that fatigue of the operator can be reduced when performing pointing and object operation for a long time.

In addition, according to the pointing method of the first embodiment, by associating the pen pressure of the input pen with movement or deformation of the pointer in the depth direction, one point in the three-dimensional space represented on the display apparatus can be pointed at. In addition, at this time, by reflecting information of inclination and orientation of the input pen on inclination and orientation of the pointer, the operator can feel as if the pointer displayed in the three-dimensional space represented on the display apparatus is a part of a pen tip of an input pen that is held by the operator, so that it becomes possible to perform pointing at a three-dimensional object easily and intuitively.

In addition, in the three-dimensional pointing method of the first embodiment, after the object is pointed at, the object that is pointed at is put into a state in which two-dimensional GUI-like operation of editing and manipulation is available for the object, in other words, the object that is pointed at is put into a state in which the object can be operated on the two-dimensional GUI by the operation of the input pen. In addition, in this case, after the operation such as object editing and processing ends, the object can be treated as a three-dimensional object again so that the operator can move the object to a three-dimensional position that the operator wants. Accordingly, the operation of the three-dimensional object can be realized as operation that is not different from operation by the conventional two-dimensional GUI using the existing pen-shaped input apparatus. Thus, it is not necessary for the operator to learn operation of the three-dimensional input pen from the beginning.

Figure 1:
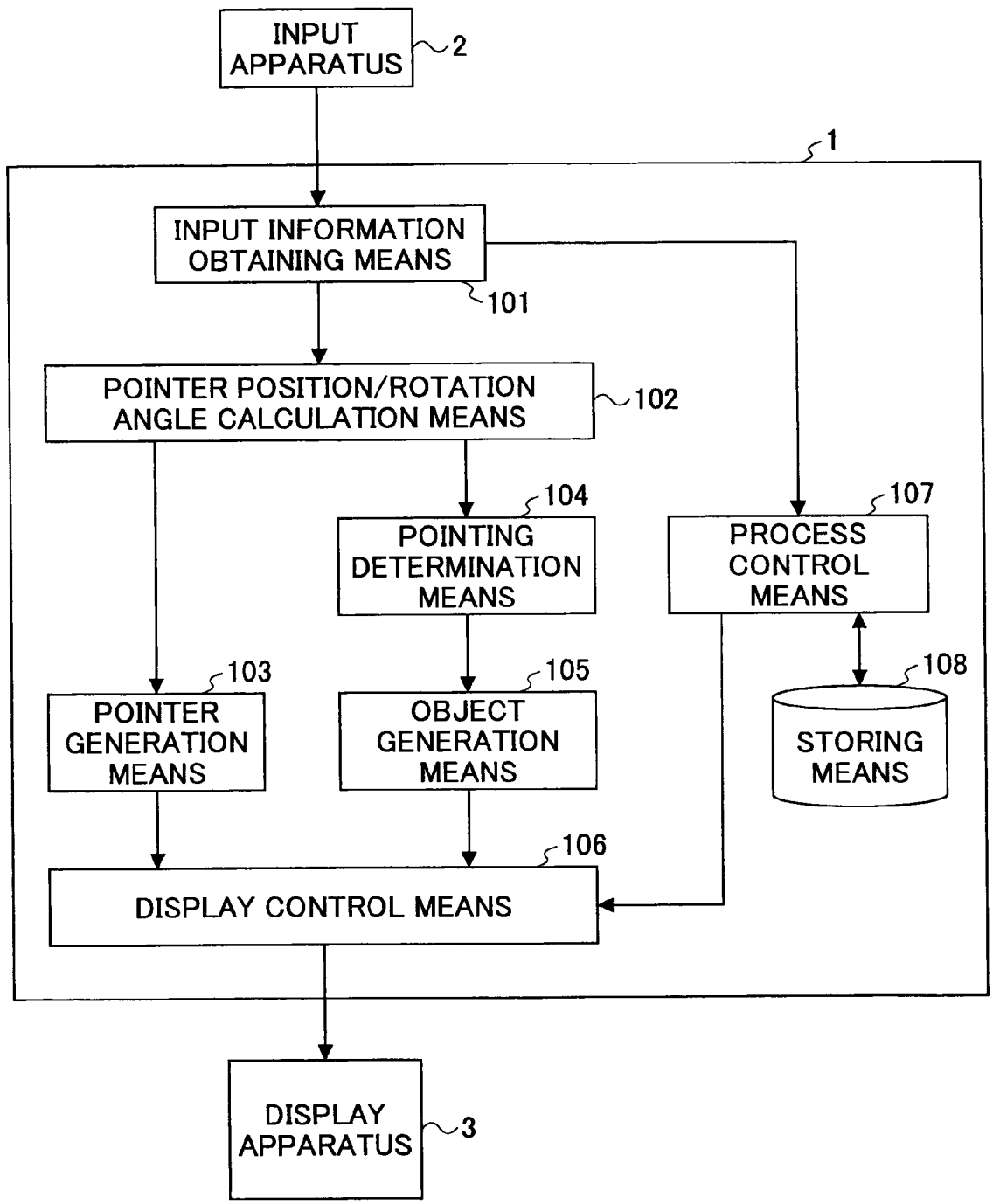
FIG. 1 is a schematic diagram for explaining an outline of the three-dimensional pointing method in the first embodiment, and shows a configuration example of a system for realizing the three-dimensional pointing method in the first embodiment.
Figure 2:
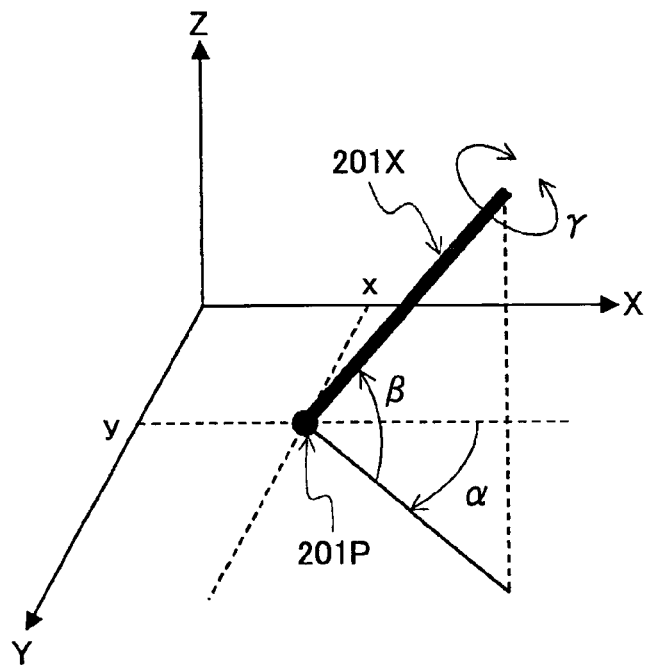
FIG. 2 is a schematic diagram for explaining an outline of the three-dimensional pointing method in the first and second embodiments, and for explaining the principle of the three-dimensional pointing method in the first and second embodiments.
Figure 3:
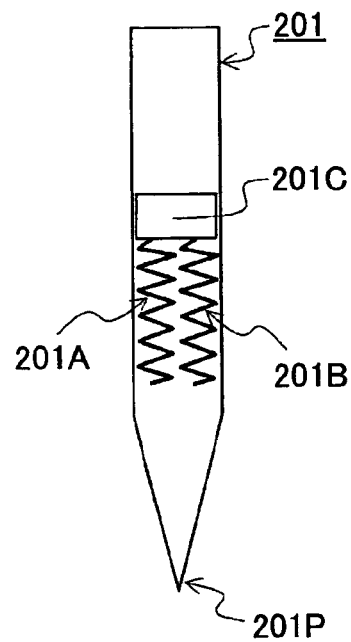
FIG. 3 is a schematic diagram for explaining an outline of the three-dimensional pointing method in the first embodiment, and shows a configuration example of the input pen used for the three-dimensional pointing method in the first embodiment.

FIGS. 1-3 are schematic diagrams for explaining outline of the three-dimensional pointing method in the first embodiment. FIG. 1 shows a configuration example of a system for realizing the three-dimensional pointing method in the first embodiment, FIG. 2 is a figure for explaining the principle of the three-dimensional pointing method in the first embodiment, and FIG. 3 shows a configuration example of the input pen used for the three-dimensional pointing method in the first embodiment.

In FIG. 1, 1 indicates a system control apparatus, 101 indicates an input information obtaining means, 102 indicates a pointer position/rotation angle calculation means, 103 indicates a pointer generation means, 104 indicates a pointing determination means, 105 indicates an object generation means, 106 indicates a display control means, 107 indicates a process control means, 108 indicates a storing means, 2 indicates an input apparatus and 3 indicates a display apparatus.

In FIG. 2, 201P indicates a pen tip of the input pen, and 201X indicates an axis of a case of the input pen. In addition, in FIG. 3, 201 indicates the input pen, 201A indicates a coil, 201B indicates a coil for detecting a rotation angle, and 201C indicates a pen pressure sensing unit.

The three-dimensional pointing method of the first embodiment is preferably applied for three-dimensionally operating a pointer and an object that is pointed at in the three-dimensional space represented on the display apparatus connected to a system control apparatus using the pen-shaped input apparatus connected to the system control apparatus such as a PC, for example.

As shown in FIG. 1, the system control apparatus 1 includes the input information obtaining means 101 for obtaining input information input from the input apparatus 2, a pointer position/rotation angle calculation means 102 for calculating moving direction, moving amount, rotation direction, and rotation angle, etc. of the pointer based on the input information when the input information obtained by the input information obtaining means 101 is information on control of the pointer, a pointer generation means 103 for generating the pointer based on calculation results of the pointer position/rotation angle calculation means 102, a pointing determination means 104 for determining whether there is an object that is pointed at by the pointer generated by the pointer generation means 103, an object generation means 105 for, when there is an object that is pointed at, changing the color of the object or generating an object having a position and an orientation that follows movement and rotation of the pointer, and a display control means 106 for causing the display apparatus 3 to display the pointer generated by the pointer generation means 103 and the object generated by the object generation means 105.

The system control apparatus 1 is an apparatus, such as the PC for example, for launching and operating software according to input information from the input apparatus 2 and for controlling other apparatus, and includes, in addition to the before-mentioned means, the process control means 107 for controlling processes for launching the software and the like and the storing means 108 for storing data and the like used for processing by the process control means 107, as shown in FIG. 1. Then, when information obtained by the input information obtaining means 101 is different from the information on the control of the pointer, the input information obtaining means 101 passes the obtained information to the process control means 107 to cause the system control apparatus 1 to perform processes according to the obtained information. Thus, the display control means 106 can cause the display means 3 to display not only the pointer and the object but also information about the process being executed by the system control apparatus 1 (process control means 107) and the result of the process.

Although not shown in the figure, for example, the input apparatus 2 includes a pen-shaped operation means (input pen) to be held by the operator operating the pointer and the object, and a detection means having a detection plane for detecting information of the position of the pen tip of the input pen, pressure (pen pressure) of the pen tip, inclination, direction, rotation angle etc. of the input pen.

As shown in FIG. 2, assuming that a Cartesian coordinate system XYZ corresponding to the three-dimensional space represented on the display apparatus 3 is set on the detection plane of the detection means and that the XY plane of the Cartesian coordinate system XYZ is the detection plane, the detection means detects information such as coordinates (x,y) of the pen tip 201P, a direction angle $\alpha$ (0 degree $\leq \alpha < 360$ degrees, for example) of the axis 201X of the case of the input pen, an inclination angle $\beta$ (0 degree $\leq \beta \leq 90$ degrees, for example), a rotation angle $\gamma$ (0 degree $\leq \gamma < 360$ degree) around the axis, and a pen pressure of the pen, when the pen tip 201P of the input pen contacts the detection plane (XY plane).

The configuration of the input apparatus 2 can be easily estimated and realized from information described in a reference document 1 (Y. Mitani, "Basic and application of touch panel", Techno times, 2001) and a reference document 2 (Catalogue of intuos2 of WACOM) for a person skilled in the art, wherein the input apparatus 2 can detect information such as coordinates of the pen tip 201P, direction $\alpha$ of the axis 201X of the case of the input pen, inclination $\beta$, rotation $\gamma$ around the axis, and the pen pressure and the like. However, the structure disclosed in the reference document 1 or the reference document 2 cannot obtain the angle of the rotation $\gamma$ around the axis 201X of the case of the input pen. However, as shown in FIG. 3, for detecting the angle of the rotation $\gamma$ around the axis, it can be easily contrived and can be realized for a person skilled in the art to add a coil 201B, in parallel to the coil 201A of a coordinate indicator described in the reference document 1, for detecting the rotation $\gamma$ around the axis so that the pressure sensing unit 201C obtains changes of linking magnetic fluxes of the coils 201A and 201B respectively to calculate the rotation amount, for example. But, the input pen 201 used in the three-dimensional pointing method of this embodiment may not have the mechanism for detecting the angle of the rotation $\gamma$ around the axis as shown in FIG. 3.

In addition, the input apparatus 2 is not limited to the device, such as a pen tablet or a combination of a touch panel and a stylus pen, in which the input pen and the detection means are separated. The input apparatus 2 may be an input apparatus, such as a pen-shaped mouse, in which the detection means is embedded in the inside of the case of the input pen.

The display apparatus 3 can be any display apparatus that can represent the three-dimensional space. For example, the display apparatus 3 may be a two-dimensional display apparatus for representing and displaying a three-dimensional object as an image that is projected on the two-dimensional plane such as a CRT display and a liquid crystal display, or may be a display apparatus that can represent a three-dimensional stereoimage such as a HMD (Head Mount Display) and a DFD (Depth Fused 3D) (details of the DFD are described later). That is, the display apparatus 3 may be any display apparatus by which the operator can perceive the displayed pointer and object three-dimensionally.

In addition, the detection means of the input apparatus 2 and the display apparatus 3 may take an integrated form (refer to Japanese Laid-Open Patent Application No. 5-073208, for example). When using a electromagnetic induction type pen tablet as the input apparatus 2, the detection means (digitizer) can be overlapped on the display plane of the display apparatus 2 so as to be integrated with the display apparatus 3. In addition, as a similar form, for example, a form of the combination of the touch panel and the stylus pen can be applied. Accordingly, the operator can perform pointing while contacting the input pen on the display surface of the display apparatus 3 such as the liquid crystal display and the like, so that more intuitive operation is realized compared with operation in a state in which the detection means are separated from the display apparatus 3. But, in the present invention, the configurations of the detection means of the input apparatus 2 and the display apparatus 3 are not limited to these, and the detection means and the display apparatus 3 are not necessarily integrated like a general pen tablet.

Embodiment 1-1

Figure 4A:
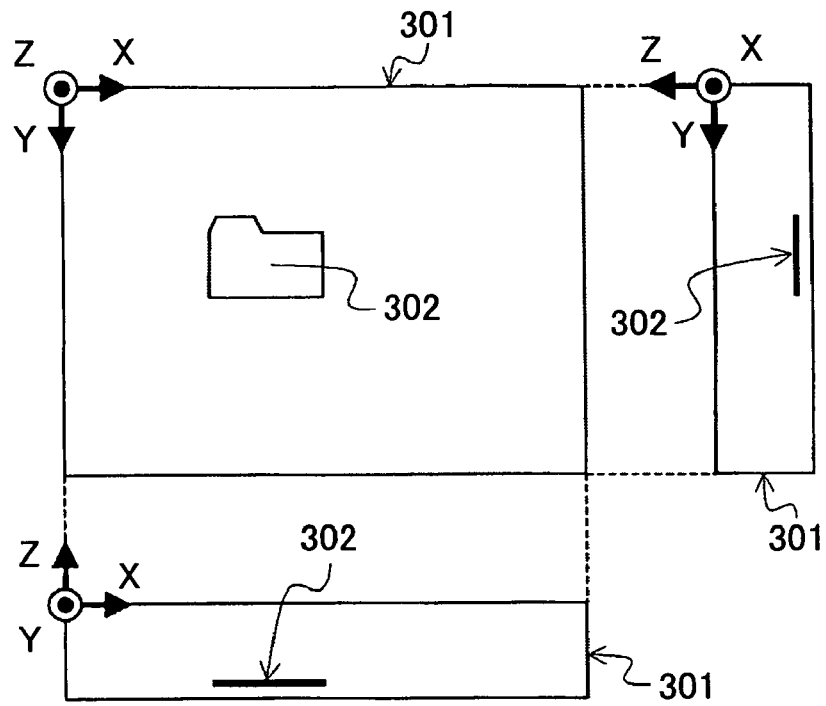
FIG. 4A is a schematic diagrams for explaining the three-dimensional pointing method of the embodiments 1-1 and 2-1, and shows a front view, a right side view and a bottom view showing an example of a three-dimensional space represented on the display apparatus.
Figure 5A:
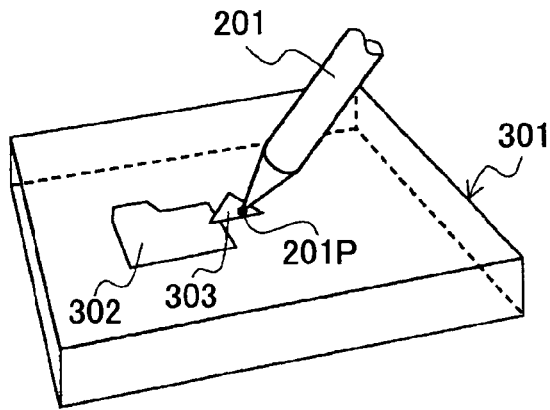
FIG. 5A is a schematic diagrams for explaining the three-dimensional pointing method of the embodiments 1-1 and 2-1, and shows a bird's-eye view showing a situation in the three-dimensional space when operating with an input pen.
Figure 5B:
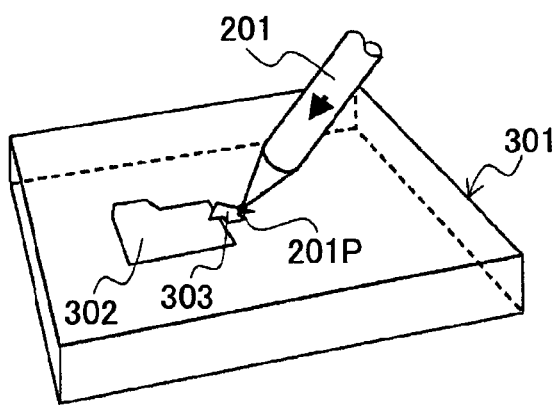
FIG. 5B is a schematic diagrams for explaining the three-dimensional pointing method of the embodiments 1-1 and 2-1, and shows a bird's-eye view showing a situation in the three-dimensional space when operating with an input pen.
Figure 5C:
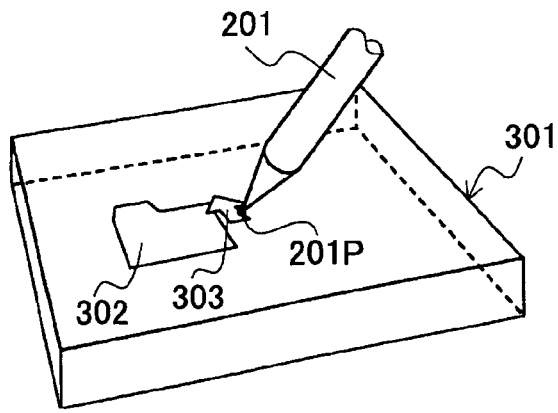
FIG. 5C is a schematic diagrams for explaining the three-dimensional pointing method of the embodiments 1-1 and 2-1, and shows a bird's-eye view showing a situation in the three-dimensional space when operating with an input pen.
Figure 6A:
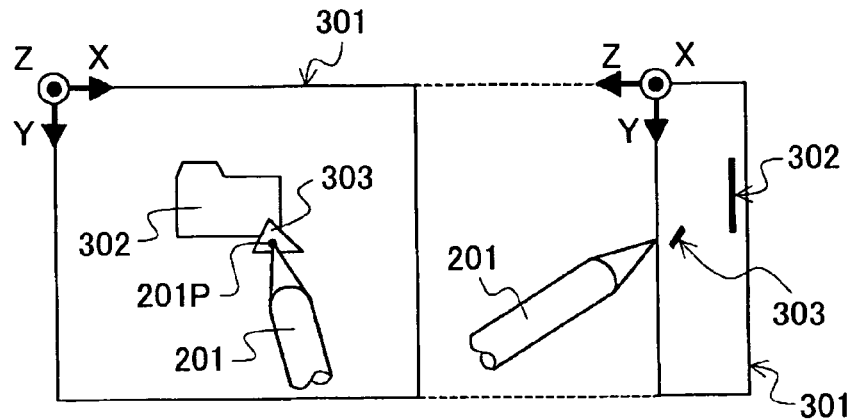
FIG. 6A is a schematic diagrams for explaining the three-dimensional pointing method of the embodiments 1-1 and 2-1, and shows a front view and a right side view showing a situation in the three-dimensional space when operating with an input pen.
Figure 6B:
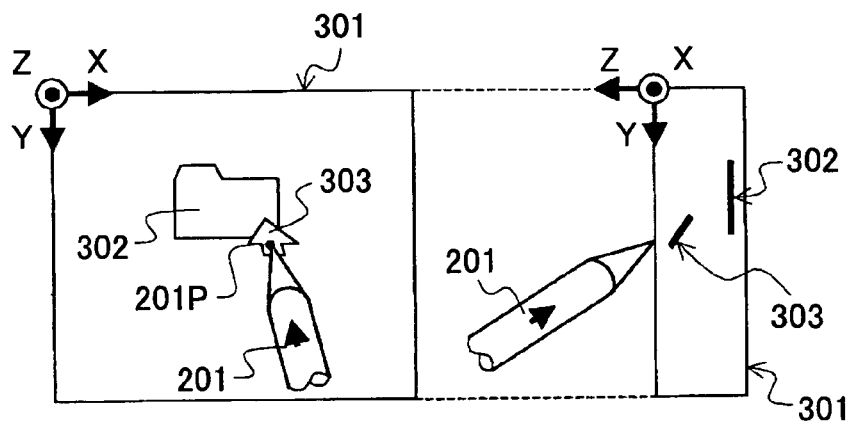
FIG. 6B is a schematic diagrams for explaining the three-dimensional pointing method of the embodiments 1-1 and 2-1, and shows a front view and a right side view showing a situation in the three-dimensional space when operating with an input pen.
Figure 6C:
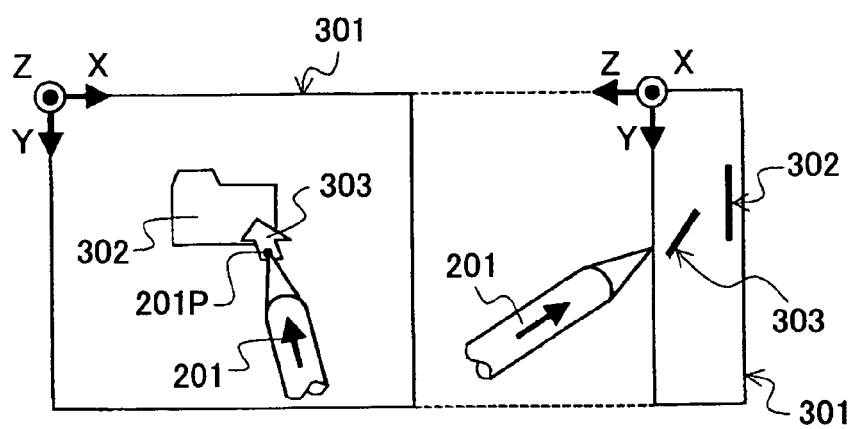
FIG. 6C is a schematic diagrams for explaining the three-dimensional pointing method of the embodiments 1-1 and 2-1, and shows a front view and a right side view showing a situation in the three-dimensional space when operating with an input pen.
Figure 7:
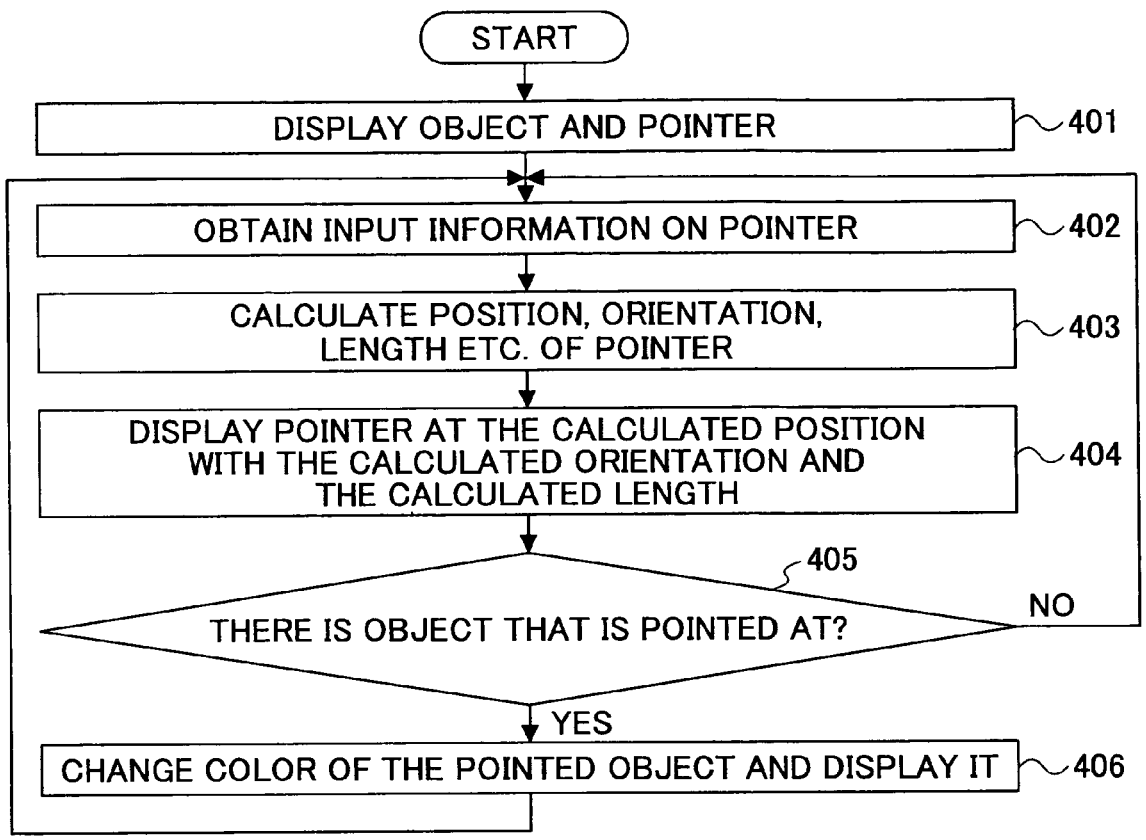
FIG. 7 is a schematic diagram for explaining the three-dimensional pointing method of the embodiment 1-1, and shows a flowchart showing the process procedure of the three-dimensional pointing method in the embodiment 1-1.

FIGS. 4A-7 are schematic diagrams for explaining the three-dimensional pointing method of the embodiment 1-1 of the present invention. FIG. 4A shows a front view, a right side view and a bottom view showing an example of a three-dimensional space represented on the display apparatus, FIG. 4B shows a bird's-eye view of an example of the three-dimensional space represented on the display apparatus, each of FIGS. 5A, 5B and 5c shows a bird's-eye view showing situations in the three-dimensional space when operating with an input pen, each of FIGS. 6A, 6B and 6c shows a front view and a right side view showing situations in the three-dimensional space when operating with an input pen, and FIG. 7 shows a flowchart showing the process procedure of the three-dimensional pointing method in the embodiment 1-1. FIGS. 6A, 6B and 6C correspond to FIGS. 5A, 5B and 5C respectively.

The three-dimensional pointing method of this embodiment 1-1 is a method for pointing at an object that is placed in the depth direction as seen from the operator by changing the pen pressure of the input pen.

In this embodiment 1-1, an electromagnetic induction type pen tablet is used as the input apparatus 2, and a liquid crystal display is used as the display apparatus 3 that can display the three-dimensional space. In addition, the detection means (digitizer) of the input apparatus 2 is overlapped on the display plane of the liquid crystal display 3 so that the input pen can be directly operated on the display screen to perform pointing. In addition, the input apparatus 2 and the display apparatus 3 are connected to the system control apparatus 1 having the configuration shown in FIG. 1.

Figure 4B:
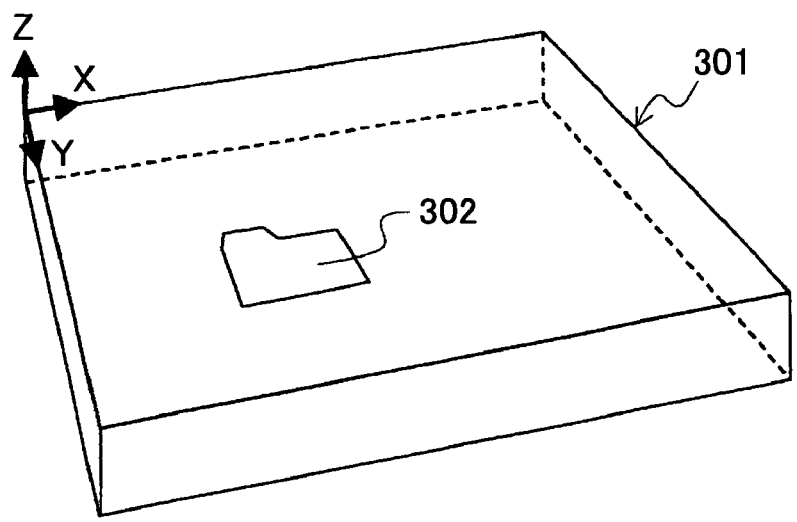
FIG. 4B is a schematic diagrams for explaining the three-dimensional pointing method of the embodiments 1-1 and 2-1, and shows a bird's-eye view of an example of the three-dimensional space represented on the display apparatus.

In this embodiment 1-1, as shown in FIG. 4A and FIG. 4B, a coordinate system XYZ corresponding to the coordinate system XYZ shown in FIG. 2 is set in the three-dimensional space 301 represented on the liquid crystal display 3, and the object 302 is placed at a position of z<0 in the three-dimensional space 301. In addition, it is assumed that the operator who operates the input pen 201 of the input apparatus 2 observes the XY plane of the three-dimensional space 301 from a point of z>0.

In addition, in this embodiment 1-1, it is assumed that, the XY plane of Z=0 in the three-dimensional space 301, that is, a plane closest to the operator is the display plane of the liquid crystal display, and at the same time, the XY plane is a detection plane of the detection means.

In this case, as shown in FIG. 5A and FIG. 6A, when the pen tip 201P of the input pen 201 contacts the display plane of the liquid crystal display 3, the detection means that is overlapped with the display plane detects the position (coordinates), pen pressure and the like of the pen tip 201P. At this time, in the system control apparatus 1, the input information obtaining means 101 obtains the position (coordinates), pen pressure and the like of the pen tip 201P detected by the detection means so as to cause the pointer position/rotation angle calculation means 102 and the pointer generation means 103 to generate a pointer to be displayed at a position (a position on an extension of the axis of the input pen in the three-dimensional space, for example) in the three-dimensional space 301 corresponding to the position at which the pen tip contacts 201P. When the pointer is generated, a signal for pointer display is sent from the display control means 106 to the display apparatus 3, so that a pointer 303 reflecting the position and the pen pressure of the pen tip 201P is displayed in the three-dimensional space 301 represented on the display apparatus 3.

In addition, after the operator contacts the pen tip 201P of the input pen 201 with the display plane of the liquid crystal display 3, for example, when the operator increases the pen pressure by pushing the input pen 201 to the display plane of the liquid crystal display 3 as shown in FIGS. 5B and 6B, or FIGS. 5C and 6C, the pointer position/rotation angle calculation means 102 and the pointer generation means 103 of the system control apparatus 1 generate a pointer having a shape according to the pen pressure. At this time, for example, by configuring an arrow-shaped pointer such that it extends according to the pen pressure, the length of the pointer 303 in the three-dimensional space 301 represented on the display apparatus 3 becomes longer than that of the pointer shown in FIGS. 5A and 6A by increasing the pen pressure as shown in FIG. 5B and FIG. 6B. In addition, by further increasing the pen pressure, the pointer 303 further extends as shown in FIGS. 5C and 6C.

By performing such display of the pointer 303 continuously almost at the same time when the operator performs the operation to apply the pen pressure to the input pen, the operator can feel as if the pointer extends in the three-dimensional depth direction (z<0) due to the applied pen pressure. In addition, although not shown in the figure, when the pointing determination means 104 of the system control apparatus 1 determines that the pointer 303 (tip of the pointer) points at a target object 302, the object generation means 105 changes the color of the object 302 or switches display of the object displayed in the three-dimensional space 301 or the like, so as to be able to report the operator that the object existing in the three-dimensional depth direction (Z<0) can be pointed at.

In addition, for example, as shown in FIGS. 5B and 6B or FIGS. 5C and 6C, when the pen pressure is decreased after the pointer 303 is tilted in the three-dimensional by once increasing the pen pressure, the pointer 303 may be returned to a depth position reflecting the pen pressure or may be fixed at a depth position before decreasing the pen pressure.

For realizing the three-dimensional pointing method, processes from step 401 to step 406 shown in FIG. 7 can be performed in the system control apparatus 1. In the system control apparatus 1, first, the display control means 106 displays the pointer 303 and the object 302 in the three-dimensional space 301 represented on the display apparatus (liquid crystal display 3) (step 401). At this time, the pointer 303 is displayed at an arbitrary position. In addition, the input information obtaining means 101 is set to be in a state for obtaining information detected by the detection means of the input apparatus 2.

Then, when the operator brings the pen tip 201P of the input pen 201 into contact with the detection plane of the detection means, the detection means detects the position (coordinates) and the pen pressure and the like, so that the input information obtaining means 101 obtains the detected position (coordinates) and the pen pressure and the like of the pen tip 201P (step 402). In the three-dimensional pointing method in this embodiment 1-1, since it is only necessary to obtain information of the position (coordinates) and the pen pressure of the pen tip 201P, only the information of the position (coordinates) and the pen pressure of the pen tip 201P may be obtained in step 402. However, in addition to the position (coordinates) and the pen pressure of the pen tip 201P, the detection means can detect the direction α, inclination β, rotation γ around the axis and the like of the input pen 201. Thus, the detection means may obtain information of direction α, inclination β, and rotation γ around the axis of the input pen 201, in addition to the position (coordinates) and the pen pressure of the pen tip 201P.

After the input information obtaining means 101 obtains information from the detection means, next, the pointer position/rotation angle calculation means 102 uses information of the position (coordinates) and the pen pressure of the pen tip 201P from the obtained information so as to calculate a position, orientation, length and the like that reflects these information (step 403). In the three-dimensional pointing method in this embodiment 1-1, in step 403, the pointer position/rotation angle calculation means 102 calculates a position (coordinates), on the XY plane in the three-dimensional space represented on the display apparatus 3, corresponding to the position (coordinates) of the pen tip 201P, and calculates the length that is proportional to the pen pressure.

After performing the process in step 403, next, the pointer generation means 103 generates a pointer of a shape based on the calculation result of the pointer position/rotation angle calculation means 102, and information on the generated pointer is sent from the display control means 106 to the display apparatus 3, so as to cause the display apparatus 3 to display the pointer in the three-dimensional space 301 (step 404).

In addition, in parallel with the process of step 404, the pointing determination means 104 determines whether an object that is pointed at exists at a position corresponding to the position (coordinates) on the XY plane in the three-dimensional space and the depth position calculated by the pointer position/rotation angle calculation means 102 (step 405). When the object does not exist at the position, only display control for the pointer 303 is performed, and the procedure returns to the step 402, and the system waits until next input information is obtained.

On the other hand, when the object that is pointed at exists, the object generation means 105 generates an object by changing the color of the object that is pointed at, and information on the generated object is sent from the display control means 106 to the display apparatus 3, so as to cause the display apparatus 3 to display the object in the three-dimensional space 301 (step 406). Then, after that, the procedure returns to step 403, and the system waits until next input information is obtained.

By performing the above-mentioned processes in the system control apparatus 1, pointer display control shown in FIGS. 5A, 5B and 5C becomes possible.

As described above, according to the pointing method of this embodiment 1-1, an arbitrary point in the three-dimensional space 301 represented on the display apparatus 3 can be pointed at by obtaining information on the position (coordinates) and the pen pressure of the pen tip 201P of the input pen 201, calculating a position (coordinates), on the XY plane in the three-dimensional space represented on the display apparatus 3, corresponding to the position (coordinates) of the pen tip 201P, and a depth position corresponding to the pen pressure, and generating a pointer that points at the calculated position and the depth position to display the pointer.

In addition, by using a general pen tablet as the input apparatus 2, since a pointing position in the depth direction of the pointer 303 can be changed while the pen tip 201P of the input pen 201 is brought into contact with the detection means, fatigue of the operator can be reduced.

In addition as described in this embodiment 1-1, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

In addition, in this embodiment 1-1, although the pointer 303 is displayed in which the length changes according to the pen pressure of the input pen 201, the pointer is not limited to this. Any change can be adopted as long as pointing at a position in the three-dimensional direction (Z<0) can be performed, such a pointer of which the shape (not the length) changes in the three-dimensional depth direction, and a pointer in which the inclination of the three-dimensional depth direction (Z<0) changes. In addition, for changing the length of the pointer, the length may be changed in proportion to the pen pressure, or the length may be changed in proportion to a power of the pen pressure or a power root of the pen pressure.

Although, in this embodiment 1-1, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 1-1, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

FIGS. 8A-D are schematic diagrams for explaining a modified example of the three-dimensional pointing method of this embodiment 1-1, and each of FIGS. 8A, 8B, 8C and 8D is a figure for showing a shape of a pointer to be displayed.

Figure 8A:
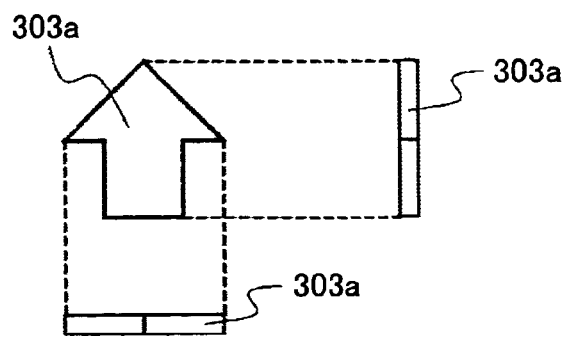
FIG. 8A is a schematic diagram for explaining a modified example of the three-dimensional pointing method of the embodiments 1-1 and 2-1, and shows a shape of a pointer to be displayed.
Figure 8B:
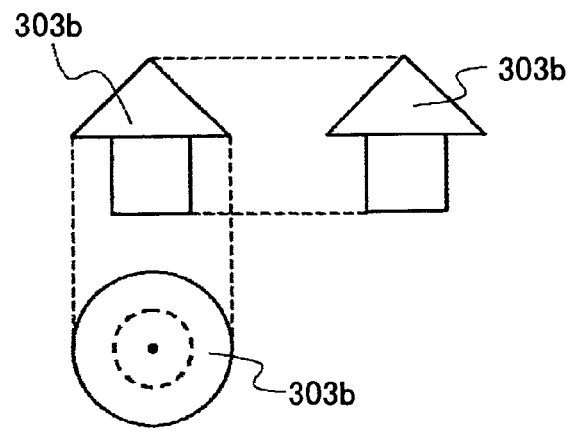
FIG. 8B is a schematic diagram for explaining a modified example of the three-dimensional pointing method of the embodiments 1-1 and 2-1, and shows a shape of a pointer to be displayed.
Figure 8C:
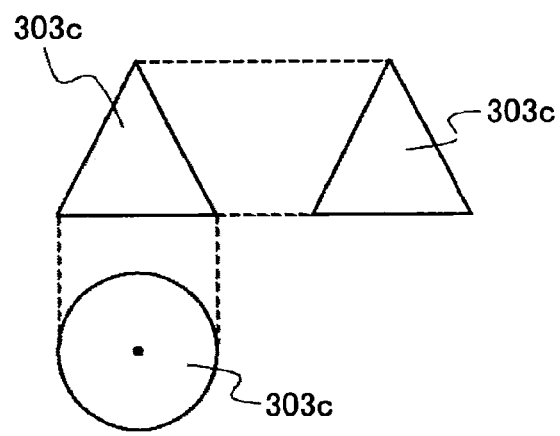
FIG. 8C is a schematic diagram for explaining a modified example of the three-dimensional pointing method of the embodiments 1-1 and 2-1, and shows a shape of a pointer to be displayed.
Figure 8D:
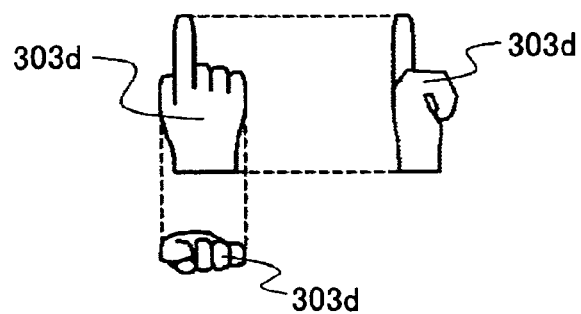
FIG. 8D is a schematic diagram for explaining a modified example of the three-dimensional pointing method of the embodiments 1-1 and 2-1, and shows a shape of a pointer to be displayed.

Although, in this embodiment 1-1, a planar arrow-shaped pointer 303a is used as the pointer 303 as shown in FIG. 8A for example, the shape of the pointer 303 is not limited to this, and the shape may be any shape as long as a position that is pointed at is visually clear. As the shape of such a pointer, it can be considered to use a stereoscopic arrow-shaped pointer 303b formed by connecting a cylinder to a bottom surface of a cone shown in FIG. 8B, a cone-shaped pointer 303c as shown in FIG. 8C, a pointer 303d having a shape of a hand of a human who points at an object with an index finger as shown in FIG. 8D. In addition, although not shown in the figure, a multiple-sided pyramid shaped pointer similar to the cone-line pointer 303c shown in FIG. 8C may be also used.

In addition, although, in this embodiment 1-1, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 1-1, a folder-shaped object is taken as an example of the object 302, the shape is not limited to this, and the object 302 may take any shape.

In addition, although, in this embodiment 1-1, the coordinate system of the three-dimensional space represented on the display apparatus 3 is set such that the display surface becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, although, in this embodiment 1-1, the pen pressure of the input pen 201 is focused on, the inclination and the rotation of the pointer can be operated by adding elements of after mentioned inclination β and the rotation γ around the axis of the input pen 201.

Embodiment 1-2

Figure 9A:
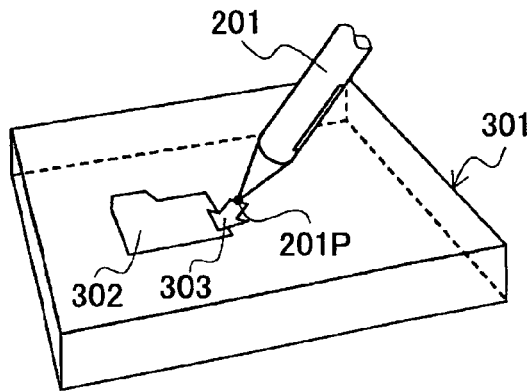
FIG. 9A is a schematic diagram for explaining the three-dimensional pointing method of the embodiments 1-2 and 2-2, and shows a bird's-eye view showing a situation in the three-dimensional space when operating with an input pen.
Figure 9B:
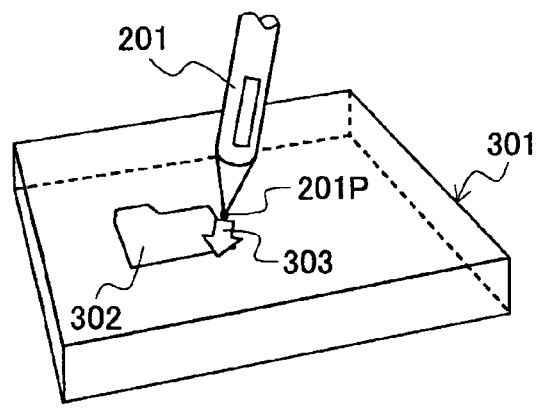
FIG. 9B is a schematic diagram for explaining the three-dimensional pointing method of the embodiments 1-2 and 2-2, and shows a bird's-eye view showing a situation in the three-dimensional space when operating with an input pen.
Figure 9C:
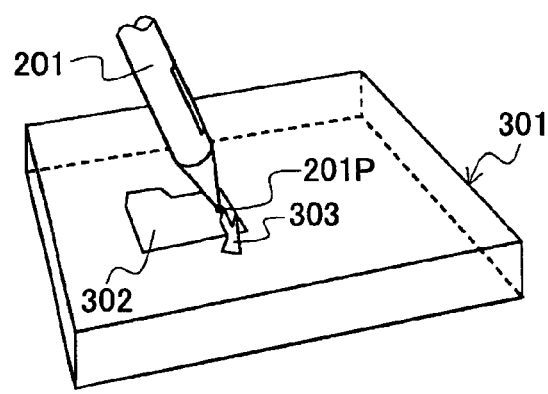
FIG. 9C is a schematic diagram for explaining the three-dimensional pointing method of the embodiments 1-2 and 2-2, and shows a bird's-eye view showing a situation in the three-dimensional space when operating with an input pen.
Figure 10A:
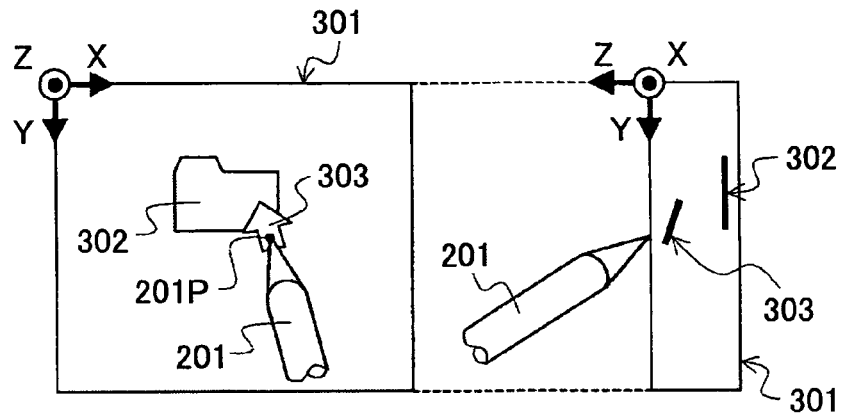
FIG. 10A is a schematic diagram for explaining the three-dimensional pointing method of the embodiments 1-2 and 2-2, and shows a front view and a right side view showing a situation in the three-dimensional space when operating with an input pen.
Figure 10B:
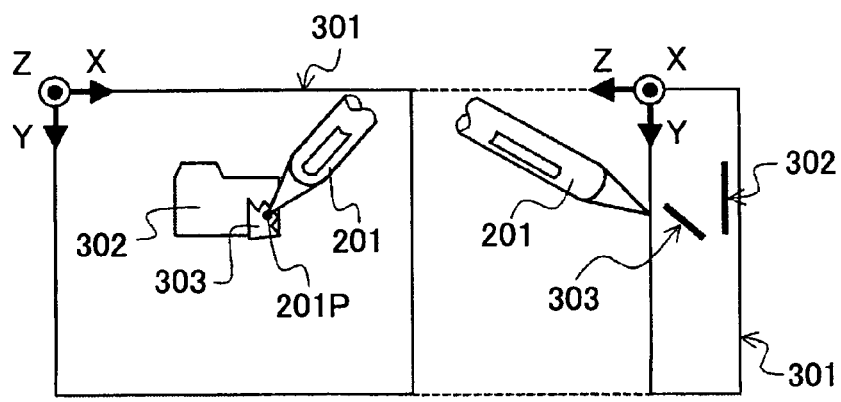
FIG. 10B is a schematic diagram for explaining the three-dimensional pointing method of the embodiments 1-2 and 2-2, and shows a front view and a right side view showing a situation in the three-dimensional space when operating with an input pen.
Figure 10C:
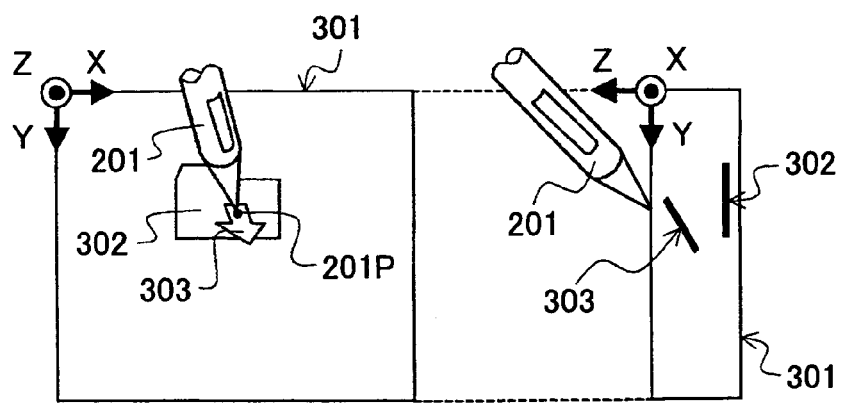
FIG. 10C is a schematic diagram for explaining the three-dimensional pointing method of the embodiments 1-2 and 2-2, and shows a front view and a right side view showing a situation in the three-dimensional space when operating with an input pen.

FIGS. 9A-10C are schematic diagrams for explaining the three-dimensional pointing method of the embodiment 1-2 of the present invention. Each of FIGS. 9A, 9B and 9C shows a bird's-eye view showing situations in the three-dimensional space when operating with an input pen, each of FIGS. 10A, 10B and 10C shows a front view and a right side view showing situations in the three-dimensional space when operating with an input pen. FIGS. 10A, 10B and 10C correspond to FIGS. 9A, 9B and 9C respectively.

The three-dimensional pointing method of this embodiment 1-2 is a method for pointing at an object, that is placed in the depth direction when seen from the operator in the three-dimensional space, from various directions by changing the orientation of the input pen 201.

In this embodiment 1-2, similar to the embodiment 1-1, the electromagnetic induction type pen tablet and the liquid crystal display are used as the input apparatus 2 and the display apparatus 3. In addition, the detection means (digitizer) of the pen tablet 2 is overlapped on the display plane of the liquid crystal display 3.

In addition, the setting method of the coordinate system in the three-dimensional space represented on the liquid crystal display, the operation method of the input pen 201 of the pen tablet 2 and the like are the same as those described in the embodiment 1-1. In addition, the pen tablet 2 and the display apparatus 3 are connected to the system control apparatus 1 having the configuration shown in FIG. 1.

In the three-dimensional pointing method in this embodiment 1-2, when the operator puts the pen tip 201P of the input pen 201 on an arbitrary point on the XY plane (z=0) of the three-dimensional space 301 represented on the liquid crystal display 3, the system control apparatus 1 obtains, by the input information obtaining means 101, information such as the position (coordinates) of the pen tip 201 of the input pen 201, the direction α, the inclination β, the rotation γ around the axis and the pen pressure of the pen tip 201P detected by the detection means (digitizer) so as to cause the pointer position/rotation angle calculation means 102 and the pointer generation means 103 to generate a pointer to be displayed at a position (a position on an extension of the axis of the input pen in the three-dimensional space, for example) in the three-dimensional space 301 corresponding to the position at which the pen tip 201P contacts. When the pointer is generated, a signal for pointer display is sent from the display control means 106 to the display apparatus 3, so that a pointer 303 shown in FIGS. 9A and 10B, for example, is displayed.

In addition, when the operator changes the orientation of the input pen 201 to an orientation shown in FIGS. 9B and 10B or FIGS. 10C and 10C, for example, while the pen pressure is being kept almost constant, the pointer position/rotation angle calculation means 102 and the pointer generation means 103 calculates the orientation of the new pointer from a new orientation α, inclination β, and rotation γ around the axis of the input pen 201 to generate a pointer based on the calculation result. Then, a signal for displaying the newly generated pointer is sent from the display control means 106 to the display apparatus 3 so that the pointer 303 shown in FIGS. 9B and 10B or FIGS. 9C and 10C is displayed.

By performing such display of the pointer 303 continuously almost at the same time when the operator performs the operation to change the direction of the input pen 201, the operator can feel as if the pointer is inclined so as to be displayed on an extension of the pen tip 201P in the direction of the inclined pen. In addition, although not shown in the figure, when the pointing determination means 104 of the system control apparatus 1 determines that the pointer 303 (tip of the pointer) points at a target object, the object generation means 105 changes the color of the object 302 and switches display of the object displayed in the three-dimensional space 301, so as to be able to report the operator that the object existing in the three-dimensional depth direction (Z<0) is pointed at.

In addition, although not shown in the figure, when the operator not only changes the orientation of the input pen 201 but also changes the pen pressure, the pointer position/rotation angle calculation means 102 and the pointer generation means 103 can calculate the length in proportion to the pen pressure as described in the embodiment 1-1 in addition to the orientation of the pointer so as to be able to generate the pointer to which the calculation result is reflected.

For realizing such three-dimensional pointing method, since it is only necessary that the system control apparatus performs processes from step 401 to step 406 shown in FIG. 7, the detailed descriptions are not given here.

However, when the orientation of the input pen 201 is reflected to the pointer like this embodiment 1-2, it is necessary to obtain information of the direction α, the inclination β and the rotation γ around the axis of the input pen 201 in addition to the position (coordinates) and the pen pressure of the pen tip 201P in step 402.

In addition, in step 403, in addition to calculating the position (coordinates) on the XY plane in the three-dimensional space represented on the display apparatus 3 corresponding to the position (coordinates) of the pen tip 201P and calculating the length in proportion to the pen pressure, it is necessary to calculate an orientation, an inclination and a rotation around the axis of the pointer in the three-dimensional space 301 corresponding to the direction α, the inclination β and the rotation γ around the axis of the input pen 201.

By performing the above-mentioned processes in the system control apparatus 1, display control of the pointer as shown in FIGS. 9A, 9B and 9C can be performed.

As described above, according to the pointing method of this embodiment 1-2, an arbitrary point in the three-dimensional space 301 represented on the display apparatus 3 can be pointed at by obtaining information on the direction α, the inclination β and the rotation γ around the axis of the input pen 201 in addition to the position (coordinates) and the pen pressure of the pen tip 201P of the input pen 201, calculating a position (coordinates), on the XY plane in the three-dimensional space represented on the display apparatus 3, corresponding to the position (coordinates) of the pen tip 201P, and a depth position corresponding to the pen pressure, and calculating the orientation, the inclination and the rotation around the axis in the three-dimensional space 301 of the pointer corresponding to the orientation α, the inclination β and the rotation γ around the axis of the input pen 201, and generating a pointer that points at the calculated position and the depth position from the calculated direction and displaying the pointer.

In addition, by using a general pen tablet as the input apparatus 2, a pointing position in the depth direction of the pointer 303 can be changed while the pen tip 201P of the input pen 201 is being contacted with the detection means, so that fatigue of the operator can be reduced.

In addition as described in this embodiment 1-2, by overlapping the detection means of the input apparatus 2 with the display plane of the display apparatus (liquid crystal display)

3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

In addition, in this embodiment 1-2, although an example is shown in which the inclination, the direction and the rotation of the pointer change in proportion to the inclination, the direction and the rotation of the input pen 201 respectively, the changing method is not limited to this. Any change can be adopted as long as pointing at a position in the three-dimensional depth direction (Z<0) can be performed by changing the shape, not the rotation angle, toward the three-dimensional depth direction (z<0) or changing the inclination of the pointer toward the three-dimensional depth direction (z<0), for example. In addition, the changing method is not limited to the case in which the inclination, the direction and the rotation of the pointer change in proportion to the inclination, the direction and the rotation of the input pen 201 respectively, and any of the inclination, the direction and the rotation of the input pen 201 may change in proportion to a power of the pen pressure or a power root of it, for example.

Although, in this embodiment 1-2, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 1-2, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, a pointer 303d having a shape of a hand of a human who points at an object with an index finger as shown in FIG. 8D.

In addition, although, in this embodiment 1-2, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 1-2, a folder-shaped object is taken as an example of the object 302, the shape is not limited to this, and the object 302 may take any shape.

In addition, although, in this embodiment 1-2, the coordinate system of the three-dimensional space represented on the display apparatus 3 is set in the same way as the embodiment 1-1, that is, the coordinate system of the three-dimensional space represented on the display apparatus 3 is set such that the display surface becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, although, in this embodiment 1-2, the direction α, the inclination β and the rotation γ around the axis of the input pen 201 are focused on, more intuitive pointing becomes possible by adding the element of the pen pressure of the input pen 201 described in the embodiment 1-1.

Embodiment 1-3

Figure 11:
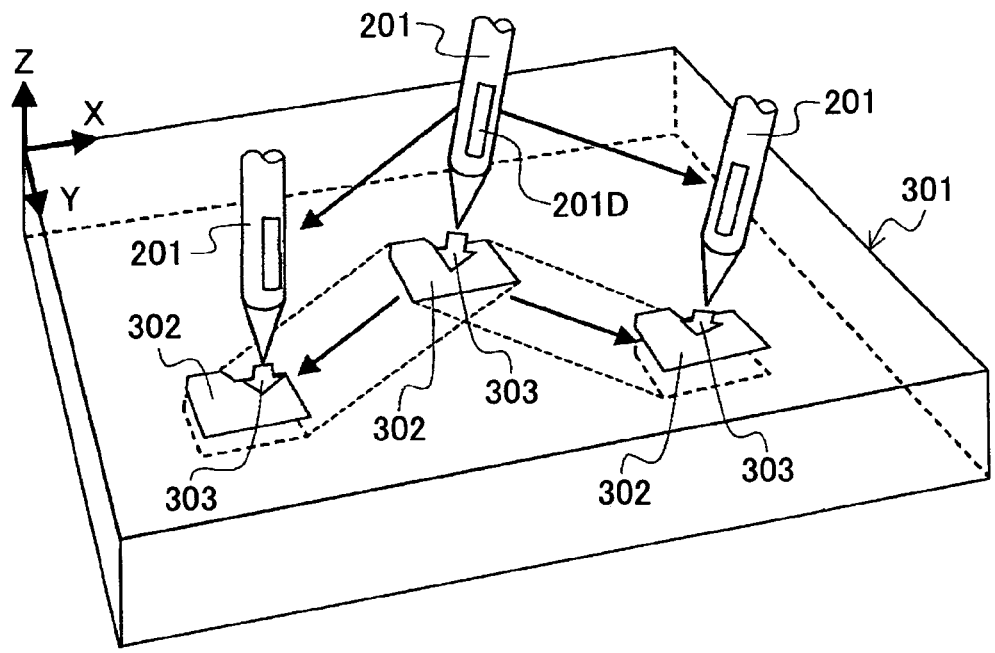
FIG. 11 is a schematic diagram for explaining the three-dimensional pointing method of the embodiments 1-3 and 2-3, and shows a bird's-eye view showing a situation in the three-dimensional space when operating with an input pen.
Figure 12:
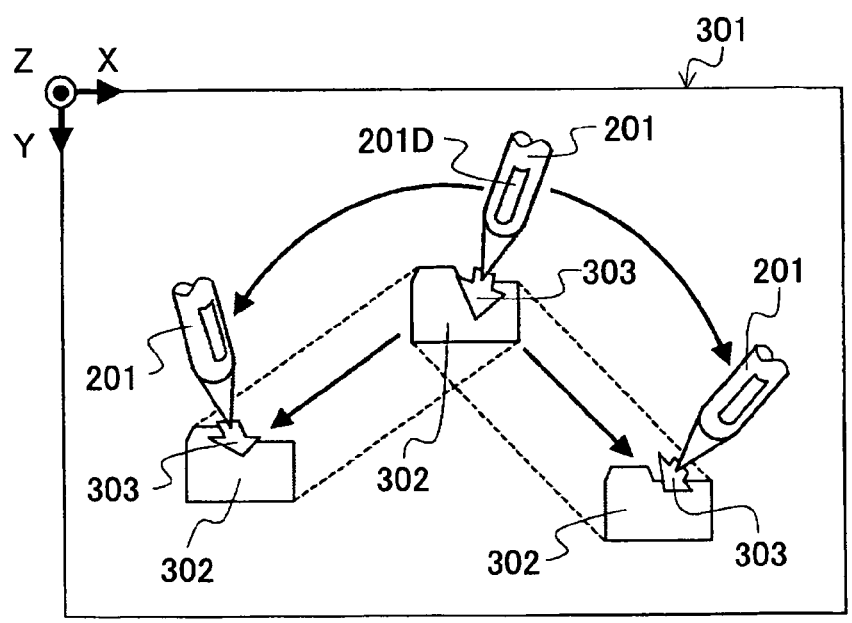
FIG. 12 is a schematic diagram for explaining the three-dimensional pointing method of the embodiments 1-3 and 2-3, and shows a front view showing a situation in the three-dimensional space when operating with an input pen.
Figure 13:
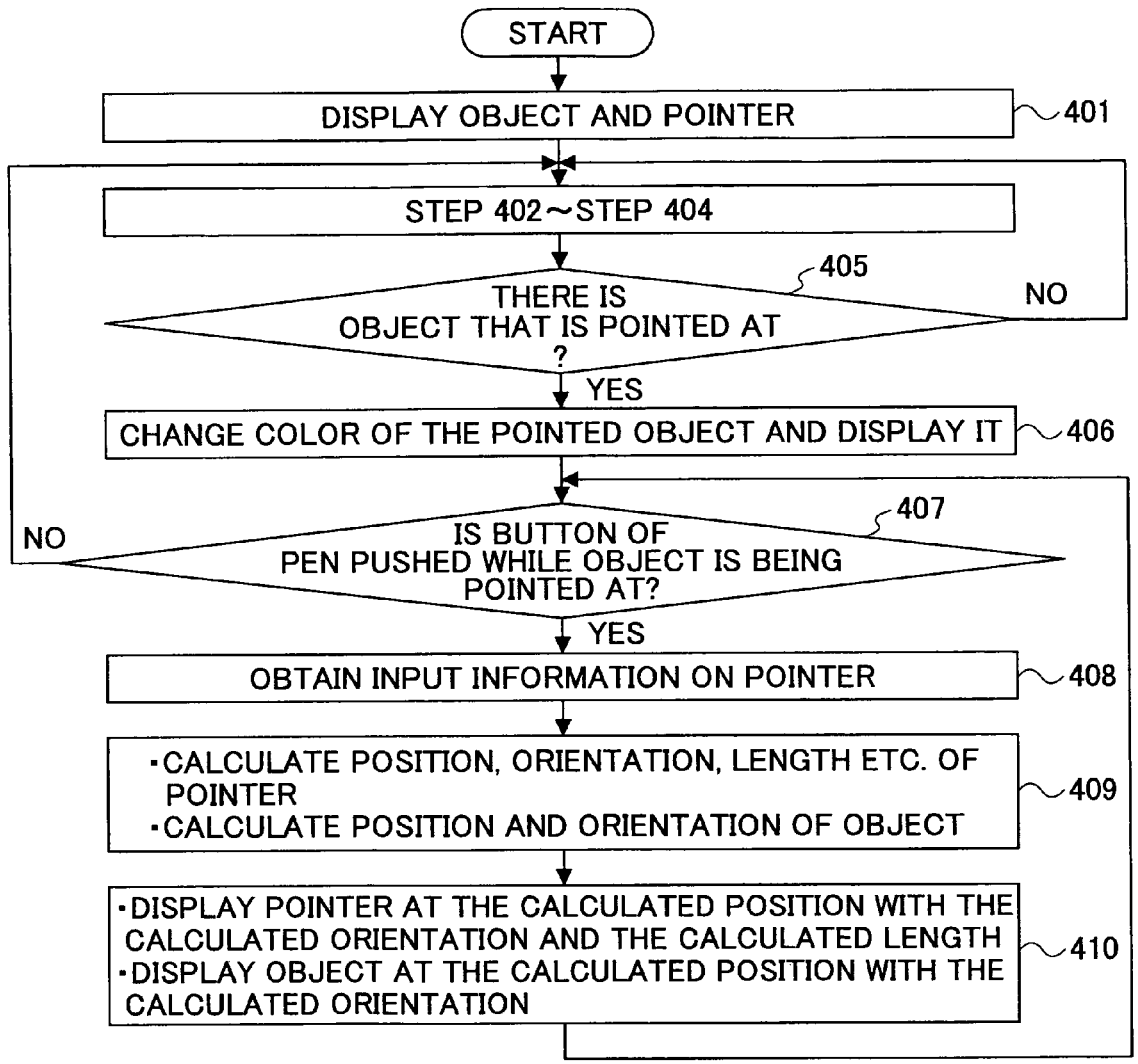
FIG. 13 is a schematic diagram for explaining the three-dimensional pointing method of the embodiment 1-3, and shows a flowchart showing a process procedure of the three-dimensional pointing method of the embodiment 1-3.

FIGS. 11A-13C are schematic diagrams for explaining the three-dimensional pointing method of the embodiment 1-3 of the present invention. FIG. 11 shows a bird's-eye view showing a situation in the three-dimensional space when operating with an input pen, FIG. 12 shows a front view showing a situation in the three-dimensional space when operating with an input pen, and FIG. 13 is a flowchart showing a process procedure of the three-dimensional pointing method of the embodiment 1-3.

In embodiments 1-1 and 1-2, pointing methods are described for performing display control of the pointer in the three-dimensional space 301 represented on the display apparatus 3 and display control of the pointed object in response to operation of the input pen 201 of the input apparatus 2.

However, when pointing at the object in the three-dimensional space 301 by the method of the embodiments 1-1 and 1-2, there are many cases in which operation such as moving, editing and processing of the object is accompanied after the pointing. Thus, in this embodiment 1-3, a method is described for moving the pointed object by operating the input pen 201 after pointing at the object in the three-dimensional space 301.

In the embodiment 1-3, similar to the embodiment 1-1, the electromagnetic induction type pen tablet and the liquid crystal display are used as the input apparatus 2 and the display apparatus 3. In addition, the detection means (digitizer) of the pen tablet 2 is overlapped on the display plane of the liquid crystal display 3.

In addition, the setting method of the coordinate system in the three-dimensional space represented on the liquid crystal display 3, the operation method of the input pen 201 of the pen tablet 2 and the like are the same as those described in the embodiment 1-1. In addition, the pen tablet 2 and the display apparatus 3 are connected to the system control apparatus 1 having the configuration shown in FIG. 1.

In addition, in this embodiment 1-3, since the method described in the embodiments 1-1 and 1-2 can be used as a method for pointing at an object in the three-dimensional space 301, the method is not described in detail.

In this case, for example, after the operator points at the object shown in FIGS. 11 and 12 by a method similar to the method in the embodiment 1-1 or the embodiment 1-2, the operator who checks that the object 302 is pointed at performs operation for holding the object 302 by pushing the button 201D provided in the input pen 201, for example. Then, the operator moves the input pen 201 to a desired position while pushing the button 201D of the input pen 201 and while bringing the pen tip 201P of the input pen 201 into contact with the display plane (detection plane of the detection means) of the display apparatus 3, and after that, the operator performs operation to release the object by releasing the button 201D. By performing these operations, the object 302 moves in the three-dimensional space 301 following the movement of the input pen 201 as shown in FIGS. 11 and 12. By doing these operations, the object can be moved from the original position to the target position in the three-dimensional space. At this time, the input information obtaining means 101 of the system control apparatus 1 obtains information indicating that the button 201D is pushed in addition to obtaining detection information of the position (coordinates) and the pen pressure of the input pen 201, and the direction α, the inclination β, and the rotation γ around the axis of the input pen 201 from the detection means (digitizer) of the display apparatus 2. Then, the system control apparatus 1 can ascertain that the operator is performing the operation to move the object 302 since the button 201D is pushed. Thus, the movement operation for the object 302 becomes possible by causing the pointing determination means 104 and the object generation means 105 to generate the object following the movement of the input pen 201 and causing the display apparatus 3 to display the object.

For realizing such three-dimensional pointing method, the system control apparatus may perform processes from step 401 to step 410 shown in FIG. 13.

In FIG. 13, the processes from the step 401 to the step 406 are processes performed until the object 302 in the three-dimensional space 301 is pointed at, and are the same as the processes from the step 401 to the step 406 shown in FIG. 7. Since the processes from the step 401 to the step 406 can be the same as corresponding processes in the embodiment 1-1 or the embodiment 1-2, detailed description is not given.

In the three-dimensional pointing method in this embodiment, after the system control apparatus 1 displays the pointed object by changing the color in step 406, the system control apparatus 1 determines whether the button 201D of the input pen 201 is pushed while the object is being pointed at as shown in FIG. 13 instead of returning to the step 402 (step 407). This determination is performed by determining whether the input information obtaining means 101 obtains information indicating that the button 201D is pushed. Then, when the button 201D is not pushed, the process returns to the step 402, and the system waits until next input information is obtained.

On the other hand, when the button 201D is pushed, the input information obtaining means 101 obtains information on the pointer (step 408). The information obtained at this time are information of the position (coordinates) of the pen tip 201P of the input pen 201, the pen pressure, and the direction α, the inclination β and the rotation γ around the axis of the input pen 201 as described in the embodiments 1-1 and 1-2.

After obtaining the information of the pointer in step 408, the pointer position/rotation angle calculation means 102 calculates the position, the orientation, the length and the like of the pointer based on the obtained information, and calculates the position and the orientation of the object (step 409). Since the calculation of the position, the orientation, the length and the like of the pointer is performed as described in the embodiment 1-1 or the embodiment 102, detailed description of it is not given. In addition, the position and the orientation of the object is calculated such that relative position relationship between the reference position of the object when it is pointed at and the position at which the pointer points is kept at the position of the pointer calculated in the step 409.

After calculating the position, the orientation and the length and the like of the pointer, and the position and the orientation of the object in the step 409, the pointer generation means 103 generates a pointer based on the calculated position, orientation and length of the pointer, and the object generation means 105 generates an object based on the position and the orientation. Then, display signals of these are sent from the display control means 106 to the display apparatus 3 so as to display the pointer and the object (step 410).

After displaying the pointer and the object in step 410, the process returns to the step 407. When the state in which the button 201D of the input pen 201 is pushed is continuing, the processes from the step 408 to the step 410 are repeated. Then, at the time when the operator releases the button 201D, the movement operation for the pointer and the object ends.

By performing the above-mentioned processes in the system control apparatus 1, pointing operation and movement operation for the object as shown in FIGS. 11 and 12 become possible.

As described above, according to the three-dimensional pointing method in this embodiment 1-3, after an object is pointed at, the pointed object can be translated following the movement of the input pen.

In addition, a general pen tablet is used as the input apparatus 2, an object is pointed at, and the object can be moved while the pen tip 201P of the input pen 201 is contacting with the detection means, so that fatigue of the operator can be reduced.

In addition as described in this embodiment 1-3, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

Although, in this embodiment 1-3, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, a pointer 303d having a shape if a hand of a human who points at an object with an index finger as shown in FIG. 8D.

In addition, although, in this embodiment 1-3, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 1-3, a folder-shaped object is taken as an example of the object 302, the shape is not limited to this and the object 302 may take any shape.

In addition, although, in this embodiment 1-3, the coordinate system of the three-dimensional space represented on the display apparatus 3 is set such that the display surface becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 1-3, although the pointed object is moved by moving the input pen while pushing the button 201D of the input pen 201, the movement method is not limited to this, and the object may be moved by a method for moving the input pen while pushing a specified key of a keyboard or pushing other switch, for example. In this case, in the step 407 shown in FIG. 13, it is determined whether input information corresponding to the operation for moving the object is obtained.

Embodiment 1-4

Figure 14A:
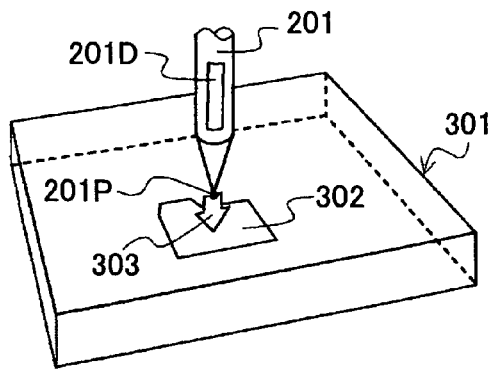
FIG. 14A is a schematic diagram for explaining the three-dimensional pointing method of the embodiments 1-4 and 2-4, and shows a bird's-eye view showing a situation in the three-dimensional space when operating with an input pen.
Figure 14B:
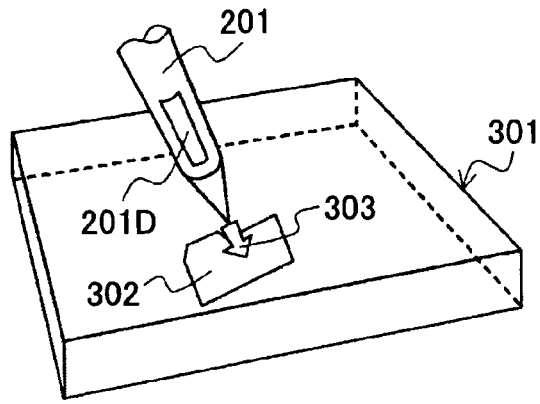
FIG. 14B is a schematic diagram for explaining the three-dimensional pointing method of the embodiments 1-4 and 2-4, and shows a bird's-eye view showing a situation in the three-dimensional space when operating with an input pen.
Figure 14C:
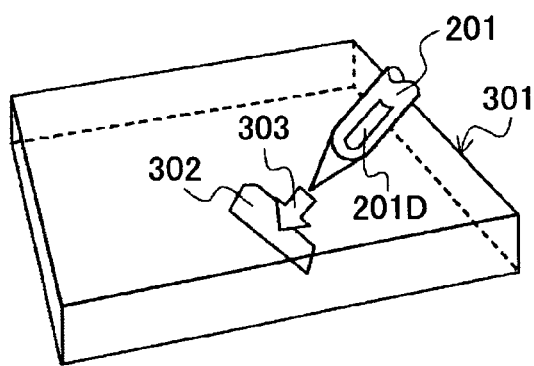
FIG. 14C is a schematic diagram for explaining the three-dimensional pointing method of the embodiments 1-4 and 2-4, and shows a bird's-eye view showing a situation in the three-dimensional space when operating with an input pen.
Figure 15A:
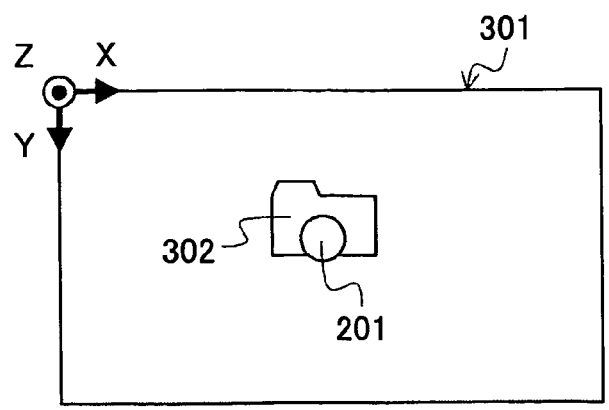
FIG. 15A is a schematic diagram for explaining the three-dimensional pointing method of the embodiments 1-4 and 2-4, and shows a front view and a right side view showing a situation in the three-dimensional space when operating with an input pen.
Figure 15B:
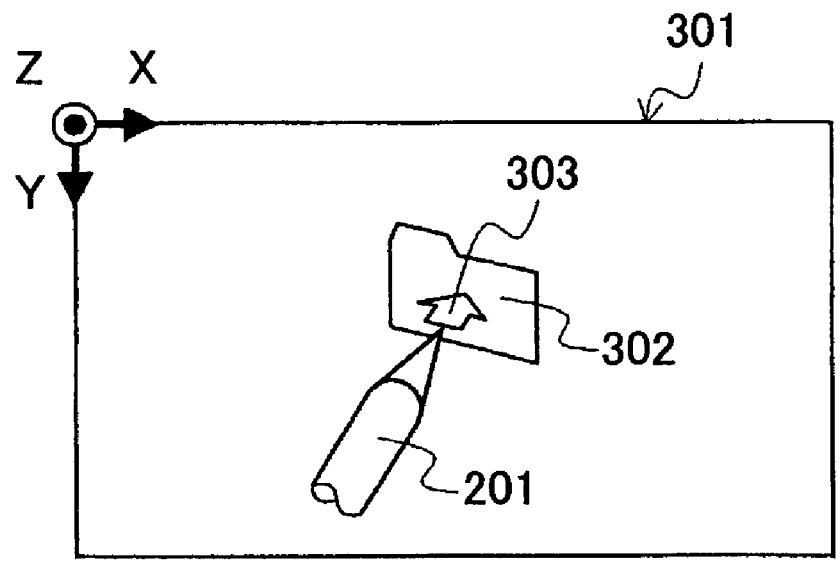
FIG. 15B is a schematic diagram for explaining the three-dimensional pointing method of the embodiments 1-4 and 2-4, and shows a front view and a right side view showing a situation in the three-dimensional space when operating with an input pen.
Figure 15C:
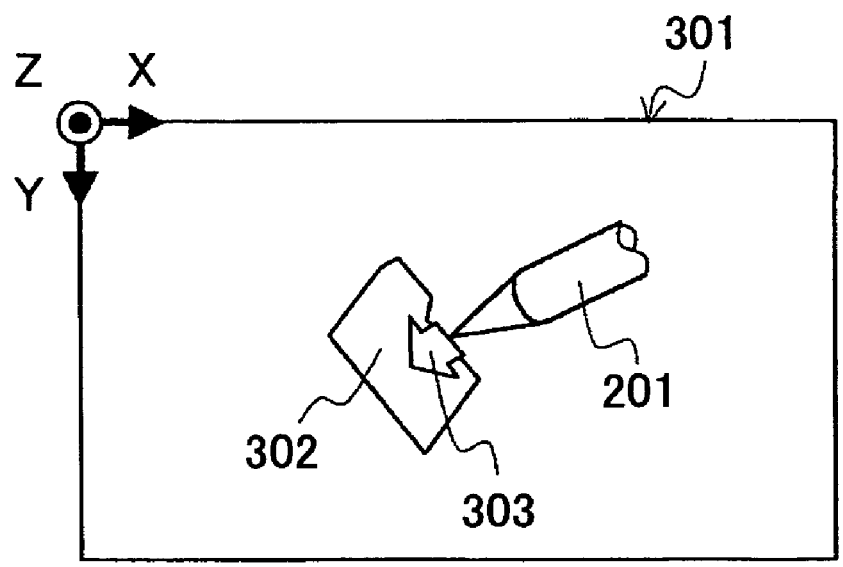
FIG. 15C is a schematic diagram for explaining the three-dimensional pointing method of the embodiments 1-4 and 2-4, and shows a front view and a right side view showing a situation in the three-dimensional space when operating with an input pen.

FIGS. 14A-15C are schematic diagrams for explaining the three-dimensional pointing method of the embodiment 1-4 of the present invention. Each of FIGS. 14A, 14B and 14C shows a bird's-eye view showing situations in the three-dimensional space when operating with an input pen, each of FIGS. 15A, 15B and 15C shows a front view and a right side view showing situations in the three-dimensional space when operating with an input pen. FIGS. 15A, 15B and 15C correspond to FIGS. 14A, 14B and 14C respectively.

In the embodiment 1-3, the three-dimensional pointing method is described in which, after pointing at the object in the three-dimensional space 301 represented on the display apparatus 3, the pointed object 302 can be translated.

However, in the three-dimensional space 301 represented on the display apparatus 3, in addition to simply translating the object as described in the embodiment 1-3, it can be also estimated to incline the pointed object in the depth direction in the three dimensional space, for example by utilizing the three-dimensional space 301 efficiently. Therefore, in the embodiment 1-4, a pointing method is described for, after pointing at the object, inclining the pointed object in the depth direction in the three-dimensional space while continuing to point at the object.

In the embodiment 1-4, similar to the embodiment 1-1, the electromagnetic induction type pen tablet and the liquid crystal display are used as the input apparatus 2 and the display apparatus 3. In addition, the detection means (digitizer) of the pen tablet 2 is overlapped on the display plane of the liquid crystal display 3.

In addition, the setting method of the coordinate system in the three-dimensional space represented on the liquid crystal display, the operation method of the input pen 201 of the pen tablet 2 and the like are the same as those described in the embodiment 1-1. In addition, the pen tablet 2 and the display apparatus 3 are connected to the system control apparatus 1 having the configuration shown in FIG. 1.

In addition, in this embodiment 1-3, since the method described in the embodiments 1-1 and 1-2 can be used as a method for pointing at an object in the three-dimensional space 301, the method is not described in detail.

In this case, for example, after the operator points at the object 302 as shown in FIGS. 14A and 15A by a method similar to the method in the embodiment 1-1 or the embodiment 1-2, the operator who checks that the object 302 is pointed at performs operation for holding the object 302 by pushing the button 201D provided in the input pen 201, for example. Then, when the operator changes the orientation of the input pen 201 to a desired orientation while pushing the button 201D of the input pen 201 and while bringing the pen tip 201P of the input pen 201 into contact with the display plane (detection plane of the detection means) of the display apparatus 3, the object 302 inclines in the depth direction in the three-dimensional space 301 following the change of the orientation of the input pen 201 as shown in FIGS. 14B and 15B or FIGS. 14C and 15C. By doing these operations, the object 302 can be inclined to a desired orientation in the three-dimensional space. At this time, the input information obtaining means 101 of the system control apparatus 1 obtains information indicating that the button 201D is pushed in addition to obtaining detection information of the position (coordinates) and the pen pressure of the input pen 201, and the direction $\alpha$, the inclination $\beta$, and the rotation $\gamma$ around the axis of the input pen 201 from the detection means (digitizer) of the display apparatus 2. Then, the system control apparatus 1 can ascertain that the operator is performing the operation to move the object 302 since the button 201D is pushed. Thus, the movement operation for the object 302 becomes possible by causing the pointing determination means 104 and the object generation means 105 to generate the object following the change of the orientation of the input pen 201 and causing the display apparatus 3 to display the object.

For realizing such three-dimensional pointing method, the system control apparatus 1 may perform processes from step 401 to step 410 shown in FIG. 13.

However, the position and the orientation of the object are calculated in step 409 such that all of relative position relationships between the pointed object and the pointer at the time the object is pointed at are kept, for example.

By performing the above-mentioned processes in the system control apparatus 1, the operations for pointing at the object and inclining the object in the depth direction become possible as shown in FIGS. 14A, 14B and 14C.

As described above, according to the three-dimensional pointing method in this embodiment 1-4, after an object is pointed at, the pointed object can be rotated in the same XY plane and can be inclined in the depth direction following the change of the orientation of the input pen 201.

In addition, a general pen tablet is used as the input apparatus 2, and an object is pointed at, and the object can be moved while the pen tip 201P of the input pen 201 is contacting with the detection means, so that fatigue of the operator can be reduced.

In addition as described in this embodiment 1-4, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

Although, in this embodiment 1-4, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 1-4, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, a pointer 303d having a shape of a hand of a human who points at an object with an index finger as shown in FIG. 8D.

In addition, although, in this embodiment 1-4, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 1-4, a folder-shaped object is taken as an example of the object 302, the shape is not limited to this and the object 302 may take any shape.

In addition, although, in this embodiment 1-4, the coordinate system of the three-dimensional space represented on the display apparatus 3 is set such that the display plane becomes Z=0 as shown in FIG. 4A like the embodiment 1-1, the origin of three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 1-4, although the pointed object is moved by moving the input pen while pushing the button 201D of the input pen 201, the movement method is not limited to this, and the object may be moved by a method for moving the input pen while pushing a specified key of a keyboard or pushing other switch, for example. In this case, in the step 407 shown in FIG. 13, it is determined whether input information corresponding to the operation for moving the object is obtained.

In addition, in the embodiment 1-4, although the operation method is descried in which the pointed object 302 is rotated in the same XY plane and is inclined in the depth direction, various object operations become possible by adding the operation method for translation as described in the embodiment 1-3 to the above operation method.

Embodiment 1-5

Figure 16A:
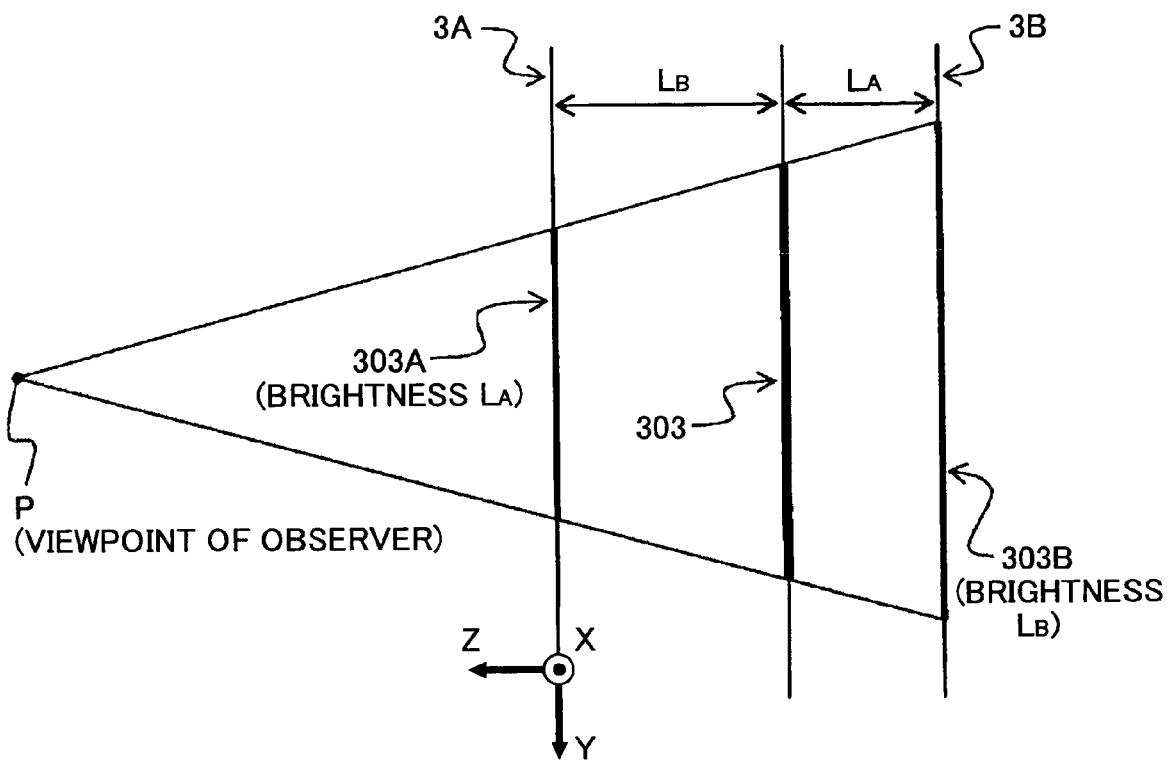
FIG. 16A is a schematic diagram for explaining the three-dimensional pointing method of the embodiments 1-5 and 2-5, and for explaining the principle of a display apparatus (DFD) used in the embodiments 1-5 and 2-5.
Figure 18A:
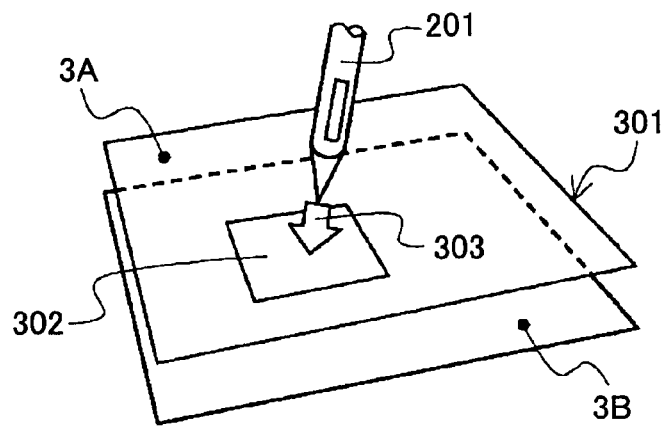
FIG. 18A is a schematic diagram for explaining the three-dimensional pointing method of the embodiments 1-5 and 2-5, and shows a bird's-eye view showing a situation in the three-dimensional space when operating with an input pen.
Figure 18B:
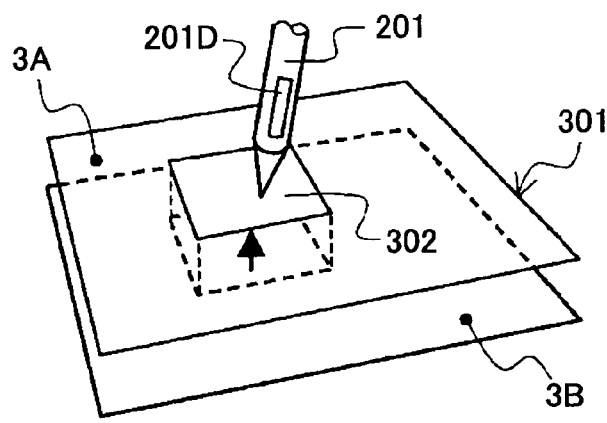
FIG. 18B is a schematic diagram for explaining the three-dimensional pointing method of the embodiments 1-5 and 2-5, and shows a bird's-eye view showing a situation in the three-dimensional space when operating with an input pen.
Figure 18C:
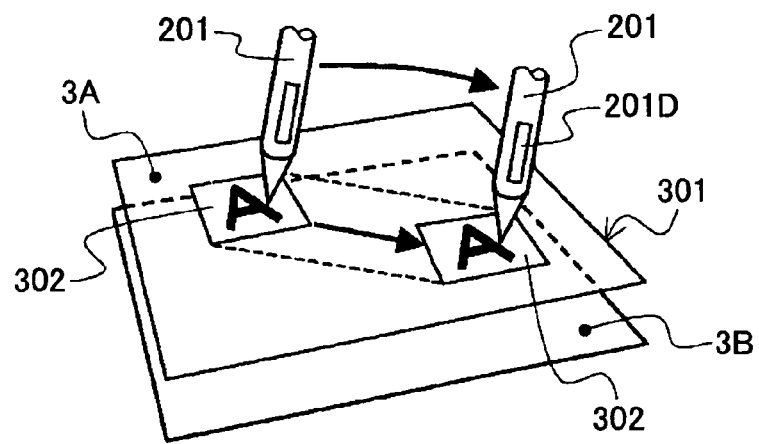
FIG. 18C is a schematic diagram for explaining the three-dimensional pointing method of the embodiments 1-5 and 2-5, and shows a bird's-eye view showing a situation in the three-dimensional space when operating with an input pen.
Figure 18D:
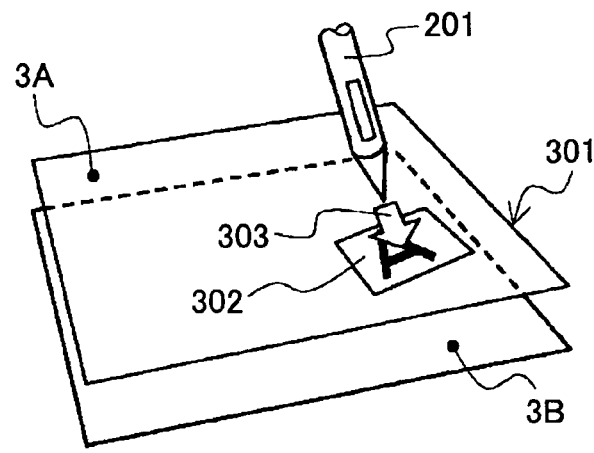
FIG. 18D is a schematic diagram for explaining the three-dimensional pointing method of the embodiments 1-5 and 2-5, and shows a bird's-eye view showing a situation in the three-dimensional space when operating with an input pen.
Figure 19A:
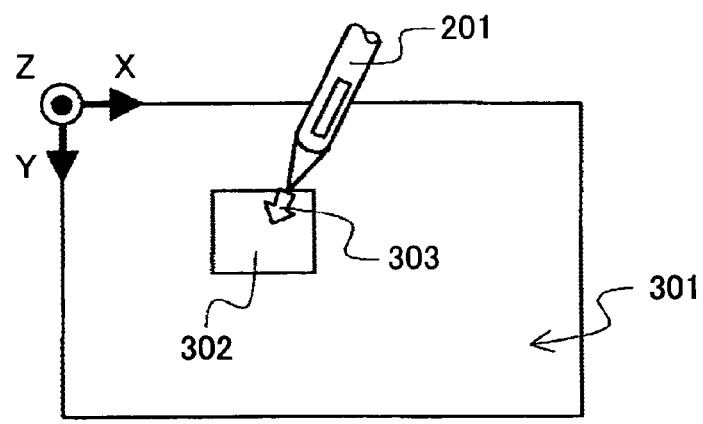
FIG. 19A is a schematic diagram for explaining the three-dimensional pointing method of the embodiments 1-5 and 2-5, and shows a front view showing a situation in the three-dimensional space when operating with an input pen.
Figure 19B:
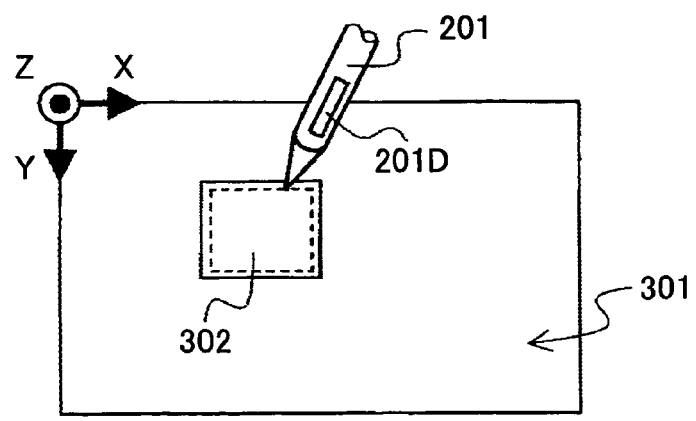
FIG. 19B is a schematic diagram for explaining the three-dimensional pointing method of the embodiments 1-5 and 2-5, and shows a front view showing a situation in the three-dimensional space when operating with an input pen.
Figure 19C:
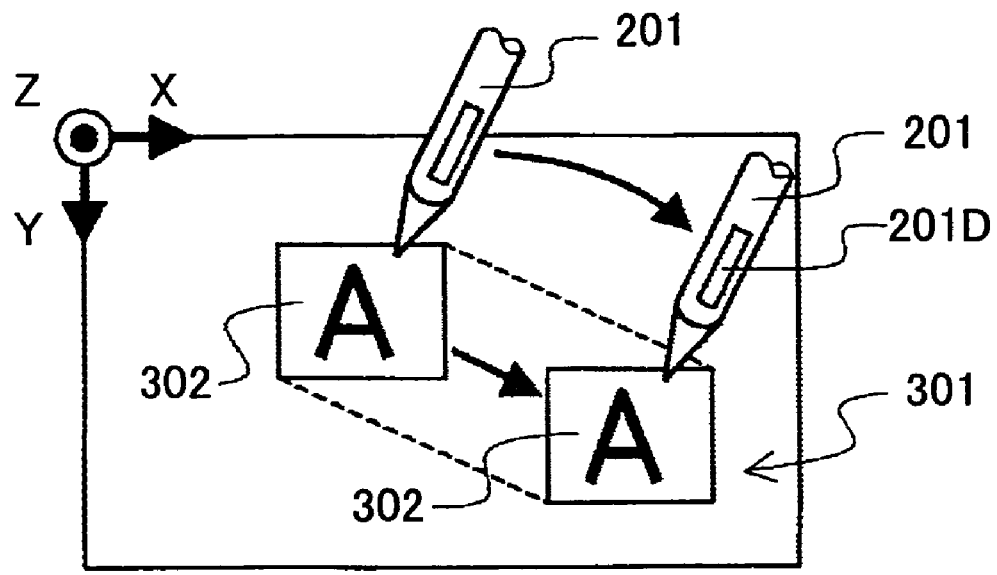
FIG. 19C is a schematic diagram for explaining the three-dimensional pointing method of the embodiments 1-5 and 2-5, and shows a front view showing a situation in the three-dimensional space when operating with an input pen.
Figure 19D:
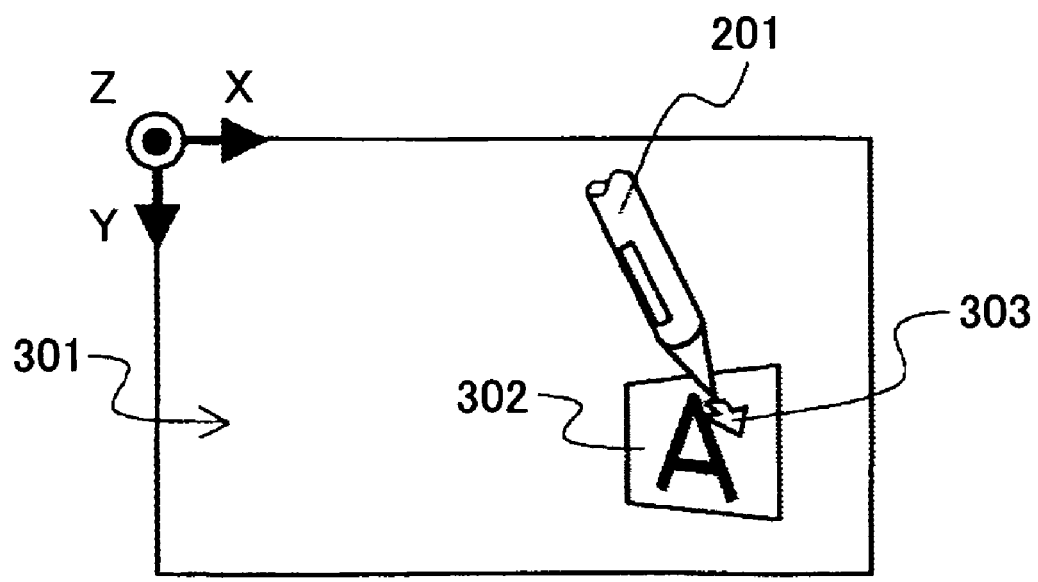
FIG. 19D is a schematic diagram for explaining the three-dimensional pointing method of the embodiments 1-5 and 2-5, and shows a front view showing a situation in the three-dimensional space when operating with an input pen.
Figure 20:
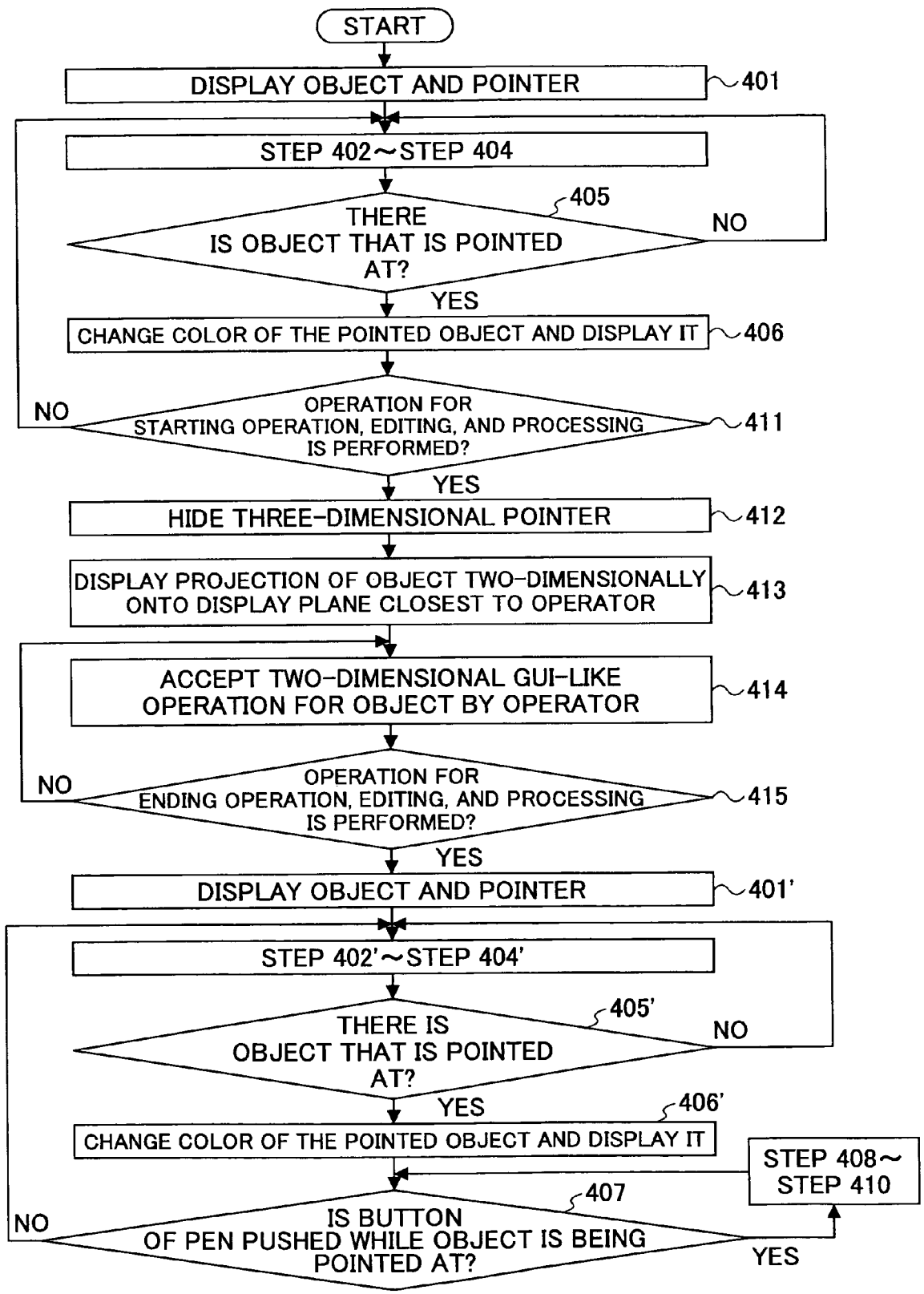
FIG. 20 is a schematic diagram for explaining the three-dimensional pointing method of the embodiment 1-5, and shows a flowchart showing a process procedure of the three-dimensional pointing method of the embodiment 1-5.

FIGS. 16A-20 are schematic diagrams for explaining the three-dimensional pointing method of the embodiment 1-5 of the present invention. FIGS. 16A and 16B are figures for explaining the principle of a display apparatus (DFD) used in this embodiment 1-5, FIG. 17A shows a front view, a right side view and a bottom view of an example of the three-dimensional space represented by the display apparatus, FIG. 17B shows a bird's-eye view of an example of the three-dimensional space represented by the display apparatus, each of FIGS. 18A, 18B, 18C and 18D shows a bird's-eye view showing situations in the three-dimensional space when operating with an input pen, each of FIGS. 19A, 19B, 19C and 19D shows a front view showing situations in the three-dimensional space when operating with an input pen, and FIG. 20 is a flowchart showing a process procedure of the three-dimensional pointing method of this embodiment 1-5. By the way, FIGS. 19A, 19B, 19C and 19D correspond to FIGS. 18A, 18B, 18C and 18D respectively.

In the embodiments 1-3 and 1-4, the three-dimensional pointing method is described in which, after pointing at the object 301 in the three-dimensional space 301 represented by the display apparatus 3, the pointed object 302 can be translated in the XY plane, rotated or inclined in the depth direction. However, the operator may want to perform not only the translation and the rotation of the object but also the conventional three-dimensional GUI operation such as editing and deformation and the like continuously after pointing at the object 302 in the three-dimensional space 301. For performing the two-dimensional GUI-like operation, when the operator wants to point at and operate an object placed in the back (far) side in the three-dimensional space 301 as seen from the operator in the method described in the embodiments 1-3 and 1-4, the operator should operate the input pen 201 in a state in which the pen pressure is high for keeping the state of pointing at the object. Therefore, in this embodiment 1-5, a three-dimensional pointing method is described in which, after the operator points at the object, the pointed object is automatically moved to a position where the two-dimensional GUI-like operation can be applied, so that the operator performs desired editing, deformation and the like, and after that, the operator moves back the object to a three-dimensional position desired by the operator.

In the embodiment 1-5, similar to each before-mentioned embodiment, the electromagnetic induction type pen tablet is used as the input apparatus 2, and a method for pointing and object operation following the pointing is described in which DFD is used as the display apparatus 3 that can represent the three-dimensional space.

Figure 16B:
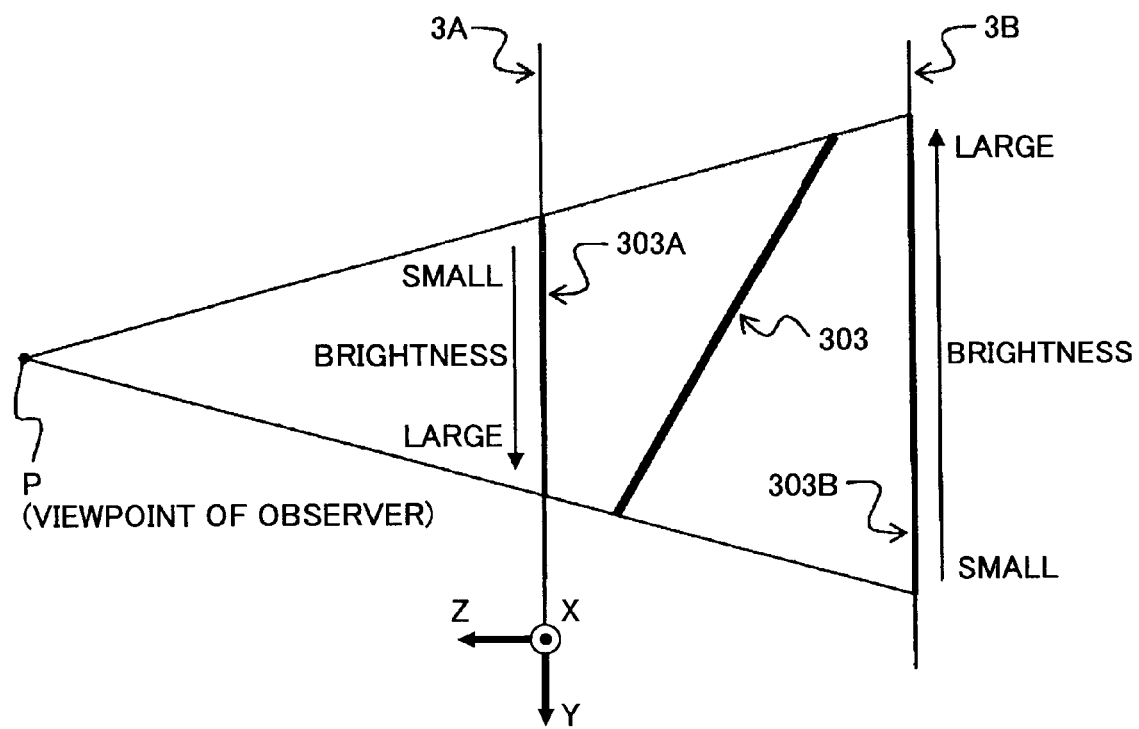
FIG. 16B is a schematic diagram for explaining the three-dimensional pointing method of the embodiments 1-5 and 2-5, and for explaining the principle of a display apparatus (DFD) used in the embodiments 1-5 and 2-5.

The DFD is a display apparatus in which two or more display planes are arranged such that the display planes are overlapped when viewed from the observer (operator) as shown in FIGS. 16A and 16B, and the DFD can be normally classified to two types that are a transparent type and a brightness modulation type according to the display method. Since more detailed configuration and the operation principle of the DFD are described in Japanese Patent No. 3022558 and Japanese Patent No. 3460671, for example, detailed description is not given here, and only general operation principle of the DFD is described.

As shown in FIGS. 16A and B, it is assumed that two display planes 3A and 3B are overlapped. In this case, the pointer 302 and the object 303 are displayed on the three-dimensional space between the two display planes 3A and 3B reflecting the depth position.

The pointer 302 and the object 303 displayed on the DFD are displayed on both of the display plane 3A placed in the front side as viewed from the operator and the display plane 3B in the back side. In this case, if the DFD is the brightness modulation type, when the object 303A of the front side display plane 3A is displayed with brightness $L_A$ and the object 303B of the back side display plane 3B is displayed with brightness $L_B$, the object 303 is seen as being displayed at a depth position wherein a ratio between distance of the position from the front side display plane and distance of the position from the back side display plane 3B is $L_B:L_A$.

In addition, for example, as shown in FIG. 16B, by continuously changing the brightness in one display region of the object 303, the object can be displayed to be inclined in the depth direction. In the example shown in FIG. 16B, the brightness of the object 303A of the front side display plane 3A is gradually increased from the top to the bottom on the figure surface, and the brightness of the object 303B of the back side display plane 3B is gradually increased from the bottom to the top on the figure surface. Therefore, the operator can stereoscopically observe the object 303 that is inclined such that the top part of the object 303 on the figure surface is placed in the back side and the bottom part of the object 303 is placed in the front side.

In addition, although detailed description is not given, when the DFD is the transparent type, by adjusting transparency of each point (pixel) in the region in which the object 303A is displayed on the front side display plane 3A, the stereoscopic image of the pointer and the object can be displayed at an arbitrary depth position between the front side display plane 3A and the back side display plane 3B in the same way as the brightness modulation type DFD.

As to the two-dimensional display apparatus such as a general CRT display and a liquid crystal display, it is necessary to project the three-dimensional space to a two-dimensional plane to be displayed. On the other hand, as to the three-dimensional display apparatus such as the DFD, since it is only necessary to determine ratio of brightness of each point (pixel) on each display plane according to the depth position in the three-dimensional space, work load for the system control apparatus 1 can be reduced. In addition, as to the two-dimensional apparatus such as the general CRT display and the liquid crystal display, since the three-dimensional space is projected to the two-dimensional plane for displaying, there may be a case where it is difficult to perform pointing operation with the same feeling as in the real space for some operators. But, by using the three-dimensional display apparatus such as the DFD, pointing operation can be performed having a feeling closer to that in the real space. As described above, by using the three-dimensional apparatus such as the DFD, the operator can point at a three-dimensional depth position more accurately and quickly as compared with the case in which pointing operation is performed using a general two-dimensional display.

Also in the case using the DFD as the display apparatus 3, as described in each embodiment, the detection means (digitizer) of the input means (pen tablet) can be overlapped with the display plane of the DFD. In addition, when using the electromagnetic induction type pen tablet, since there is a detection available range of Δz on the detection plane of the detection means, information such as the position/inclination/direction of the input pen can be detected even though the pen tip of the input pen does not contact with the detection plane. Therefore, even when there is a space between display planes like the DFD, it can be easily estimated and can be realized by a person skilled in the art to obtain information such as the position/inclination/direction of the input pen by placing the detection means on the backside of the DFD display apparatus. Further, although currently, the detection means is placed in the back side of the display plane in many cases, the detection means can be also placed on the upper side instead of the backside when the detection means is a transparent electrode. As mentioned above, by overlapping the detection means with the display plane of the DFD, direct pointing can be possible by operating the input pen on the display plane of the front side of the DFD. Thus, also in this embodiment 1-5, it is assumed that the detection means of the electromagnetic induction type pen tablet 2 is overlapped with the display plane of the DFD.

Figure 17A:
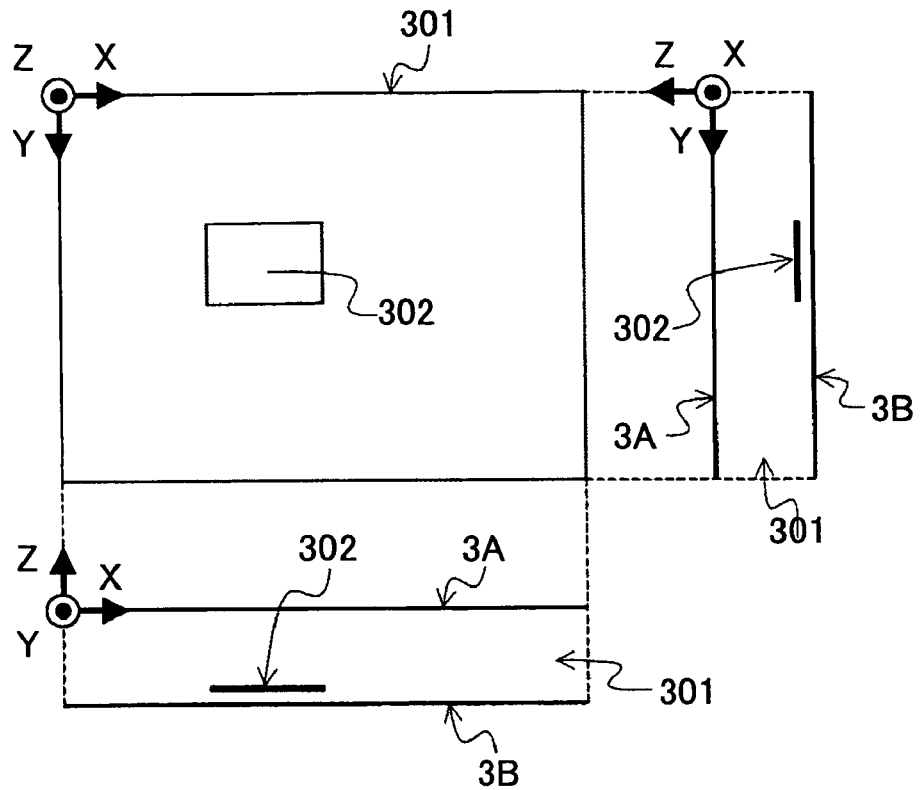
FIG. 17A is a schematic diagram for explaining the three-dimensional pointing method of the embodiments 1-5 and 2-5, and shows a front view, a right side view and a bottom view of an example of the three-dimensional space represented by the display apparatus.
Figure 17B:
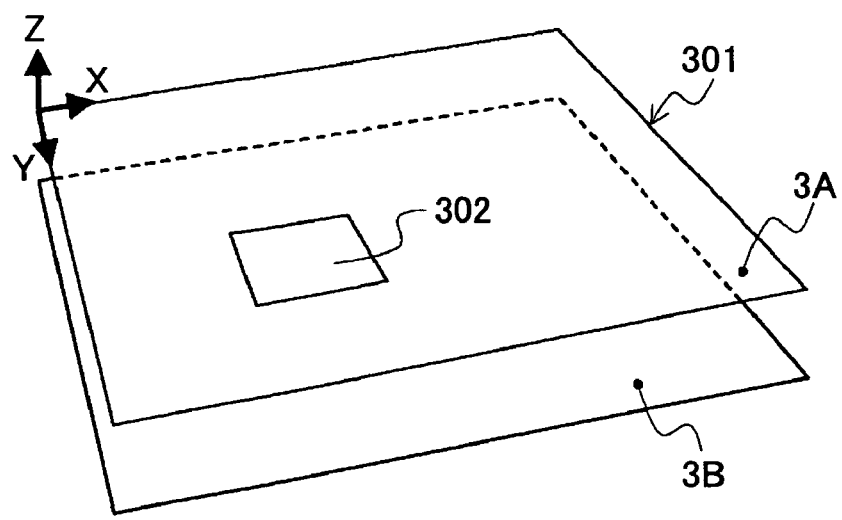
FIG. 17B is a schematic diagram for explaining the three-dimensional pointing method of the embodiments 1-5 and 2-5, and shows a bird's-eye view of an example of the three-dimensional space represented by the display apparatus.

In addition, in this embodiment 1-5, it is assumed that, the number of the display planes of the DFD 3 is two, and that, as shown in FIGS. 17A and 17B, a coordinate system XYZ corresponding to the coordinate system XYZ shown in FIG. 2 is set in the three-dimensional space 301 represented by the DFD 3, and the object 302 is placed at a position of z<0 in the three-dimensional space 301. In addition, it is assumed that the operator who operates the input pen 201 of the input apparatus 2 observes the XY plane of the three-dimensional space 301 from a point of z>0.

In addition, it is assumed that, the display plane in the front side as seen from the operator is z=0, and that the front side display plane is the detection plane of the detection means of the input apparatus 2.

The operator points at the object 302 stereoscopically displayed in the three-dimensional space 301 as shown in FIGS. 18A and 19A by using the method described in the embodiment 1-1 or the embodiment 1-2, for example. Then, the operator checks that the object 302 is pointed at based on the change of the color and the like of the object 302. Then, when the operator pushes the button 201D provided in the input pen once, for example, the pointed object 302 is displayed as a two-dimensional object on the front side display plane of the DFD as shown in FIGS. 18B and 19B, for example, and the pointer 303 disappears. The object 302 is displayed as an object having no thickness in the z direction in FIG. 18A. Although the object is a stereoscopic object having thickness in the z direction, three-dimensional stereoscopic display using DFD is not performed in this process, and the object is displayed as a projected image on the front side display plane of the DFD.

Then, the operator performs operation for writing a character, for example, on the object 302 as three-dimensional GUI operation. Then, after the two-dimensional GUI operation ends, when the operator pushes the button 201D of the input pen again, the pointer 303 appears again, so that the operator can move the object 302 to a desired three-dimensional position and can incline the object in the depth direction by the procedure as described in the embodiments 1-3 and 1-4 as shown in FIGS. 18C and 19C or FIGS. 18D and 19D, for example.

To realize such three-dimensional pointing method, it is only necessary to perform processes from the step 401 to the step 415 as shown in FIG. 20 in the system control apparatus 1. First, the system control apparatus 1 performs processes from the step 401 to the step 406 as described in the embodiment 1-1 and the embodiment 1-2 so as to point at the object 302 in the three-dimensional space 301 represented by the display apparatus 3. Then, the color of the pointed object 302 is changed in step 406. Next, as shown in FIG. 20, it is determined whether the operator performs operation, such as pushing of the button 201D of the input pen, for starting two-dimensional GUI-like operation/editing/processing for the pointed object 302 (step 411). Then, when the operator does not perform the operation for starting two-dimensional GUI-like operation/editing/processing, the process returns to the step 402, and the system waits until obtaining next input information.

On the other hand, when the operator performs the operation for starting two-dimensional GUI-like operation/editing/processing, the pointer 303 displayed in the three-dimensional space 301 represented on the display apparatus 3 is hidden, and a projection image of the pointed object 302 is displayed on a display plane closest to the operator as seen from the operator (step 412, step 413). By performing the step 412 and the step 413, the system enters a state in which the two-dimensional GUI-like operation/editing/processing for the object 302 can be performed.

After the system enters the state in which the two-dimensional GUI-like operation/editing/processing can be performed, two-dimensional GUI-like operation from the input pen 201 is received and is executed (step 414). After the process of the step 414, it is determined whether the operator performs operation, such as pushing the button 201D of the input pen again, for ending two-dimensional GUI-like operation/editing/processing (step 415). Then, when the operator does not perform the operation for ending the two-dimensional GUI-like operation/editing/processing, the process returns to the step 414, and other two-dimensional GUI-like operation/editing/processing is received and is executed.

On the other hand, when the operator performs the operation for ending the two-dimensional GUI-like operation/editing/processing, the mode returns from the mode for performing the two-dimensional GUI-like operation to the mode for performing three-dimensional pointing operation as described from the embodiment 1-1 to the embodiment 1-4. Then, processes from the step 401' to the step 406' equivalent the processes from the step 401 to the step 406 that are performed first are performed so as to point at a target object.

Then, after displaying the pointed object by changing the color at the step 406', the three-dimensional translation operation, rotation operation and inclination (deformation) operation for the pointed object 302 become possible by performing processes from the step 407 to the step 410 described in the embodiment 1-3 and the embodiment 1-4 by performing the operation such as pushing the button 201D of the input pen 201, for example.

By performing the above-mentioned processes in the system control apparatus 1, it becomes possible to perform display control for the pointer, three-dimensional operation such as moving the object, and two-dimensional GUI-like operation for the object as shown in FIGS. 18A, 18B, 18C and 18D.

As described above, according to the three-dimensional pointing method of this embodiment 1-5, only by the operations of the input pen 201, the two-dimensional GUI-like operation/editing/processing for the object can be performed in addition to the three-dimensional display control for the pointer, and to the operation of the object for three-dimensional movement and the like described in the embodiments 1-1-1-4. Therefore, the operator does not need to learn new three-dimensional operation for performing the two-dimensional GUI-like operation/editing/processing for the object.

In addition, in the three-dimensional pointing method of this embodiment 1-5, the mode can be changed from the mode for performing three-dimensional pointing operation to the mode for performing the two-dimensional GUI-like operation/editing/processing by performing specific operation such as pushing the button 201D of the input pen 201. In this case, information obtained by the input information obtaining means 101 of the system control apparatus 1 is processed as information for performing the two-dimensional GUI-like operation/editing/processing for the object. Therefore, for example, when performing the two-dimensional GUI-like operation/editing/processing by pointing at an object placed in a deep part as seen from the operator, it is not necessary to keep the state in which the pen pressure of the input pen 201 is high. As a result, the fatigue of the operator can be reduced.

Although, in this embodiment 1-5, the detection means (digitizer) of the electromagnetic induction type pen tablet that is the input apparatus 2 is overlapped with the display plane of the DFD that is the display apparatus 3 that can display the three-dimensional space, the input apparatus 2 is not limited to this configuration, and a configuration in which the detection means and the display apparatus are separated may be adopted. In addition, although in this embodiment 1-5, the DFD is used as the display apparatus 3, the display apparatus 3 is not limited to this, and a display apparatus such as the liquid crystal display described in embodiments 1-1-1-4 can be used.

Although, in this embodiment 1-5, a two-dimensional rectangular object is taken as an example of the target object 302, the shape is not limited to this and the object 302 may take any shape.

In addition, although, in this embodiment 1-5, the coordinate system of the three-dimensional space represented on the display apparatus 3 is set such that the display plane becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 1-5, although the pointed object is moved by moving the input pen while pushing the button 201D of the input pen 201, the movement method is not limited to this, and the object may be moved by a method for moving the input pen while pushing a specified key of a keyboard or pushing other switch, for example. In this case, in the steps 407, 411 and 415 shown in FIG. 20, it is determined whether input information corresponding to the operation for moving the object is obtained.

In addition, in this embodiment 1-5, although a case for writing a character "A" is taken as an example for directly editing the object 302 as shown in FIG. 18C, for example, a following example may be also possible. In this example, an object representing a file is used as the object 302, and after pointing at the object, when the two-dimensional GUI-like operation is performed, the file opens so that the operator edits the information on the two-dimensional GUI, and after the file closes, the operator can move the object to a desired three-dimensional position.

Embodiment 1-6

Figure 21A:
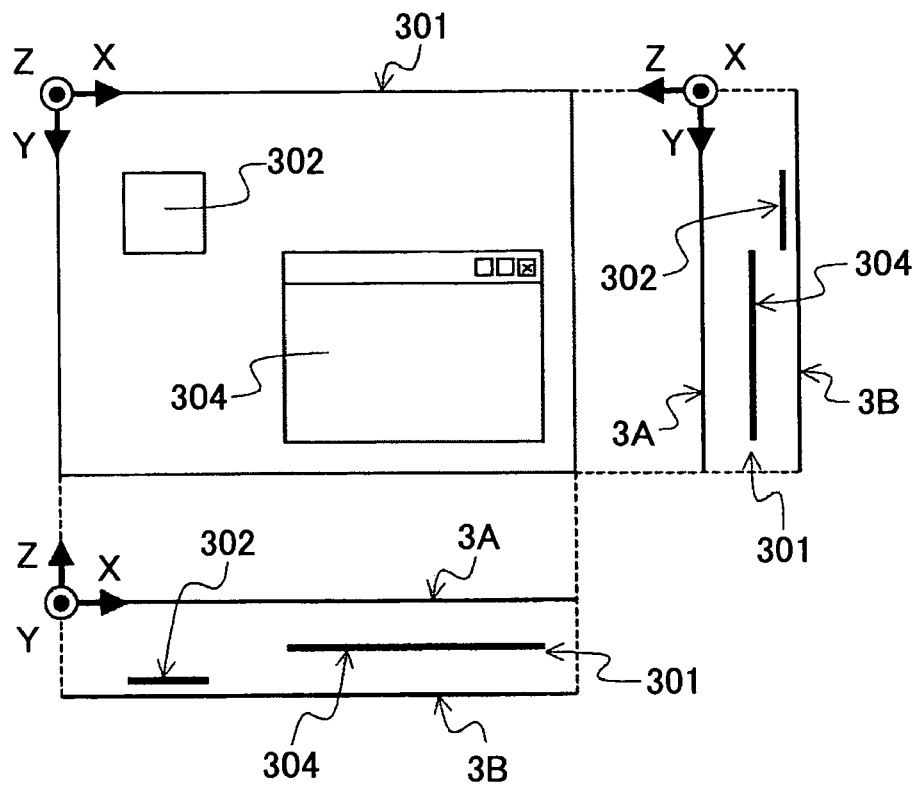
FIG. 21A is a schematic diagram for explaining the three-dimensional pointing method of the embodiments 1-6 and 2-6, and shows a front view, a right side view and a bottom view of an example of the three-dimensional space represented by the display apparatus.
Figure 24A:
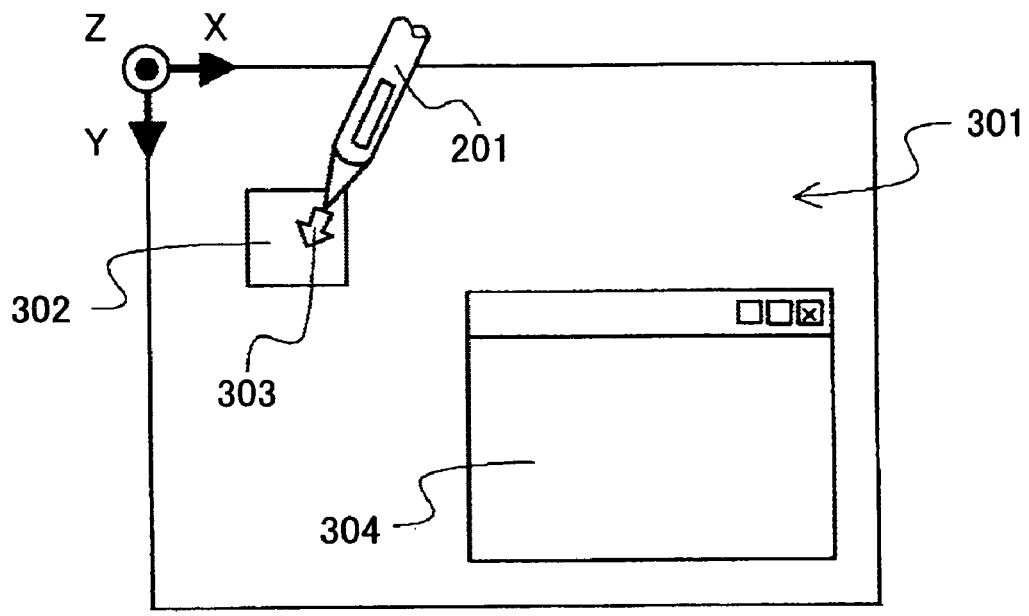
FIG. 24A is a schematic diagram for explaining the three-dimensional pointing method of the embodiments 1-6 and 2-6, and shows a front view showing a situation in the three-dimensional space when operating with an input pen.
Figure 24B:
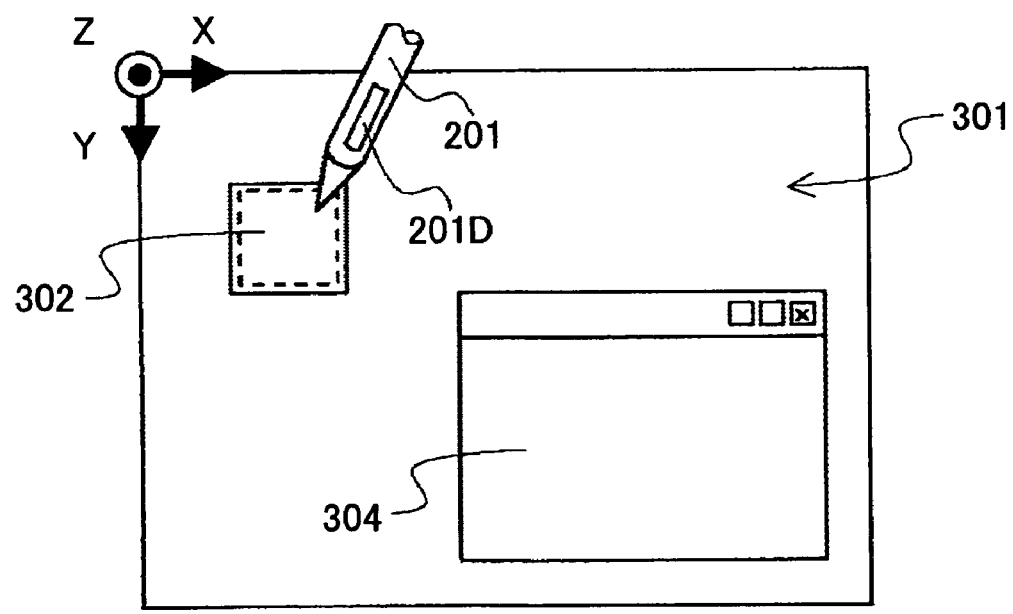
FIG. 24B is a schematic diagram for explaining the three-dimensional pointing method of the embodiments 1-6 and 2-6, and shows a front view showing a situation in the three-dimensional space when operating with an input pen.
Figure 24C:
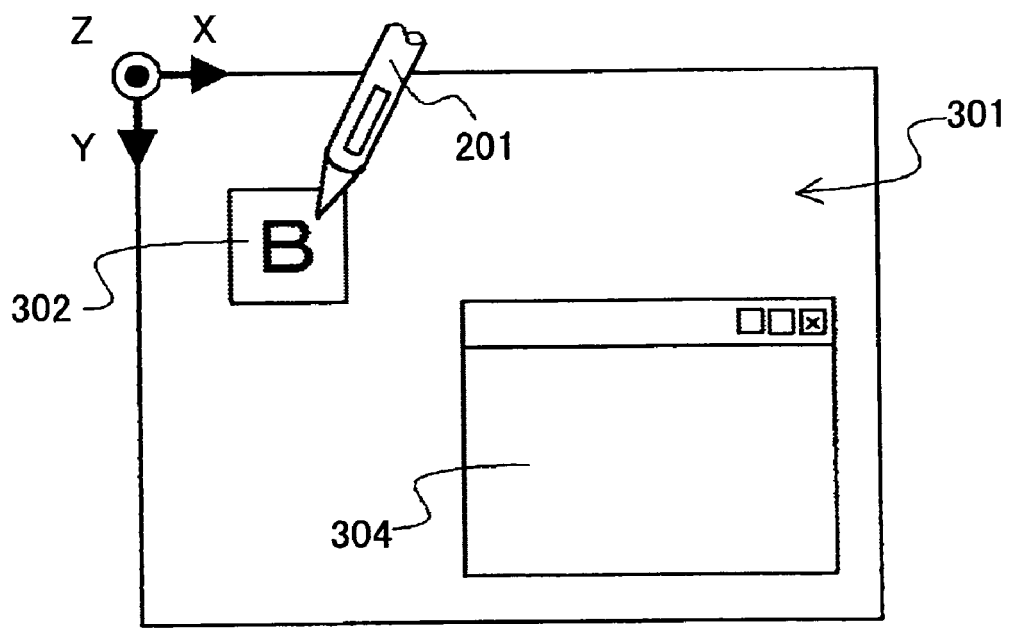
FIG. 24C is a schematic diagram for explaining the three-dimensional pointing method of the embodiments 1-6 and 2-6, and shows a front view showing a situation in the three-dimensional space when operating with an input pen.
Figure 25A:
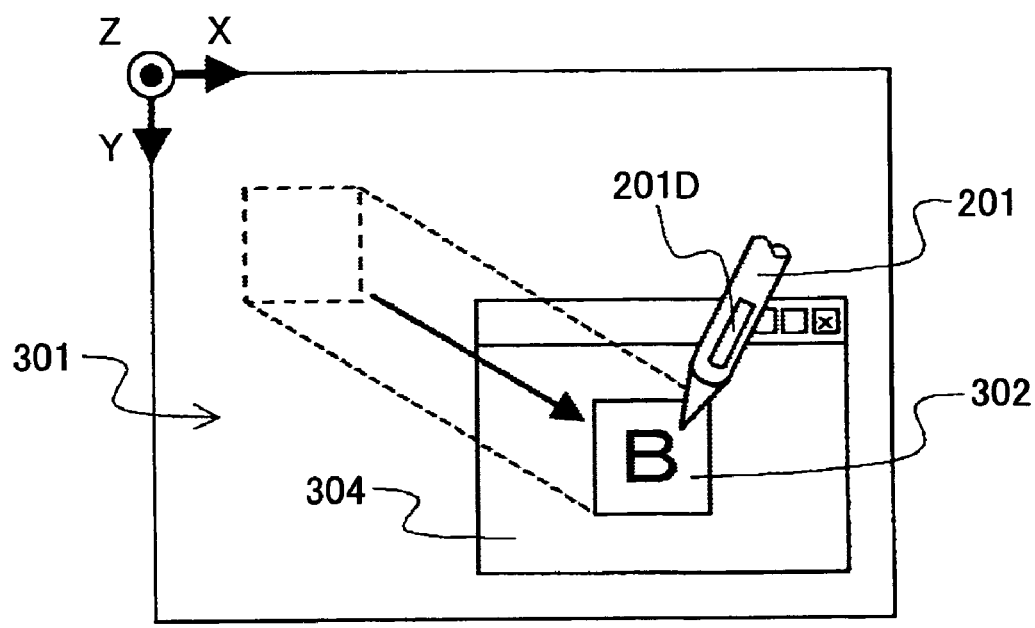
FIG. 25A is a schematic diagram for explaining the three-dimensional pointing method of the embodiments 1-6 and 2-6, and shows a front view showing a situation in the three-dimensional space when operating with an input pen.
Figure 25B:
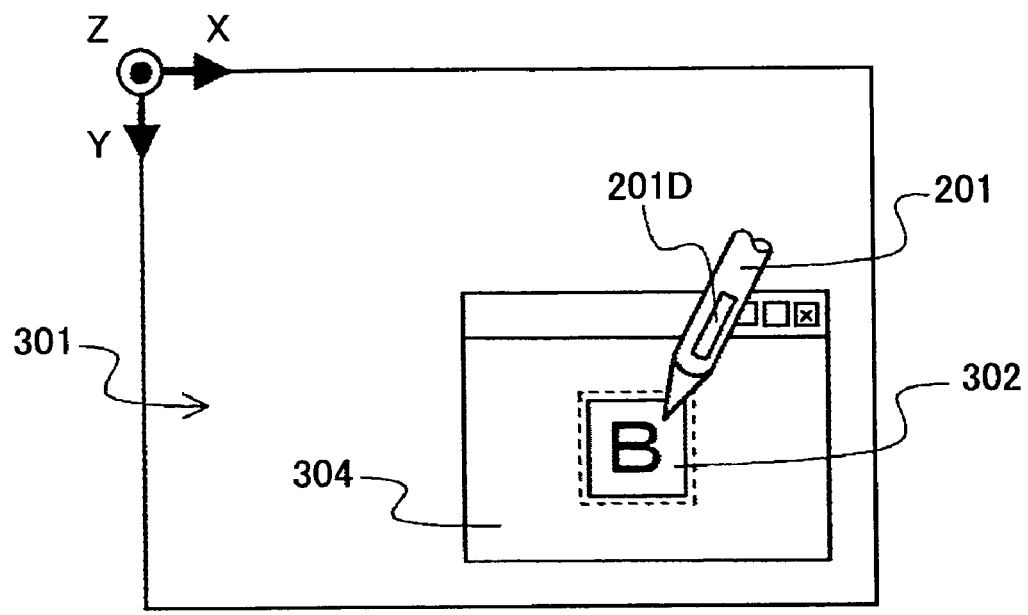
FIG. 25B is a schematic diagram for explaining the three-dimensional pointing method of the embodiments 1-6 and 2-6, and shows a front view showing a situation in the three-dimensional space when operating with an input pen.
Figure 25C:
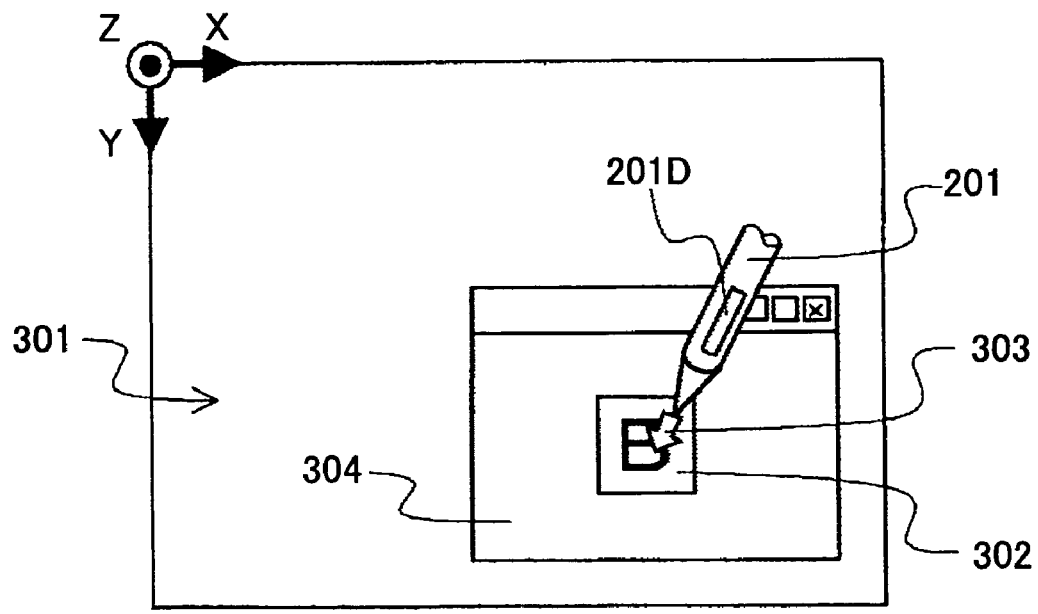
FIG. 25C is a schematic diagram for explaining the three-dimensional pointing method of the embodiments 1-6 and 2-6, and shows a front view showing a situation in the three-dimensional space when operating with an input pen.
Figure 26:
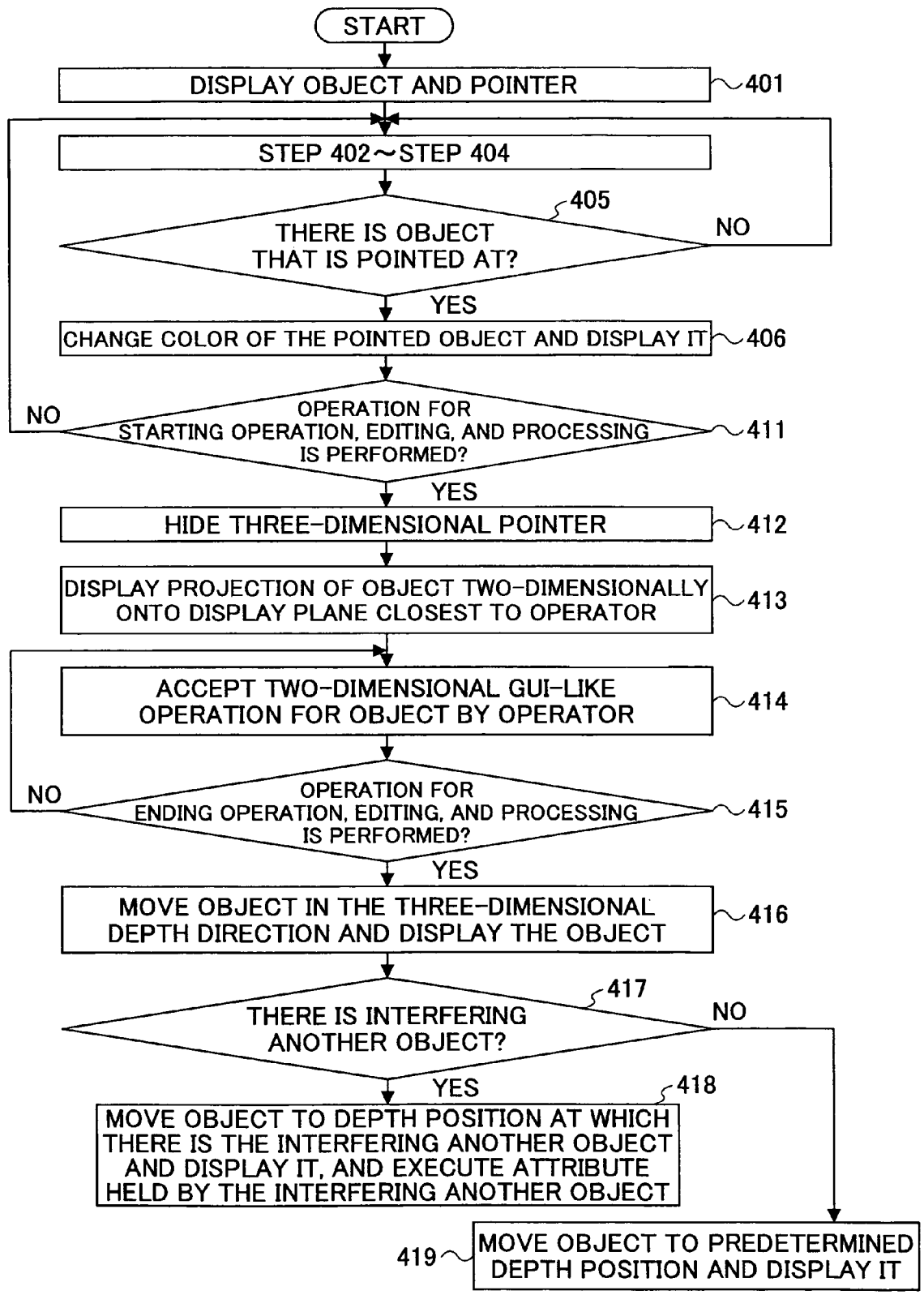
FIG. 26 is a schematic diagram for explaining the three-dimensional pointing method of the embodiment 1-6, and shows a flowchart showing a process procedure of the three-dimensional pointing method of the embodiment 1-6.
Figure 27:
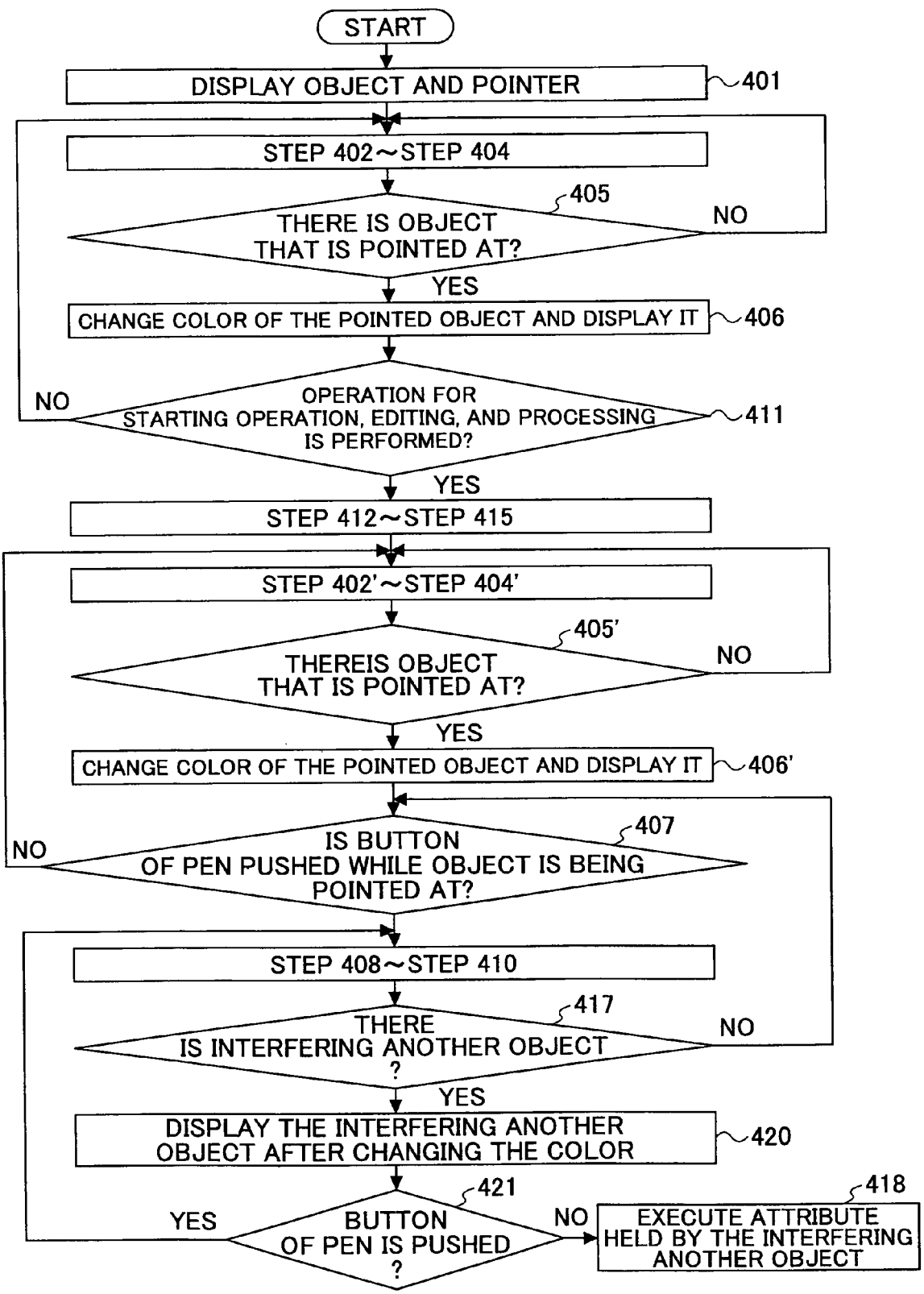
FIG. 27 is a schematic diagram for explaining the three-dimensional pointing method of the embodiment 1-6, and shows a flowchart showing a modified example of a process procedure of the three-dimensional pointing method of the embodiment 1-6.

FIGS. 21A-27 are schematic diagrams for explaining the three-dimensional pointing method of the embodiment 1-6 of the present invention. FIG. 21A shows a front view, a right side view and a bottom view of an example of the three-dimensional space represented by the display apparatus, FIG. 21B shows a bird's-eye view of an example of the three-dimensional space represented by the display apparatus, each of FIGS. 22A, 22B, 22C, 23A, 23B, and 23D shows a bird's-eye view showing situations in the three-dimensional space when operating with an input pen, each of FIGS. 24A, 24B, 24C, 25A, 25B, and 25D shows a front view showing situations in the three-dimensional space when operating with an input pen, and FIG. 26 is a flowchart showing a process procedure of the three-dimensional pointing method of this embodiment 1-6, and FIG. 27 is a flowchart showing a modified example of a process procedure of the three-dimensional pointing method of this embodiment 1-6. By the way, FIGS. 24A, 19B, and 24C correspond to FIGS. 23A, 23B, and 23C respectively.

The three-dimensional pointing method of this embodiment 1-6 is an application example of the three-dimensional pointing method describe in the embodiment 1-5. In the pointing method, the object 302 in the three-dimensional space 301 is pointed at by the method of the embodiment 1-1 or the embodiment 1-2. After that, the pointed object 302 is automatically moved to a position where the operator can easily operate the object, that is, moved to a position where the two-dimension GUI operation can be performed so that the operator performs desired editing, processing and the like. After completing the desired editing and processing, when the operator performs operation, the object 302 moves until the objects 302 interferes with another object that is placed in the three-dimensional depth position as seen from the operator. After interfering with the another object, the state of the moved object is changed according to an attribute of the another object.

In this embodiment 1-6, similar to the embodiment 1-5, the electromagnetic induction type pen tablet is used as the input apparatus 2, and a method for pointing and object operation is described in which DFD is used as the display apparatus 3.

In addition, it is assumed that the detection means (digitizer) of the input apparatus (pen tablet) 2 is overlapped with the display plane of the display apparatus (DFD) 3 so as to be provided in an integrated manner.

Figure 21B:
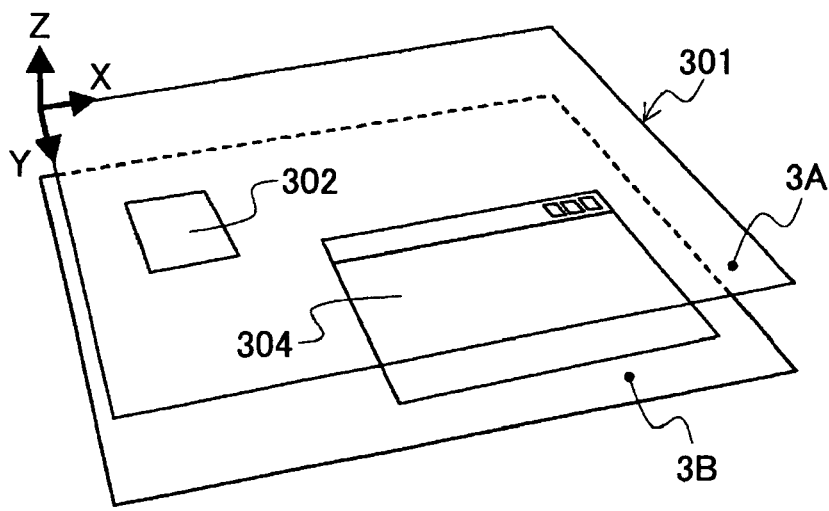
FIG. 21B is a schematic diagram for explaining the three-dimensional pointing method of the embodiments 1-6 and 2-6, and shows a bird's-eye view of an example of the three-dimensional space represented by the display apparatus.

In addition, for explaining the three-dimensional pointing method of this embodiment 1-6, an example is explained in which the coordinate system XYZ is set in the three-dimensional space 301 represented between the two display planes of the DFD 3, and the object 302 and a window 304 are placed at a position of Z<0 in the three-dimensional space 301 as shown in FIGS. 21A and 21B.

Figure 22A:
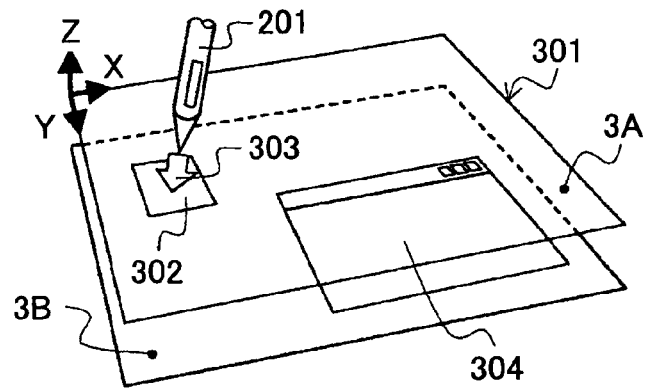
FIG. 22A is a schematic diagram for explaining the three-dimensional pointing method of the embodiments 1-6 and 2-6, and shows a bird's-eye view showing a situation in the three-dimensional space when operating with an input pen.
Figure 22B:
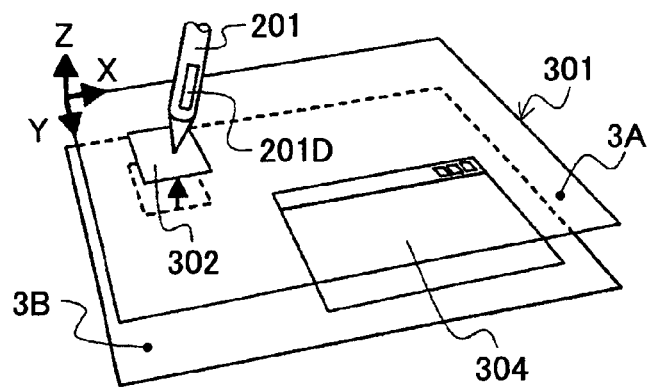
FIG. 22B is a schematic diagram for explaining the three-dimensional pointing method of the embodiments 1-6 and 2-6, and shows a bird's-eye view showing a situation in the three-dimensional space when operating with an input pen.

In this case, the operator who wants to operate the object 302 points at the object 302 as shown in FIGS. 22A and 24A by using the method described in the embodiment 1-1 or the embodiment 1-2, for example. Then, the operator checks that the object 302 is pointed at based on the change of the color and the like of the object 302. Then, when the operator pushes the button 201D provided in the input pen once, for example, the pointed object 302 is displayed as a two-dimensional object on the front side display plane of the DFD as shown in FIGS. 22B and 24B, for example, and the pointer 303 disappears. In this embodiment 1-6, the object 302 is an object having no thickness in the z direction. Even when the object is a stereoscopic object having thickness in the z direction, three-dimensional stereoscopic display using DFD is not performed in this process, and the object is displayed as a projected image on the front side display plane of the DFD.

Figure 22C:
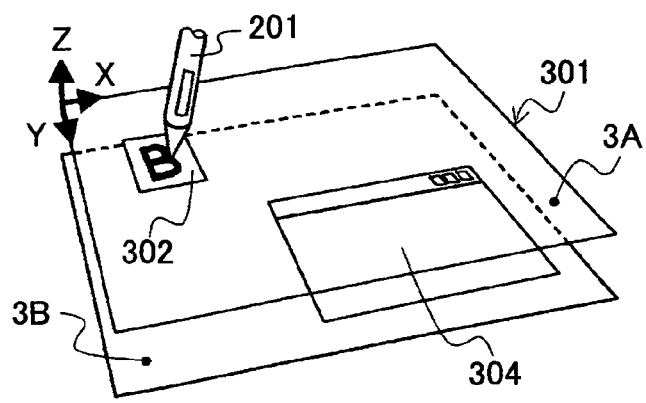
FIG. 22C is a schematic diagram for explaining the three-dimensional pointing method of the embodiments 1-6 and 2-6, and shows a bird's-eye view showing a situation in the three-dimensional space when operating with an input pen.
Figure 23A:
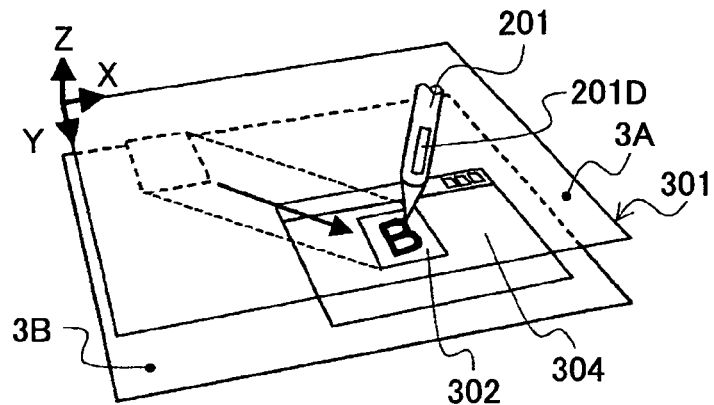
FIG. 23A is a schematic diagram for explaining the three-dimensional pointing method of the embodiments 1-6 and 2-6, and shows a bird's-eye view showing a situation in the three-dimensional space when operating with an input pen.
Figure 23B:
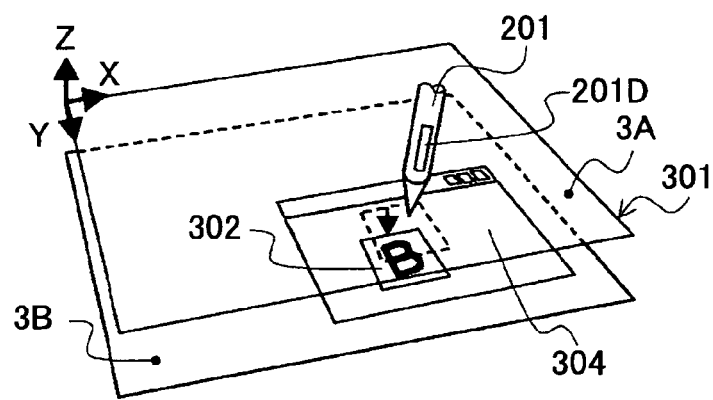
FIG. 23B is a schematic diagram for explaining the three-dimensional pointing method of the embodiments 1-6 and 2-6, and shows a bird's-eye view showing a situation in the three-dimensional space when operating with an input pen.
Figure 23C:
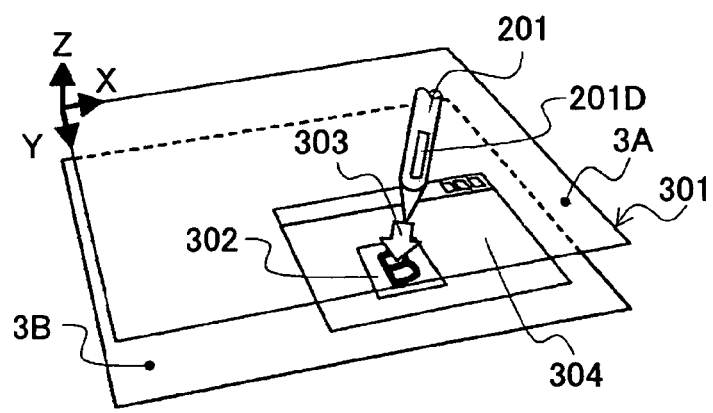
FIG. 23C is a schematic diagram for explaining the three-dimensional pointing method of the embodiments 1-6 and 2-6, and shows a bird's-eye view showing a situation in the three-dimensional space when operating with an input pen.

In this way, when the display method of the object 302 changes, since the system enters the state in which two-dimensional GUI operation can be performed on the three-dimensional space 301, the operator can perform the intended operation such as writing a character on the object 302 as two-dimensional GUI operation with the input pen 201 as shown in FIGS. 22C and 24C. Then, as shown in FIGS. 23A and 25A, after the operator continuously moves the object 302 to a desired position by performing two-dimensional operation, when the operator pushes the button 201 of the input pen 201 once, the object moves in the three-dimensional depth direction as seen from the operator (z<0) until the object 302 interferes with the window 304 as shown in FIG. 23B and FIG. 25B. At this time, by adding animation in which the z coordinate of the object in the three-dimensional depth direction becomes gradually small, the process of movement is easily known by the operator. Then, when the object 302 interferes with the window 304, operation of moving to the window is executed for the object 302 as the attribute of the window 304.

In addition, as shown in FIGS. 23B and 25B. instead of automatically moving the object 302 in the three-dimensional depth direction (z<0), the object 302 can be moved in the three-dimensional depth direction (z<0) to the position where the object interferes with the window 304 by operating the input pen 201 while pushing the button 201D of the input pen 201.

To realize such three-dimensional pointing method, it is only necessary to perform processes of steps 401-406 and steps 411-419 as shown in FIG. 26 in the system control apparatus 1. First, the system control apparatus 1 performs processes from the step 401 to the step 406 as described in the embodiment 1-1 and the embodiment 1-2 so as to point at the object 302 in the three-dimensional space 301 represented by the display apparatus 3. Then, the color of the pointed object 302 is changed in step 406. Next, as shown in FIG. 26, it is determined whether the operator performs operation, such as pushing of the button 201D of the input pen, for starting two-dimensional GUI-like operation/editing/processing for the pointed object 302 (step 411). Then, when the operator does not perform the operation for starting two-dimensional GUI-like operation/editing/processing, the process returns to the step 402, and the system waits until obtaining next input information.

On the other hand, when the operator performs the operation for starting two-dimensional GUI-like operation/editing/processing, the pointer 303 displayed in the three-dimensional space 301 represented on the display apparatus 3 is hidden, and a projection image of the pointed object 302 is displayed on a display plane closest to the operator as seen from the operator (step 412, step 413). By performing the step 412 and the step 413, the system enters a state in which the two-dimensional GUI-like operation/editing/processing for the object 302 can be performed.

After the system enters the state in which the two-dimensional GUI-like operation/editing/processing can be performed, two-dimensional GUI-like operation from the input pen 201 is received and is executed (step 414). After the process of the step 414, it is determined whether the operator performs operation, such as pushing the button 201D of the input pen again, for ending two-dimensional GUI-like operation/editing/processing (step 415). Then, when the operator does not perform the operation for ending the two-dimensional GUI-like operation/editing/processing, the process returns to the step 414, and other two-dimensional GUI-like operation/editing/processing is received and is executed.

On the other hand, when the operator performs the operation for ending the two-dimensional GUI-like operation/editing/processing, the mode returns from the mode for performing the two-dimensional GUI-like operation to the mode for performing three-dimensional pointing operation as described from the embodiment 1-1 to the embodiment 1-4. Then, the object 302 is moved in the three-dimensional depth direction (z<0) as shown in FIG. 26 (step 416).

In addition, while the object 302 is moved in the three-dimensional depth direction in step 416, the system control apparatus 1 determines whether there is another object such as the window 304, for example, that interferes with the object 302 (step 417). Then, when there is the interfering object, at the time when the interference occurs, the movement of the object 302 in the three-dimensional depth direction stops, and the attribute of the interfering another object is executed for the object 302 (step 418).

On the other hand, when the another object that interferes with the object 302 does not exist, the object 302 is displayed after the object 302 is moved to a predetermined depth position, that is, to a depth position the same as one before the processes after the step 411 are performed, for example (step 419).

By performing the processes of the procedure shown in FIG. 26, it becomes possible to perform a series of pointer display control, operation for moving the object three-dimensionally and the two-dimensional GUI-like operation as shown in FIGS. 22A, 22B, 22C, 23A and 23B.

In the process procedure shown in FIG. 26, after the step 415, that is, after the state returns from the state in which the two-dimensional GUI operation is possible to the state in which the three-dimensional pointing operation is possible, the object 302 is automatically moved in the depth direction in step 416. But, this step is not limited to such operation, and the operator may move the object 302 in the depth direction while operating the input pen 201 using the method in the embodiment 1-3 or the embodiment 1-4. In such pointing method, it is only necessary for the system control apparatus 1 to perform processes of steps 401-415, steps 417, 418, 420 and 421 as shown in FIG. 27.

The processes until the two-dimensional GUI-like operation is performed by pointing at the object in the three-dimensional space 301 represented by the DFD 3 (steps 401-406 and steps 411-415) can be the same as the processes shown in FIG. 26. Thus, detailed description is not given here.

Then, in step 415, after checking the operation, such as pushing the button 201D of the input pen 201 for example, for returning from the state in which the two-dimensional GUI operation is possible to the state in which the three-dimensional pointing operation is possible, the object 302 is pointed at by the procedure (steps 402'-406') described in the embodiment 1-1 or the embodiment 1-2.

After pointing at the target object 302 by the steps 402'-406', it is checked whether the button 201D of the input pen 201 is pushed (step 407). When it is determined that the button 201D of the input pen 201 is pushed, processes of steps 408-410 are performed continuously in synchronization with the operation of the input pen 201 as described in the embodiment 1-3 or the embodiment 1-4, so that the object 302 is three-dimensionally moved, rotated or deformed.

In addition, while the object 302 is moved, rotated or deformed by performing the processes from the step 408 to the step 410, the system control apparatus 1 checks whether there is another object that interferes with the object 302 (step 417). When there is the interfering another object, the interfering another object is displayed by changing the color (step 420). At this time, at the same time, in addition to displaying the interfering another object by changing the color, it is checked whether the button 201D of the input pen 201 is being pushed. When the button 201D of the input pen 201 is being pushed, the process from the step 408 continues so that the object 302 continues to be three-dimensionally moved, rotated or deformed.

On the other hand, when the button 201D is released at the time when the interfering another object is displayed by changing the color, the movement, rotation or deformation of the object is stopped at the time, and the attribute held by the interfering another object is executed for the object 302 (step 418).

By performing the processes of the procedure shown in FIG. 27, it becomes possible to perform a series of pointer display control, operation for moving the object three-dimensionally and the two-dimensional GUI-like operation as shown in FIGS. 22A, 22B, 22C, 23A and 23B.

As described above, according to the three-dimensional pointing method of this embodiment 1-6, after the object 302 in the three-dimensional space 301 is pointed at, the pointed object 302 is automatically moved to the position where the operator can easily operate the object 302, and the operator can perform the intended editing and processing and the like by the conventional two-dimensional GUI operation, and after completing the intended editing and processing, the object 302 is moved in the three-dimensional direction as seen from the operator, and when the another object that interferes with the moved object 302 exists, the state of the moved object 302 can be changed by the attribute of the another object.

In addition, in the three-dimensional pointing method of this embodiment 1-6, the mode can be changed from the mode for performing three-dimensional pointing operation to the mode for performing the two-dimensional GUI-like operation/editing/processing by performing specific operation such as pushing the button 201D of the input pen 201. In this case, information obtained by the input information obtaining means 101 of the system control apparatus 1 is processed as information for performing the two-dimensional GUI-like operation/editing/processing for the object. Therefore, for example, when performing the two-dimensional GUI-like operation/editing/processing by pointing an object placed in a deep part as seen from the operator, it is not necessary to keep the state in which the pen pressure of the input pen 201 is high. As a result, the fatigue of the operator can be reduced.

Although, in this embodiment 1-6, the detection means (digitizer) of the electromagnetic induction type pen tablet that is the input apparatus 2 is overlapped with the display plane of the DFD that is the display apparatus 3 that can display the three-dimensional space, the input apparatus 2 is not limited to this configuration, and a configuration in which the detection means and the display apparatus are separated may be adopted. In addition, although in this embodiment 1-6, the DFD is used as the display apparatus 3, the display apparatus 3 is not limited to this, and a display apparatus such as the liquid crystal display described in embodiments 1-1-1-4 can be used.

Although, in this embodiment 1-6, a two-dimensional rectangular object is taken as an example of the target object 302, the shape is not limited to this and the object 302 may take any shape.

In addition, although, in this embodiment 1-6, the coordinate system of the three-dimensional space represented on the display apparatus 3 is set such that the display surface becomes Z=0 as shown in FIG. 4A like the embodiment 1-1, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 1-6, although the pointed object is moved by moving the input pen while pushing the button 201D of the input pen 201, the movement method is not limited to this, and the object may be moved by a method for moving the input pen while pushing a specified key of a keyboard or pushing other switch, for example. In this case, in the steps 407, 411 and 415 shown in FIG. 20, it is determined whether input information corresponding to the operation for moving the object is obtained.

In addition, in this embodiment 1-6, although a case for writing a character "B" is taken as an example for directly editing the object 302 as shown in FIG. 22C, for example, a following example may be also possible. In this example, an object representing a file is used as the object 302, and after pointing at the object, when the two-dimensional GUI-like operation is performed, the file opens so that the operator edits the information on the two-dimensional GUI, and after the file closes, the operator can move the object to a desired three-dimensional position.

In addition, in this embodiment 1-6, a case is described in which the window is taken as an example of the another object, and the attribute of moving the file when interfering with the window 304 is executed. But, the present invention is not limited to this example, and it is also possible to execute an attribute of executing a file when interfering with an icon for executing another application, for example. In addition, it is also possible to execute an attribute of deleting a file when interfering with a trash box object, for example.

Figure 28A:
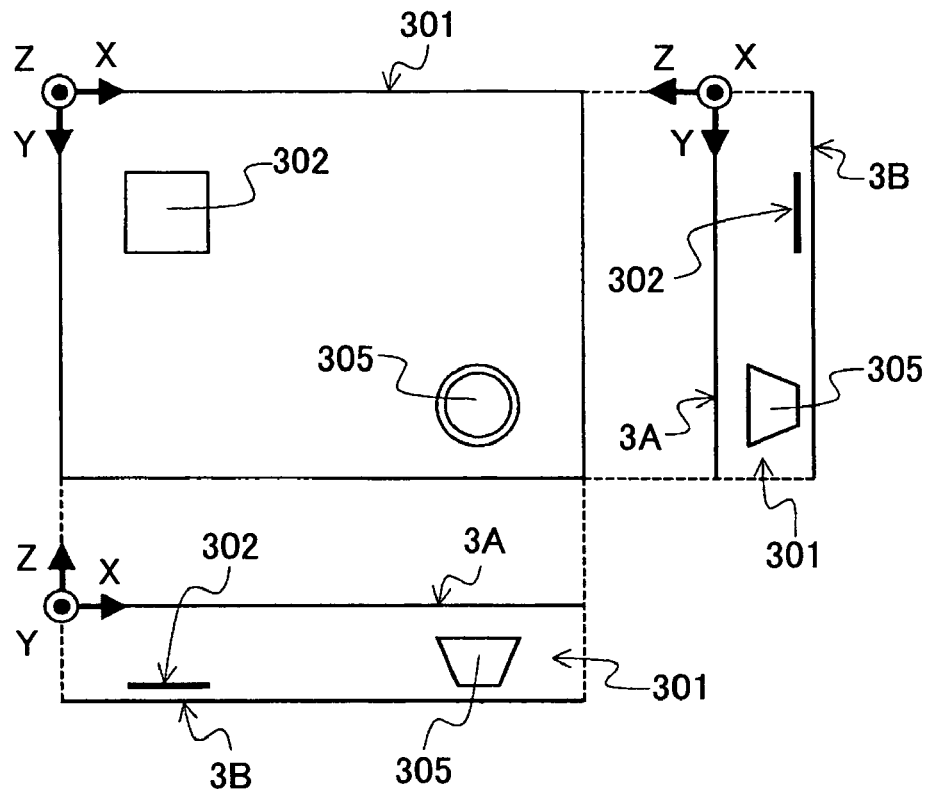
FIG. 28A is a schematic diagram for explaining the method for deleting an object in the three-dimensional pointing method of the embodiments 1-6 and 2-6, and shows a front view, a right side view and a bottom view of an example of the three-dimensional space represented by the display apparatus.

FIGS. 28A-32C are schematic diagrams for explaining the method for deleting an object in the three-dimensional pointing method of the embodiment 1-6. FIG. 28A shows a front view, a right side view and a bottom view of an example of the three-dimensional space represented by the display apparatus, FIG. 28B shows a bird's-eye view of an example of the three-dimensional space represented by the display apparatus, each of FIGS. 29A, 29B, 30A, 30B, and 30C shows a bird's-eye view showing situations in the three-dimensional space when operating with an input pen, each of FIGS. 31A, 31B, 32A, 32B, and 32C shows a front view showing situations in the three-dimensional space when operating with an input pen. By the way, FIGS. 31A and 31B correspond to FIGS. 29A and 29B respectively and FIGS. 32A, 32B and 32C correspond to FIGS. 30A, 30B and 30C respectively.

Figure 28B:
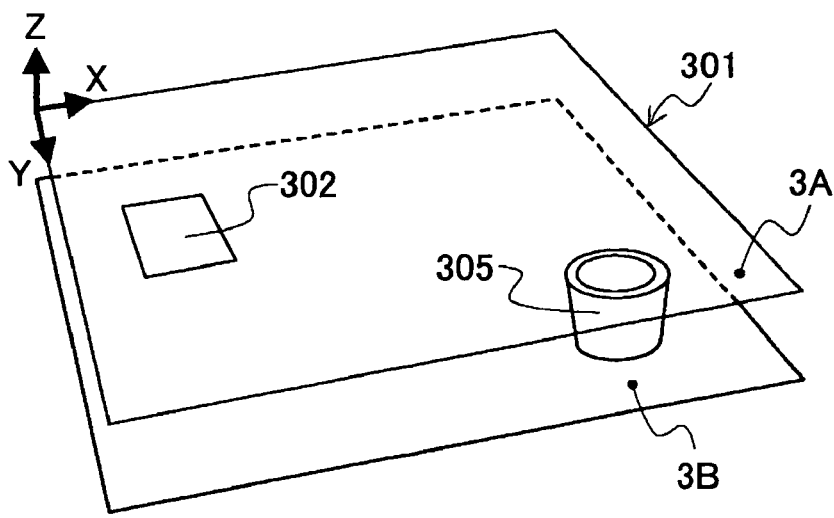
FIG. 28B is a schematic diagram for explaining the method for deleting an object in the three-dimensional pointing method of the embodiments 1-6 and 2-6, and shows a bird's-eye view of an example of the three-dimensional space represented by the display apparatus.

As described before, in the three-dimensional pointing method of this embodiment 1-6, as mentioned before, the object 302 is not only moved to the window 304, but also the object 302 can be deleted by moving the object 302 to the trash box object, for example. Thus, as shown in FIGS. 28A and 28B, the procedure for deleting the object 302 is described, taking, as an example, a case in which the coordinate system XYZ is set in the three-dimensional space 301 represented between the two display planes of the DFD 3, and the object 302 and the trash box 305 are placed at positions of z<0 in the three-dimensional space 301.

Figure 29A:
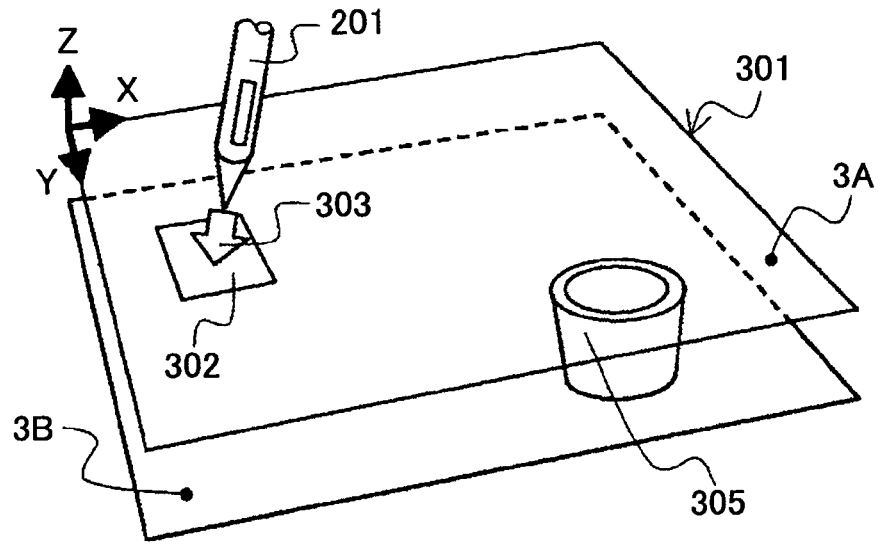
FIG. 29A is a schematic diagram for explaining the method for deleting an object in the three-dimensional pointing method of the embodiments 1-6 and 2-6, and shows a bird's-eye view showing a situation in the three-dimensional space when operating with an input pen.
Figure 29B:
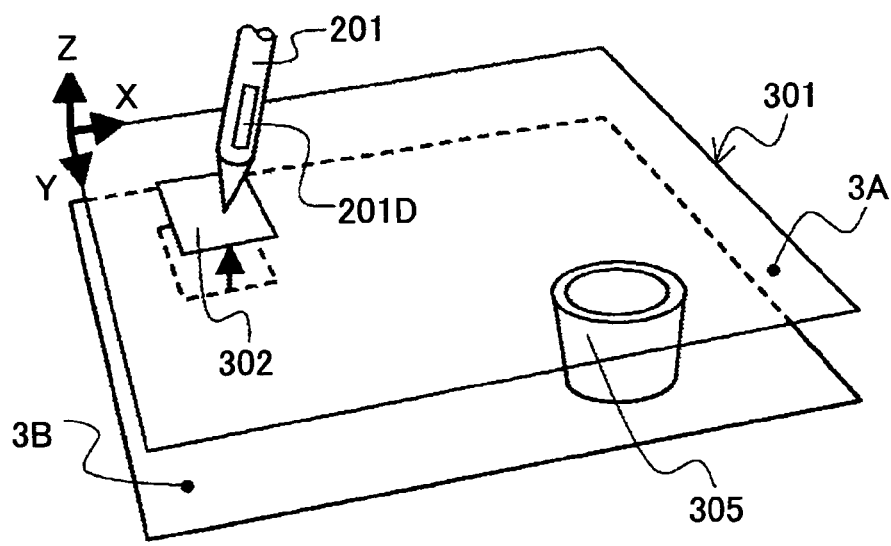
FIG. 29B is a schematic diagram for explaining the method for deleting an object in the three-dimensional pointing method of the embodiments 1-6 and 2-6, and shows a bird's-eye view showing a situation in the three-dimensional space when operating with an input pen.
Figure 30A:
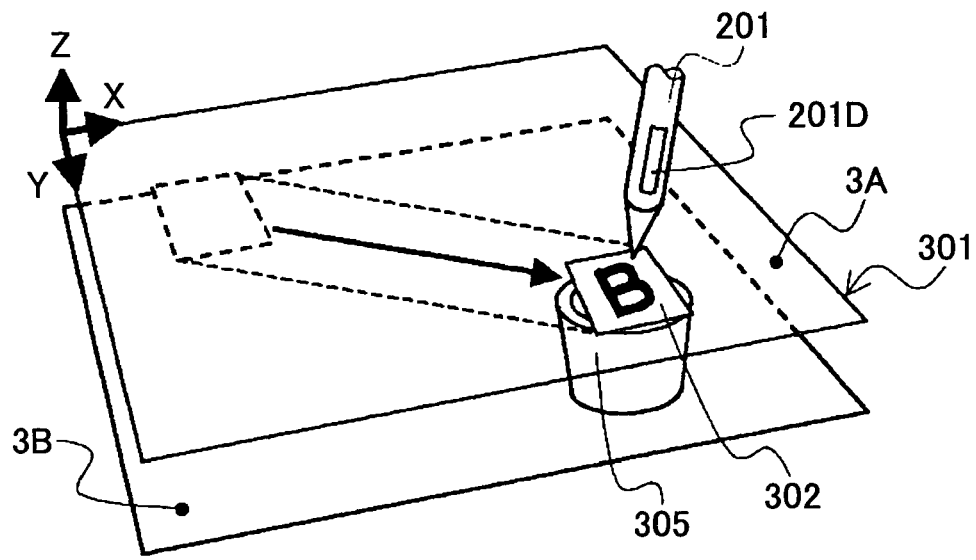
FIG. 30A is a schematic diagram for explaining the method for deleting an object in the three-dimensional pointing method of the embodiments 1-6 and 2-6, and shows a bird's-eye view showing a situation in the three-dimensional space when operating with an input pen.
Figure 30B:
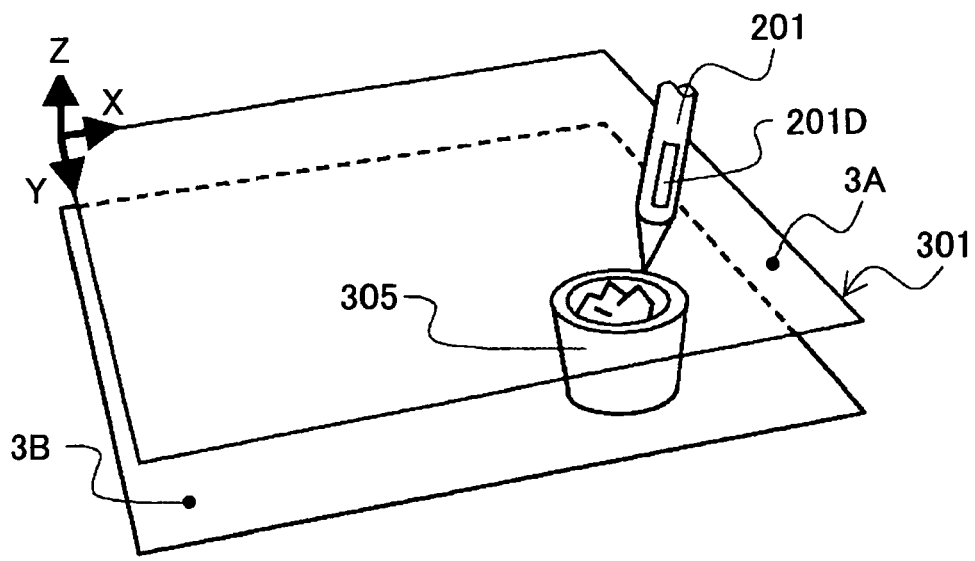
FIG. 30B is a schematic diagram for explaining the method for deleting an object in the three-dimensional pointing method of the embodiments 1-6 and 2-6, and shows a bird's-eye view showing a situation in the three-dimensional space when operating with an input pen.
Figure 31A:
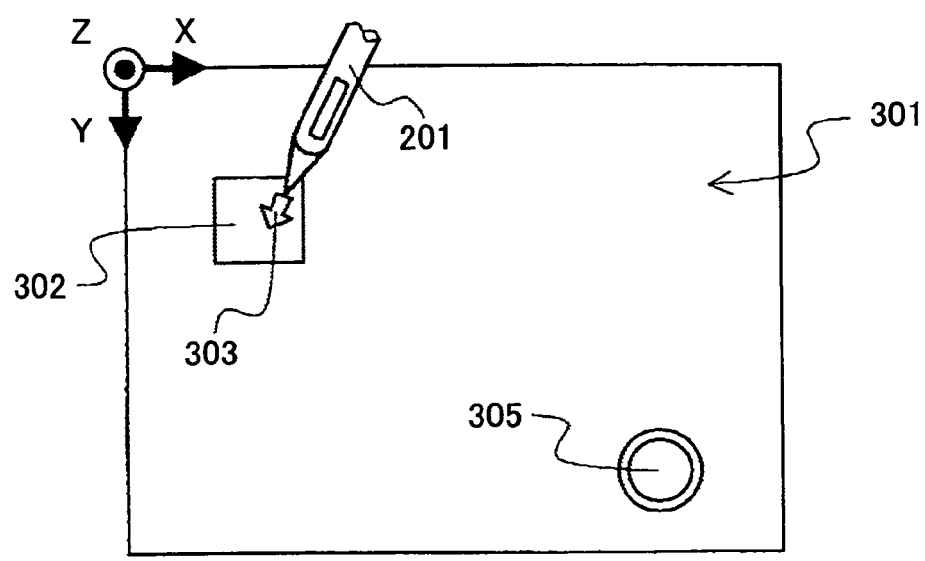
FIG. 31A is a schematic diagram for explaining the method for deleting an object in the three-dimensional pointing method of the embodiments 1-6 and 2-6, and shows a front view showing a situation in the three-dimensional space when operating with an input pen.
Figure 31B:
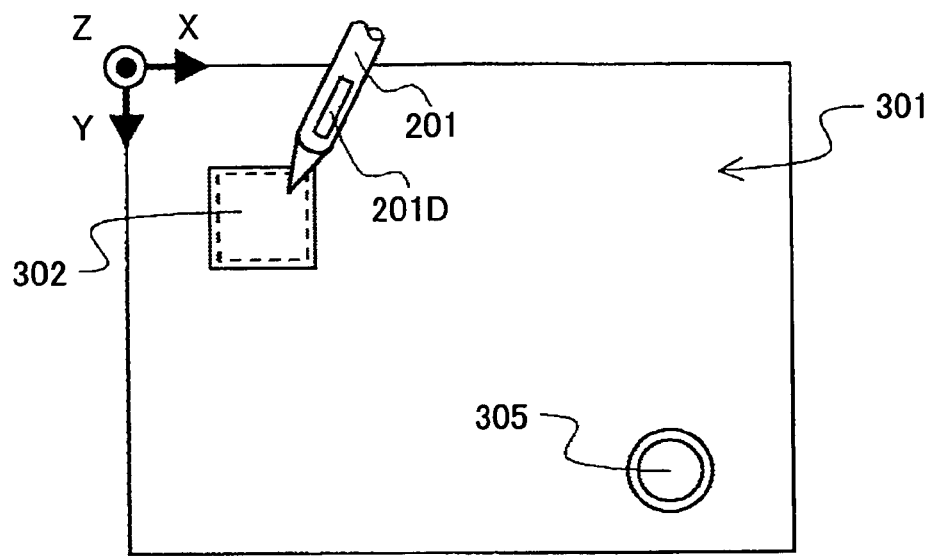
FIG. 31B is a schematic diagram for explaining the method for deleting an object in the three-dimensional pointing method of the embodiments 1-6 and 2-6, and shows a front view showing a situation in the three-dimensional space when operating with an input pen.
Figure 32A:
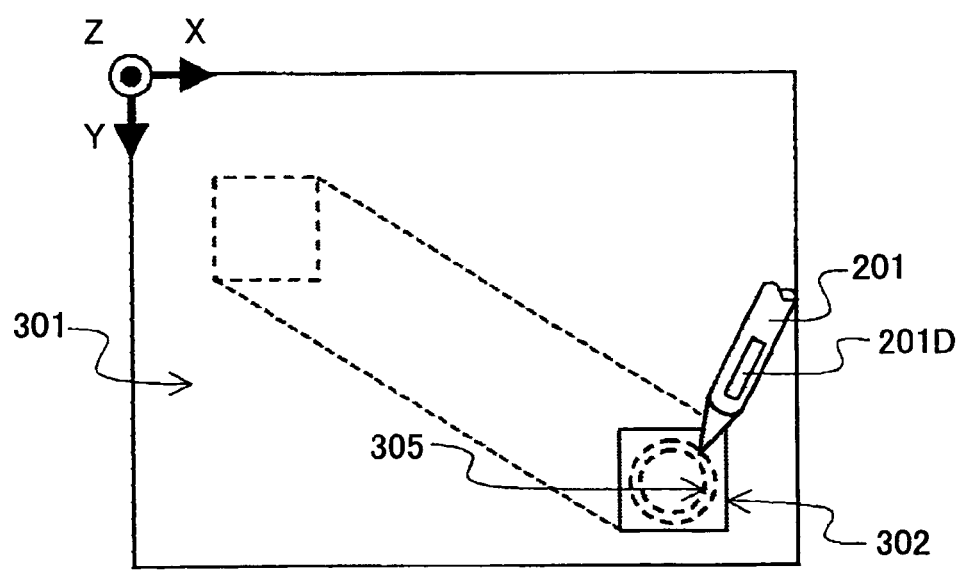
FIG. 32A is a schematic diagram for explaining the method for deleting an object in the three-dimensional pointing method of the embodiments 1-6 and 2-6, and shows a front view showing a situation in the three-dimensional space when operating with an input pen.
Figure 32B:
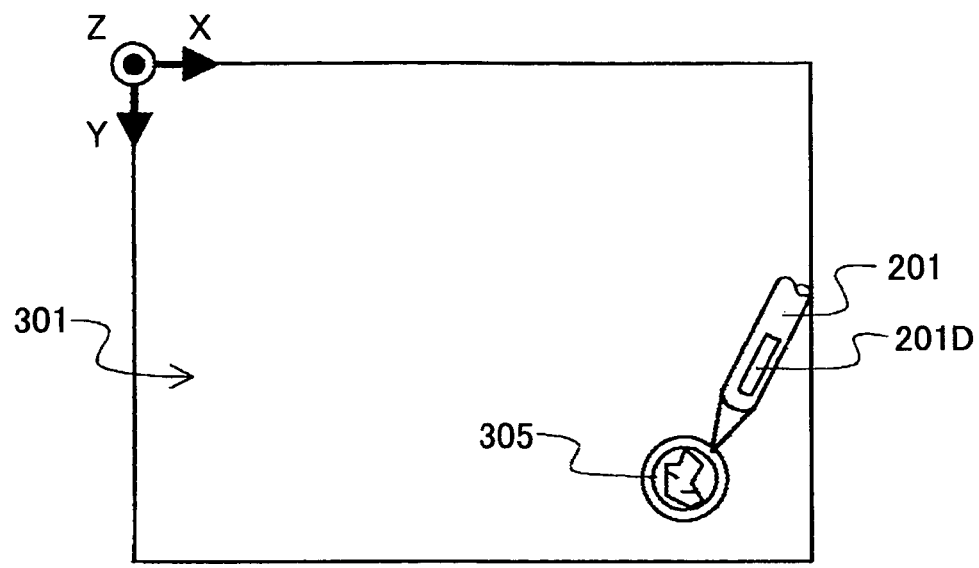
FIG. 32B is a schematic diagram for explaining the method for deleting an object in the three-dimensional pointing method of the embodiments 1-6 and 2-6, and shows a front view showing a situation in the three-dimensional space when operating with an input pen.

As shown in FIGS. 29A and 31A, first, the operator who wants to delete the object 302 operates the input pen 201 so as to point at the object 302 to be deleted. Then, while pointing at the object 302 to be deleted, when the operator performs specific operation such as operation to push the button 201D of the input pen 201 once, for example, the pointed object 302 moves to the front side display plane and the state of the object 302 changes to the state in which the two-dimensional GUI operation is possible as shown in FIGS. 29B and 31B. At this time, as shown in FIGS. 30A and 32A, for example, when the operator moves the pointed object 302 to a position above the trash box 305 and performs specific operation such as the operation to push the button 201D of the input pen 201 again, the state changes from the state in which the two-dimensional GUI operation is possible to the state in which three-dimensional pointing is possible. When processes performed in the system control apparatus 1 are based on the procedure shown in FIG. 26, after the state returns to the state in which the three-dimensional pointing is possible, the object 302 automatically moves in the three-dimensional direction (z<0), and at the time when the object interferes with the trash box 305, the object 302 disappears and the trash box 305 changes to a state in which there is a trash (object) in the trash box 305.

Figure 30C:
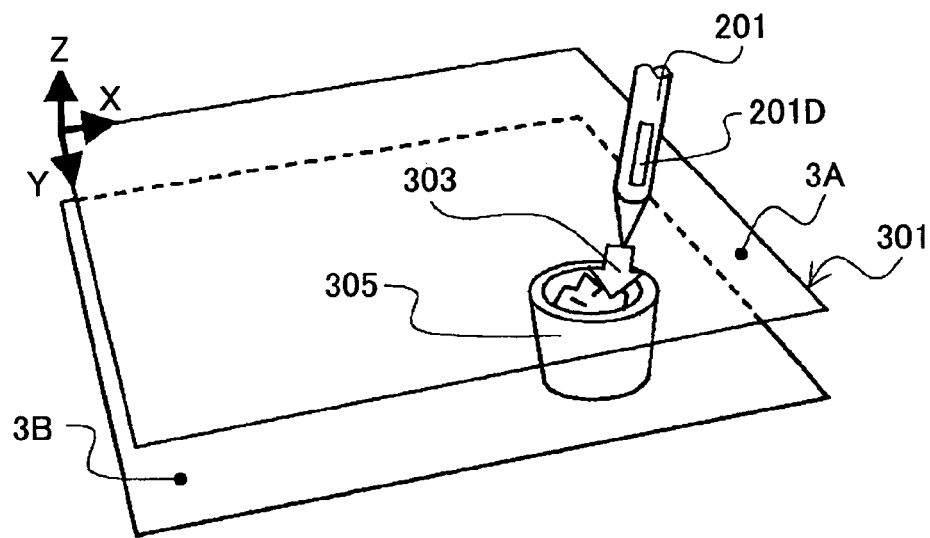
FIG. 30C is a schematic diagram for explaining the method for deleting an object in the three-dimensional pointing method of the embodiments 1-6 and 2-6, and shows a bird's-eye view showing a situation in the three-dimensional space when operating with an input pen.
Figure 32C:
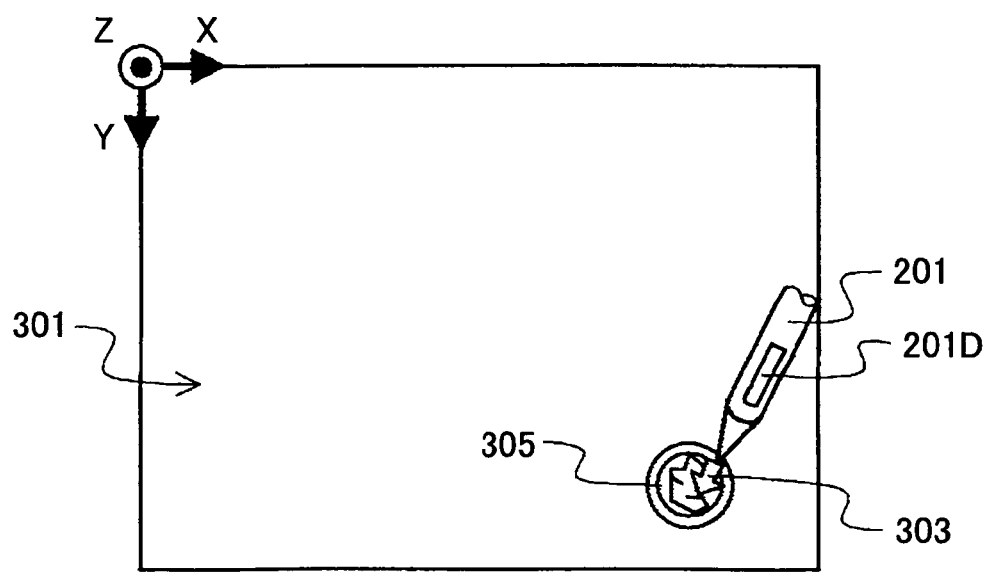
FIG. 32C is a schematic diagram for explaining the method for deleting an object in the three-dimensional pointing method of the embodiments 1-6 and 2-6, and shows a front view showing a situation in the three-dimensional space when operating with an input pen.

On the other hand, when processes performed in the system control apparatus 1 are based on the procedure shown in FIG. 27, after the state returns to the state in which the three-dimensional pointing is possible, the operator moves the object 302 in the three-dimensional depth direction by operating the input pen 201. Then, at the time when the object interferes with the trash box, the object 302 disappears and the trash box 305 changes to a state in which there is a trash (object) in the trash box 305 as shown in FIGS. 30C and 32C.

As described above, in the three-dimensional pointing method of this embodiment 1-6, the object that interferes with the object 302 may be any object as long as the attribute can be executed for the object 302.

Embodiment 1-7

Figure 33:
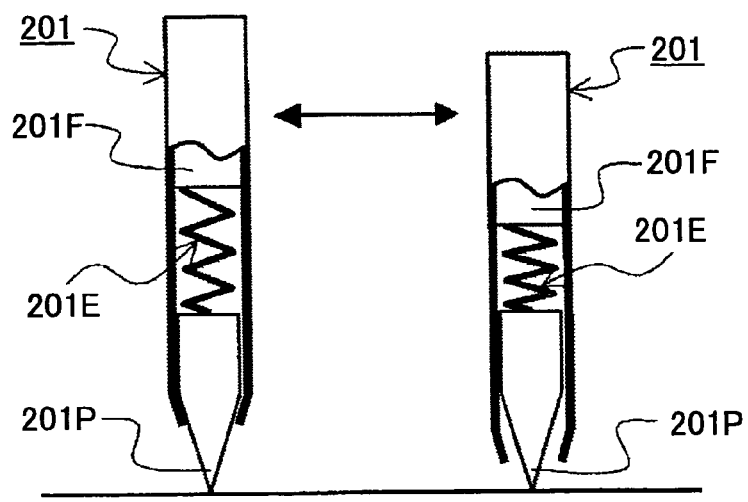
FIG. 33 is a schematic diagram for explaining the three-dimensional pointing method of the embodiment 1-7, and shows a configuration example of the input pen used for the three-dimensional pointing method of the embodiment 1-7.
Figure 34:
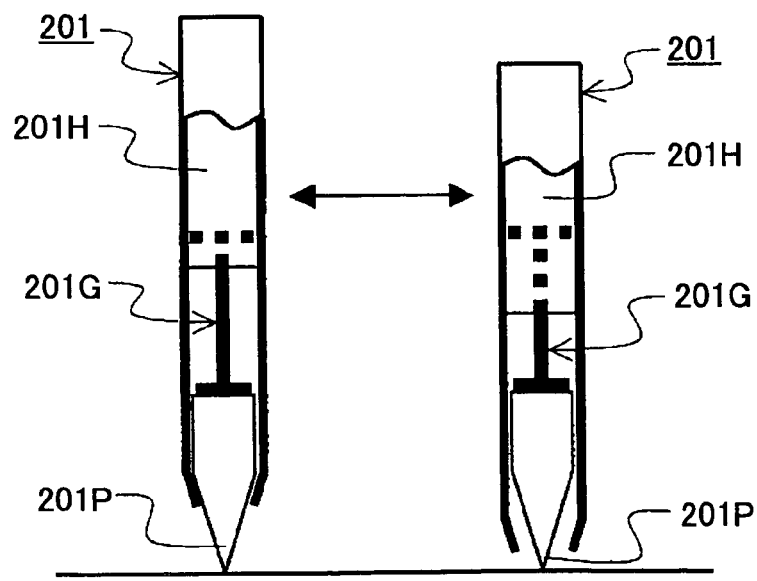
FIG. 34 is a schematic diagram for explaining the three-dimensional pointing method of the embodiment 1-7, and shows a configuration example of the input pen used for the three-dimensional pointing method of the embodiment 1-7.
Figure 35A:
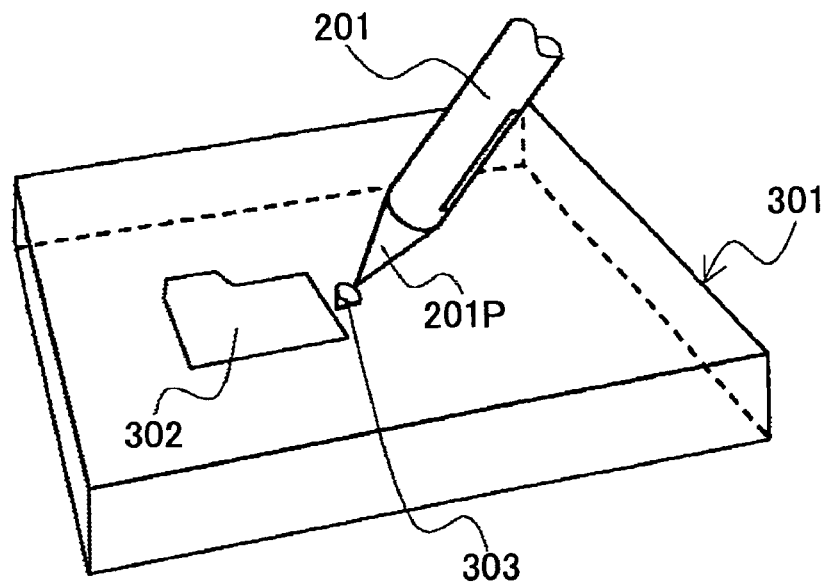
FIG. 35A is a schematic diagram for explaining the three-dimensional pointing method of the embodiments 1-7 and 2-7, and shows a bird's-eye view showing situations in the three-dimensional space when operating with an input pen.
Figure 35B:
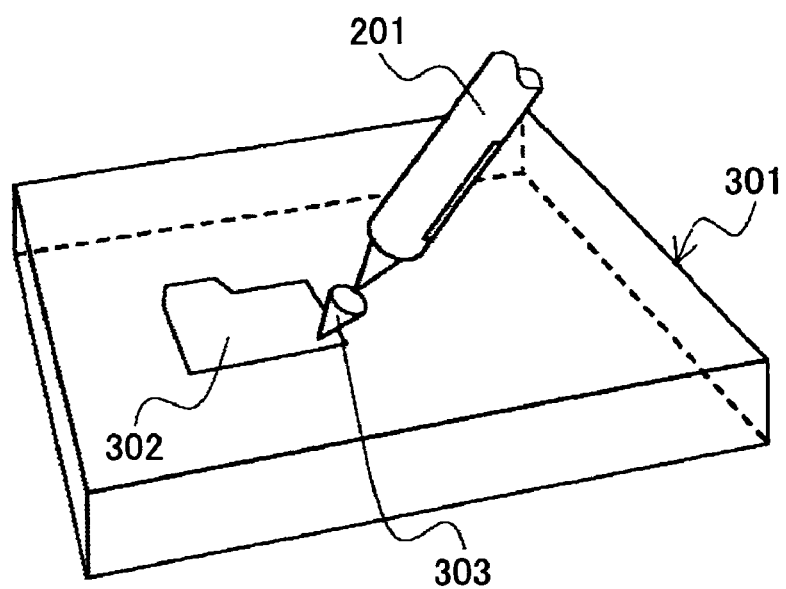
FIG. 35B is a schematic diagram for explaining the three-dimensional pointing method of the embodiments 1-7 and 2-7, and shows a bird's-eye view showing situations in the three-dimensional space when operating with an input pen.
Figure 35C:
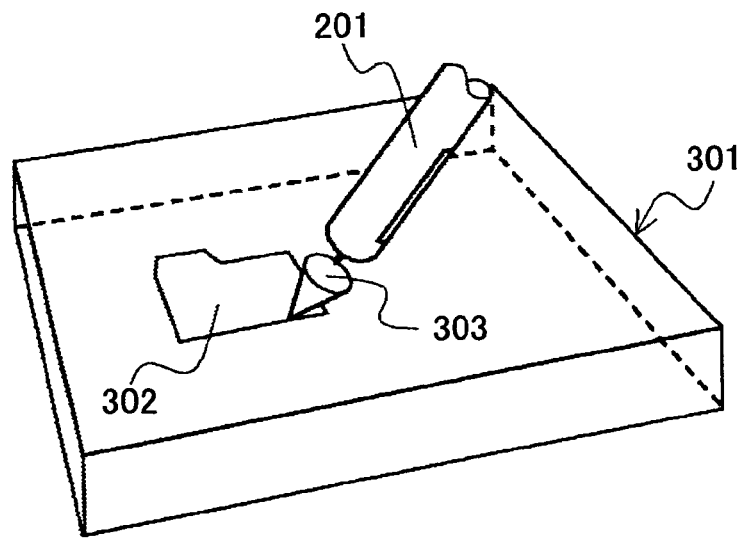
FIG. 35C is a schematic diagram for explaining the three-dimensional pointing method of the embodiments 1-7 and 2-7, and shows a bird's-eye view showing situations in the three-dimensional space when operating with an input pen.
Figure 36A:
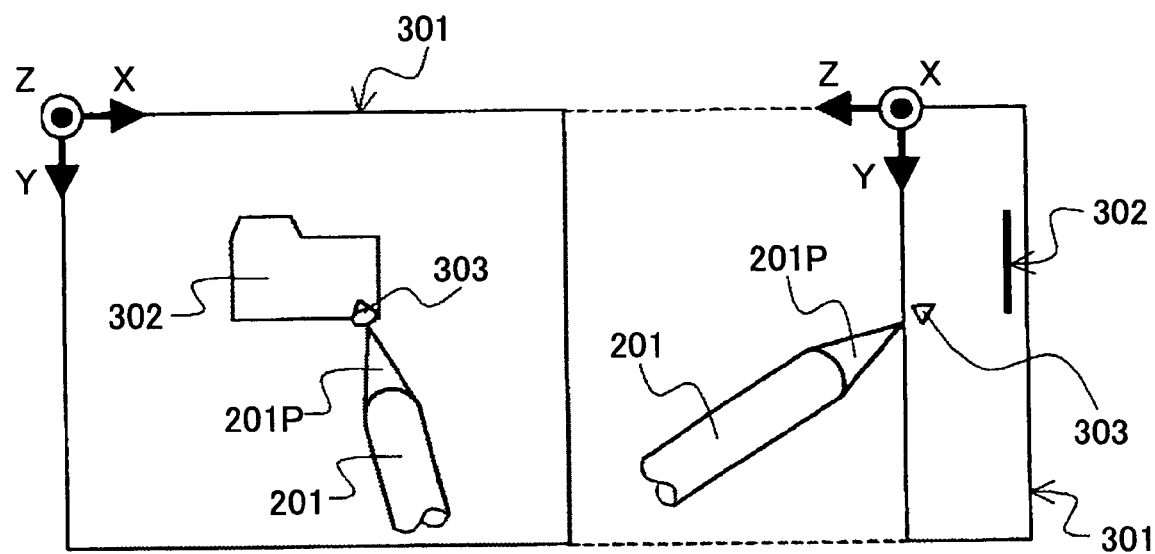
FIG. 36A is a schematic diagram for explaining the three-dimensional pointing method of the embodiments 1-7 and 2-7, and shows a front view and a right side view and a bottom view showing situations in the three-dimensional space when operating with an input pen.
Figure 36B:
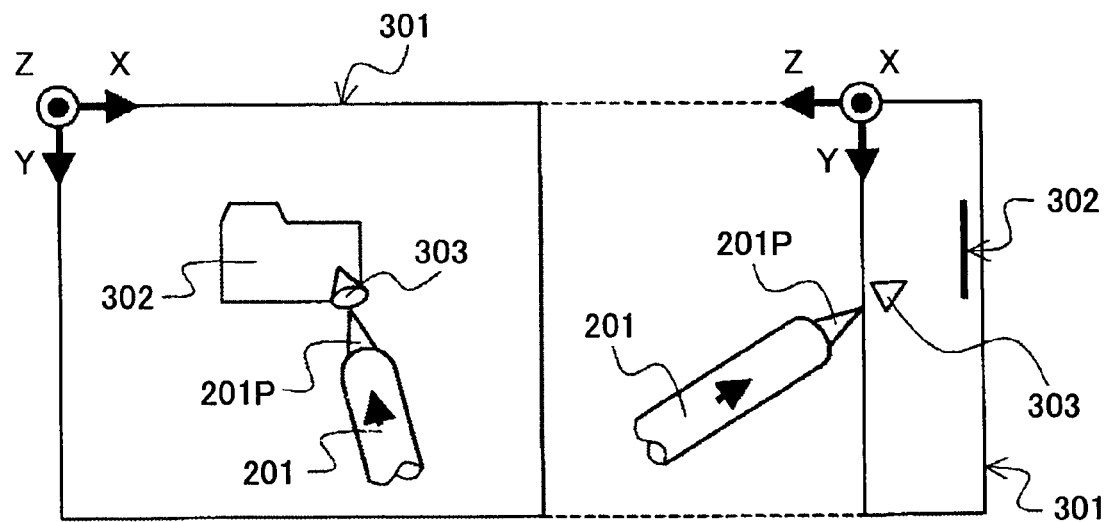
FIG. 36B is a schematic diagram for explaining the three-dimensional pointing method of the embodiments 1-7 and 2-7, and shows a front view and a right side view and a bottom view showing situations in the three-dimensional space when operating with an input pen.
Figure 36C:
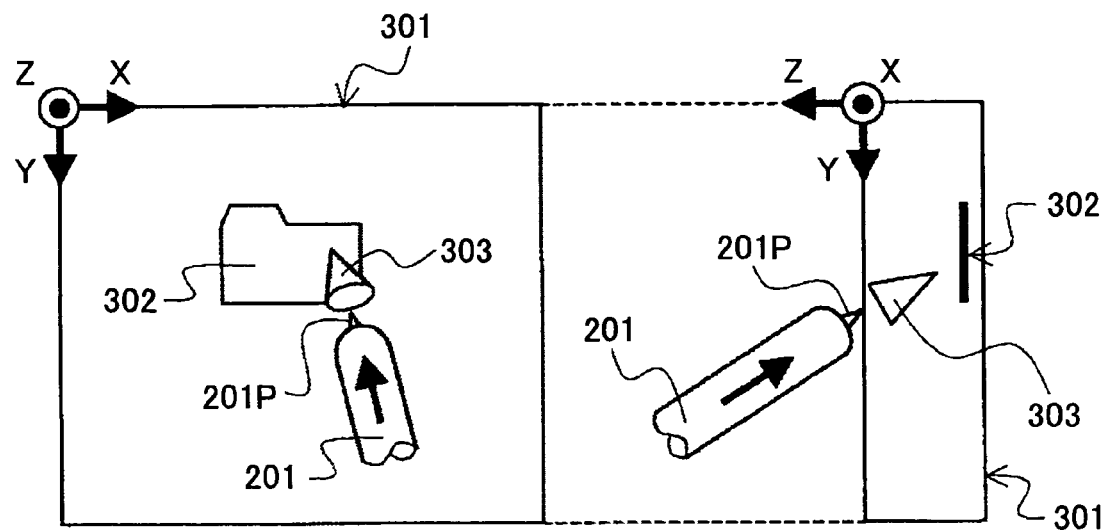
FIG. 36C is a schematic diagram for explaining the three-dimensional pointing method of the embodiments 1-7 and 2-7, and shows a front view and a right side view and a bottom view showing situations in the three-dimensional space when operating with an input pen.

FIGS. 33-36C are schematic diagrams for explaining the three-dimensional pointing method of the embodiment 1-7 of the present invention, FIGS. 33 and 34 shows configuration examples of the input pen used for the three-dimensional pointing method of this embodiment 1-7, each of FIGS. 35A, 35B, and 35C shows a bird's-eye view showing situations in the three-dimensional space when operating with an input pen, each of FIGS. 36A, 36B, and 36C shows a front view and a right side view and a bottom view showing situations in the three-dimensional space when operating with an input pen. By the way, FIGS. 36A, 36B, and 36C correspond to FIGS. 35A, 35B, and 35C respectively.

In this embodiment 1-7, a pointing method is described for using an input pen having a structure in which the pen tip 201P is pushed into the case of the input pen 201 according to the pen pressure as the input pen for performing the three-dimensional pointing method as described in embodiments 1-1-1-6.

As shown in FIG. 33, for example, the input pen 201 used in this embodiment 1-7 includes a spring 201E in the inside of the case, and the input pen 201 has a structure in which, when the operator applies pen pressure on the input pen 201, a pressure detection means 201F detects pressure of repulsion of the spring 201E. The configuration of the input pen 201 is not limited to the configuration shown in FIG. 33, and the input pen 201 may have a structure including an air pressure type piston 201G so that the air pressure detection part 201H detects the applied pressure as shown in FIG. 34, for example. The pressure detected by the input pen 201 having the structure shown in FIG. 33 or 34 is arithmetically processed so that a pointer 303 having a length in proportion to the pressure applied by the operator is displayed on the display apparatus 3, for example.

In this embodiment 1-7, a case for performing the pointing method described in the embodiment 1-1 is taken as an example for performing pointing in the three-dimensional space represented on the display apparatus 3 using the input pen 201 having the configuration shown in FIG. 33 or 34. In this case, the electromagnetic induction type pen tablet and the liquid crystal display are used as the input apparatus 2 and the display apparatus 3 similarly to the embodiment 1-1. In addition, it is assumed that the detection means (digitizer) of the input apparatus 2 is overlapped with the display surface of the liquid crystal display 3.

When the operator puts the pen tip 201P of the input pen 201 on an arbitrary one point of the XY plane (z=0) of the liquid crystal display 3, a pointer having a shape, such as a cone, that reflects the shape of the pen tip 201P of the input pen 201 is displayed in the three-dimensional space 301 of the liquid crystal display 3 as shown in FIGS. 35A and 36A, for example.

When the operator increases the pen pressure of the input pen 201, the size of the pointer 303 changes according to the pen pressure of the input pen as shown in FIGS. 35B and 36B or FIGS. 35C and 36D, for example. Since the control of the size of the pointer 303 can be performed based on the procedure described in the embodiment 1-1, detailed description is not given here.

In this case, by changing the size of the cone-shaped pointer 303 in proportion to the length by which the pen tip 201P is pushed into the body of the input pen 201 as shown in FIGS. 35B and 36B or FIGS. 35C and 36D, the visual effect for feeling that the pointer 303 is a part of the pen tip 201P can be increased compared to the method described in the embodiment 1-1, for example.

In addition, in this embodiment 1-7, although the input pens having the mechanism using the spring and the air pressure are taken as examples of the input pen 201 in which the pen tip is depressed as shown in FIGS. 33 and 34, input pens having different mechanism can be also used as long as the same effect can be obtained. In addition, instead of providing the pressure detection part 201F or the air pressure detection part 201H in the inside of the case of the pen, a mechanism for measuring a depressed length of the pen tip 201P can be provided, for example. That is, input pens having other mechanism can be used as long as the same effect can be obtained.

In addition, in this embodiment 1-7, although the case for performing the three-dimensional pointing method described in the embodiment 1-1 is taken as an example, the present invention is not limited to the example, and it is needless to say that the input pen 201 of the configuration shown in FIGS. 33 and 34 can be used also when the pointing method described in embodiments 1-2-1-6 is performed.

Embodiment 1-8

FIGS. 37A-40C are schematic diagrams for explaining the three-dimensional pointing method of the embodiment 1-8 of the present invention, each of FIGS. 37A, 37B, 37C, 38A, 38B, and 38C shows a bird's-eye view showing situations in the three-dimensional space when operating with an input pen, each of FIGS. 39A, 39B, 39C, 40A, 40B, and 40C is a front view showing situations in the three-dimensional space when operating with an input pen. By the way, FIGS. 39A, 39B, and 39C correspond to FIGS. 37A, 37B, and 37C respectively, and FIGS. 40A, 40B, and 40C correspond to FIGS. 38A, 38B, and 38C respectively In this embodiment 1-8, a concrete usage scene for the three-dimensional pointing method described in embodiments 1-1-1-6 is described in which a remote control including a display screen that can perform three-dimensional display and detection means of the pen tablet is used for operating music reproduction functions. In this embodiment 1-8, since the procedure for display control for the pointer and the object on the display screen of the remote control for operating the input pen 201 can be the same as the procedure described in embodiments 1-1-1-7, detailed description is not given here.

Figure 37A:
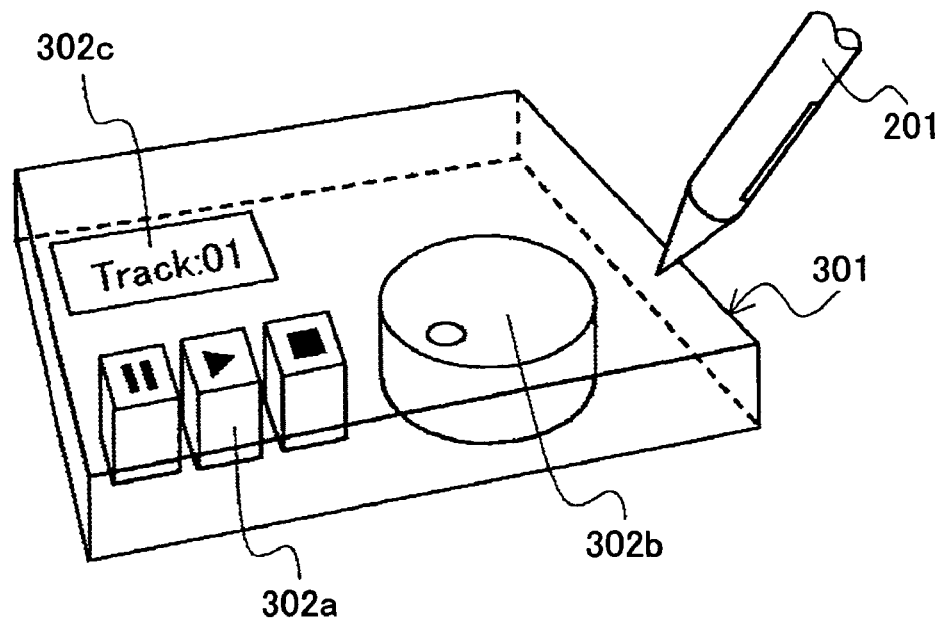
FIG. 37A is a schematic diagram for explaining the three-dimensional pointing method of the embodiments 1-8 and 2-8, and shows a bird's-eye view showing situations in the three-dimensional space when operating with an input pen.
Figure 37B:
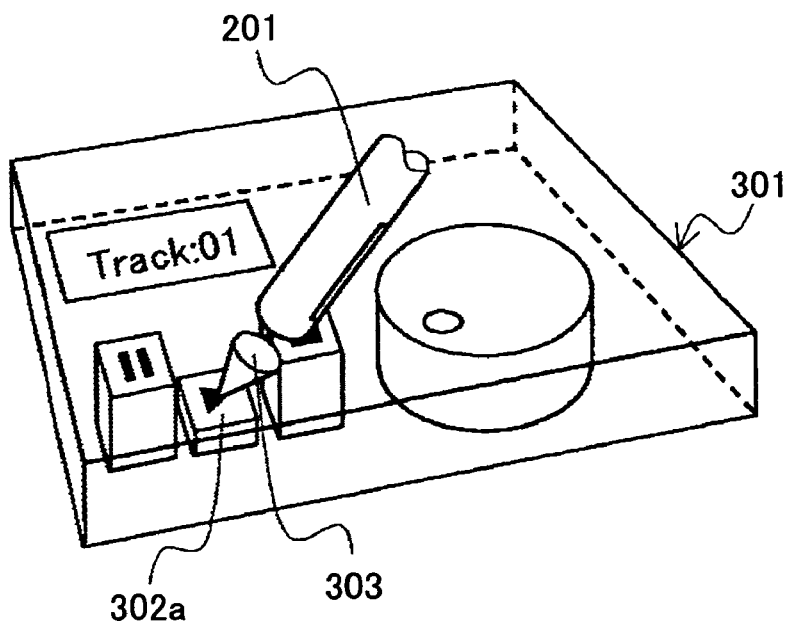
FIG. 37B is a schematic diagram for explaining the three-dimensional pointing method of the embodiments 1-8 and 2-8, and shows a bird's-eye view showing situations in the three-dimensional space when operating with an input pen.
Figure 39A:
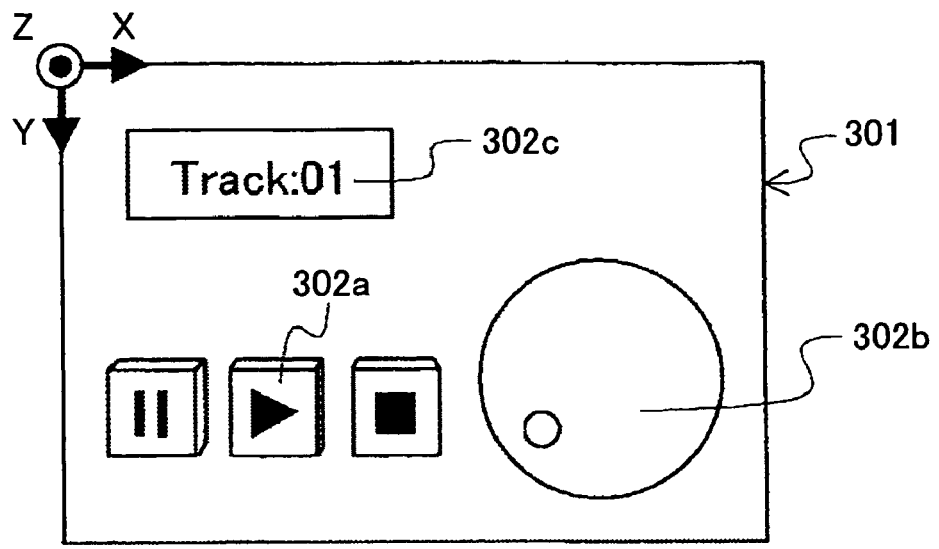
FIG. 39A is a schematic diagram for explaining the three-dimensional pointing method of the embodiments 1-8 and 2-8, and shows a front view showing situations in the three-dimensional space when operating with an input pen.
Figure 39B:
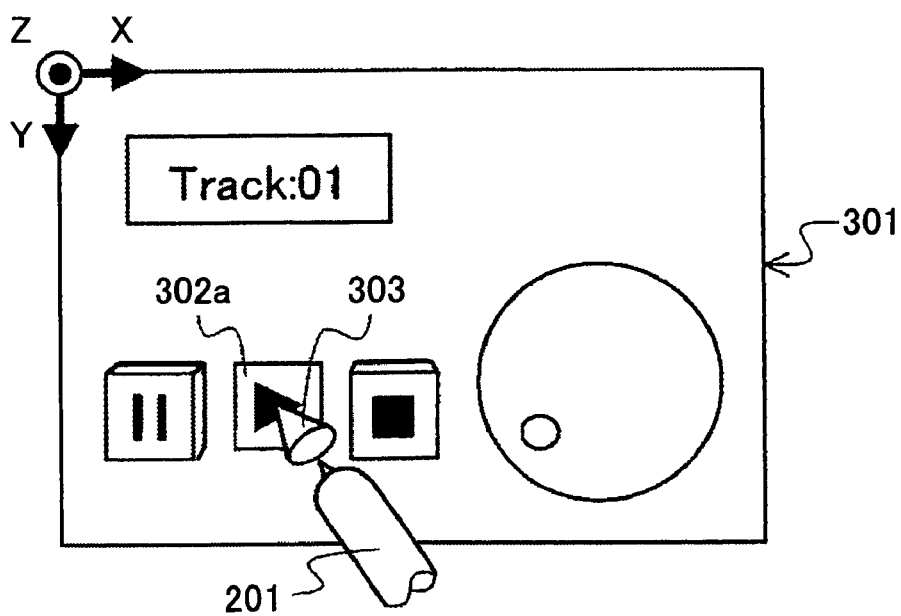
FIG. 39B is a schematic diagram for explaining the three-dimensional pointing method of the embodiments 1-8 and 2-8, and shows a front view showing situations in the three-dimensional space when operating with an input pen.

The operator operates the object displayed in the three-dimensional space 301 of the remote control shown in FIGS. 37A and 39A, for example, using the input pen 201 in which the pen tip 201P is depressed into the case as described in the embodiment 1-7. First, as shown in FIGS. 37B and 39B, for example, when the operator points at a reproducing button 302a by operating the input pen 201, the display is changed to a state in which the reproducing button 302a is pushed so that music starts to be reproduced.

Figure 37C:
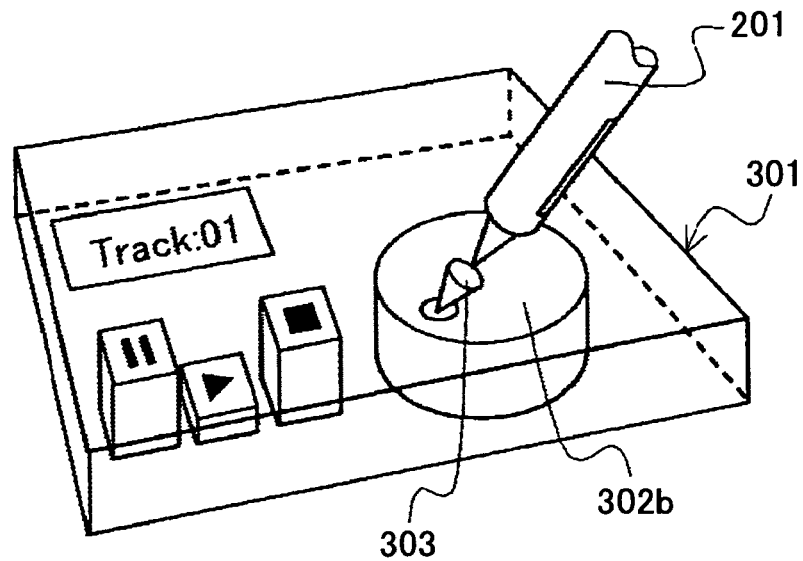
FIG. 37C is a schematic diagram for explaining the three-dimensional pointing method of the embodiments 1-8 and 2-8, and shows a bird's-eye view showing situations in the three-dimensional space when operating with an input pen.
Figure 39C:
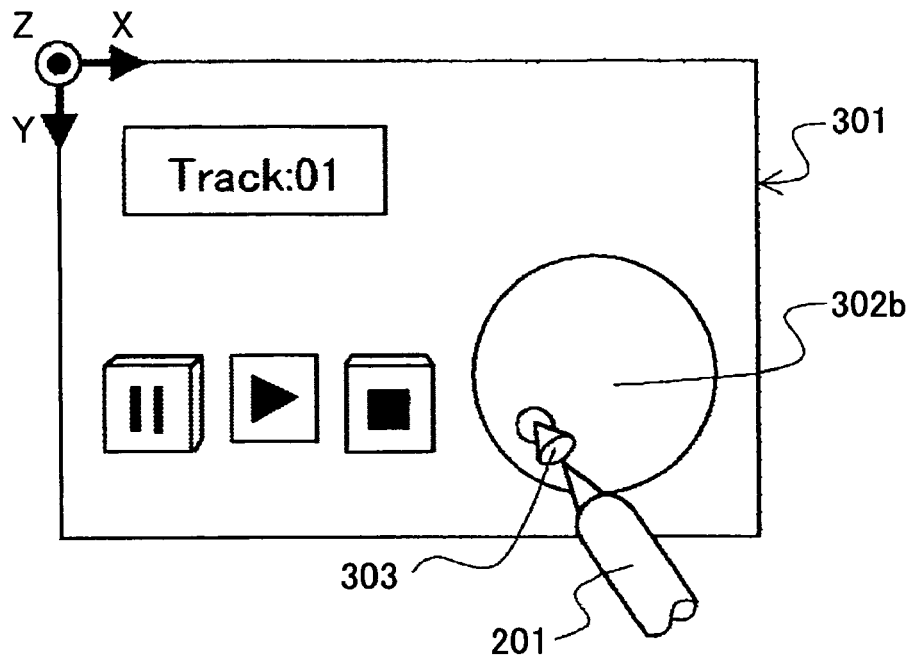
FIG. 39C is a schematic diagram for explaining the three-dimensional pointing method of the embodiments 1-8 and 2-8, and shows a front view showing situations in the three-dimensional space when operating with an input pen.

In addition, as shown in FIGS. 37C and 39C, for example, the volume of the reproduced music can be turned up or down by pointing at the volume knob 302b by operating the input pen 201 and by moving the input pen while pushing the button 201D of the input pen so as to rotate the knob 302b, for example.

Figure 38A:
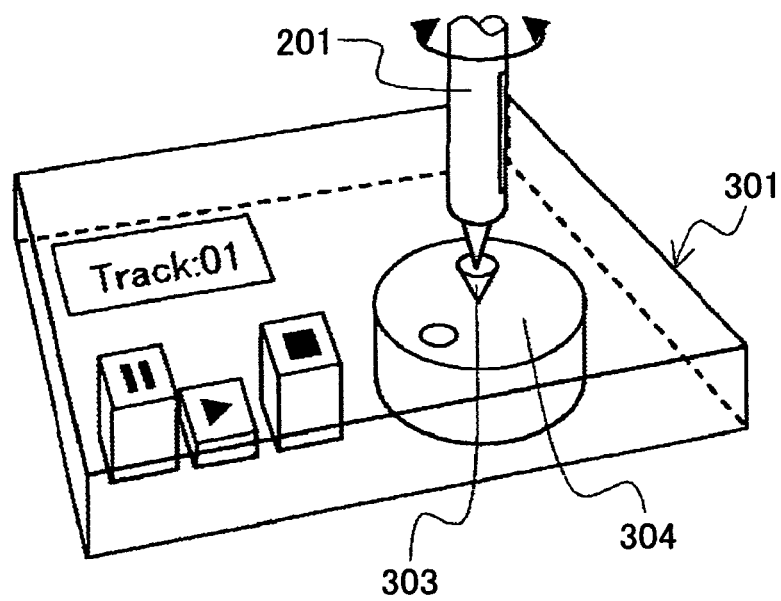
FIG. 38A is a schematic diagram for explaining the three-dimensional pointing method of the embodiments 1-8 and 2-8, and shows a bird's-eye view showing situations in the three-dimensional space when operating with an input pen.
Figure 40A:
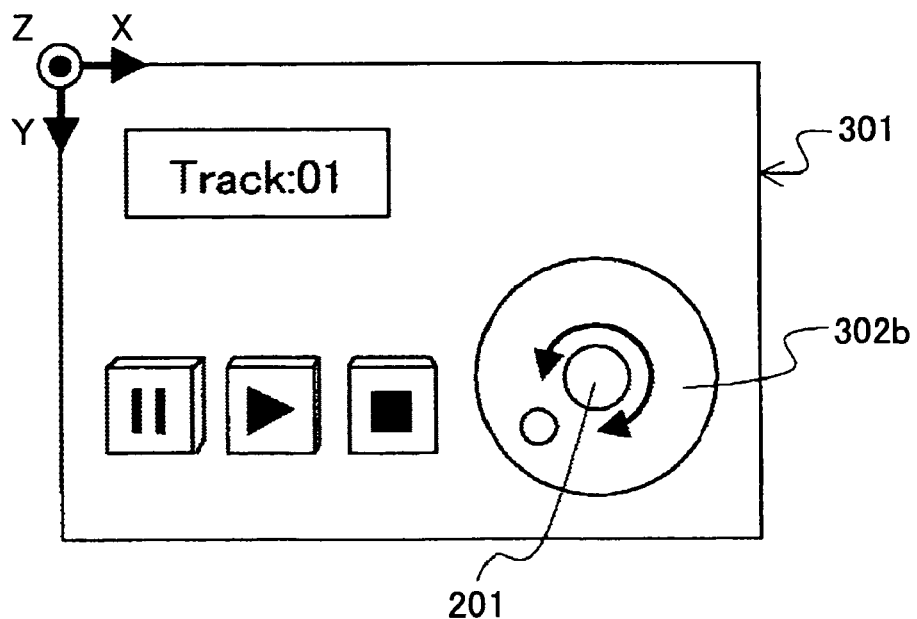
FIG. 40A is a schematic diagram for explaining the three-dimensional pointing method of the embodiments 1-8 and 2-8, and shows a front view showing situations in the three-dimensional space when operating with an input pen.

The operation for turning up or down the volume is not limited to the operation shown in FIGS. 37C and 39C. The operation for turning up or down the volume can be also realized by, after pointing at the knob 302b at a position around the center of the knob 302b, rotating the input pen 201 around the axis so as to rotate the knob 302b as shown in FIGS. 38A and 40A, for example.

Figure 38B:
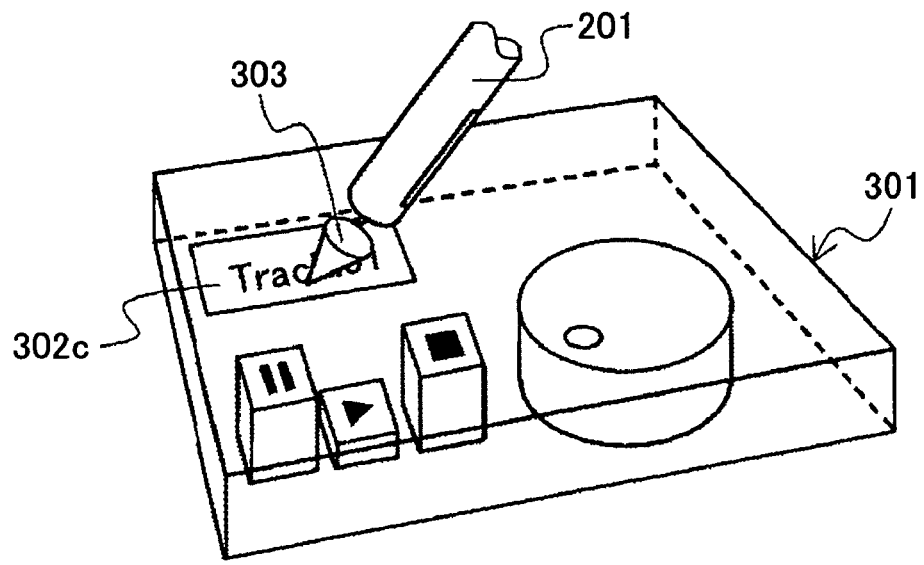
FIG. 38B is a schematic diagram for explaining the three-dimensional pointing method of the embodiments 1-8 and 2-8, and shows a bird's-eye view showing situations in the three-dimensional space when operating with an input pen.
Figure 38C:
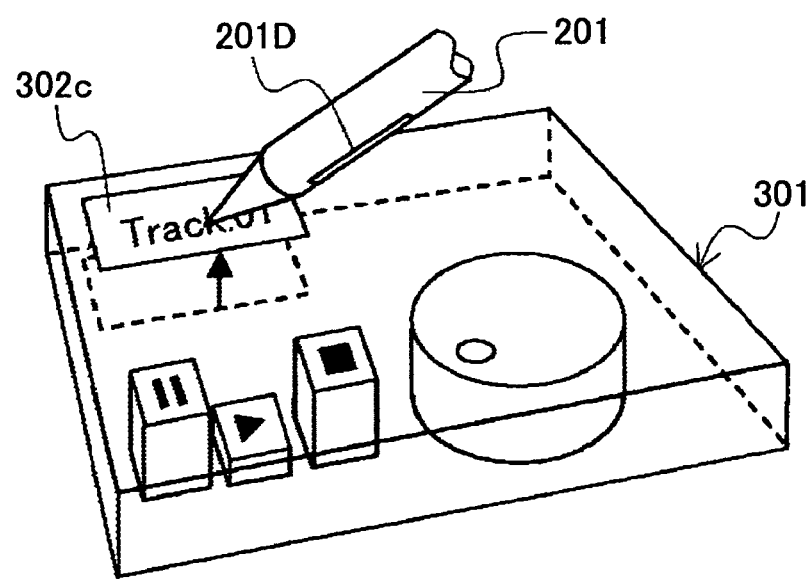
FIG. 38C is a schematic diagram for explaining the three-dimensional pointing method of the embodiments 1-8 and 2-8, and shows a bird's-eye view showing situations in the three-dimensional space when operating with an input pen.
Figure 40B:
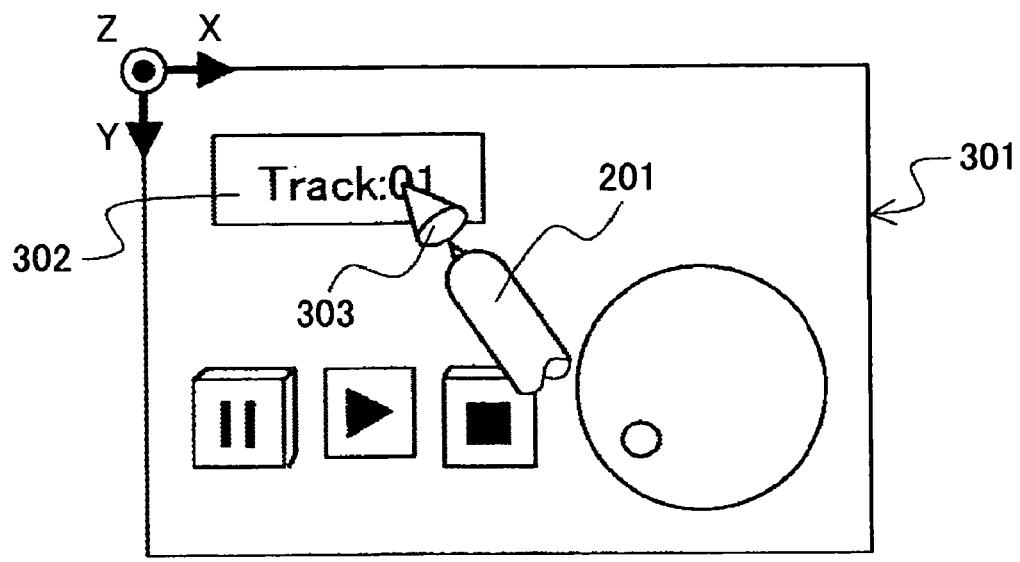
FIG. 40B is a schematic diagram for explaining the three-dimensional pointing method of the embodiments 1-8 and 2-8, and shows a front view showing situations in the three-dimensional space when operating with an input pen.
Figure 40C:
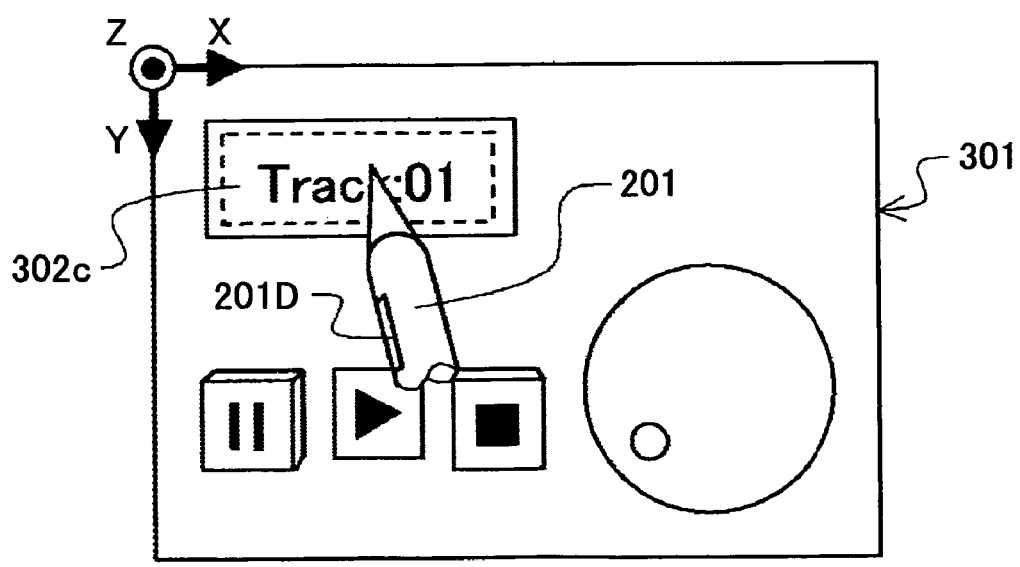
FIG. 40C is a schematic diagram for explaining the three-dimensional pointing method of the embodiments 1-8 and 2-8, and shows a front view showing situations in the three-dimensional space when operating with an input pen.

In addition, as shown in FIGS. 38B and 40B, for example, by configuring the system such that, when pointing at the region 302C on which information on the reproduced music is displayed, the region 302c is changed to two-dimensional display so as to enter a state in which the two-dimensional GUI operation can be performed, as shown in FIGS. 38C and 40C, music can be skipped to a target track number by inputting the track number of music that the operator wants to reproduce in the region 302c, in which a function for recognizing hand-written character is combined, for example.

As mentioned above, by utilizing the three-dimensional pointing method of the embodiments 1-1-1-6, the object such as the operation button in the three-dimensional space can be operated easily and intuitively.

In addition, in this embodiment 1-8, although an operation example for operating a musical apparatus using the remote control is shown, the present invention is not limited to this example, and the method can be also applied to operations for apparatuses such as PDA, mobile phone, kiosk terminal, and ATM and the like that can take the similar form, so that each apparatus can be operated more intuitively. In addition, in the operation in this embodiment, although music is reproduced, the volume is turned up and the track is changed, the operation is not limited to these, and any operation can be performed as long as the operation can be related to operations of the input pen 201.

In addition, in this embodiment, although hand-written character recognition is used for inputting the track number, any method can be used as long as the method can be realized by two-dimensional GUI. An input method for displaying track numbers using a pull-down menu so as to select a track number with the input pen 201 can be used, for example.

In addition, the three-dimensional pointing apparatus is not necessarily a specific apparatus specialized in realizing the three-dimensional pointing method. The three-dimensional pointing apparatus can be realized by a computer (system control apparatus) such as a PC and a three-dimensional pointing program for causing the computer to execute the three-dimensional pointing method described in each embodiment as shown in FIG. 1, for example. In this case, as long as the three-dimensional pointing program is recorded in a state in which the program can be read by the computer, the program can be recorded in any of magnetic, electrical, and optical recording mediums. In addition, the three-dimensional pointing program is not only provided by recording it in the recording medium but also can be provided via a network such as the Internet.

Second Embodiment

Next, the second embodiment of the present invention is described. The second embodiment corresponds to the first object of the present invention like the first embodiment. In the first embodiment, the pointer is controlled according to the pen pressure or the inclination or the like of the input pen. On the other hand, in the second embodiment, the pointer is controlled according to contacting time of the pen tip of the input pen or an operation amount of the operation means attached to the input pen or the like. Although the operation method of the input pen for controlling the pointer is different between the first embodiment and the second embodiment, since the object to be realized is the same, the second embodiment is described with reference to figures of the first embodiment as necessary.

The three-dimensional pointing method of the second embodiment is a method for pointing at an object and operating the object that is pointed at, with a pen-shaped input apparatus (means), in a three-dimensional space represented by a display apparatus that can perform three-dimensional display. The pen-shaped input apparatus, such as a pen tablet, includes an input pen (electronic pen) held by an operator for performing operation to point at the object and to perform operation for the object, and a detection means for detecting information of the input pen such as a contact/noncontact status of the pen tip, a position of the pen tip, orientation of the axis, operation information of the operation means of the input pen and the like. Then, in the three-dimensional pointing method in the second embodiment, based on the information detected by the detection means, the position, shape and orientations etc. of the pointer are determined, so as to display the pointer in the three-dimensional space represented on the display apparatus. Accordingly, the operator can perform pointing and operation for the object in the three-dimensional space represented on the display apparatus in a state that the pen tip of the input pen contacts with a detection plane of the detection means, so that fatigue of the operator can be reduced when performing pointing and object operation for a long time.

In addition, according to the pointing method of the this embodiment, by associating a time for continuing to point the pen tip of the input pen at the object or the operation status of the operation means of the input pen with movement or deformation of the pointer in the depth direction, one point in the three-dimensional space represented on the display apparatus can be pointed at. In addition, by reflecting information of inclination and direction of the input pen on inclination and direction of the pointer, the operator can feel as if the pointer displayed in the three-dimensional space represented on the display apparatus is a part of a pen tip of an input pen that is held by the operator, so that it becomes possible to perform pointing at a three-dimensional object easily and intuitively.

In addition, in the three-dimensional pointing method of the this embodiment, after the object is pointed at, by performing operation for selecting or holding the pointed object, the object that is pointed at is put into a state in which operation of editing and manipulation like the two-dimensional GUI is available for the object, in other words, the object that is pointed at is put into a state in which the object can be operated on the two-dimensional GUI by the operation of the input pen. In addition, after the processing (operation) such as object editing and processing ends, the object is treated as a three-dimensional object again so that the operator can move the object to a desired three-dimensional position. Accordingly, the operation of the three-dimensional object can be realized as operation that is not different from operation in the conventional two-dimensional GUI using the existing pen-shaped input apparatus. Thus, it is not necessary for the operator to learn operation of the three-dimensional input pen from the beginning.

Figure 41:
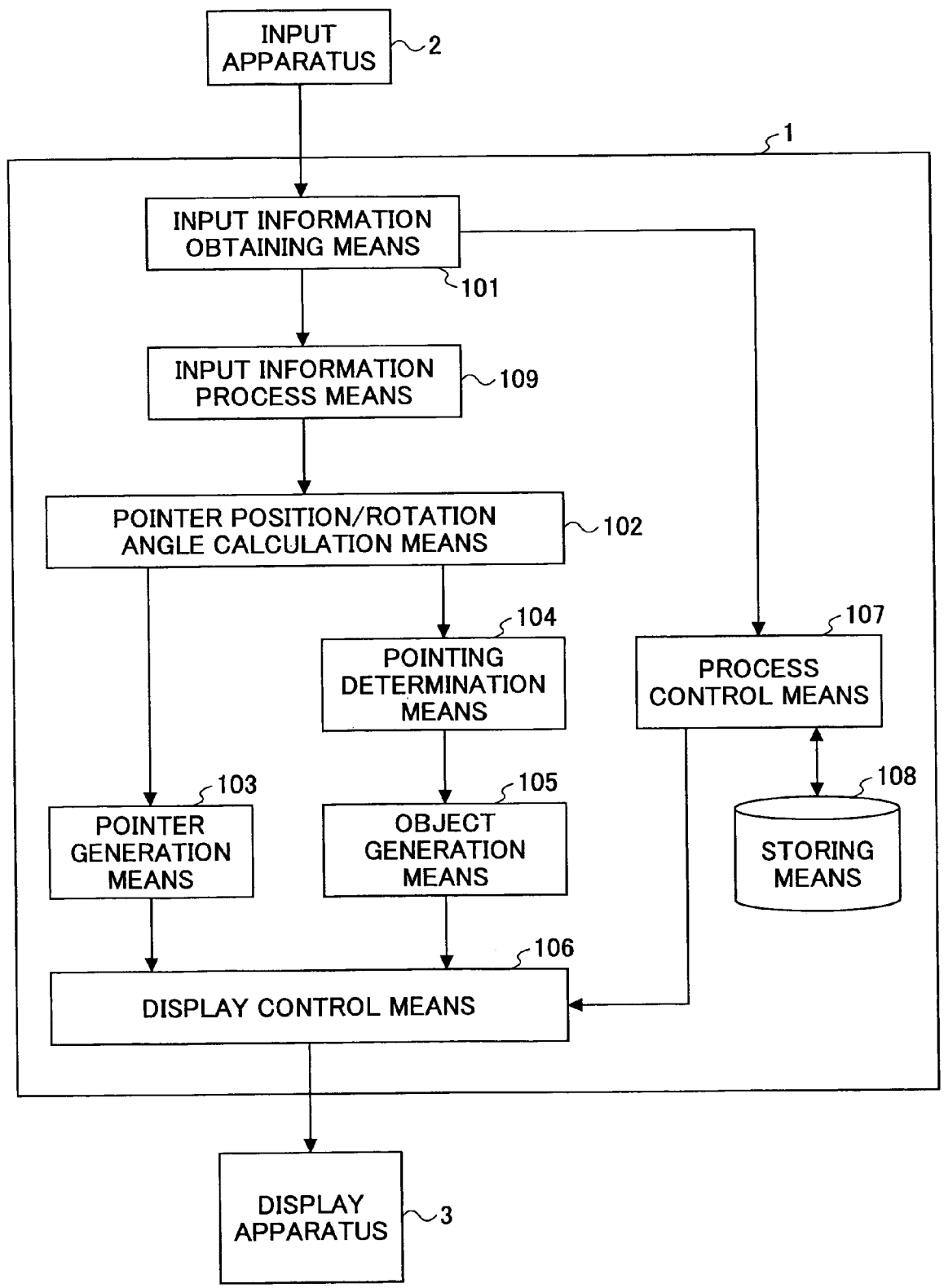
FIG. 41 is a schematic diagram for explaining an outline of the three-dimensional pointing method in the second embodiment, and shows a configuration example of a system for realizing the three-dimensional pointing method in the second embodiment.
Figure 42:
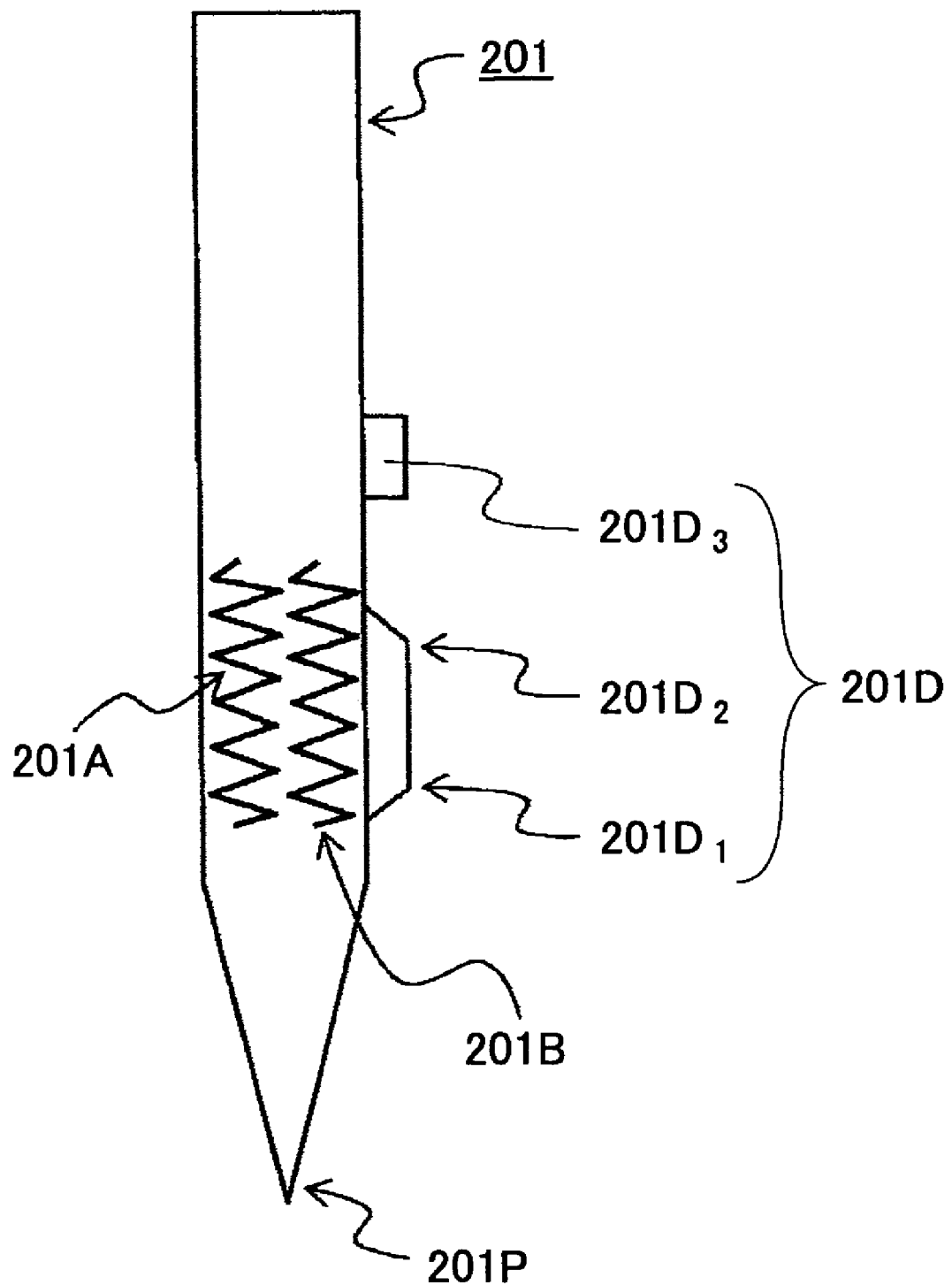
FIG. 42 is a schematic diagram for explaining an outline of the three-dimensional pointing method in the second embodiment, and shows a configuration example of the input pen used for the three-dimensional pointing method in the second embodiment.

FIG. 41 shows a configuration example of a system for realizing the three-dimensional pointing method of this embodiment. In FIG. 41, 1 indicates a system control apparatus, 101 indicates an input information obtaining means, 102 indicates a pointer position/rotation angle calculation means, 103 indicates a pointer generation means, 104 indicates a pointing determination means, 105 indicates an object generation means, 106 indicates a display control means, 107 indicates a process control means, 108 indicates a storing means, 2 indicates an input apparatus and 3 indicates a display apparatus. FIG. 42 shows a configuration example of an input pen used in the three-dimensional pointing method of this embodiment. In FIG. 42, 201 indicates an input pen, 201A indicates a coil, 201B indicates a coil for detecting a rotation angle, 201D indicates an operation means (button), each of $201D_1$ and $201D_2$ indicates a seesaw-shaped button or wheel, or a slider-shaped bar, and $201D_3$ indicates a push button. By the way, each of $201D_1$ and $201D_2$ indicates the seesaw-shaped button and $201D_3$ indicates the push button unless otherwise specified. In addition, the mechanism of the input pen is not limited to the above-mentioned example as long as the input pen has the same function.

The three-dimensional pointing method of this embodiment is preferably applied for three-dimensionally operating a pointer and an object that is pointed at in the three-dimensional space represented on the display apparatus connected to a system control apparatus using the pen-shaped input apparatus connected to the system control apparatus such as a PC, for example.

As shown in FIG. 41, for example, the system control apparatus 1 includes the input information obtaining means 101 for obtaining input information input from the input apparatus 2, an input information process means 109 for, when the input information obtained by the input information obtaining means 101 is information related to control of the pointer, calculating time for continuing to perform pointing with the input apparatus 2 and calculating operation information (time over which the button is pushed and the number of times the button is pushed) of the operation means of the input apparatus 2 based on the input information, a pointer position/rotation angle calculation means 102 for calculating moving direction, movement amount, rotation direction, and rotation angle, etc. of the pointer based on the input information, a pointer generation means 103 for generating the pointer based on calculation results of the pointer position/rotation angle calculation means 102, a pointing determination means 104 for determining whether there is an object that is pointed at by the pointer generated by the pointer generation means 103, an object generation means 105 for, when there is an object that is pointed at, changing the color of the object or generating an object having a position and an orientation that follows movement and rotation of the pointer, and a display control means 106 for displaying the pointer generated by the pointer generation means 103 and the object generated by the object generation means 105.

The system control apparatus 1 is an apparatus, such as the PC for example, for launching and operating software according to input information from the input apparatus 2 and for controlling other apparatus, and includes, in addition to the before-mentioned means, the process control means 107 for controlling processes for launching the software and the like and the storing means 108 for storing data and the like used for processing by the process control means 107, as shown in FIG. 41. Then, when information obtained by the input information obtaining means 101 is different from the information on the control of the pointer, the input information obtaining means 101 passes the obtained information to the process control means 107 to cause the system control apparatus 1 to perform processes according to the obtained information. Thus, the display control means 106 can cause the display means 3 to display not only the pointer and the object but also information about the process being executed by the system control apparatus 1 (process control means 107) and the result of the process.

Although not shown in the figure, for example, the input apparatus 2 includes an input pen (electronic pen) held by the operator operating the pointer and the object, and a detection means having a detection plane for detecting the contact/noncontact status and the position of the pen tip of the input pen, the state of the operation means such as the button provided in the input pen, and information of inclination, orientation, rotation angle etc. of the input pen.

Like the first embodiment, as shown in FIG. 2, assuming that a Cartesian coordinate system XYZ corresponding to the three-dimensional space represented on the display apparatus 3 is set on the detection plane of the detection means and that the XY plane of the Cartesian coordinate system XYZ is the detection plane, the detection means detects information of the contact/noncontact status of the pen tip 201P, coordinates (x,y) of the pen tip 201P, a direction angle α (0 degree≦α<360 degrees, for example) of the axis 201X of the case of the input pen, an inclination angle β (0 degree≦β≦90 degrees, for example), a rotation angle γ (0 degree≦γ<360 degree) around the axis, when the pen tip 201P of the input pen contacts the detection surface (XY plane).

Like the first embodiment, The configuration of the input apparatus 2 can be easily estimated and realized from information described in the reference document 1 (Y. Mitani, "Basic and application of touch panel", Techno times, 2001) and the reference document 2 (Catalogue of intuos2 of WACOM) and the like for a person skilled in the art, wherein the input apparatus 2 can detect information such as the contact/noncontact status of the pen tip 201 of the input pen, coordinates (x, y) of the contact point, orientation α of the axis 201 of the case of the input pen, inclination β, rotation γ around the axis. However, the structure disclosed in the reference document 1 or the reference document 2 cannot obtain the angle of the rotation γ around the axis 201X of the case of the input pen. However, as shown in FIG. 42, for detecting the angle of the rotation γ around the axis, it can be easily contrived and can be realized for a person skilled in the art to add a coil 201B, in parallel to the coil 201A of a coordinate indicator in the reference document 1, for detecting the rotation γ around the axis so as to obtain changes of linking magnetic fluxes of the coils 201A and 201B so as to calculate the rotation amount, for example. But, the input pen 201 used in the three-dimensional pointing method of this embodiment may not have the mechanism for detecting the angle of the rotation γ around the axis as shown in FIG. 42.

In addition, the input apparatus 2 is not limited to the device, such as a pen tablet or a combination of a touch panel and a stylus pen for example, in which the input pen and the detection means are separated. The input apparatus 2 may be an input apparatus, such as a pen-shaped mouse, in which the detection means is embedded in the inside of the case of the input pen.

The display apparatus 3 can be any display apparatus that can represent the three-dimensional space. For example, the display apparatus 3 may be a two-dimensional display apparatus for representing and displaying a three-dimensional object as an image that is projected on the two-dimensional plane such as a CRT display and a liquid crystal display, or may be a display apparatus that can represent a three-dimensional stereoimage such as a HMD (Head Mount Display) and a DFD. That is, the display apparatus 3 may be any display apparatus by which the operator can perceive the displayed pointer and object three-dimensionally.

In addition, the detection means of the input apparatus 2 and the display apparatus 3 may take an integrated form (refer to Japanese Laid-Open Patent Application No. 5-073208, for example). When using an electromagnetic induction type pen tablet as the input apparatus 2, the detection means (digitizer) can be overlapped on the display plane of the display apparatus 2 so as to be integrated with the display apparatus 3. In addition, as a similar form, for example, a form of combination of the touch panel and the stylus pen can be applied. Accordingly, the operator can perform pointing while contacting the input pen on the display plane of the display apparatus 3 such as the liquid crystal display and the like, so that more intuitive operation is realized compared with operation in a state in which the detection means are separated from the display apparatus 3. But, in the present invention, the configuration of the detection means of the input apparatus 2 and the display apparatus 3 are not limited to this, and the detection means and the display apparatus 3 is not necessarily integrated like a general pen tablet.

Embodiment 2-1

Next, the embodiment 2-1 is described The three-dimensional pointing method of this embodiment 2-1 is an embodiment for selecting or holding an object like the embodiment 1-1, and is described with reference to FIGS. 4-6 of the embodiment 1-1. In addition, the process procedure of the embodiment 2-1 is described with reference to FIG. 43. By the way, although arrows for indicating the direction for applying pressure to the input pen are shown in FIGS. 5B, 6B and 6C, it is assumed that these arrows are not shown in this embodiment 2-1.

The three-dimensional pointing method of this embodiment 2-1 is a method for bringing the pen tip 201P of the input pen 201 into contact with the detection plane of the detection means, pointing at an object place in the depth direction as seen from the operator in the three dimensional space using the seesaw-shaped button $201D_1$, $201D_2$, and further, selecting or holding the object using the push button $201D_3$.

In the embodiment 2-1, an electromagnetic induction type pen tablet is used as the input apparatus 2, and a liquid crystal display is used as the display apparatus 3 that can display the three-dimensional space. In addition, the detection means (digitizer) of the input apparatus 2 is overlapped on the display plane of the liquid crystal display 3 so that the input pen can be directly operated on the display screen to perform pointing and selecting or holding operation. In addition, the input apparatus 2 and the display apparatus 3 are connected to the system control apparatus 1 having the configuration shown in FIG. 41.

In this embodiment 2-1, as shown in FIG. 4A and FIG. 4B, in the same way as the embodiment 1-1, a coordinate system XYZ corresponding to the coordinate system XYZ shown in FIG. 2 is set in the three-dimensional space 301 represented on the liquid crystal display 3, and the object 302 is placed at a position of z<0 in the three-dimensional space 301. In addition, it is assumed that the operator who operates the input pen 201 of the input apparatus 2 observes the XY plane of the three-dimensional space 301 from a point of z>0.

In addition, it is assumed that, the XY plane of Z=0 in the three-dimensional space 301, that is, a plane closest to the observer is the display plane of the liquid crystal display, and at the same time, the XY plane is a detection plane of the detection means.

In this case, as shown in FIG. 5A and FIG. 6A, when the pen tip 201P of the input pen 201 contacts the display plane of the liquid crystal display 3, the detection means that is overlapped with the display plane detects the position (coordinates) of the pen tip 201P. Next, in the system control apparatus 1, it is determined that any one of the seesaw-shaped buttons $201D_1$ and $201D_2$ is pushed while the pen tip 201P is contacting the display plane, and the input information obtaining means 101 obtains information such as the position (coordinates) and the like of the pen tip 201P detected by the detection means so as to cause the pointer position/rotation angle calculation means 102 and the pointer generation means 103 to generate a pointer to be displayed at a position in the three-dimensional space 301 corresponding to the position at which the pen tip 201P contacts. When the pointer is generated, a signal for pointer display is sent from the display control means 106 to the display apparatus 3, so that a pointer 303 is displayed in the three-dimensional space 301 represented on the display apparatus 3, wherein the pointer 303 reflects time over which any one of the seesaw-shaped buttons $201D_1$ and $201D_2$ is pushed (or the number of times the button is pushed) in the state in which the pen tip 201P contacts the plane.

In addition, when the operator further pushes any one of the seesaw-shaped buttons $201D_1$ and $201D_2$ while contacting the pen tip 201P of the input pen 201 with the display surface of the liquid crystal display 3, the input information process means 109, the pointer position/rotation angle calculation means 102 and the pointer generation means 103 of the system control apparatus 1 generates a pointer having a shape according to time over which any one of the seesaw-shaped buttons $201D_1$ and $201D_2$ is pushed (or the number of times the button is pushed). At this time, for example, by configuring an arrow-shaped pointer to extend according to time over which the seesaw-shaped button $201D_1$ is pushed (or the number of times the button is pushed), the length of the pointer 303 becomes longer than that of the pointer shown in FIGS. 5A and 6A by increasing the time over which the seesaw-shaped button $201D_1$ is pushed (or increasing the number of times the button is pushed) as shown in FIG. 5B and FIG. 6B. In addition, by continuing to push the seesaw-shaped button $201D_1$ for longer time (or by pushing the button more times), the pointer 303 further extends as shown in FIGS. 5C and 6C.

On the other hand, by configuring the arrow-shaped pointer to be shortened according to time over which the seesaw-shaped button $201D_1$ is pushed (or the number of times the button is pushed), the long pointer 303 shown in FIGS. 5C and 6C becomes shortened by increasing the time over which the seesaw-shaped button $201D_1$ is pushed (or increasing the number of times the button is pushed) as shown in FIG. 5B and FIG. 6B. In addition, by continuing to push the seesaw-shaped button $201D_1$ for longer time (or by pushing the button more times), the pointer 303 is further shortened as shown in FIGS. 5A and 6A.

By performing such display of the pointer 303 continuously (or in predetermined incremental steps) almost at the same time when the operator brings the input pen 201 into contact with the display plane and pushes the seesaw-shaped button $201D_1$, $201D_2$, the operator can feel as if the pointer extends in the three-dimensional depth direction (z<0) according to the time over which the seesaw-shaped button $201D_1$, $201D_2$ is pushed (or the number of times the button is pushed). By the way, the maximum value and the minimum value of the length of the pointer 303 may be set by the operator, or may by set in the system beforehand. In addition, although not shown in the figure, when the tip of the pointer 303 points at the neighborhood of a target object 302 (within a region of 10 pixels, for example), the object generation means 105 may change the color of the object 302, for example, so as to report the operator that the object 302 is pointed. At this time, for example, when the operator pushes the push button $201D_3$ of the input pen, the pointing determination means 104 determines that selection or holding operation is performed on the object 302 so that the state in which the color of the object is changed is kept. In addition, when the pen tip 201P of the input pen 201 is separated (floated) from the detection plane, the pointer 303 may be shortened at a constant speed from the state just before the pen tip 201P is detached (floated) from the detection plane according to time over which the pen tip 201P is detached (floated), or the pointer 303 may be fixed in the state just before the pen tip 201P is detached (floated) from the detection plane.

Figure 43:
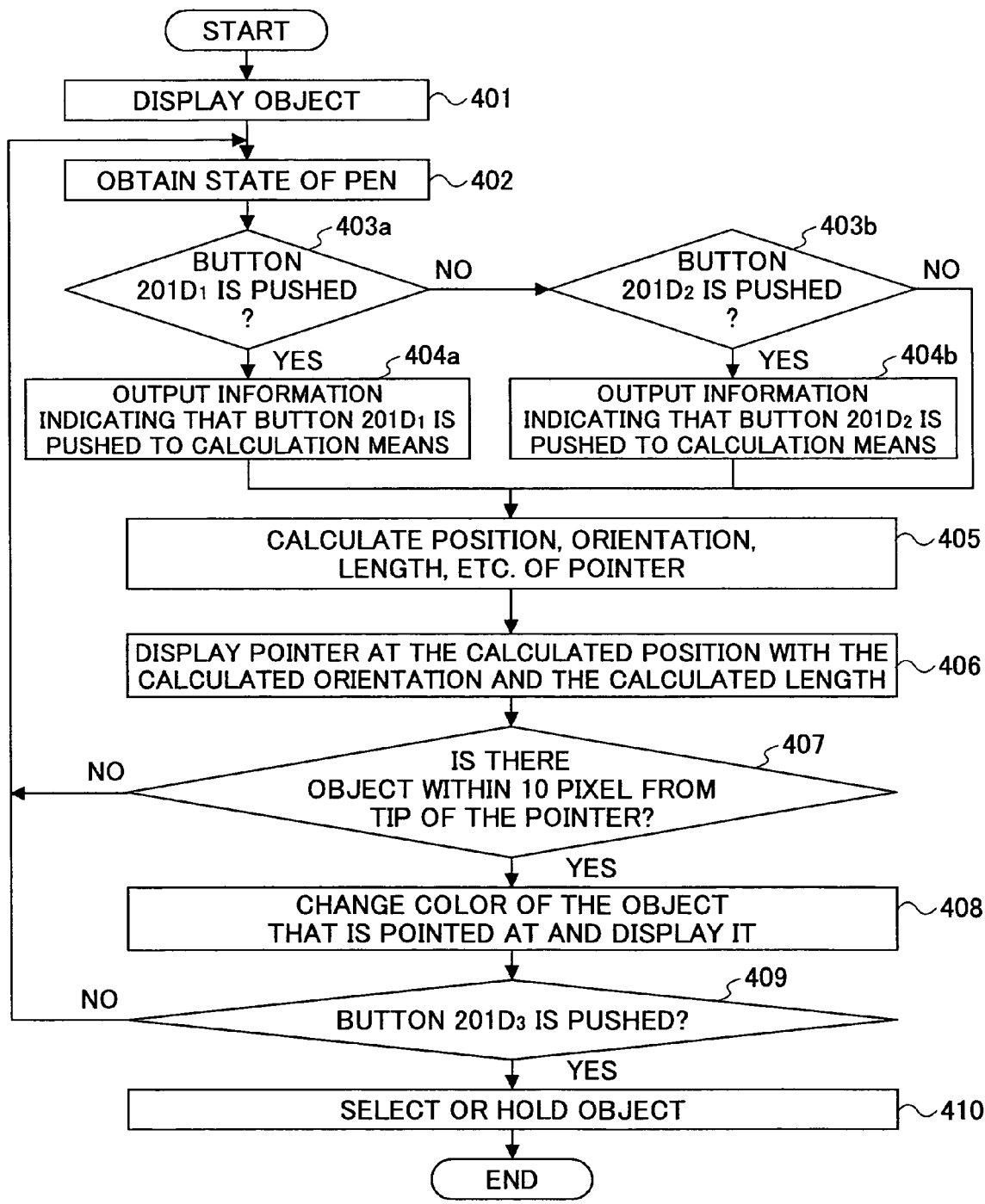
FIG. 43 is a schematic diagram for explaining the three-dimensional pointing method of the embodiment 2-1, and shows a flowchart showing the process procedure of the three-dimensional pointing method in the embodiment 2-1.

For realizing the three-dimensional pointing method, processes from step 401 to step 410 shown in FIG. 43 are performed in the system control apparatus 1. That is, in the system control apparatus 1, first, the display control means 106 displays the pointer 303 in the three-dimensional space 301 represented on the display apparatus (liquid crystal display) 3 (step 401). At this time, the input information obtaining means 101 is set to be in a state for obtaining information detected by the detection means of the input apparatus 2.

Then, when the operator contacts the pen tip 201P of the input pen 201 with the detection plane of the detection means, the detection means detects the position (coordinates) and the like of the pen tip, so that the input information obtaining means 101 obtains information representing the state of the input pen 201 such as the detected position (coordinates) and the like of the pen tip 201P (step 402). In the three-dimensional pointing method in this embodiment 2-1, since it is only necessary to obtain information of the position (coordinates) of the pen tip 201P, only the information of the position (coordinates) of the pen tip 201P may be obtained in step 402. However, in addition to the position (coordinates) of the pen tip 201P, the detection means can detect the orientation α, inclination β, rotation γ around the axis and the like of the input pen 201. Thus, the detection means may obtain information of orientation α, inclination β, and rotation γ around the axis of the input pen 201, in addition to the position (coordinates) of the pen tip 201P.

Next, the input information process means 109 determines whether any one of the seesaw-shaped buttons $201D_1$ and $201D_2$ of the input pen 201 is pushed, and outputs information of a button that is pushed. In this process, as shown in FIG. 43, for example, it is determined whether the button $201D_1$ is pushed (step 403a). When the button is pushed, the information is output to the pointer position/rotation angle calculation means 102 (step 404a). When the button $201D_1$ is not pushed, it is determined whether the button $201D_2$ is pushed (step 403b). When the button is pushed, the information is output to the pointer position/rotation angle calculation means 102 (step 404b).

Next, from the obtained information, the pointer position/rotation angle calculation means 102 uses information of the position (coordinates) of the pen tip 201P and information indicating whether any one of the seesaw-shaped buttons $201D_1$ and $201D_2$ is pushed so as to calculate position, orientation and length and the like of the pointer reflecting the information (step 405). In the case of the three-dimensional pointing method of this embodiment 2-1, step 405 calculates the position (coordinates) on the XY plane in the three-dimensional space represented on the display apparatus 3, corresponding to the position (coordinates) of the pen tip 201P, and calculates the length that is proportional to the time over which any one of the seesaw-shaped buttons $201D_1$ and $201D_2$ is pushed (or proportional to the number of times the button is pushed).

By the way, like this embodiment 2-1, when only the information of the position (coordinates) of the pen tip 201P of the input pen 201 is used and information of the direction α, inclination β and rotation γ around the axis is not used, the pointer is displayed in which the direction is always constant. Therefore, it is not necessary to calculate the orientation of the pointer in step 405.

After performing the calculation process in step 405, next, the pointer generation means 103 generates a pointer of a shape based on the calculation result of the pointer position/rotation angle calculation means 102, and information on the generated pointer is sent from the display control means 106 to the display apparatus 3, so as to cause the display apparatus 3 to display the pointer in the three-dimensional space 301 (step 406).

In addition, in parallel with the process of step 406, the pointing determination means 104 in the system control apparatus 1 determines whether the object to be pointed at exists at a position corresponding to the position (coordinates) on the XY plane in the three-dimensional space and to the depth position calculated by the pointer position/rotation angle calculation means 102 (step 407). As shown in FIG. 43, for example, the determination in step 407 is performed by determining whether there is the object within 10 pixels from the tip of the pointer, in other words, within 10 pixels from the position at which the pointer points. By the way, although the range is within 10 pixel in FIG. 43, the range is not limited to this, and the determination may be performed based on other conditions. This determination method for determining whether there is a pointed object can be applied also to the first embodiment. When the pointed object does not exist, only display control for the pointer 303 is performed, and the procedure returns to the step 402, and next input information is obtained.

On the other hand, when the pointed object exists, the object generation means 105 generates an object by changing the color of the pointed object, for example, and information on the generated object is sent from the display control means 106 to the display apparatus 3, so as to cause the display apparatus 3 to display the object in the three-dimensional space 301 (step 408). In addition, the pointing determination means 104 determines whether the push button 201D$_3$ of the input pen 201 is pushed (step 409). Then, when the push button 201D$_3$ is pushed, the pointed object 302 can be selected or held (step 410). In addition, when the push button 201D$_3$ is not pushed, the procedure returns to step 402, and next input information is obtained.

By performing the above-mentioned processes in the system control apparatus 1, display control for the pointer 303 shown in FIGS. 5A, 5B and 5C becomes possible.

By the way, for calculating the length of the pointer in step 405 in a state in which processes of steps 401-406 have been performed, that is, in a state the pointer is already displayed on the display apparatus 3, when information indicating that the button 201D$_1$ is being pushed is received from the input information process means 109, for example, the pointer position/rotation angle calculation means 102 increases the length of the pointer by a predetermined length. When information indicating that the button 201D$_2$ is being pushed is received from the input information process means 109, the pointer position/rotation angle calculation means 102 decreases the length of the pointer by a predetermined length. By executing such process loop repeatedly, it becomes possible to display a pointer having a length corresponding to the time over which the seesaw-shaped button 201D$_1$, 201D$_2$ is pushed (or the number of times the button is pushed).

As described above, according to the pointing method of this embodiment 2-1, an arbitrary point in the three-dimensional space 301 represented on the display apparatus 3 can be pointed at by obtaining information on the position (coordinates) of the pen tip 201P of the input pen 201 and the detection plane of the detection means, calculating a position (coordinates), on the XY plane in the three-dimensional space represented on the display apparatus 3, corresponding to the position (coordinates) of the pen tip 201P, and a depth position corresponding to the time over which the seesaw-shaped button 201D$_1$, 201D$_2$ of the input pen 201 is pushed (or the number of times the button is pushed), generating a pointer that points at the calculated position and the depth position to display the pointer. In addition, by determining whether the push button 201D$_3$ of the input pen 201 is pushed, the object pointed at by the pointer can be selected or held.

In addition, by using a general pen tablet as the input apparatus 2, a pointing position in the depth direction of the pointer 303 can be changed while the pen tip 201P of the input pen 201 is contacting with the detection means, so that fatigue of the operator can be reduced.

In addition as described in this embodiment 2-1, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

In addition, in this embodiment 2-1, although the length-changing pointer 303 is displayed according to the time over which the seesaw-shaped button 201D$_1$, 201D$_2$ is pushed (or the number of times the button is pushed), the pointer is not limited to this. Any change can be adopted as long as pointing at a position in the three-dimensional direction (Z<0) can be performed like a pointer in which the shape (not the length) changes in the three-dimensional depth direction, and a pointer in which the inclination of the three-dimensional depth direction (Z<0) changes. In addition, for changing the length of the pointer, the length may be changed in proportion to the time over which the seesaw-shaped button 201D$_1$, 201D$_2$ is pushed (or the number of times the button is pushed), or the length may be changed in proportion to a power or a power root of the time over which the seesaw-shaped button 201D$_1$, 201D$_2$ is pushed (or the number of times the button is pushed).

Although, in this embodiment 2-1, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 2-1, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, in this embodiment 2-1, although the determination whether there is the tip of the pointer 303 in the neighborhood of the target object 302 is performed by determining whether the object is within 10 pixels from the tip of the pointer 303, this range can be arbitrarily set and changed by a system manager or the operator.

Like the embodiment 1-1, also in this embodiment 2-1, various shapes of pointers as shown in FIGS. 8A-D can be adopted.

Although, in this embodiment 2-1, a planar arrow-shaped pointer 303a is used as the pointer 303 as shown in FIG. 8A for example, the shape of the pointer 303 is not limited to this, and the shape may be any shape as long as a position that is pointed at is visually clear. As the shape of such a pointer, it can be considered to use a stereoscopic arrow-shaped pointer 303b formed by connecting a cylinder to a bottom surface of a cone shown in FIG. 8B, a cone-shaped pointer 303c as shown in FIG. 8C, a pointer 303d having a shape if a hand of a human who points at an object with an index finger as shown in FIG. 8D. In addition, although not shown in the figure, a multiple-sided pyramid shaped pointer similar to the cone-line pointer 303c shown in FIG. 8C may be also used.

In addition, although, in this embodiment 2-1, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 2-1, a folder-shaped object is taken as an example of the object 302, the shape is not limited to this and the object 302 may take any shape.

In addition, although, in this embodiment 2-1, the coordinate system of the three-dimensional space represented on the display apparatus 3 is set such that the display surface becomes Z=0 as shown in FIG. 4A, the origin three-dimensional space may be any point as long as the three-dimensional space can be represented, and it is not necessarily the Cartesian coordinate system, and the coordinate system may be the cylindrical coordinate system or the spherical coordinates system.

In addition, although, in this embodiment 2-1, the time over which the seesaw-shaped button $201D_1$, $201D_2$ of the input pen 201 (or the number of times the button is pushed) is focused on, the inclination and the rotation of the pointer may be operated by adding elements of direction α, inclination β and the rotation γ around the axis of the input pen 201.

Embodiment 1-2

Next, the three-dimensional pointing method of the embodiment 2-2 is described. Like the embodiment 1-2, in this embodiment 2-2, a method for pointing at an object, that is placed in the depth direction as seen from the operator in the three-dimensional space, from various directions by changing the orientation of the input pen 201 is described with reference to FIGS. 9A-10C.

Also in this embodiment 2-2, the electromagnetic induction type pen tablet and the liquid crystal display are used as the input apparatus 2 and the display apparatus 3. In addition, the detection means (digitizer) of the pen tablet 2 is overlapped on the display plane of the liquid crystal display 3. In addition, the pen tablet 2 and the display apparatus 3 are connected to the system control apparatus 1 shown in FIG. 41.

In addition, the setting method of the coordinate system in the three-dimensional space represented on the liquid crystal display, the operation method of the input pen 201 of the pen tablet 2 and the like are the same as those described in the embodiment 2-1. However, in this embodiment, another embodiment of the inputting method is described, in which the seesaw-shaped buttons $201D_1$, $201D_2$ and the push button $201D_3$ of the input pen 201 that are used in the embodiment 2-1 are not used, but an input method is used in which the object can be pointed at based on operation of separating or not separating the pen tip 201P of the input pen 201 from the detection plane, and the pointed object is selected or held.

In the three-dimensional pointing method in this embodiment 2-2, when the operator puts the pen tip 201P of the input pen 201 on an arbitrary point on the XY plane (z=0) of the three-dimensional space 301 represented on the liquid crystal display 3, the system control apparatus 1 obtains, by the input information obtaining means 101, information such as the position (coordinates) of the pen tip 201 of the input pen 201, the direction α, the inclination β, the rotation γ around the axis detected by the detection means (digitizer). In addition, at this time, the input information process means 109 calculates time over which the pen tip 201P of the input pen 201 contacts the detection plane. In addition, the input information process means 109, the pointer position/rotation angle calculation means 102 and the pointer generation means 103 generate a pointer to be displayed at a position in the three-dimensional space 301 corresponding to the position at which the pen tip 201P contacts. When the pointer is generated, a signal for pointer display is sent from the display control means 106 to the display apparatus 3, so that a pointer 303 shown in FIGS. 9A and 10B, for example, is displayed.

In addition, when the operator changes the orientation of the input pen 201 to an orientation shown in FIGS. 9B and 10B or FIGS. 10C and 10C, for example, the pointer position/rotation angle calculation means 102 and the pointer generation means 103 calculate the orientation of the new pointer from a new direction α, inclination β, and rotation γ around the axis of the input pen 201 to generate a pointer based on the calculation result. Then, a signal for displaying the newly generated pointer is sent from the display control means 106 to the display apparatus 3 so that the pointer 303 shown in FIGS. 9B and 10B or FIGS. 9C and 10C is displayed.

By performing such display of the pointer 303 continuously almost at the same time when the operator performs the operation to change the orientation of the input pen 201, the operator can feel as if the pointer is inclined and displayed on an extension of the pen tip 201P in the direction of the inclined pen.

In addition, in this method for displaying the pointer 303, the length of the pointer 303 can be adjusted according to the status of contact/noncontact and contacting time of the pen tip 201P of the input pen with the detection plane, for example. For example, when the operator performs operation (tap operation) to contact the pen tip 201P of the input pen 201 with the detection plane, and separate the pen tip 201P from the detection plane and contacts the pen tip 201P with the detection plane again within a predetermined time (within 0.5 second, for example), the length of the pointer 303 starts to increase. Then, when the tap operation is performed again while the length of the pointer 303 is increasing, the increase of the length of the pointer 303 stops, and the operator can use the pointer having the length at the time. When the tap operation is performed when the length of the pointer 303 is not changing, the length of the pointer can be further increased. In addition, when the operator performs operation (double tap operation) to perform the tap operation two times continuously, the length of the pointer 303 starts to decrease. Then, when tap operation is performed while the length of the pointer 303 is decreasing, the decrease of the pointer 303 stops, and the operator can use the pointer having the length at the time. In addition, when the double tap operation is performed when the length of the pointer 303 is not changing, the pointer 303 can be further decreased.

In this series of extending/contracting operation for the pointer 303, when the pointer 303 (the tip of the pointer) reaches the neighborhood (within 10 pixels, for example) of the object 302, the object generation means 105 changes the color of the object 302 or switches display of the object displayed in the three-dimensional space 301 or the like, so as to be able to report the operator that the pointer is in a state in which the length is not changed and that the object 302 is in a state in which it can be selected or held. When the color of the object 302 changes so that the state in which the object can be selected or held continues for equal to or more than 0.5 second for example, the operator can select or hold the object 302.

In addition, although not shown in the figure, when the operator changes the orientation of the input pen 201, the input information process means 109, the pointer position/rotation angle calculation means 102 and the pointer generation means 103 can generate a pointer to which the length of the pointer, just before the orientation of the input pen 201 is changed is reflected in addition to reflecting the orientation of the pointer.

Figure 44:
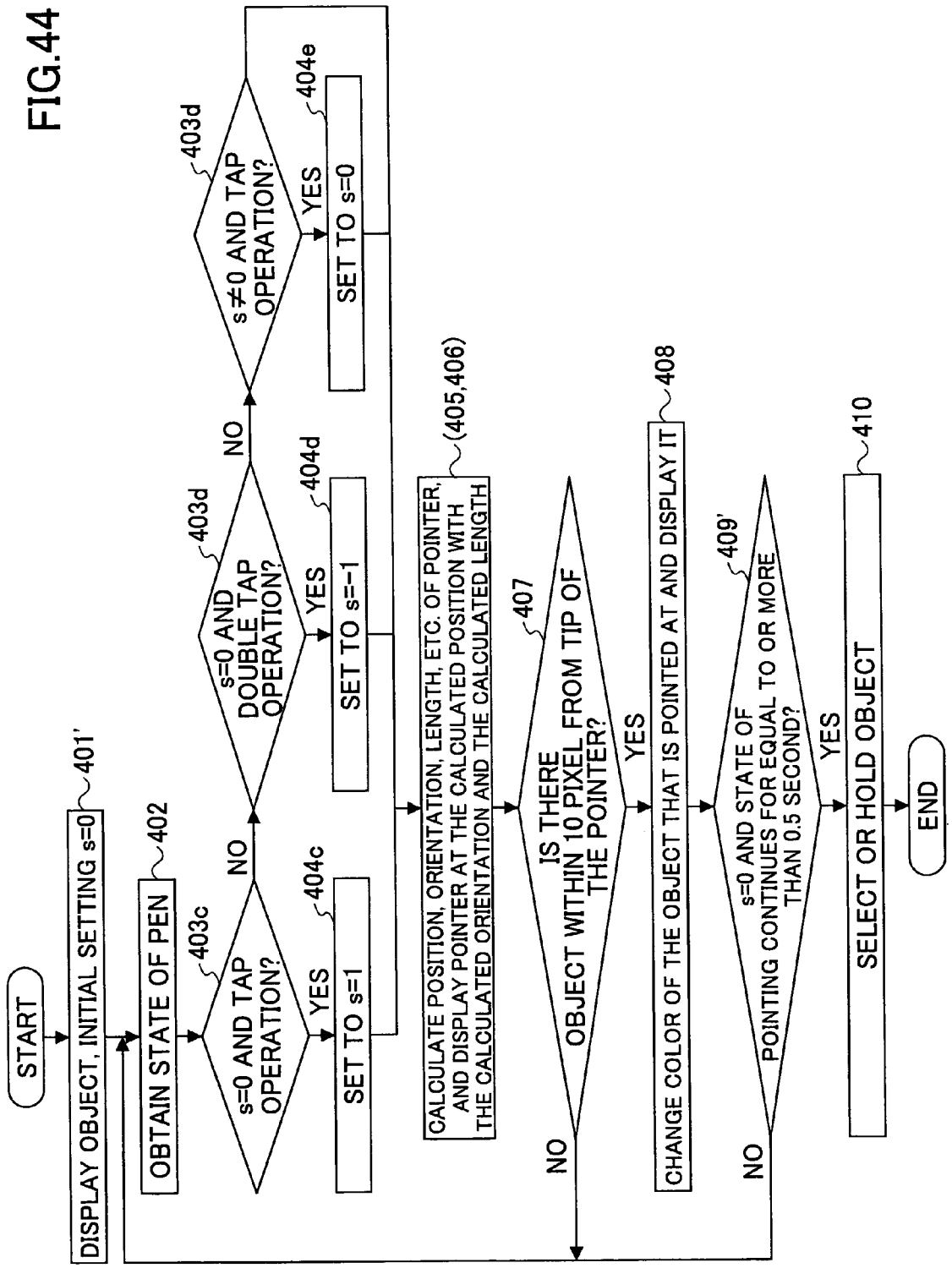
FIG. 44 is a schematic diagram for explaining the three-dimensional pointing method of the embodiment 2-2, and shows a flowchart showing the process procedure of the three-dimensional pointing method in the embodiment 2-2.

For realizing such three-dimensional pointing method, the system control apparatus 1 may perform processes shown in FIG. 44. In this case, the system control apparatus 1 displays the object 302 in the three-dimensional space 301 represented on the display apparatus (liquid crystal display) 3 by the display control means 106, and, in addition to that, a variable s indicating the state of the pointer is set to be s=0 (step 401). As to the variable s indicating the state of the pointer, for example, s=0 indicates a state in which the length of the pointer is not changed or a state in which the pointer is not displayed, s=1 indicates a state in which the length of the pointer is increasing, and s=−1 indicates a state in which the length of the pointer is decreasing. At this time, the input information obtaining means 101 is caused to be in a state to be able to obtain information detected by the detection means of the input apparatus 2.

When the operator contacts the pen tip 201P of the input pen with the detection plane of the detection means, the detection means detects the position (coordinates) of the pen tip 201P and the like, so that the input information obtaining means 101 obtains information indicating the state of the input pen such as the detected position (coordinates) of the pen tip 201P (step 402). In this embodiment 2-2, in the step 402, information indicating the orientation of the input pen such as the direction α, the inclination β and the rotation γ around the axis of the input pen 201 is obtained in addition to the information of the position (coordinates) of the pen tip.

Next, the input information process means 109 determines whether to change the length of the pointer based on the variable s indicating the state of the pointer and the status of contact/noncontact of the pen tip 201P of the input pen 201 with the detection plane, and outputs the information. In this process, as shown in FIG. 44 for example, first, it is checked whether the variable s is s=0 and the tap operation is performed (step 403c). When the variable s is s=0 and the tap operation is performed, the variable s is set to be s=1, and the information is output to the pointer position/rotation angle calculation means (step 404c). When s≠0 or the tap operation is not performed, it is checked whether the variable s is s=0 and the double tap operation is performed (step 403d). When the variable s is s=0 and the double tap operation is performed, the variable s is set to be s=−1 and the information is output to the pointer position/rotation angle calculation means (step 404d). When s≠0 or the double tap operation is not performed, it is checked whether the tap operation is performed (step 403e). When s≠0 and the tap operation is performed, the variable s is set to be s=0 and the information is output to the pointer position/rotation angle calculation means (step 404e).

Next, the pointer position/rotation angle calculation means 102 uses the position (coordinates) of the pen tip 201P and the value of the variable s indicating the state of the pointer from the detected information so as to calculate position, orientation, length and the like of the pointer to which the information is reflected (step 405). Then, the pointer generation means 103 generates a pointer having a shape based on the calculation result of the pointer position/rotation angle calculation means 102, and the information on the generated pointer is sent from the display control means 106 to the display apparatus 3 so that the pointer is displayed in the three-dimensional space 301 (step 406). In this embodiment 2-2, in the step 405, the system calculates the position (coordinates) on the XY plane in the three-dimensional space 301 represented by the display apparatus corresponding to the position (coordinates) of the pen tip 201P, and calculates the length that is proportional to the time over which the pen tip 201P contacts the detection plane. When the variable s is set to be s=1, for example, the length of the pointer is calculated so as to increase in proportion to the time over which the pen tip 201P contacts the detection plane. When the variable s is set to be s=−1, the length of the pointer is calculated so as to decrease in proportion to the time over which the pen tip 201P contacts the detection plane. When the variable s is set to be s=0, the length is set to be the length just before the tap operation or the double tap operation is performed.

In addition, at this time, in parallel to the process of step 406, the system control apparatus 1 performs processes of steps 407 and 408 described in the embodiment 2-1. In the step 407, as shown in FIG. 44, for example, it is determined whether there is the object within 10 pixels from the tip of the pointer, in other words, from the position at which the pointer points. By the way, although the range is within 10 pixels in FIG. 44, the range is not limited to this, and the determination may be performed using other conditions. When there is no pointed object, display control is performed only for the pointer 303, and the process returns to the step 402, so that next input information is obtained.

On the other hand, when there is a pointed object, the object generation means 105 generates an object in which the color is changed, for example, so that information on the generated object is sent from the display control means 106 to the display apparatus 3 to cause the display apparatus 3 to display the object in the three-dimensional space 301 (step 408). In addition, the pointing determination means 104 determines whether a state in which the variable s is s=0 and the object is pointed at continues for equal to or more than 0.5 second (step 409'). When the state the variable s is s=0 and the object is pointed at continues for equal to or more than 0.5 second, the pointed object 302 can be selected or held (step 410). When s≠0 or the time over which the object is pointed at is less than 0.5 second, the procedure returns to the step 402, and next input information is obtained. By the way, the continuing time of the state in which the object is pointed at is not limited to equal to or more than 0.5 second, and other time may be used.

By performing the above-mentioned processes in the system control apparatus 1, display control of the pointer as shown in FIGS. 9A, 9B and 9C can be performed.

By the way, the process procedure shown in FIGS. 43 and 44 corresponds to the process procedure shown in FIG. 7 in the first embodiment. In FIGS. 43 and 44, processes are described in more detail.

As described above, according to the pointing method of this embodiment 1-2, an arbitrary point in the three-dimensional space 301 represented on the display apparatus 3 can be pointed at by obtaining, in addition to the position (coordinates) and the contact/noncontact status of the pen tip 201P of the input pen 201 with the detection plane, information on the direction α, the inclination β and the rotation γ around the axis of the input pen 201, calculating a position (coordinates), on the XY plane in the three-dimensional space represented on the display apparatus 3, corresponding to the position (coordinates) of the pen tip 201P, and calculating a depth position corresponding to the time over which the pen tip of the input pen 201 contacts with the detection plane, and calculating the direction, the inclination and the rotation around the axis in the three-dimensional space 301 corresponding to the direction α, the inclination β and the rotation γ around the axis of the input pen 201, and generating a pointer that points at the calculated position and the depth position from the calculated direction, and displaying the pointer. In addition, the pointed object can be selected and held.

In addition, since it is not necessary to provide the input pen 201 with an operation means such as the button for performing operation to change the depth position of the pointer or to change the pointing direction, a conventional general pen tablet and an input pen can be used. In addition, a pointing position in the depth direction of the pointer 303 can be changed while the pen tip 201P of the input pen 201 is contacting with the detection means, so that fatigue of the operator can be reduced.

In addition as described in this embodiment 2-2, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

In addition, in this embodiment 2-2, although an example is shown in which the direction, the inclination, and the rotation around the axis of the pointer change in proportion to the direction α, the inclination β, and the rotation γ around the axis of the input pen 201 respectively, the changing method is not limited to this. Any change can be adopted as long as pointing at a position in the three-dimensional depth direction (Z<0) can be performed by changing the shape, not the rotation angle, in the three-dimensional depth direction (z<0) in some way or changing the inclination of the pointer in the three-dimensional depth direction (z<0), for example. In addition, the changing method is not limited to the case in which the direction, the inclination, and the rotation of the pointer change in proportion to the direction, the inclination, and the rotation of the input pen 201 respectively, and any of the inclination, the orientation and the rotation of the input pen 201 may change in proportion to a power of or a power root of any of the inclination, direction and rotation of the input pen, for example.

Although, in this embodiment 2-2, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 2-2, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In this embodiment 2-2, although the contact/noncontact status of the pen tip 201P with the detection plane is taken as an example of the operation of the input pen 201, the method is not limited to this as long as the same effect can be obtained. For example, the length of the pointer 303 may be changed according to the time over which the button of the input pen is pushed (or the number of times the button is pushed), or according to rotation amount and rotation direction of a wheel, or moving amount and moving direction of a slide bar. In addition, the maximum value and the minimum value of the length of the pointer 303 can be set by the operator, or may be set in the system control apparatus 1 beforehand.

In addition, in this embodiment 2-2, although the determination whether there is the tip of the pointer 303 in the neighborhood of the target object 302 is performed by determining whether the object is within 10 pixels from the tip of the pointer 303, this range can be arbitrarily set and changed by a system manager or the operator. In the same way, the time length of pointing in the step 409' can be arbitrarily set and changed by a system manager or the operator.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, a pointer 303d having a shape if a hand of a human who points at an object with an index finger as shown in FIG. 8D.

In addition, although, in this embodiment 2-2, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 2-2, a folder-shaped object is taken as an example of the object 302, the shape is not limited to this and the object 302 may take any shape.

In addition, although, in this embodiment 2-2, the coordinate system of the three-dimensional space represented on the display apparatus 3 is set such that the display surface becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 2-2, the direction α, the inclination β and the rotation γ around the axis of the input pen 201 are focused on. But in the same way as the embodiment 2-1, it is not necessary to use every element. For example, only the depth position can be changed without using the direction α, the inclination β and the rotation γ around the axis of the input pen 201, or only the direction α and the inclination β may be used.

Embodiment 2-3

Next, the embodiment 2-3 is described.

In embodiments 2-1 and 2-2, pointing methods are described for performing display control of the pointer in the three-dimensional space 301 represented on the display apparatus 3 and performing display control of the pointed object in response to operation of the input pen 201 of the input apparatus 2.

However, when the object in the three-dimensional space 301 is pointed at by the method of the embodiments 2-1 and 2-2, there are many cases in which operation such as movement, editing and processing of the object is accompanied after the pointing. Thus, in this embodiment 2-3, a method is described for selecting or holding the object, and moving the pointed object by operating the input pen 201 after pointing at the object in the three-dimensional space 301. This embodiment is described with reference to FIGS. 11 and 12 that are used for the embodiment 1-3. In addition, a process procedure of this embodiment is described with reference to FIG. 45. The process procedure shown in FIG. 45 corresponds to the process procedure shown in FIG. 13 in the first embodiment.

In the embodiment 2-3, similar to the embodiment 2-1, the electromagnetic induction type pen tablet and the liquid crystal display are used as the input apparatus 2 and the display apparatus 3. In addition, the detection means (digitizer) of the pen tablet 2 is overlapped on the display surface of the liquid crystal display 3.

In addition, the setting method of the coordinate system in the three-dimensional space represented on the liquid crystal display, the operation method of the input pen 201 of the pen tablet 2 and the like are the same as those described in the embodiment 2-1. In addition, the pen tablet 2 and the display apparatus 3 are connected to the system control apparatus 1 having the configuration shown in FIG. 41.

In addition, in this embodiment 2-3, since the method described in the embodiments 2-1 and 2-2 can be used for selecting or holding an object in the three-dimensional space 301, the method is not described in detail.

After the operator points at the object as shown in FIGS. 11 and 12, for example, by a method similar to the method in the embodiment 2-1 or the embodiment 2-2, the operator who checks that the object 302 is pointed at performs operation for selecting or holding the object 302 using the method in the embodiment 2-1 or the embodiment 2-2, for example. Then, when the operator moves the input pen 201 to a desired position in the state in which the object is selected or held and in the state in which the pen tip 201P of the input pen 201 is contacting with the display plane (detection plane of the detection means) of the display apparatus 3, the object 302 moves in the three-dimensional space 301 following the movement of the input pen 201. Then, although not shown in the figure, after the input pen 201 is moved to the desired position, when the operator performs a predetermined operation such as operation to push the push button 201D$_3$ of the input pen 201 once, the position of the object 302 is determined, so that the object is displayed at the position even when moving the input pen 201 or separating the pen tip 201P from the detection plane. Accordingly, the object 302 can be moved from the original position to the target position in the three-dimensional space.

At this time, the input information obtaining means 101 of the system control apparatus 1 obtains information indicating that the push button 201D$_3$ is pushed, for example, in addition to obtaining information necessary for selecting or holding the object as described in the embodiment 2-1 or the embodiment 2-2. Then, the system control apparatus 1 can ascertain that the operator is performing the operation to move the object 302 since the operation for selecting or holding the object is performed. Thus, the movement operation for the object 302 becomes possible by causing the pointing determination means 104 and the object generation means 105 to generate the object following the movement of the input pen 201 and causing the display apparatus 3 to display the object.

Figure 45:
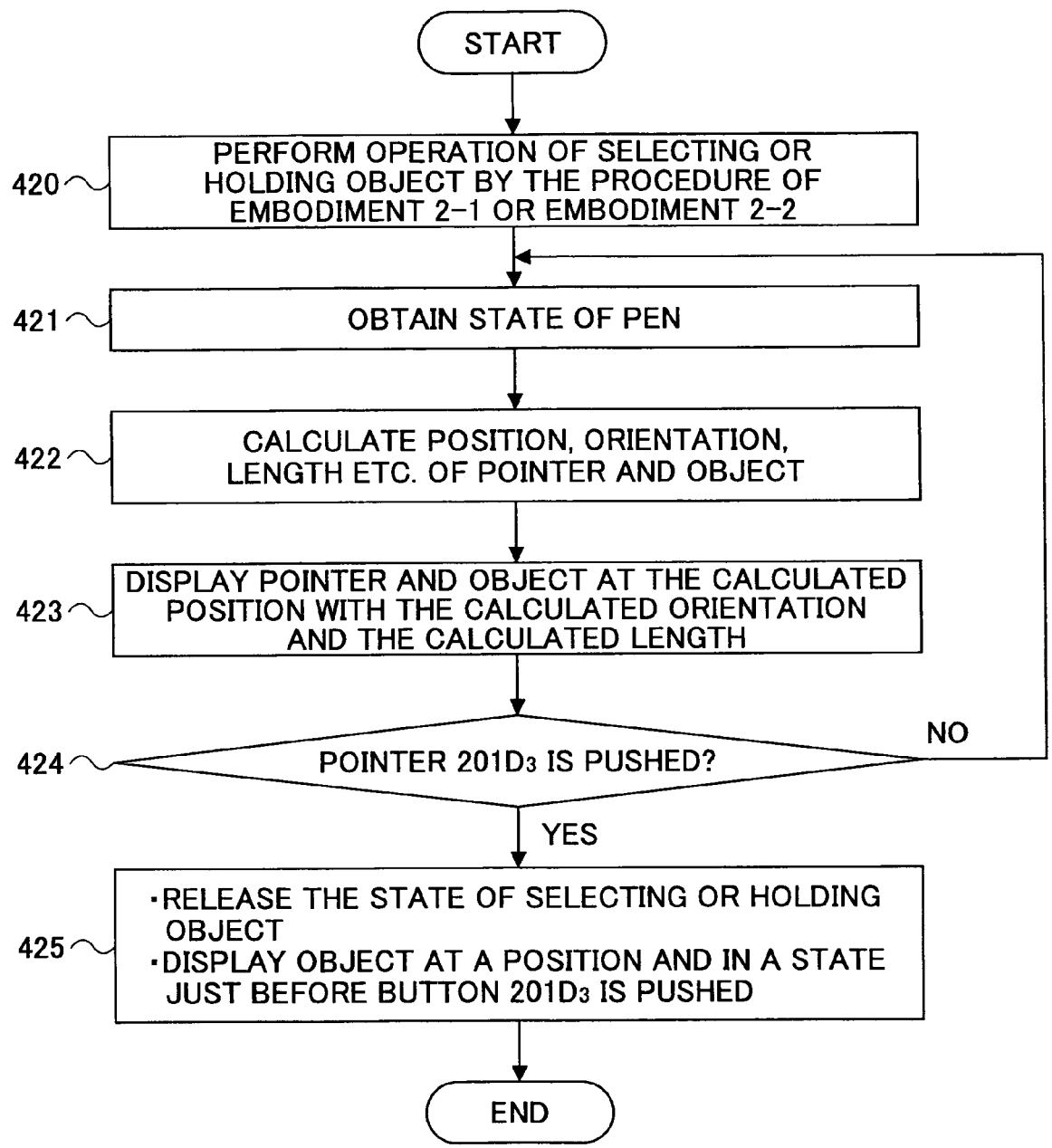
FIG. 45 is a schematic diagram for explaining the three-dimensional pointing method of the embodiment 2-3, and shows a flowchart showing the process procedure of the three-dimensional pointing method in the embodiment 2-3.

For realizing such three-dimensional pointing method, the system control apparatus 1 may perform processes shown in FIG. 45. In FIG. 45, the first process (step 420) is a process performed until the object 302 in the three-dimensional space 301 is selected or held, and can be the same as that described in the embodiment 2-1 or the embodiment 2-2. Thus, detailed description is not given.

In the three-dimensional pointing method in this embodiment 2-3, after the system control apparatus 1 performs the process for selecting or holding the object 302 by the procedure described in the embodiment 2-1 or 2-2 (step 420), the input information obtaining means 101 obtains information on the pointer (step 421). The information obtained in the step 421 are information such as the position (coordinates) of the pen tip 201P of the input pen 201, and the direction α, the inclination β and the rotation γ around the axis of the input pen 201.

After obtaining the information indicating the state of the input pen 201 in step 421, the input information process means 109 and the pointer position/rotation angle calculation means 102 calculate the position, the orientation, the length and the like of the pointer 303 based on the obtained information, and calculate the position and the orientation of the object 302 (step 422). Since the calculation of the position, the orientation, the length and the like of the pointer is the same as that described in the embodiment 2-1 or the embodiment 2-2, detailed description of it is not given. In addition, the position and the orientation of the object are calculated such that relative position relationship between the reference position of the object when it is pointed at and the position at which the pointer points is kept also at the position of the pointer calculated in the step 422.

By the way, like the embodiment 2-1, when only the information of the position (coordinates) of the pen tip 201P of the input pen 201 is used and information of the direction α, inclination β and rotation γ around the axis is not used, the pointer is displayed in which the orientation is always constant. Therefore, it is not necessary to calculate the orientation of the pointer in step 422. In addition, like this embodiment 2-3, when the movement of the object 302 is only translation, the object is displayed in which the orientation is always constant. Therefore, it is not necessary to calculate the orientation of the object in step 422.

After calculating the position, the orientation and the length and the like of the pointer 303, and calculating the position and the orientation of the object 302 in the step 422, the pointer generation means 103 generates a pointer based on the calculated position, orientation and length of the pointer, and the object generation means 105 generates an object based on the calculated position and the orientation of the object. Then, display signals of these are sent from the display control means 106 to the display apparatus 3 so as to display the pointer and the object (step 423).

After displaying the pointer and the object in step 423, the input information process means 109 determines whether the push button 201D$_3$ of the input pen 201 is pushed (step 424). When the button is not pushed, the state of the input pen is obtained again (step 421), the processes of the steps 422 and 423 are continued. On the other hand, when the push button 201D$_3$ is pushed once, the state of selecting or holding the object is released, and the display status of the object 302 is fixed to a position and an orientation obtained just before the push button 201D$_3$ is pushed (step 425). Then, the movement operation for the pointer and the object ends.

By performing the above-mentioned processes in the system control apparatus 1, pointing operation and movement operation for the object as shown in FIGS. 11 and 12 become possible.

As described above, according to the three-dimensional pointing method in this embodiment 2-3, after an object is pointed at, the pointed object can be selected or held, and can be translated following the movement of the input pen.

In addition, a general pen tablet is used as the input apparatus 2, an object is pointed at, and the object can be moved while the pen tip 201P of the input pen 201 is contacting with the detection means, so that fatigue of the operator can be reduced.

In addition as described in this embodiment 2-3, by overlapping the detection means of the input apparatus 2 with the display surface of the display apparatus (liquid crystal display) 3, the operator can perform operation of the input pen on the display surface. Accordingly, a visual effect is obtained in which the operator feels as if the pointer 303 is a part of the pen tip 201 of the input pen 201, so that accurate pointing at the object 302 can be easily performed and intuitive pointing becomes possible.

Although, in this embodiment 2-3, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 2-3, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, or a pointer 303d having a shape of a hand of a human who points at an object with an index finger as shown in FIG. 8D.

In addition, although, in this embodiment 2-3, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 2-3, a folder-shaped object is taken as an example of the object 302, the shape is not limited to this and the object 302 may take any shape.

In addition, although, in this embodiment 2-3, the coordinate system of the three-dimensional space represented on the display apparatus 3 is set such that the display surface becomes Z=0 as shown in FIG. 4A like the embodiment 2-1, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 2-3, after the selected or held object 302 is moved to the desired position, the movement operation of the objects ends by pushing the push button 201D₃ of the input pen 201 once. However, the ending method is not limited to this, and any method such as a method using a specified key of a keyboard or other switch instead of the push button 201D₃ can be used for ending the movement operation as long as the same effect can be obtained.

Embodiment 2-4

Next, the embodiment 2-4 is described. In the embodiment 2-3, the three-dimensional pointing method is described in which, after pointing at the object in the three-dimensional space 301 represented on the display apparatus 3, the pointed object 302 can be selected or held and translated.

However, in the three-dimensional space 301 represented on the display apparatus 3, in addition to simply translating the object as described in the embodiment 2-3, it can be also estimated to incline the pointed object in the depth direction in the three dimensional space, for example, by utilizing the three-dimensional space 301 efficiently. Therefore, in the embodiment 2-4, in the same way as the embodiment 1-4, a pointing method is described for, after pointing at the object and selecting or holding the object, inclining the pointed object in the depth direction in the three-dimensional space while continuing to point at the object. This embodiment is described with reference to FIGS. 14C-15C used in the embodiment 1-4.

In the embodiment 2-4, similar to the embodiment 2-1, the electromagnetic induction type pen tablet and the liquid crystal display are used as the input apparatus 2 and the display apparatus 3. In addition, the detection means (digitizer) of the pen tablet 2 is overlapped on the display plane of the liquid crystal display 3.

In addition, the setting method of the coordinate system in the three-dimensional space represented on the liquid crystal display, the operation method of the input pen 201 of the pen tablet 2 and the like are the same as those described in the embodiment 2-2. In addition, the pen tablet 2 and the display apparatus 3 are connected to the system control apparatus 1 having the configuration shown in FIG. 41.

In addition, in this embodiment 2-4, since the method described in the embodiments 2-1 and 2-2 can be used as a method for, after pointing at an object in the three-dimensional space 301, selecting or holding the object, the method is not described in detail here.

After the operator points at the object 302 as shown in FIGS. 14A and 15A, for example, by a method similar to the method in the embodiment 2-1 or the embodiment 2-2, the object 302 is selected or held. Then, when the operator changes the orientation of the input pen 201 to a desired orientation in the state in which the object 302 is selected or held, the object 302 inclines in the depth direction in the three-dimensional space 301 following the change of the orientation of the input pen 201 as shown in FIGS. 14B and 15B or FIGS. 14C and 15C. By doing these operations, the object 302 can be inclined to a desired orientation in the three-dimensional space. At this time, the input information obtaining means 101 of the system control apparatus 1 obtains information necessary for the operation of selecting or holding the object in the embodiment 2-1 or the embodiment 2-2. Then, the system control apparatus 1 can ascertain that the operator is performing the operation to move the object 302 since the operation of selecting or holding the object in the embodiment 2-1 or the embodiment 2-2 is performed. Thus, the movement operation for the object 302 becomes possible by causing the pointing determination means 104 and the object generation means 105 to generate the object following the change of the orientation of the input pen 201 and causing the display apparatus 3 to display the object.

For realizing such three-dimensional pointing method, the system control apparatus may perform processes shown in FIG. 45, for example.

When performing the operation shown in FIGS. 14A-14C in this embodiment 2-4, the position and the orientation of the object are calculated in step 422 such that all of relative position relationships between the object when it is pointed at and the pointer are kept, for example.

By performing the above-mentioned processes in the system control apparatus 1, the operations for pointing at the object and inclining the object in the depth direction become possible as shown in FIGS. 14A, 14B and 14C.

As described above, according to the three-dimensional pointing method in this embodiment 2-4, after an object is pointed at, selected and held, the object can be rotated in the three-dimensional space and can be inclined in the depth direction following the change of the orientation of the input pen 201.

In addition, a general pen tablet is used as the input apparatus 2, an object is pointed at, and the object can be moved while the pen tip 201P of the input pen 201 is contacting with the detection means, so that fatigue of the operator can be reduced.

In addition as described in this embodiment 2-4, by overlapping the detection means of the input apparatus 2 with the display plane of the display apparatus (liquid crystal display) 3, the operator can perform operation of the input pen on the display plane. Accordingly, a visual effect is obtained in which the operator feels as if the pointer 303 is a part of the pen tip 201 of the input pen 201, so that accurate pointing at the object 302 can be easily performed and intuitive pointing becomes possible.

Although, in this embodiment 2-4, an example is described in which the electromagnetic induction type pen tablet is used as the input apparatus 2, and the detection means (digitizer) of the pen tablet is overlapped with the display plane of the display apparatus (liquid crystal display) 3, the input apparatus 2 is not limited to this configuration, and a configuration in which the detection means and the display apparatus are separated may be adopted. In addition, although in this embodiment 2-4, the electromagnetic induction type pen tablet and the liquid crystal display are taken as an example of a combination of the input apparatus 2 and the display apparatus 3, the combination is not limited to this, and the combination may be a combination of a touch panel and a stylus pen that are used in PDA and the like.

In addition, the shape of the pointer may be any shape as long as a position that is pointed at is visually clear. The shape is not limited to the planar arrow-shaped pointer 303a as shown in FIG. 8A. For example, the pointer may be a stereoscopic arrow-shaped pointer 303b formed by connecting a cylinder to a bottom surface of a cone shown in FIG. 8B, a cone-shaped pointer 303c as shown in FIG. 8C, a pointer 303d having a shape if a hand of a human who points at an object with an index finger as shown in FIG. 8D.

In addition, although, in this embodiment 2-4, the point at which the pointer 303 points is the tip of the arrow-shaped pointer (tip of arrow), the pointing method is not limited to this, and the pointer may be configured to be able to perform pointing using any part of the pointer, or the pointer may be configured to use another part instead of the tip of the pointer.

Although, in this embodiment 2-4, a folder-shaped object is taken as an example of the object 302, the shape is not limited to this and the object 302 may take any shape.

In addition, although, in this embodiment 2-4, the coordinate system of the three-dimensional space represented on the display apparatus 3 is set such that the display surface becomes Z=0 as shown in FIG. 4A, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 2-4, after the selected or held object 302 is moved to the desired position, the movement operation of the objects ends by pushing the push button 201D$_3$ of the input pen 201. However, the ending method is not limited to this, and any method such as a method using a specified key of a keyboard or other switch instead of the push button 201D$_3$ can be used for ending the movement operation as long as the same effect can be obtained.

In addition, in the embodiment 2-4, although the operation method is descried in which the pointed object 302 is rotated in the same XY plane and is inclined in the depth direction, various object operations become possible by adding the operation method for translation as described in the embodiment 2-3 to the above operation method.

Embodiment 2-5

Next, the embodiment 2-5 is described.

In the embodiments 2-3 and 2-4, the three-dimensional pointing method is described in which, after pointing at, and selecting or holding the object 301 in the three-dimensional space 301 represented by the display apparatus 3 by the method in the embodiment 2-1 or 2-2, the pointed object 302 can be translated, rotated or inclined in the depth direction. However, the operator may want to perform, continuously after pointing at the object 302 in the three-dimensional space 301, not only the translation and the rotation of the object 302 but also the conventional two-dimensional GUI-like operation such as editing and deformation and the like. Therefore, in this embodiment 2-5, like the embodiment 1-5, a three-dimensional pointing method is described in which, after the operator points at the object, the pointed object is automatically moved to a position where the two-dimensional GUI-like operation can be applied, so that the operator performs desired editing, deformation and the like, and after that, the operator moves back the object to a three-dimensional position desired by the operator. This embodiment is described with reference to FIGS. 16A-19D used for the embodiment 1-5. In addition, the process procedure of this embodiment is described with reference to FIG. 46. The process procedure shown in FIG. 46 corresponds to the process procedure shown in FIG. 20 in the first embodiment.

In the embodiment 2-5, similar to each before-mentioned embodiment, the electromagnetic induction type pen tablet is used as the input apparatus 2, and a method for pointing and object operation following the pointing is described in which DFD is used as the display apparatus 3 that can represent the three-dimensional space.

The principle of the DFD is as described in the embodiment 1-5 with reference to FIGS. 16A and 16B. Also in this embodiment, in the case when using the DFD as the display apparatus 3, as described in each embodiment, the detection means (digitizer) of the input apparatus (pen tablet) 2 can be overlapped with the display plane of the DFD. In addition, when using the electromagnetic induction type pen tablet, since there is a detection available range of Δz on the detection plane of the detection means, information such as the position/inclination/direction of the input pen can be detected even though the pen tip of the input pen does not contact with the detection plane. Therefore, even when there is a space between display planes in the DFD, it can be easily estimated and can be realized by a person skilled in the art to obtain information such as the position/inclination/direction of the input pen by placing the detection means on the backside of the DFD display apparatus. Further, although currently, the detection means is placed in the backside of the display plane in many cases, the detection means can be also placed on the upper side instead of the backside when the detection means is a transparent electrode. As mentioned above, by overlapping the detection means with the display plane of the DFD, direct pointing can be possible by operating the input pen on the display plane of the front side of the DFD. Thus, also in this embodiment 125, it is assumed that the detection means of the electromagnetic induction type pen tablet 2 is overlapped with the display plane of the DFD.

In addition, in this embodiment 2-5, as shown in FIGS. 17A and 17B, it is assumed that, the number of the display planes of the DFD 3 is two, and that a coordinate system XYZ corresponding to the coordinate system XYZ shown in FIG. 2 is set in the three-dimensional space 301 represented by the DFD 3, and the object 302 is placed at a position of z<0 in the three-dimensional space 301. In addition, it is assumed that the operator who operates the input pen 201 of the input apparatus 2 observes the XY plane of the three-dimensional space 301 from a point of z>0.

In addition, it is assumed that, the display plane 3A in the front side as seen from the operator is z=0, and that the front side display plane 3A is the detection plane of the detection means of the input apparatus 2.

The operator points at the object 302 stereoscopically displayed in the three-dimensional space 301 as shown in FIGS. 18A and 19A by using the method described in the embodiment 2-1 or the embodiment 2-2, for example. Then, the operator checks that the object 302 is pointed at based on the change of the color and the like of the object 302. Then, when the operator performs the operation to select or hold the object 302 using the method of the embodiment 2-1 or 2-2, for example. Accordingly, the pointed object 302 is displayed as a two-dimensional object on the front side display plane 3A of the DFD as shown in FIGS. 18B and 19B, for example, and the pointer 303 disappears. The object 302 is displayed as an object having no thickness in the z direction in FIG. 18A. Although the object is a stereoscopic object having thickness in the z direction, three-dimensional stereoscopic display using DFD is not performed in this process, and the object is displayed as a projected image on the front side display plane 3A of the DFD.

Then, the operator performs desired operation for writing a character, for example, on the object 302 as two-dimensional GUI operation. Then, after the two-dimensional GUI operation ends, when the operator pushes the push button 201D$_3$ of the input pen 201, for example, the pointer 303 appears again, so that the operator can move the object 302 to a desired three-dimensional position and can incline the object in the depth direction by the procedure as described in the embodiments 2-3 and 2-4 as shown in FIGS. 18C and 19C or FIGS. 18D and 19D, for example.

Figure 46:
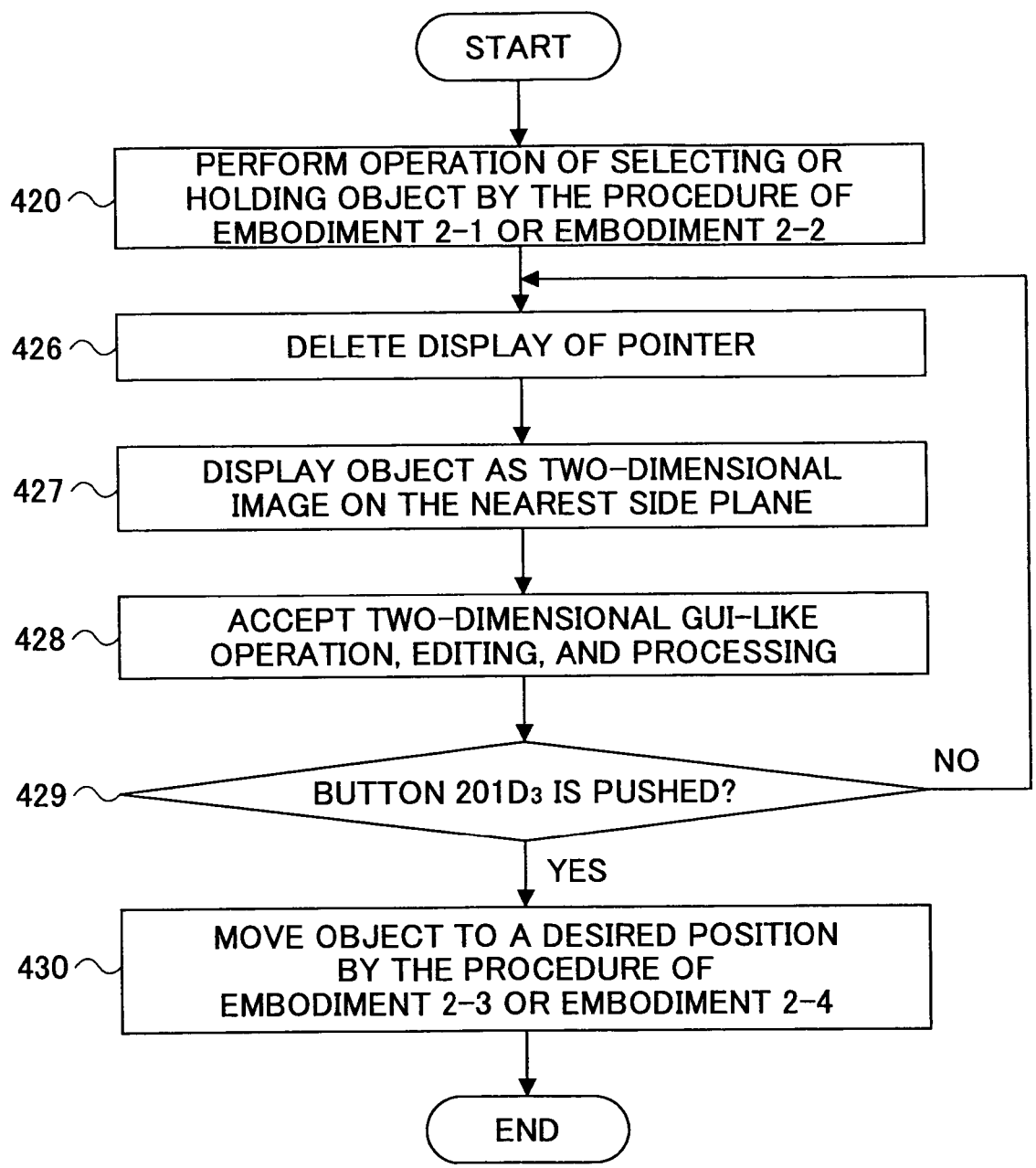
FIG. 46 is a schematic diagram for explaining the three-dimensional pointing method of the embodiment 2-5, and shows a flowchart showing the process procedure of the three-dimensional pointing method in the embodiment 2-5.

To realize such three-dimensional pointing method, it is only necessary to perform processes shown in FIG. 46 in the system control apparatus 1. The first process in FIG. 46 (step 420) is a process until the object 302 in the three-dimensional space 301 is selected or held, and the process can be the same as that described in the embodiment 2-1 or 2-2. Thus, detailed description of it is not given here.

In the three-dimensional pointing method in this embodiment 2-5, when the operation (step 420) to select or hold the object 302 is performed by the procedure described in the embodiment 2-1 or the embodiment 2-2, the system control apparatus 1 determines that operation for starting two-dimensional GUI-like operation/editing/processing is performed. Thus, next, the pointer 303 displayed in the three-dimensional space 301 represented on the display apparatus 3 is hidden (step 426), and a projection image of the selected or held object 302 is displayed on a display plane 3A closest to the operator as seen from the operator (step 427). Accordingly, the system enters a state in which the two-dimensional GUI-like operation/editing/processing for the object 302 can be performed.

After the system enters the state in which the two-dimensional GUI-like operation/editing/processing can be performed, two-dimensional GUI-like operation from the input pen 201 is received and is executed (step 428). In addition, it is determined whether the operator performs operation, such as pushing the push button 201D$_3$ of the input pen 201, for ending two-dimensional GUI-like operation/editing/processing (step 429). At this time, when the operator does not perform the operation for ending the two-dimensional GUI-like operation/editing/processing, other two-dimensional GUI-like operation/editing/processing is received and is executed. On the other hand, when the operator performs the operation for ending the two-dimensional GUI-like operation/editing/processing, the mode returns from the mode for performing the two-dimensional GUI-like operation to the mode for performing operation to perform operation described in the embodiment 2-3 or the embodiment 2-4, so that the operator can perform the operation to translate, rotate and incline the object by the procedure described in the embodiment 2-3 or the embodiment 2-4 (step 430). Since the step 430 can be performed by the procedure described in the embodiment 2-3 or the embodiment 2-4, detailed description is not given.

By performing the above-mentioned processes in the system control apparatus 1, it becomes possible to perform display control for the pointer, three-dimensional operation such as moving the object, and two-dimensional GUI-like operation for the object as shown in FIGS. 18A, 18B, 18C and 18D.

As described above, according to the three-dimensional pointing method of this embodiment 2-5, only by the operations of the input pen 201, the two-dimensional GUI-like operation/editing/processing for the object can be performed in addition to the three-dimensional display control for the pointer, and the operation of the object for three-dimensional movement and the like described in the embodiments 2-1-2-4. Therefore, the operator does not need to learn new three-dimensional operation for performing the two-dimensional GUI-like operation/editing/processing for the object.

In addition, in the three-dimensional pointing method of this embodiment 2-5, the mode is changed from the mode for performing three-dimensional pointing operation to the mode for performing the two-dimensional GUI-like operation/editing/processing by selecting or holding the object by the method of the embodiment 2-1 or the embodiment 2-2, and information obtained by the input information obtaining means 101 of the system control apparatus 1 is processed as information for performing the two-dimensional GUI-like operation/editing/processing for the object. But, the mode may be also changed to the mode for performing the two-dimensional GUI-like operation/editing/processing for the object by operating a specific key of a keyboard or other switch after the operation for pointing at the object.

Although, in this embodiment 2-5, the detection means (digitizer) of the electromagnetic induction type pen tablet that is the input apparatus 2 is overlapped with the display plane of the DFD that is the display apparatus 3 that can display the three-dimensional space, the input apparatus 2 is not limited to this configuration, and a configuration in which the detection means and the display apparatus are separated may be adopted. In addition, although in this embodiment 2-5, the DFD is used as the display apparatus 3, the display apparatus 3 is not limited to this, and a display apparatus such as the liquid crystal display described in embodiments 2-1-2-4 can be used.

Although, in this embodiment 2-5, a two-dimensional rectangular object is taken as an example of the target object 302, the shape is not limited to this and the object 302 may take any shape.

In addition, although, in this embodiment 2-5, the coordinate system of the three-dimensional space represented on the display apparatus 3 is set such that the display plane becomes Z=0 as shown in FIG. 4A like the embodiment 2-1, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 2-5, although the mode for performing the two-dimensional GUI-like operation/editing/processing for the object is ended by operating the push button 201D$_3$ of the input pen 201, the ending method is not limited to this, and any method such as a method using a specified key of a keyboard or other switch instead of the push button 201D$_3$ can be used for ending the movement operation as long as the same effect can be obtained.

In addition, in this embodiment 2-5, although a case for writing a character "A" is taken as an example for directly editing the object 302 as shown in FIG. 18C, for example, a following example may be also possible. In this example, an object representing a file is used as the object 302, and after pointing at the object, when the two-dimensional GUI-like operation is performed, the file opens so that the operator edits the information on the two-dimensional GUI, and after the file closes, the operator can move the object to a desired three-dimensional position.

Embodiment 2-6

The three-dimensional pointing method of this embodiment 2-6 is an application example of the three-dimensional pointing method describe in the embodiment 2-5. In the pointing method, the object 302 in the three-dimensional space 301 is pointed at and selected or held by the method of the embodiment 2-1 or the embodiment 2-2. After that, the pointed object 302 is automatically moved to a position where the operator can easily operate the object, that is, moved to a position where the two-dimension GUI operation can be performed so that the operator performs desired editing, processing and the like. After completing the desired editing and processing, when the operator performs operation, the object 302 moves until the object 302 interferes with another object that is placed in the three-dimensional depth position as seen from the operator. After interfering with the another object, the state of the moved object is changed according to the attribute of the another object. This embodiment is described with reference to FIGS. 21A-25D used for the embodiment 1-6. In addition, the process procedure of this embodiment 2-6 is described with reference to FIG. 47. The process procedure shown in FIG. 47 corresponds to the process procedure shown in FIG. 26 in the first embodiment.

In this embodiment 2-6, similar to the embodiment 2-5, the electromagnetic induction type pen tablet is used as the input apparatus 2, and a method for pointing and object operation is described in which DFD is used as the display apparatus 3.

In addition, it is assumed that the detection means (digitizer) of the input apparatus (pen tablet) 2 is overlapped with the display plane of the display apparatus (DFD) 3 so as to be provided in an integrated manner.

In addition, for explaining the three-dimensional pointing method of this embodiment 2-6, as shown in FIGS. 21A and 21B, an example is explained in which the coordinate system XYZ is set in the three-dimensional space 301 represented between the two display planes of the DFD 3, and the object 302 and a window 304 are placed at a position of Z<0 in the three-dimensional space 301 as shown in FIGS. 21A and 21B.

In this case, the operator who wants to operate the object 302 points at the object 302 and performs operation to select or hold the object 302 as shown in FIGS. 22A and 24A by using the method described in the embodiment 2-1 or the embodiment 2-2, for example. Accordingly, the selected or held object 302 is displayed as a two-dimensional object on the front side display plane 3A of the DFD, and the pointer 303 disappears. In this embodiment 2-6, the object 302 is displayed as an object having no thickness in the z direction in FIG. 18A. Although the object is a stereoscopic object having thickness in the z direction, three-dimensional stereoscopic display using DFD is not performed in this process, and the object is displayed as a projected image on the front side display plane 3A of the DFD.

In this way, when the display method of the object 302 changes, since the system enters the state in which two-dimensional GUI operation can be performed on the three-dimensional space 301, the operator can perform the intended operation such as writing a character on the object 302 as two-dimensional GUI operation with the input pen 201 as shown in FIGS. 22C and 24C. Then, as shown in FIGS. 23A and 25A, after the operator moves the object 302 to a desired position by performing two-dimensional operation, when the operator pushes the push button 201D$_3$ of the input pen 201 once, the object moves in the three-dimensional depth direction as seen from the operator (z<0) until the object 302 interferes with the window 304 as shown in FIG. 23B and FIG. 25B. At this time, by adding animation in which the z coordinate of the object in the three-dimensional depth direction becomes gradually small, the process of movement is easily known by the operator. Then, when the object 302 interferes with the window 304, operation for moving to the window is executed for the object 302 as the attribute of the window 304.

In addition, as shown in FIGS. 23B and 25B. instead of automatically moving the object 302 in the three-dimensional depth direction (z<0), the object 302 can be moved in the three-dimensional depth direction (z<0) to the position where the object interferes with the window 304 after pushing the push button 201D$_3$ of the input pen 201 to change the mode to the three-dimensional object operation mode as described in the embodiment 2-5.

Figure 47:
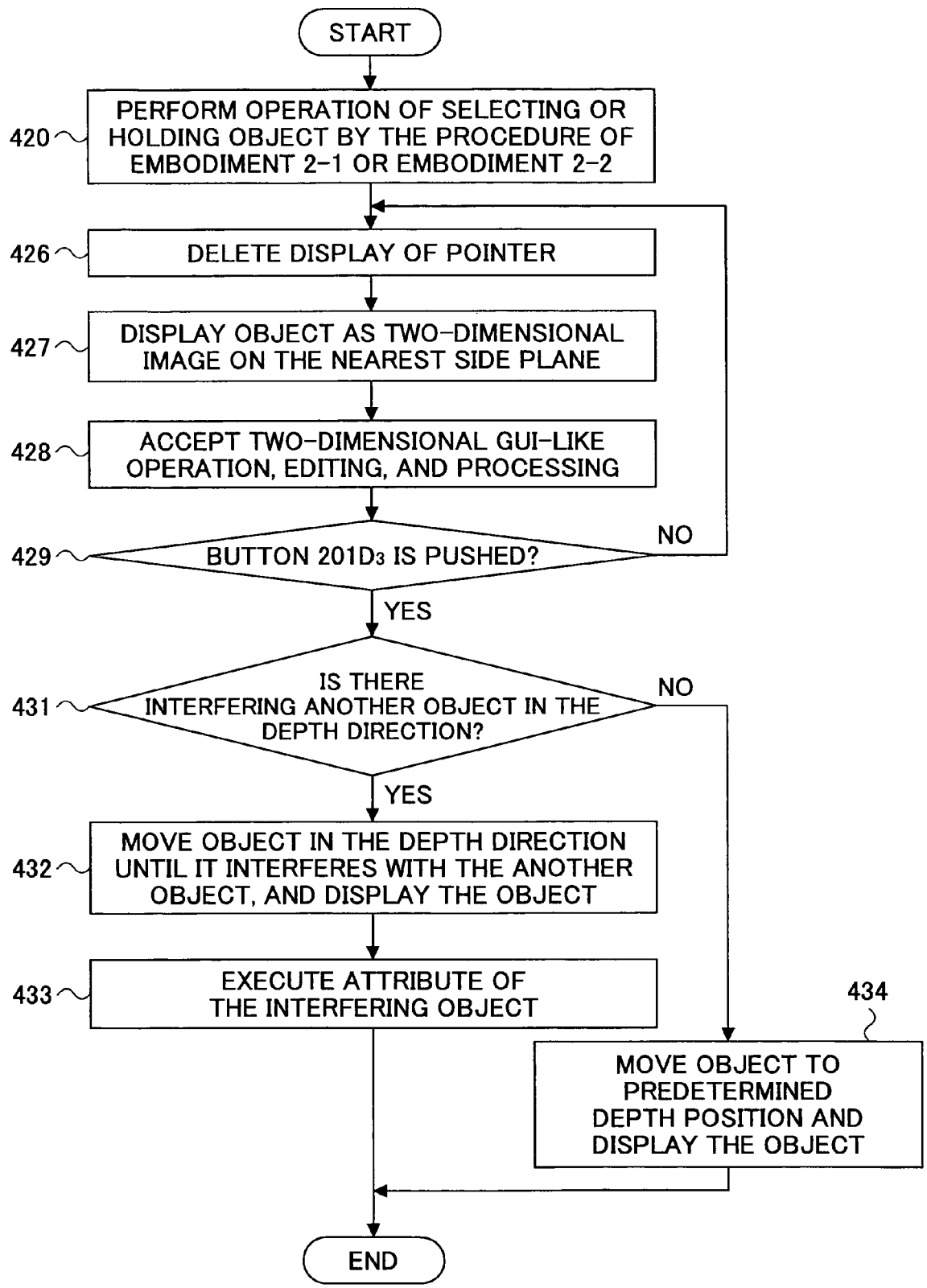
FIG. 47 is a schematic diagram for explaining the three-dimensional pointing method of the embodiment 2-6, and shows a flowchart showing the process procedure of the three-dimensional pointing method in the embodiment 2-6.

To realize such three-dimensional pointing method, it is only necessary to perform processes shown in FIG. 47 in the system control apparatus 1. The first process in FIG. 47 (step 420) is a process until the object 302 in the three-dimensional space 301 is selected or held, and the process can be the same as that described in the embodiment 2-1 or 2-2. Thus, detailed description of it is not given here.

In the three-dimensional pointing method in this embodiment 2-6, when the operation (step 420) to select or hold the object 302 is performed by the procedure described in the embodiment 2-1 or the embodiment 2-2, the system control apparatus 1 determines that operation for starting two-dimensional GUI-like operation/editing/processing is performed. Thus, next, the pointer 303 displayed in the three-dimensional space 301 represented on the display apparatus 3 is hidden (step 426), and a projection image of the selected or held object 302 is displayed on a display plane 3A closest to the operator as seen from the operator (step 427). Accordingly, the system enters a state in which the two-dimensional GUI-like operation/editing/processing for the object 302 can be performed.

After the system enters the state in which the two-dimensional GUI-like operation/editing/processing can be performed, two-dimensional GUI-like operation from the input pen 201 is received and is executed (step 428). In addition, it is determined whether the operator performs operation, such as pushing the push button 201D$_3$ of the input pen 201, for ending two-dimensional GUI-like operation/editing/processing (step 429). At this time, when the operator does not perform the operation for ending the two-dimensional GUI-like operation/editing/processing, other two-dimensional GUI-like operation/editing/processing is received and is executed. On the other hand, when the operator performs the operation for ending the two-dimensional GUI-like operation/editing/processing, the mode returns from the mode for performing the two-dimensional GUI-like operation to the mode for performing operation to perform operation described in the embodiment 2-1-the embodiment 2-4. Accordingly, the system control apparatus 1 determines whether there is another object, such as the window 304, that interferes with the object 302 in the depth direction of the object 302 (step 431). When there is another object that interferes, the object 302 is moved in the three-dimensional depth direction (z<0) as shown in FIG. 23B and FIG. 25B, for example, until it interferes with the object (window 304), and the object 302 is displayed (step 432). Then, at the time when interfering with the another object, the movement of the object 302 in the three-dimensional depth direction stops, and the attribute of the interfering another object is executed for the object 302 (step 433).

On the other hand, when the another object that interferes with the object 302 does not exist, the object 302 is displayed after the object 302 is moved to a predetermined depth position, that is, to a depth position the same as one just before the processes after the step 426 are performed, for example (step 434).

By performing the processes of the procedure shown in FIG. 47, it becomes possible to perform a series of pointer display control, operation for moving the object three-dimensionally and the two-dimensional GUI-like operation as shown in FIGS. 22A, 22B, 22C, 23A and 23B.

As described above, according to the three-dimensional pointing method of this embodiment 2-6, the pointed object 302 is automatically moved to the position where the operator can easily operate the object 302 by pointing at, and selecting or holding the object 302 in the three-dimensional space 301, and the operator can perform the intended editing and processing and the like by the two-dimensional GUI operation, and after completing the intended editing and processing, the object 302 is moved in the three-dimensional direction as seen from the operator, and when the another object that interferes with the moved object 302 exists, the state of the moved object 302 can be changed by the attribute of the another object.

In addition, in the three-dimensional pointing method of this embodiment 2-6, the mode is changed from the mode for performing three-dimensional pointing operation to the mode for performing the two-dimensional GUI-like operation/editing/processing by selecting or holding the object, and information obtained by the input information obtaining means 101 of the system control apparatus 1 is processed as information for performing the two-dimensional GUI-like operation/editing/processing for the object. But, the mode may be also changed to the mode for performing the two-dimensional GUI-like operation/editing/processing for the object by operating a specific key of a keyboard or other switch after the operation for pointing at the object.

Although, in this embodiment 2-6, the detection means (digitizer) of the electromagnetic induction type pen tablet that is the input apparatus 2 is overlapped with the display plane of the DFD that is the display apparatus 3 that can display the three-dimensional space, the input apparatus 2 is not limited to this configuration, and a configuration in which the detection means and the display apparatus are separated may be adopted. In addition, although in this embodiment 2-6, the DFD is used as the display apparatus 3, the display apparatus 3 is not limited to this, and a display apparatus such as the liquid crystal display described in embodiments 2-1-2-4 can be used.

Although, in this embodiment 2-6, a two-dimensional rectangular object is taken as an example of the target object 302, the shape is not limited to this and the object 302 may take any shape.

In addition, although in this embodiment 2-6, the coordinate system of the three-dimensional space represented on the display apparatus 3 is set such that the display surface becomes Z=0 as shown in FIG. 4A like the embodiment 2-1, the origin of the three-dimensional space may be any point as long as the three-dimensional space can be represented, and it is not necessarily the Cartesian coordinate system, and the coordinate system may be the cylindrical coordinate system or the spherical coordinates system.

In addition, in this embodiment 2-6, although the mode for performing the two-dimensional GUI-like operation/editing/processing for the object is ended by operating the push button $201D_3$ of the input pen 201, the ending method is not limited to this, and any method such as a method using a specified key of a keyboard or other switch instead of the push button $201D_3$ can be used for ending the movement operation as long as the same effect can be obtained.

In addition, in this embodiment 2-6, although a case for writing a character "B" is taken as an example for directly editing the object 302 as shown in FIG. 22C, for example, a following example may be also possible. In this example, an object representing a file is used as the object 302, and after pointing at the object, when the two-dimensional GUI-like operation is performed, the file opens so that the operator edits the information on the two-dimensional GUI, and after the file closes, the operator can move the object to a desired three-dimensional position.

In addition, in this embodiment 2-6, a case is described in which the window is taken as an example of the another object, and the attribute of moving the file when interfering with the window 304 is executed. But, the present invention is not limited to this example, and it is also possible to execute an attribute of executing a file when interfering with an icon for executing another application, for example. In addition, it is also possible to execute an attribute of deleting a file when interfering with a trash box object, for example.

In the following, the method for deleting the object in the three-dimensional pointing method of this embodiment 2-6 is described with reference to FIGS. 28A-32C used in the embodiment 1-6.

As described before, in the three-dimensional pointing method of this embodiment 2-6, the object 302 is not only moved to the window 304, but also the object 302 can be deleted by moving the object 302 to the trash object, for example. Thus, as shown in FIGS. 28A and 28B, the procedure for deleting the object 302 is described taking, as an example, a case in which the coordinate system XYZ is set in the three-dimensional space 301 represented between the two display planes of the DFD 3, and the object 302 and the trash box 305 are placed at positions of z<0 in the three-dimensional space 301.

As shown in FIGS. 29A and 31A, first, the operator who wants to delete the object 302 operates the input pen 201 so as to point at the object 302 to be deleted and performs the operation to select or hold the object 302. Then, the pointed object 302 moves to the front side display plane 3A and the state of the object 302 changes to the state in which the two-dimensional GUI operation is possible as shown in FIGS. 29B and 31B. At this time, as shown in FIGS. 30A and 32A, for example, when the operator moves the pointed object 302 to a position above the trash box 305 and performs the specific operation such as operation to push the push button $201D_3$ of the input pen 201 once, the state changes from the state in which the two-dimensional GUI operation is possible to the state in which three-dimensional pointing is possible. When processes performed in the system control apparatus 1 are based on the procedure shown in FIG. 47, after the state returns to the state in which the three-dimensional pointing is possible, the object 302 automatically moves in the three-dimensional direction (z<0), and at the time when the object interferes with the trashy box 305, the object 302 disappears and the trash box 305 changes to a state in which there is a trash (object) in the trash box 305.

As described above, in the three-dimensional pointing method of this embodiment 2-6, the object that interferes with the object 302 may be any object as long as the attribute can be executed for the object 302.

Embodiment 1-7

Figure 48:
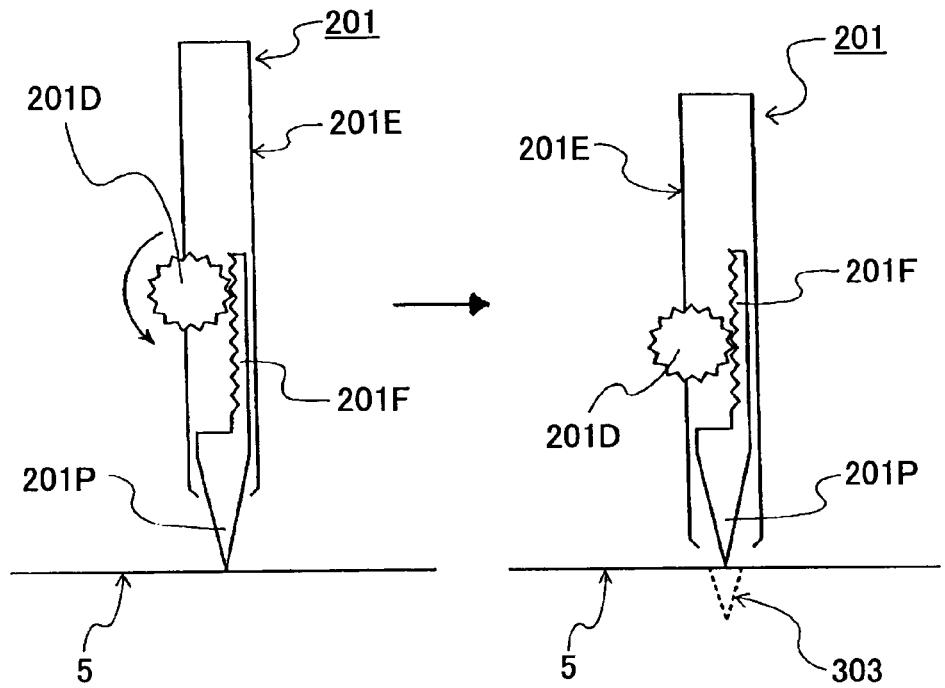
FIG. 48 is a schematic diagram for explaining an outline of the three-dimensional pointing method in the embodiment 2-7, and shows a configuration example of the input pen used for the three-dimensional pointing method in the embodiment 2-7.
Figure 49:
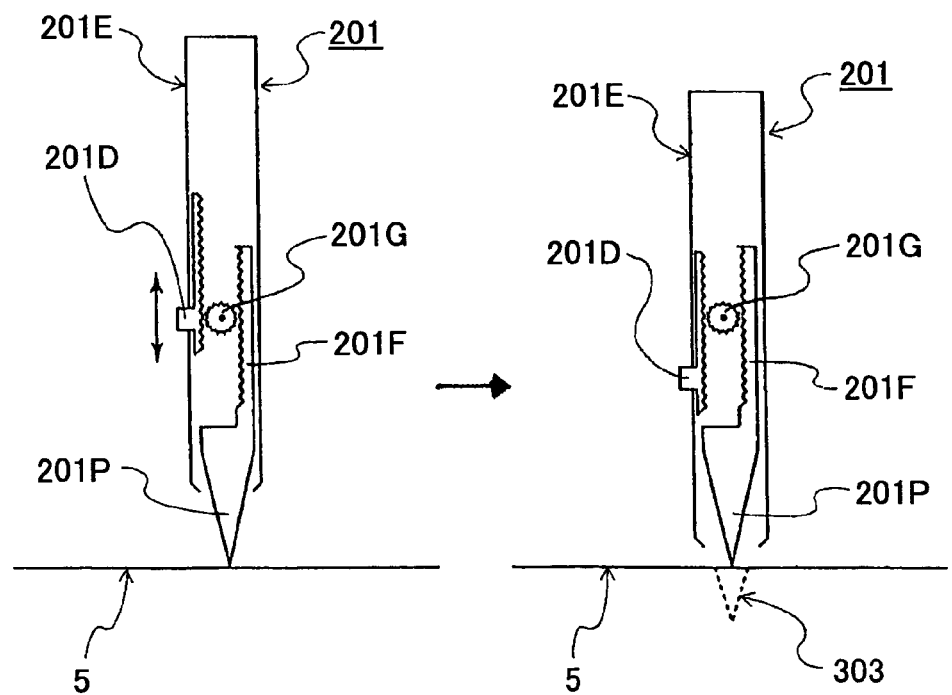
FIG. 49 is a schematic diagram for explaining an outline of the three-dimensional pointing method in the embodiment 2-7, and shows a configuration example of the input pen used for the three-dimensional pointing method in the embodiment 2-7.

Next, the embodiment 2-7 is described. FIGS. 48 and 49 are figures showing configuration examples of the input pen used in the three-dimensional pointing method of this embodiment 2-7.

In this embodiment 2-7, a pointing method is described for using, as the input pen for performing the three-dimensional pointing method as described embodiments 2-1-2-6, an input pen having a structure in which the pen tip 201P enters into or exiting from the case of the input pen 201P according to a rotation amount of a wheel provided in the input pen 201 or a moving amount of a sliding bar.

As shown in FIG. 48, for example, the input pen 201 used in this embodiment 2-7 is configured such that the wheel 201D attached to the case 201E is directly connected to a gear (or screw) part 201F, so that, when the wheel 201D is rotated, the pen tip 201P enters the case 201E. In addition, the structure is not limited to that shown in FIG. 48. For example, as shown in FIG. 49, the input pen 201 may be configured such that the sliding bar 201D is connected to the gear (or screw) part 201F provided in the inside of the pen tip 201P via an inside gear (screw), so that when the sliding bar 201D is moved, the pen tip 201P enters the case 201E. By the way, FIGS. 48 and 49 only show configuration examples of the input pen 201, and any structure can be adopted as long as the pen tip 201P enters the case 201E by rotating or moving the wheel or the sliding bar 201D like the input pen shown in FIGS. 48 and 49.

In the following, the pointing method in this embodiment 2-7 is described with reference to FIGS. 35A-36C used in the embodiment 1-7.

In this embodiment 2-7, a case for performing the pointing method described in the embodiment 2-1 is taken as an example for performing pointing in the three-dimensional space represented on the display apparatus 3 using the input pen 201 having the configuration shown in FIG. 48 or 49. In this case, the electromagnetic induction type pen tablet and the liquid crystal display are used as the input apparatus 2 and the display apparatus 3 similarly to the embodiment 2-1. In addition, it is assumed that the detection means (digitizer) of the input apparatus 2 is overlapped with the display plane of the liquid crystal display 3.

When the operator puts the pen tip 201P of the input pen 201 on an arbitrary one point of the XY plane (z=0) of the liquid crystal display 3, a pointer having a shape, such as a cone, that reflects the shape of the pen tip 201P of the input pen 201 is displayed in the three-dimensional space 301 of the liquid crystal display 3 as shown in FIGS. 35A and 36A, for example.

When the operator rotates the wheel 201D (or moves the sliding bar 201D) of the input pen 201, the length of the pointer 303 to be displayed changes according to the rotation amount of the wheel 201D of the input pen 201 (or the moving amount of the sliding bar 201D) as shown in FIGS. 35B and 36B or FIGS. 35C and 36D, for example.

In this case, by changing the size of the cone-shaped pointer 303 in proportion to the length by which the pen tip 201P is pushed into the body of the input pen 201 as shown in FIGS. 35B and 36B or FIGS. 35C and 36C, the visual effect for feeling that the pointer 303 is a part of the pen tip 201P can be increased compared to the method described in the embodiment 2-1, for example.

In addition, in this embodiment 2-7, although the case for performing the three-dimensional pointing method described in the embodiment 2-1 is taken as an example, it is also possible to perform pointing according to the contact/noncontact state of the pen tip 201P with the detection plane as described in the embodiment 2-2 by using an input pen having a configuration for detecting the contact/noncontact state of the pen tip 201P with the detection plane so as to control entering/exiting of the pen tip 201P into the case 201E by an electronic mechanism.

Embodiment 2-8

Next, the embodiment 2-8 is described. In this embodiment 2-8, a concrete usage scene for the three-dimensional pointing method similar to the embodiments 1-8 is described. This embodiment is described with reference to FIGS. 37A-40C used in the embodiment 1-8.

In this embodiment 2-8, as the usage scene for the three-dimensional pointing method described in the embodiments 2-1-2-7, a remote control including a display screen that can perform three-dimensional display and detection means of the pen tablet is used for operating music reproduction functions. In this embodiment 2-8, since the procedure for display control for the pointer and the object on the display screen of the remote control for operating the input pen 201 can be the same as the procedure described in embodiments 2-1-2-7, detailed description is not given here.

The operator operates the object displayed in the three-dimensional space 301 of the remote control shown in FIGS. 37A and 39A, for example, using the input pen 201 in which the pen tip 201P is depressed into the case as described in the embodiment 2-7. First, as shown in FIGS. 37B and 39B, for example, when the operator points at a reproducing button 302a by operating the input pen 201, the display is changed to a state in which the reproducing button 302a is pushed so that music starts to be reproduced.

In addition, as shown in FIGS. 37C and 39C, for example, the volume of the reproduced music can be turned up or down by pointing at the volume knob 302b by operating the input pen 201 and by moving the input pen while pushing the button 201D of the input pen so as to rotate the knob 302b, for example.

The operation for turning up or down the volume is not limited to the operation shown in FIGS. 37C and 39C. The operation for turning up or down the volume can be also realized by, after pointing at the knob 302b at a position around the center of the knob 302b, rotating the input pen 201 around the axis so as to rotate the knob 302b as shown in FIGS. 38A and 40A, for example.

In addition, as shown in FIGS. 38B and 40B, for example, by configuring the system such that, when pointing at the region 302C on which information on the reproduced music is displayed, the region 302c is changed to two-dimensional display so as to enter a state in which the two-dimensional GUI operation can be performed, as shown in FIGS. 38C and 40C, music can be skipped to a target track number by inputting the track number of music that the operator wants to reproduce in the region 302c by combining with a function for recognizing hand-written character, for example.

As mentioned above, by utilizing the three-dimensional pointing method of the embodiments 2-1-2-7, the object such as the operation button in the three-dimensional space can be operated easily and intuitively.

In addition, in this embodiment 2-8, although an operation example for operating a musical apparatus using the remote control is shown, the present invention is not limited to this example, and the method can be also applied to operations for apparatuses such as PDA, mobile phone, kiosk terminal, and ATM and the like that can be take the similar form, so that each apparatus can be operated more intuitively. In addition, in the operation in this embodiment, although music is reproduced, the volume is turned up and the track is changed, the operation is not limited to these, and any operation can be performed as long as the operation can be related to operations of the input pen 201.

In addition, in this embodiment, although hand-written character recognition is used for inputting the track number, any method can be used as long as the method can be realized by two-dimensional GUI, and an input method displaying track numbers using a pull-down menu to select a track number with the input pen 201 can be used, for example.

In addition, the three-dimensional pointing apparatus is not necessarily a specific apparatus specialized in realizing the three-dimensional pointing method. The three-dimensional pointing apparatus can be realized by a computer (system control apparatus) such as a PC and a three-dimensional pointing program for causing the computer to execute the three-dimensional pointing method described in each embodiment as shown in FIG. 41, for example. In this case, as long as the three-dimensional pointing program is recorded in a state in which the program can be read by the computer, the program can be recorded in any of magnetic, electrical, and optical recording mediums. In addition, the three-dimensional pointing program is not only provided by recording it in the recording medium but also can be provided via a network such as the Internet.

Third Embodiment

Next, the third embodiment of the present invention is described. The third embodiment corresponds to the second object of the present invention.

In the three-dimensional pointing method of the third embodiment, a pointer and an object are displayed in the three-dimensional space represented by the display apparatus. Then, when operation for moving the pointer in the depth direction is performed in order to point at an arbitrary point in the three-dimensional space with the pointer, a part for performing pointing in the pointer is moved in the depth direction while keeping depth position, shape and size of a part of the pointer different from the part for performing pointing to be constant. Then, when there is the object at a three-dimensional space position at which the part for performing pointing points, the object is displayed after the state of the object is changed to a state indicating that the object is pointed. Accordingly, the operator of the pointer can recognize the depth position of the pointer and the position at which the pointer points easily and accurately.

Figure 50:
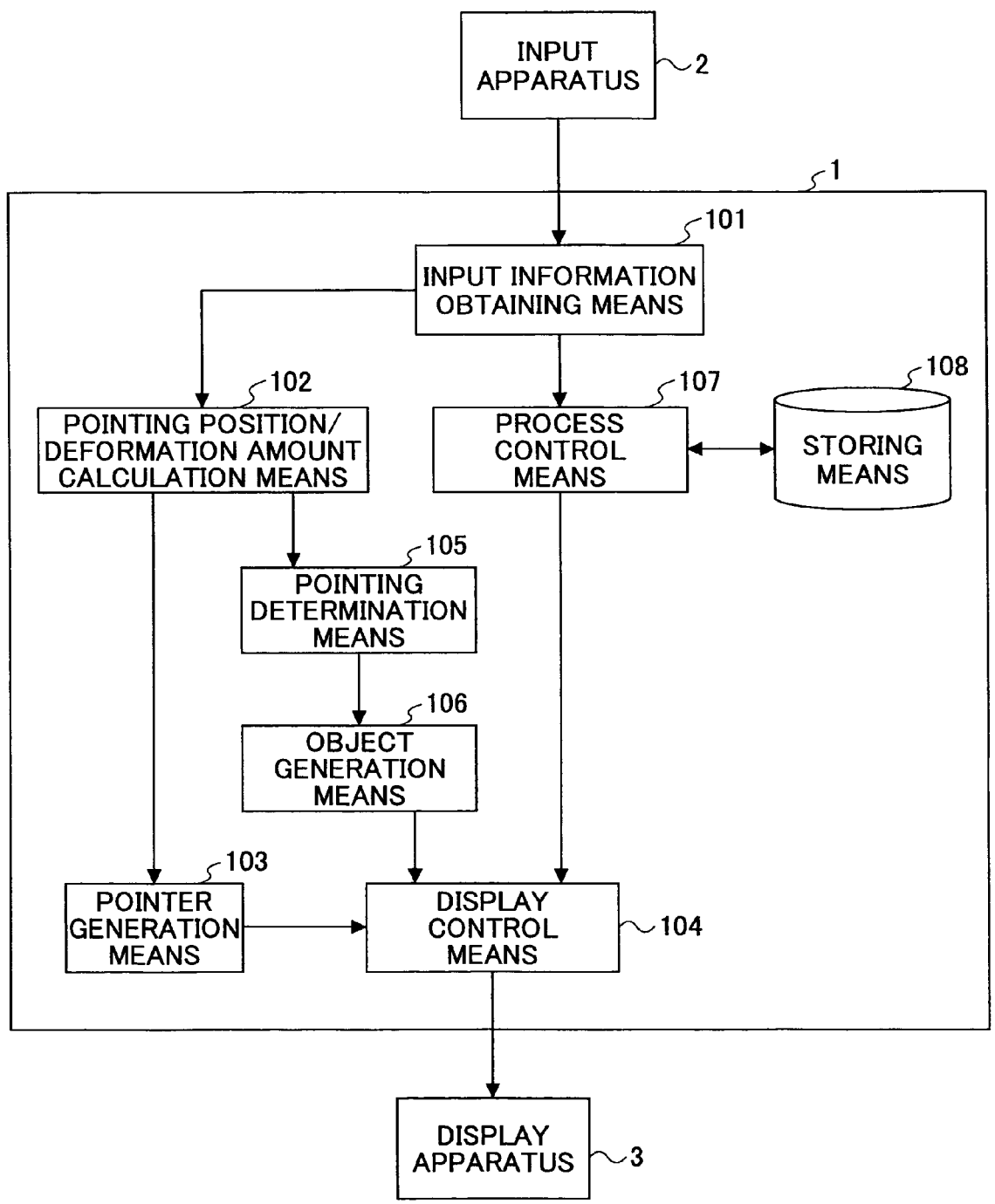
FIG. 50 is a schematic diagram showing a configuration example of a system for realizing the three-dimensional pointing method in the third embodiment.

FIG. 50 shows a configuration example of a system for realizing the three-dimensional pointing method of the present invention. In FIG. 50, 1 indicates a pointing apparatus (system control apparatus), 101 indicates an input information obtaining means, 102 indicates a pointing position/deformation amount calculation means, 103 indicates a pointer generation means, 104 indicates a display control means, 105 indicates a pointing determination means, 106 indicates an object generation means, 107 indicates a process control means, 108 indicates a storing means, 2 indicates an input apparatus and 3 indicates a display apparatus.

The three-dimensional pointing method of this embodiment is preferably applied for three-dimensionally operating a pointer in the three-dimensional space represented on the display apparatus connected to the system control apparatus such as a PC, for example, using the input apparatus connected to the system control apparatus so as to point at an arbitrary point in the three-dimensional space.

As shown in FIG. 50, for example, the system control apparatus 1 includes the input information obtaining means 101 for obtaining input information input from the input apparatus 2, a pointing position/deformation amount calculation means 102 for, when the input information obtained by the input information obtaining means 101 is information (pointer operation information) related to operation of the pointer, calculating the pointing position and the deformation amount of the pointer after calculating the moving direction and the moving amount of a pointed point based on the input information, a pointer generation means 103 for generating the pointer based on calculation results of the pointing position/deformation amount calculation means 102, and a display control means 106 for causing the display apparatus 3 to display the pointer generated by the pointer generation means 103. In addition, as shown in FIG. 50, in addition to the above-mentioned means, the system control apparatus 1 includes a pointing determination means 105 for determining whether there is an object that is pointed at by the pointer generated based on the calculation result of the pointing position/deformation amount calculation means 102, that is, whether there is an object at the xyz coordinates of the point pointed by the pointer, and an object generation means 106 for, when there is the pointed object, changing the color of the object, for example.

The system control apparatus 1 is an apparatus, such as the PC for example, for launching and operating software according to input information from the input apparatus 2 and for controlling other apparatus, and includes, in addition to the before-mentioned means, the process control means 107 and the storing means 108 as shown in FIG. 50, for example. Then, when information obtained by the input information obtaining means 101 is different from the information on the pointer operation information, the process control means 107 performs processes according to the obtained information.

That is, it is not necessary to use a special three-dimensional pointing apparatus for the three-dimensional pointing method of this embodiment, and the three-dimensional pointing method of this embodiment can be realized by using the existing system control apparatus 1 shown in FIG. 50.

In addition, the input apparatus 2 is not limited to the input apparatus such as the keyboard and the mouse that are generally connected to the system control apparatus 1 (PC), and the input apparatus 2 can be an input apparatus such as a pen tablet, a joy stick (joy pad) and the like. In addition, the operation of the pointer can be performed using one kind of input apparatus such as the mouse or the keyboard, and also can be performed using more than one kind of input apparatus such as combination of mouse operation and pushing of a specific key on the keyboard. In addition, the input apparatus 2 may be integrated with a display plane of the display apparatus like the touch panel and the pen tablet (refer to Japanese Laid-Open Patent Application No. 5-73208, for example). By using such input apparatus 2, the pointer operation information can be input by touching the display screen of the display apparatus 3.

In addition, it is only necessary that the display apparatus is a display apparatus that can represent the three-dimensional space. For example, the display apparatus 3 may be a two-dimensional display apparatus such as a CRT display and a liquid crystal display for displaying a three-dimensional object as an image that is projected on the two-dimensional plane, or may be a display apparatus such as DFD (refer to Japanese Patent No. 3022558 and Japanese Patent No. 3460671, for example) that can represent a three-dimensional stereoimage. That is, the display apparatus 3 may be any display apparatus by which the operator (observer) can recognize (perceive) the position and the shape of the displayed pointer and object three-dimensionally.

Embodiment 3-1

Figure 51:
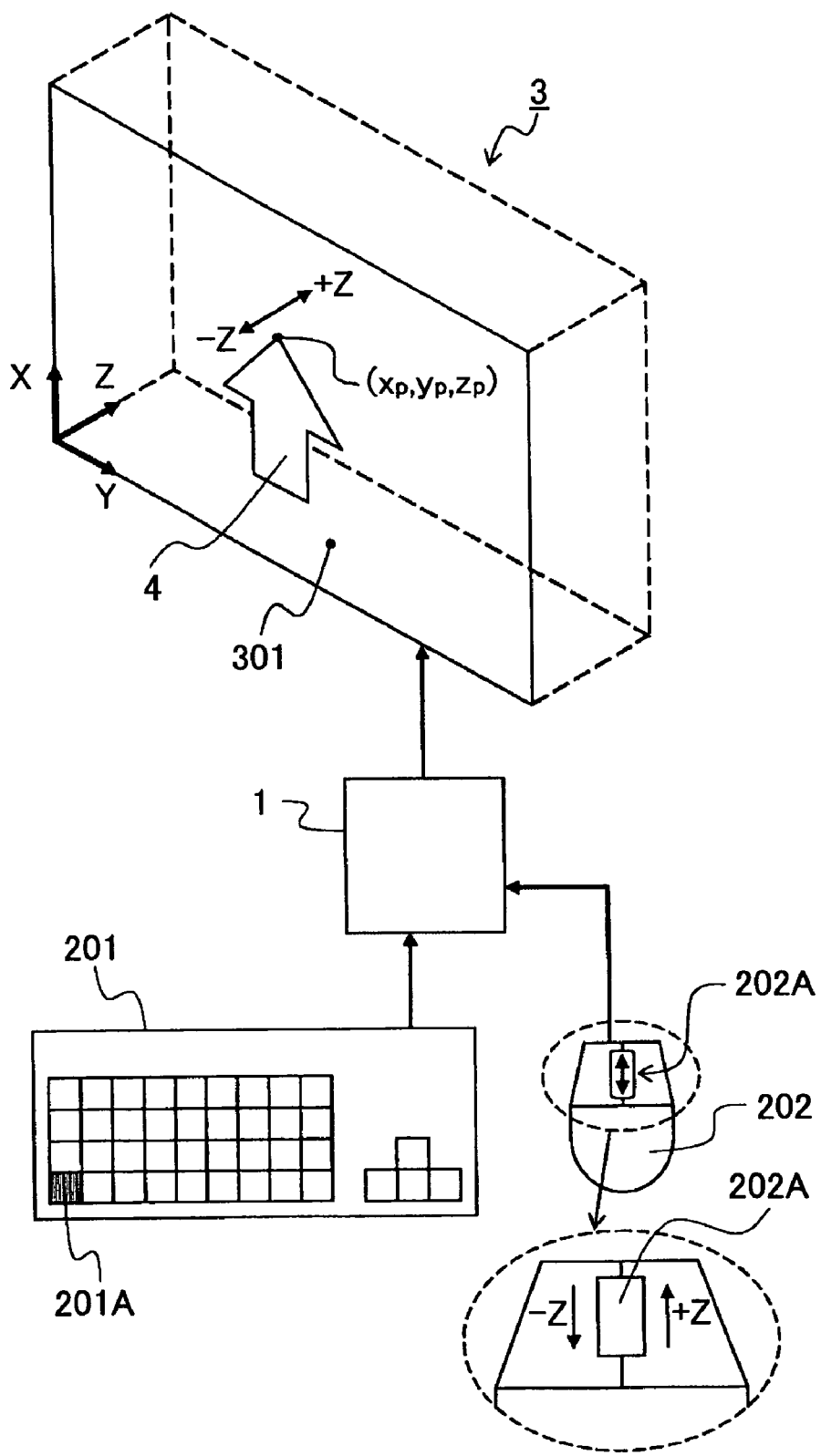
FIG. 51 is a schematic diagram for explaining the three-dimensional pointing method of the embodiment 3-1, and for describing a method for operating the pointer.
Figure 52:
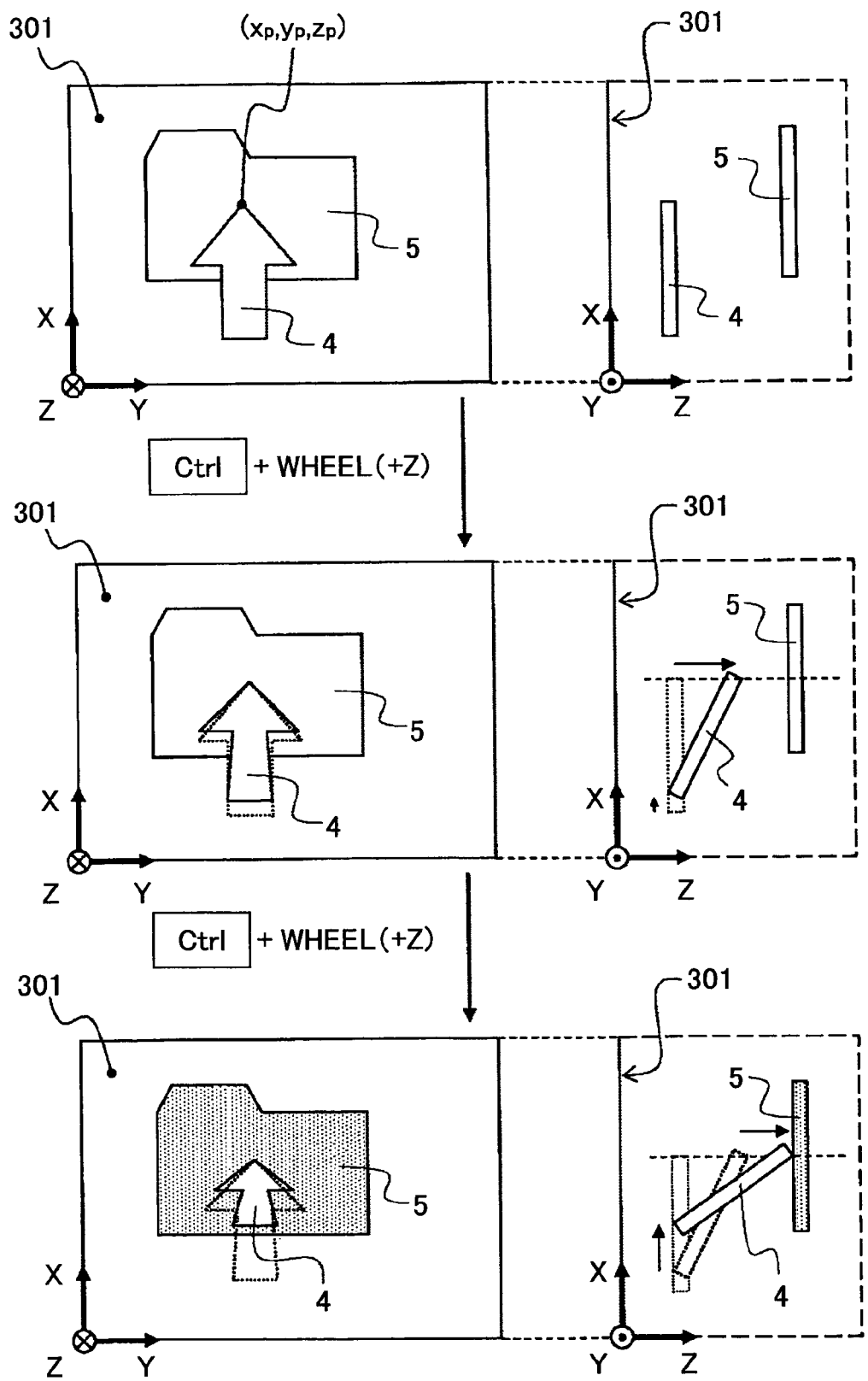
FIG. 52 is a schematic diagram for explaining the three-dimensional pointing method of the embodiment 3-1, and shows a front view and a right side view showing change in the three-dimensional space when pointing at an object in the rear side of the pointer.
Figure 53:
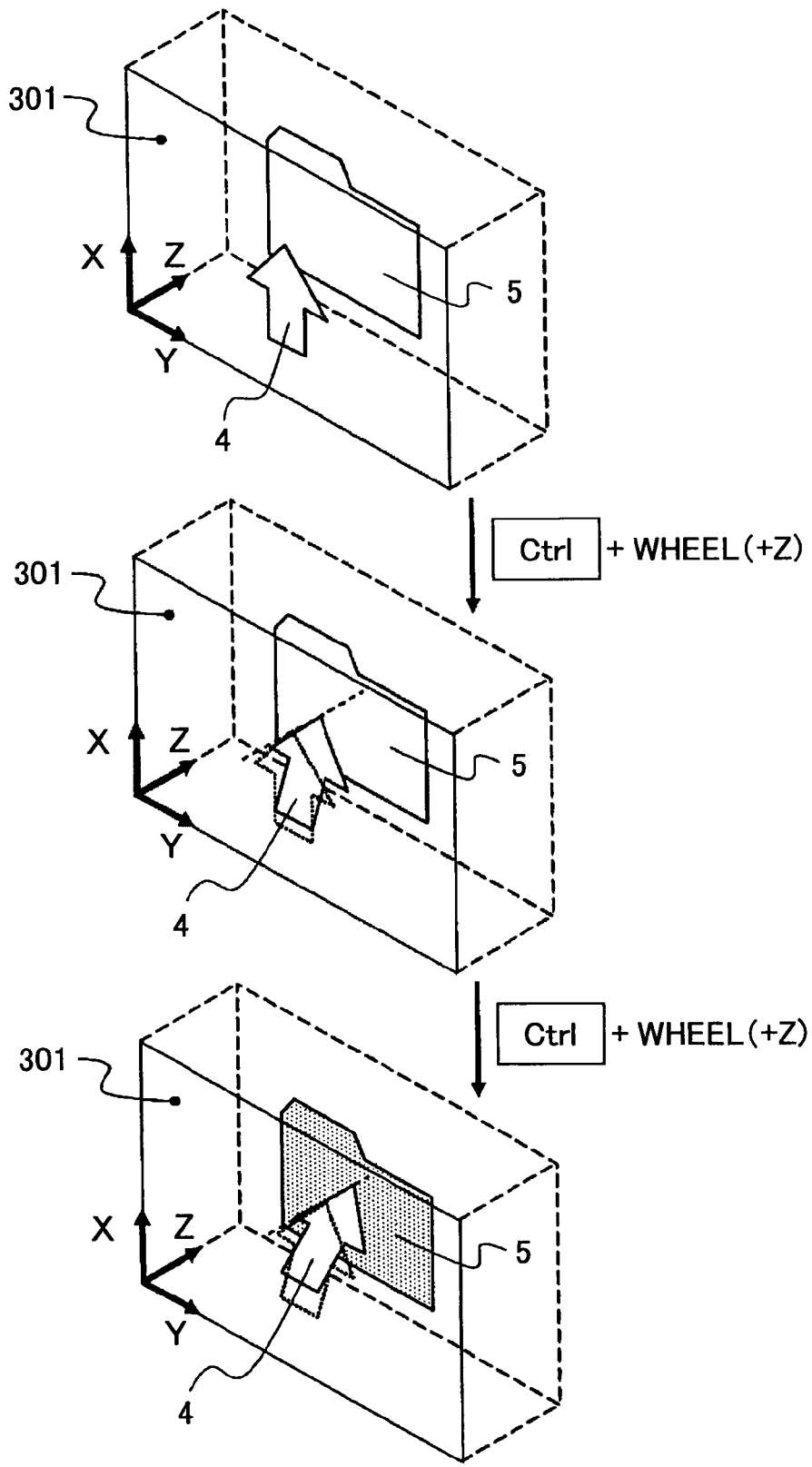
FIG. 53 is a schematic diagram for explaining the three-dimensional pointing method of the embodiment 3-1, and shows a perspective view of the change in the three-dimensional space in FIG. 52.
Figure 54:
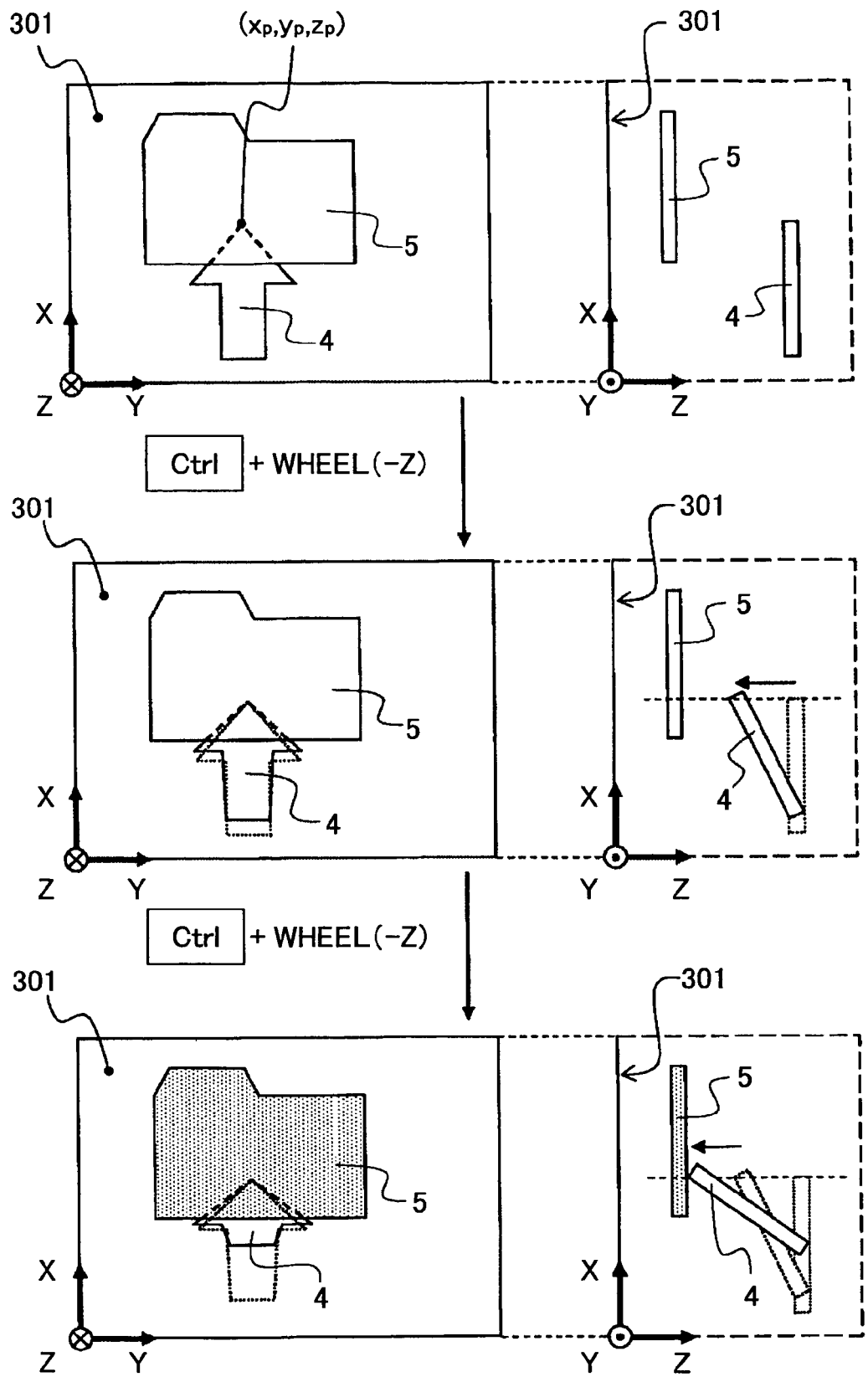
FIG. 54 is a schematic diagram for explaining the three-dimensional pointing method of the embodiment 3-1, and shows a front view and a right side view showing change in the three-dimensional space when pointing at an object in the front side of the pointer.
Figure 55:
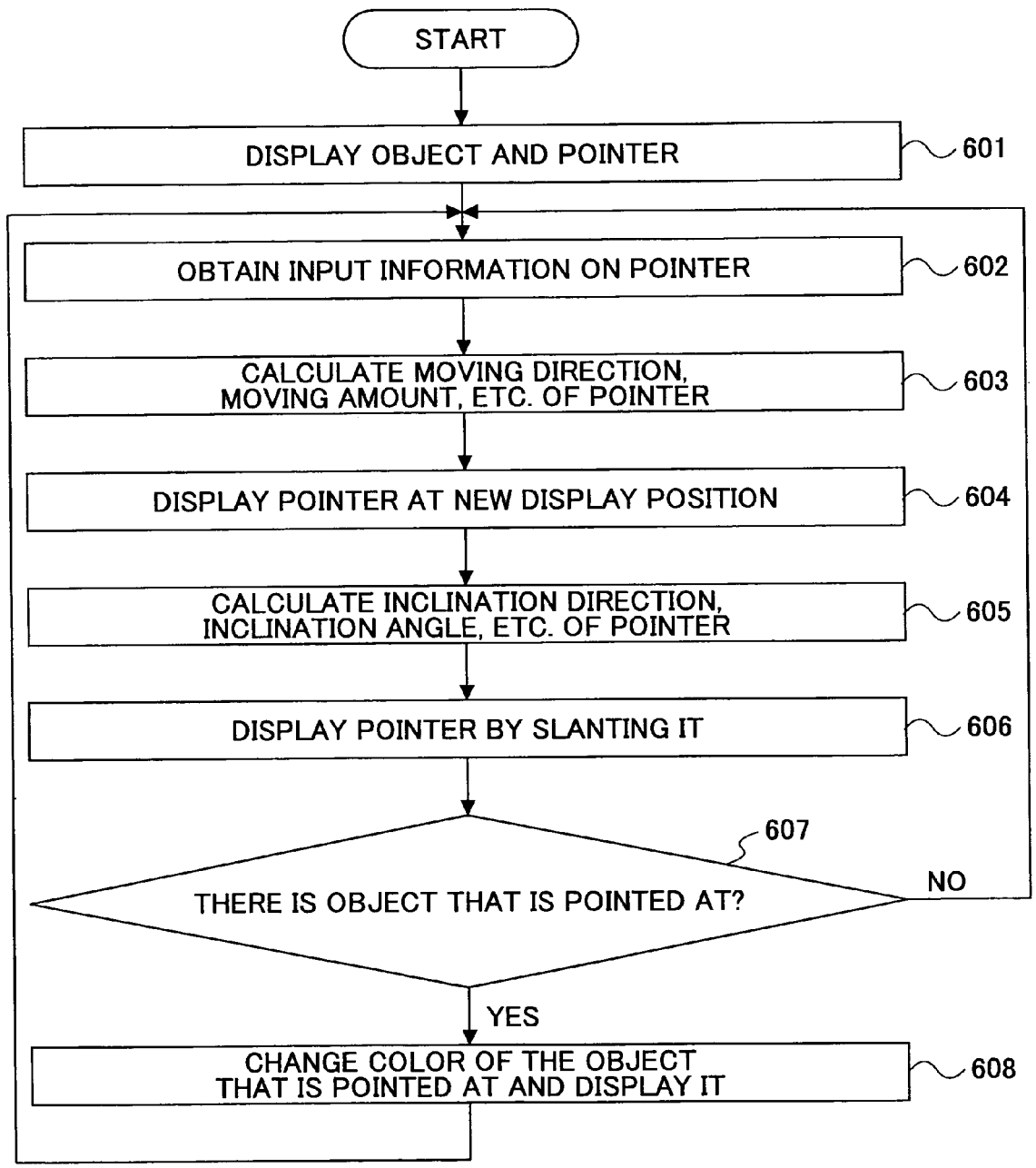
FIG. 55 is a schematic diagram for explaining the three-dimensional pointing method of the embodiment 3-1, and shows a flowchart for describing a process procedure when the system control apparatus (pointing apparatus) executes the three-dimensional pointing method of this embodiment 3-1.

FIGS. 51-55 are schematic diagrams for describing the three-dimensional pointing method of the embodiment 3-1 of the present invention. FIG. 51 is a figure for describing a method for operating the pointer. FIG. 52 shows a front view and a right side view showing change in the three-dimensional space when pointing at an object in the rear of the pointer. FIG. 53 is a perspective view of the change in the three-dimensional space in FIG. 52. FIG. 54 shows a front view and a right side view showing change in the three-dimensional space when pointing at an object in front of the pointer. FIG. 55 is a flowchart for describing a process procedure when the system control apparatus (pointing apparatus) executes the three-dimensional pointing method of this embodiment 3-1. By the way, FIG. 52 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages. FIG. 53 also shows three states in the upper stage, the middle stage, and the lower stage respectively, in which each stage shows a perspective view of the situation in the three-dimensional space for the upper stage, the middle stage, or the lower stage in FIG. 52. Similarly, FIG. 54 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages.

In FIG. 51, 1 indicates the system control apparatus, 201 indicates the keyboard, 202 indicates the mouse, 3 indicates the display apparatus (two-dimensional display apparatus), 301 indicates the display plane, and 4 indicates the pointer.

In this embodiment 3-1, as shown in FIG. 51, the three-dimensional pointing method is described taking a case, as an example, in which the keyboard 201 and the mouse 202 are used as the input apparatus 2 and a two-dimensional display apparatus such as a liquid crystal display is used as the display apparatus 3.

In addition, as shown in FIG. 51, for example, in the three-dimensional space represented by the display apparatus 3, it is assumed that the display plane 301 is z=0 so that the display plane 301 is the XY plane, and that a three-dimensional coordinate system XYZ is set in which the direction heading to the back side from the display plane 301 as seen from the operation is the positive direction of the z axis. In this case, it is assumed that the moving direction and the moving distance of the pointer in the XY plane displayed in the three-dimensional space are calculated (determined) based on the moving direction and the moving distance when moving the body of the mouse 202 two-dimensionally on a plane such as a desk.

In addition, as shown in FIG. 51, for example, the moving direction and the moving distance in the depth direction (z direction) are calculated (determined) based on a rotation direction and a rotation angle of a wheel 202A of the mouse 202 when rotating the wheel 202A while pushing a predetermined key 201A such as a control key (Ctrl key) of the keyboard 201. In this case, as shown in FIG. 51, for example, when rotating the wheel 202A of the mouse in the +Z direction, the part for performing pointing in the pointer is moved in the +Z direction, that is, in the direction heading to the back side seen from the operator. When rotating the wheel 202A of the mouse in the −Z direction, the part for performing pointing in the pointer is moved in the −Z direction, that is, in the direction heading to the front side as seen from the operator.

In addition, in the three-dimensional pointing method in this embodiment 3-1, it is assumed that the shape of the pointer 4 is an arrow shape, and that the tip of the arrow indicates a point $(x_p, y_p, z_p)$ for pointing. When the part for performing pointing in the arrow-shaped pointer 4 is moved in the depth direction, the pointer 4 is inclined by moving the part of the arrow in the depth direction while keeping the depth position of an end of the opposite side of the tip of the arrow to be constant.

As an example of the three-dimensional pointing method, a pointing method is described in a case where the pointer 4 and the object 5 are displayed in different positions in the three-dimensional space as shown in the upper stage of FIG. 52 and the upper stage of FIG. 53. From the viewpoint of the operator who sees the three-dimensional space from −Z direction, the pointer 4 is seen such that it overlaps on the object 5. But, since depth positions between the point $(x_p, y_p, z_p)$ at which the pointer 4 points and the object 5 are different, the object is not pointed at.

From this state, it is assumed that the operator rotates the wheel 202A of the mouse in the +Z direction while pushing the control key (Ctrl key) 201A of the key board, for example. Then, as shown in the middle state of FIG. 52 and the middle stage of FIG. 53, for example, the tip part of the arrow moves in the +Z direction while the depth position of the end of the opposite side of the tip of the arrow is kept constant so that the part of the arrow inclines in the depth direction as seen from the operator. By the way, the middle stage of FIG. 52 and the middle stage of FIG. 53 show an example in which the pointer is inclined while the XY coordinates $(x_p, y_p)$ of the pointing point of the pointer are kept constant and also the shape and the size of the pointer 4 are kept constant. Therefore, for keeping the depth position constant, the end of the opposite side of the tip of the arrow moves in the +X direction as shown in the middle state of FIG. 52 and the middle stage of FIG. 53.

As described above, by rotating the wheel 202A of the mouse in the +Z direction while pushing the control key 201A of the keyboard, the pointer 4 inclines such that the pointing point (the part of the tip of the arrow) goes farther as seen from the operator. In addition, at this time, by rotating the pointer 4 while keeping the shape of the size of the pointer 4, the part of the arrow of the pointer 4 is displayed such that the width of the part is narrowed. As a result, the operator can recognize that the pointer 4 inclines in the depth direction (+Z direction), and at the same time, the operator can also recognize that the pointer 4 points at a position in the back side of the position before operation from the shape of the pointer 4.

However, the three-dimensional pointing method of this embodiment 3-1 is not limited to the inclining method of the pointer 4 shown in the middle stage of FIG. 52 and the middle stage of FIG. 53. As described after, any inclining method can be adopted as long as the depth position of the end of the opposite side of the tip of the arrow is kept constant.

Then, from the state shown in the middle stage of FIG. 52 and the middle stage of FIG. 53, it is assumed that the operator rotates the wheel 202A of the mouse in the +Z direction while pushing the control key 201A of the key board once again. Then, also at this time, as shown in the lower stage of FIG. 52 and the lower stage of FIG. 53, the tip part of the arrow moves in the +Z direction while the depth position of the end of the opposite side of the tip of the arrow is kept constant so that the part of the arrow further inclines in the depth direction seen from the operator. In addition, by rotating the pointer 4 while keeping the shape of the size of the pointer, the part of the arrow of the pointer 4 is displayed such that the width of the part is further narrowed. As a result, the operator can recognize that the pointer 4 further inclines in the depth direction (+Z direction), and at the same time, the operator can also recognize that the pointer 4 points a position in the further back side of the position before operation from the shape of the pointer 4.

In addition, at this time, as a result for continuing the operation to rotate the wheel 202A of the mouse in the +Z direction while pushing the control key 201A of the keyboard, when the pointing point $(x_p, y_p, z_p)$ of the pointer 4 reaches the depth position of the object so that the xyz coordinates $(x_p, y_p, z_p)$ of the tip of the pointer 4 become the same as xyz coordinates of an arbitrary point on the surface or in the inside of the object 5 as shown in the lower stage of FIG. 52 and the lower stage of FIG. 53, the object 5 enters a state in which it is pointed at by the pointer 4. Therefore, for example, the state in which it is pointed is indicated by changing the color of the object 5. By doing so, the operator can recognize the depth position of the pointer 4 and the depth position at which the pointer is pointing from the shape of the pointer intuitively and accurately. In addition, by changing the color of the object 5 when the pointer 4 points at the object 5, it can be recognized intuitively and accurately whether the pointer 4 that overlaps on the object 5 points at the object 5.

In FIGS. 52 and 53, operation is described in which the pointer 4 is placed in front of the depth position of the object 5 and the pointer 4 is inclined to the rear side (+Z direction). In the three-dimensional pointing method in this embodiment 3-1, the pointer 4 can be also inclined to the front side (−Z direction).

As an example of the case for inclining the pointer 4 to the front side (−Z direction), a case is described in which the pointer 4 is placed in the back of the depth position of the object 5. From the viewpoint of the operator who sees the three-dimensional space from −Z direction, the tip part of the arrow of the pointer 4 is seen such that it overlaps on the object and is hidden. But, since depth positions between the point $(x_p, y_p, z_p)$ at which the pointer points and the object are different, the object is not pointed at.

From this state, it is assumed that the operator rotates the wheel 202A of the mouse in the −Z direction while pushing the control key 201A of the key board, for example. Then, as shown in the middle stage of FIG. 54, for example, the tip part of the arrow moves in the −Z direction while the depth position of the end of the opposite side of the tip of the arrow is kept constant so that the part of the arrow inclines to the front side as seen from the operator. By the way, the middle stage of FIG. 54 shows an example in which the pointer is inclined while the XY coordinates $(x_p, y_p)$ of the pointing point of the pointer are kept constant and also the shape and the size of the pointer 4 are kept constant. Therefore, for keeping the depth position constant, the end of the opposite side of the tip of the arrow moves in the +X direction as shown in the middle state of FIG. 54.

As described above, by rotating the wheel 202A of the mouse in the −Z direction while pushing the control key 201A of the keyboard, the pointer 4 inclines such that the pointing point $(x_p, y_p, z_p)$ comes close as seen from the operator. In addition, at this time, by rotating the pointer 4 while keeping the shape of the size of the pointer 4, the part of the arrow of the pointer 4 is displayed such that the width of the part is widened. As a result, the operator can recognize that the pointer 4 inclines in the depth direction (+Z direction), and at the same time, the operator can also recognize, from the shape of the pointer 4, that the pointer 4 points a position in front of the position before operation.

Then, from the state shown in the middle stage of FIG. 54, it is assumed that the operator rotates the wheel 202A of the mouse in the −Z direction while pushing the control key 201A of the key board once again. Then, also at this time, as shown in the lower stage of FIG. 54, the tip part of the arrow moves in the −Z direction while the depth position of the end of the opposite side of the tip of the arrow is kept constant so that the part of the arrow further inclines to the front side as seen from the operator. In addition, by rotating the pointer 4 while keeping the shape of the size of the pointer, the part of the arrow of the pointer 4 is displayed such that the width of the part is further widened. As a result, the operator can recognize that the pointer 4 further inclines in the depth direction (−Z direction), and at the same time, the operator can also recognize, from the shape of the pointer 4, that the pointer 4 points at a position in further front side of the position before operation.

In addition, at this time, as a result for continuing the operation to rotate the wheel 202A of the mouse in the −Z direction while pushing the control key 201A of the keyboard, when the pointing point $(x_p, y_p, z_p)$ of the pointer 4 reaches the depth position of the object so that the xyz coordinates $(x_p, y_p, z_p)$ of the tip of the pointer 4 become the same as xyz coordinates of an arbitrary point on the surface or in the inside of the object 5 as shown in the lower stage of FIG. 54, the object 5 enters a state in which it is pointed at by the pointer 4. Therefore, for example, the state in which it is pointed is indicated by changing the color of the object 5. By doing so, the operator can recognize the depth position of the pointer 4 and the depth position at which the pointer is pointing from the shape of the pointer intuitively and accurately. In addition, by changing the color of the object 5 when the pointer 4 points at the object 5, it can be recognized intuitively and accurately whether the pointer 4 that overlaps on the object 5 points at the object 5.

By the way, when displaying the pointer 4 while inclining the pointer 4 in the depth direction (+Z direction or −Z direction) in synchronization with the rotation of the wheel 202A of the mouse, the pointer 4 may be displayed such that the pointer 4 continuously inclines in synchronization with the total rotation angle of the wheel 202A, or may be displayed such that the pointer 4 inclines in incremental steps of a predetermined angle in synchronization with the rotation steps of the wheel 202A.

For causing the system control apparatus 1 (pointing apparatus) to perform the three-dimensional pointing method of this embodiment 3-1, the processes of steps 601-608 shown in FIG. 55 can be executed by the system control apparatus 1. In this case, as shown in FIG. 55, first, the system control apparatus 1 causes the display apparatus 3 to display the object 5 and the pointer 4 using the display control means 104 (step 601). At this time, a plurality of objects 5 may be displayed. In addition, the object 5 and the pointer 4 may be displayed at any positions in the three-dimensional space represented by the display apparatus 3.

Next, the input information obtaining means 101 obtains information input by the operator using the input apparatus 2 such as the keyboard and the mouse 202 and the like (step 602). At this time, the input information obtaining means 101 may obtain input information such as information on launching of application software in addition to information (pointer operation information) on operation of the pointer 4, but, it is assumed that the information on the operation of the pointer 4 is obtained. It is determined whether the input information obtained by the input information obtaining means 101 is the pointer operation information. When the input information is the pointer operation information such as moving information (operation information) of the mouse 202 or rotation operation information of the wheel 202A or the like, for example, the input information obtaining means 101 passes the input information (pointer operation information) to the pointing position/deformation amount calculation means 102 so as to cause the pointing position/deformation amount calculation means 102 to calculate the pointing position and the deformation amount of the pointer.

At this time, as shown in FIG. 55, for example, the pointing position/deformation amount calculation means 102 calculates the moving direction, moving amount and the like of the pointer based on the pointer operation information (step 603). In the step 603, the pointing position/deformation amount calculation means 102 calculates the moving direction and the moving amount or the rotation angle or the like of the pointer 4 in the XY plane of the three-dimensional space represented by the display apparatus using the information of the two-dimensional moving direction and moving amount of the body of the mouse.

After calculating the moving direction, the moving amount and the like of the pointer 4 in step 603, next, the pointer 4 displayed on the display apparatus 3 is moved and displayed based on the calculation result (step 604). In step 604, after the pointer generation means 103 generates the pointer 4 at the moving destination based on the moving direction, moving amount and the like in the XY plane of the pointer 4, the display apparatus 3 is caused to display the generated pointer 4 using the display control means 104. By the way, when the pointer operation information does not include information for moving or rotating the pointer 4 in the XY plane, the operation of the step 604 is not performed, and the next process in step 605 is performed.

When the process of the step 603 ends, the pointing position/deformation amount calculation means 102 causes the pointer generation means 103 and the display control means 104 to perform the process of the step 604, and calculates the inclining direction and the inclining amount for the pointer 4 based on the pointer operation information (step 605). In the step 605, the inclining direction is determined from information of the rotation direction of the wheel 202A of the mouse 202, for example. In addition, the inclining amount is calculated from the rotation amount of the wheel 202A of the mouse 202, for example.

After calculating the inclining direction and the inclining amount of the pointer 4 in the step 605, next, the display apparatus 3 displays the pointer 4 by inclining it based on the calculation result (step 606). In the step 606, for example, after the pointer generation means 103 inclines the pointer based on the inclining amount of the pointer 4, the display apparatus 3 is caused to display the inclined pointer 4 using the display control means 104 as shown in the middle stage of FIG. 52 and the middle stage of FIG. 53, for example. In addition, when the pointer operation information does not include information for inclining the pointer 4 in the Z axis direction, the operation of the step 606 is not performed, and the next process of the step 607 is performed.

After performing processes of the steps 603 and 606, the pointing position/deformation amount calculation means 102 passes the calculation result to the pointer generation means 103 to cause the pointer generation means 103 to generate the pointer, and also passes the calculation result to the pointing determination means 105. The pointing determination means 105 determines whether there is an object at which the pointer 4 after being operated is pointing based on the received calculation result, namely, the pointing determination means 105 determines whether the xyz coordinates of the point pointed by the pointer 4 are within a predetermined range from xyz coordinates of an arbitrary point on the surface or in the inside of the object (step 607). At this time, when there is no pointed object, the procedure returns to the step 602, and the system waits until next input information (pointer operation information) is obtained.

When there is a pointed object, the pointing determination means 105 causes the object generation means 106 to generate an object by changing the color of the pointed object, and the display control means 104 is used to cause the display apparatus 3 to display the object (step 608). Then, after the object having the changed color is displayed, the procedure returns to the step 602, and the system waits until the next input information is obtained.

In addition, after the pointer 4 is displayed by inclining it according to the before-mentioned procedure, for obtaining information on the operation of the pointer 4 from the input apparatus 2 and moving the pointer in the XY plane, for example, the pointer 4 may be moved after the inclination is turned back to the original inclination, or may be moved while the pointer 4 is inclined.

Although not shown in FIG. 55, when the input information obtaining means obtains input information other than the pointer operation information, the process control means 107 performs processes according to the obtained input information. At this time, as the input information other than the pointer operation information, there are information of launching software associated with the object 5 pointed at by the pointer 4, and input information of numeral or character string and the like, for example. In this case, the process control means 107 performs the process such as the launch of the software associated with the object 5, causes the object generation means 105 to generate an object relating to the process result, and causes the display apparatus 3 to display the object of the process result using the display control means 104, for example.

As described above, according to the three-dimensional pointing method of this embodiment 3-1, the pointing point is inclined in the depth direction so that the pointer 4 is displayed while keeping the depth position of the end of the opposite side of the pointing point (tip of the arrow) of the pointer 4 to be constant. Accordingly, the operator who sees the pointer 4 can recognize the depth position of the pointer and the depth position at which the pointer 4 is pointing intuitively and accurately.

In addition, according to the method for performing pointing at the object 5 by inclining the pointer in the depth direction while keeping the whole length of the pointer 4 constant in addition to keeping the depth position of the end of the opposite side of the tip of the arrow of the pointer 4 constant, since the three-dimensional length of the pointer 4 does not change, natural object display that is close to real-object display can be provided to the operator.

In the three-dimensional pointing method of this embodiment 3-1, although an example is shown in which the pointer 4 is inclined in the depth direction by combining the operation of the control key 201A of the keyboard and the rotation operation of the wheel 202A of the mouse, the combination is not limited to the example. Other key of the keyboard 201 may be combined with the wheel 202A, and a cursor key (direction key) of the keyboard may be used instead of the wheel 202A. In addition to that, the pointer may be inclined when performing predetermined operation using the pen tablet and the touch panel, and the joy stick and the like.

In addition, in the three-dimensional pointing method in this embodiment 3-1, although the arrow-shaped pointer is taken as an example of the pointer 4, the shape is not limited to this. Any shape can be adopted as long as the operator can visually recognize the inclining direction and the pointing point (position) when the pointer is inclined in the depth direction.

Figure 56A:
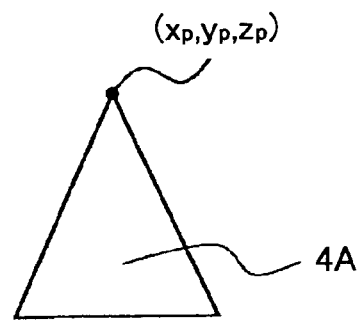
FIG. 56A is a schematic diagram showing a modified example of the shape of the pointer, and shows a triangle-shaped pointer.
Figure 56B:
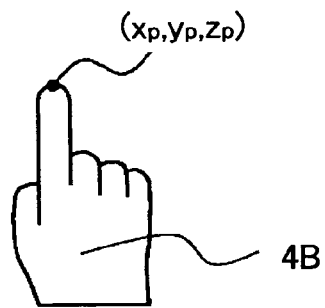
FIG. 56B is a schematic diagram showing a modified example of the shape of the pointer, and shows a human hand-shaped pointer.
Figure 56C:
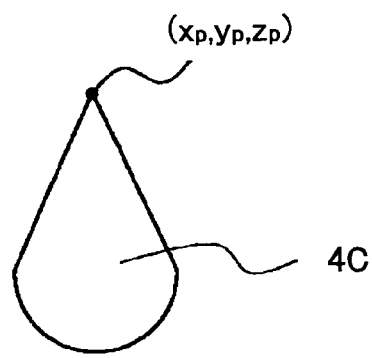
FIG. 56C is a schematic diagram showing a modified example of the shape of the pointer, and shows a drop-shaped pointer.
Figure 56D:
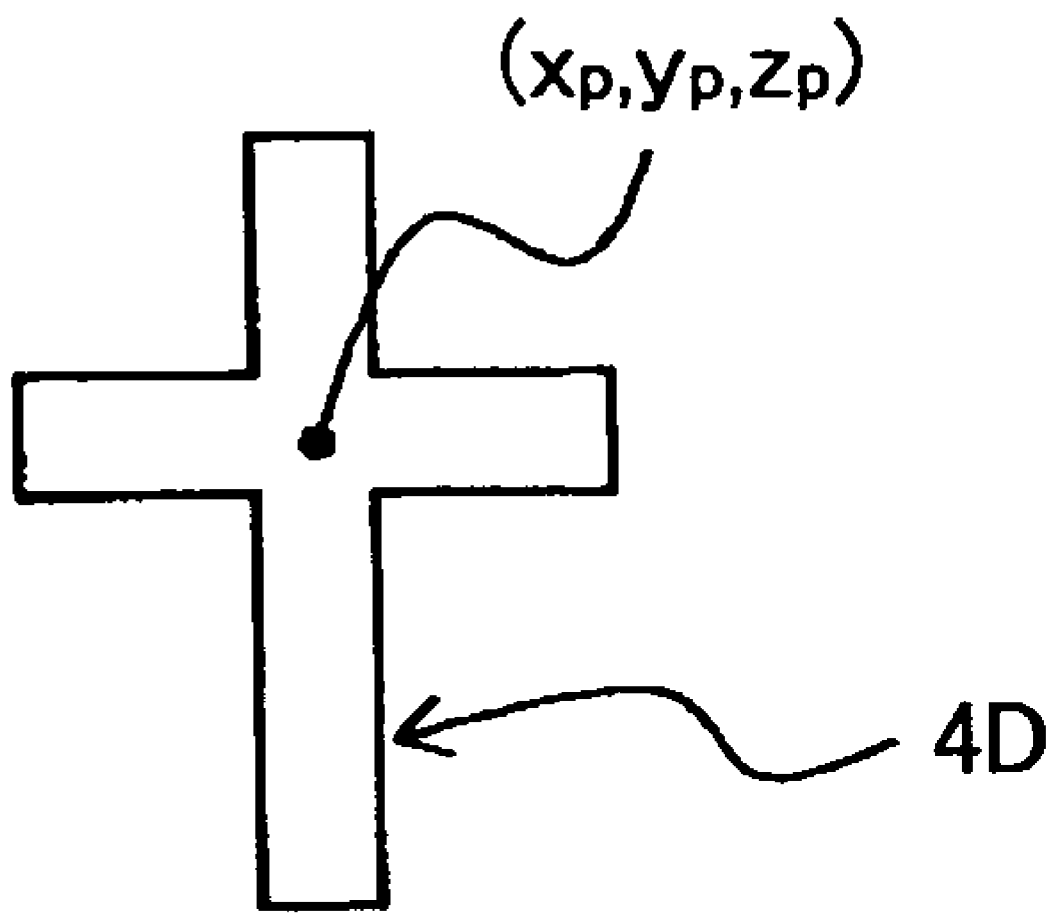
FIG. 56D is a schematic diagram showing a modified example of the shape of the pointer, and shows a cross-shaped pointer.

FIGS. 56A-D are schematic diagrams showing modified examples of the shape of the pointer, FIG. 56A shows a triangle-shaped pointer, FIG. 56B shows a human hand-shaped pointer, FIG. 56C shows a drop-shaped pointer, and FIG. 56D shows a cross-shaped pointer.

In the three-dimensional pointing method like this embodiment 3-1, the depth position of the pointing point of the pointer is recognized from change of a visual shape of the pointer wren the pointer is inclined in the depth direction. Thus, the pointer is not limited to the arrow-shaped pointer 4 shown in the upper stage of FIG. 52, and the pointer may be the triangle-shaped pointer 4A shown in FIG. 56A. In the case of the triangle-shaped pointer, assuming that the vertex of the pointer 4A is the pointing point $(x_p, y_p, z_p)$ the pointer is inclined in the depth direction while keeping the depth position of the base constant.

In addition to that, the pointer may be a pointer 4B having the shape of a hand of a human who points at an object with an index finger as shown in FIG. 56B, a drop-shaped pointer shown in FIG. 56C, or a cross-shaped pointer 4D shown in FIG. 56D. When using the human hand-shaped pointer 4B, assuming that the tip of the index finger is the pointing point $(x_p, y_p, z_p)$ the pointer is inclined in the depth direction while keeping the depth position of the opposite side (wrist side) constant, for example. When using the drop-shaped pointer 4C, assuming that the vertex is the pointing point $(x_p, y_p, z_p)$ the pointer is inclined in the depth direction while keeping the depth position of the opposite side (arc-shaped side) constant, for example. When using the cross-shaped pointer 4CD, assuming that the cross point is the pointing point $(x_p, y_p, z_p)$ the pointer is inclined in the depth direction while keeping the depth position of an end of one axis of four axes extending from the cross point constant, for example.

In addition, in this embodiment 3-1, although a folder icon shaped-object shown in FIG. 51 etc. is taken as an example of an object, the shape is not limited to this. Any shape, such as icons of data file and an executable file, and a window and the like, can be adopted as long as the shape can be pointed at by the pointer.

In addition, in the pointing method of this embodiment 3-1, the pointing position in the depth direction of the pointer 4 can be recognized from the visual change of the shape of the pointer 4, for example. In addition to that, a reference may be displayed in the three-dimensional space on the display apparatus 3 wherein the reference is for causing the operator to recognize the amount of the inclination of the pointer 4.

Figure 57:
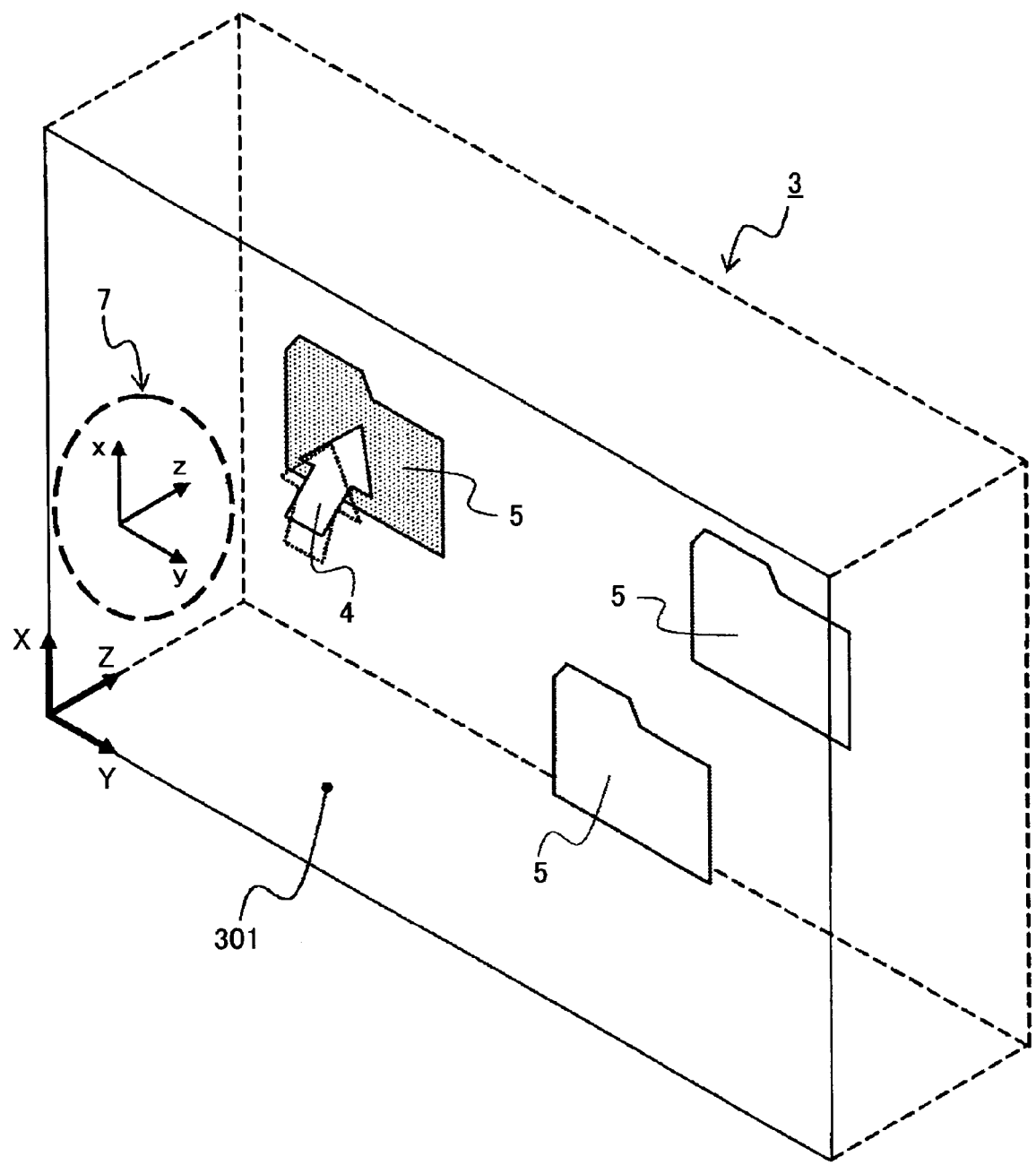
FIG. 57 is a figure for showing an example for displaying the reference in the three-dimensional method of this embodiment 3-1.

FIG. 57 is a figure for showing an example for displaying the reference in the three-dimensional method of this embodiment 3-1.

In the pointing method of this embodiment 3-1, the pointing position in the depth direction of the pointer 4 can be recognized by the operator from the visual change of the shape of the pointer 4 when the pointer is inclined to the depth direction. However, when the state in which the same depth position is pointed at continues for a ling time, since there is no visual change of the shape, there is a possibility that recognition of the pointing position of the pointer 4 in the depth direction becomes vague.

Thus, as shown in FIG. 57, for example, by displaying xyz coordinate axes (reference) 7 that reflects the XYZ coordinate system set in the three-dimensional space, even when there is no change of the depth position of the pointer 4, the operator can easily recognize the depth direction inclination of the pointer 4 by referring to the xyz coordinate axes. At this time, the reference 7 may be fixed at a specific position in the three-dimensional space, or may move and be fixed at a moved position when the pointer 4 inclines. In addition, the reference 7 may be placed in any position in the three-dimensional space represented on the display apparatus 3, and it is also possible that the operator sets the placement position. In FIG. 57, although an display object representing the xyz axes is used as the reference 7, the reference 7 is not limited to that. Any object can be used as long as it becomes an indicator by which the operator can recognize the degree of the inclination of the pointer 4. For example, the reference 7 may be a semitransparent display object having an analogous shape of the pointer in which the inclination of the display object is 0 (parallel to the XY plane).

In addition, in the three-dimensional pointing method of this embodiment 3-1, although an example is shown in which, as shown in the middle stage of FIG. 52 and the middle stage of FIG. 53, for example, when inclining the pointer 4 in the depth direction, the pointer 4 is inclined while keeping the depth position of the end of the opposite side of the arrow of the pointer 4 constant and keeping the whole length (shape, size) of the pointer 4 constant, the pointing method is not limited to that. It is also possible to perform pointing for an object by inclining the pointer in the depth direction while changing the whole length of the pointer.

Figure 58:
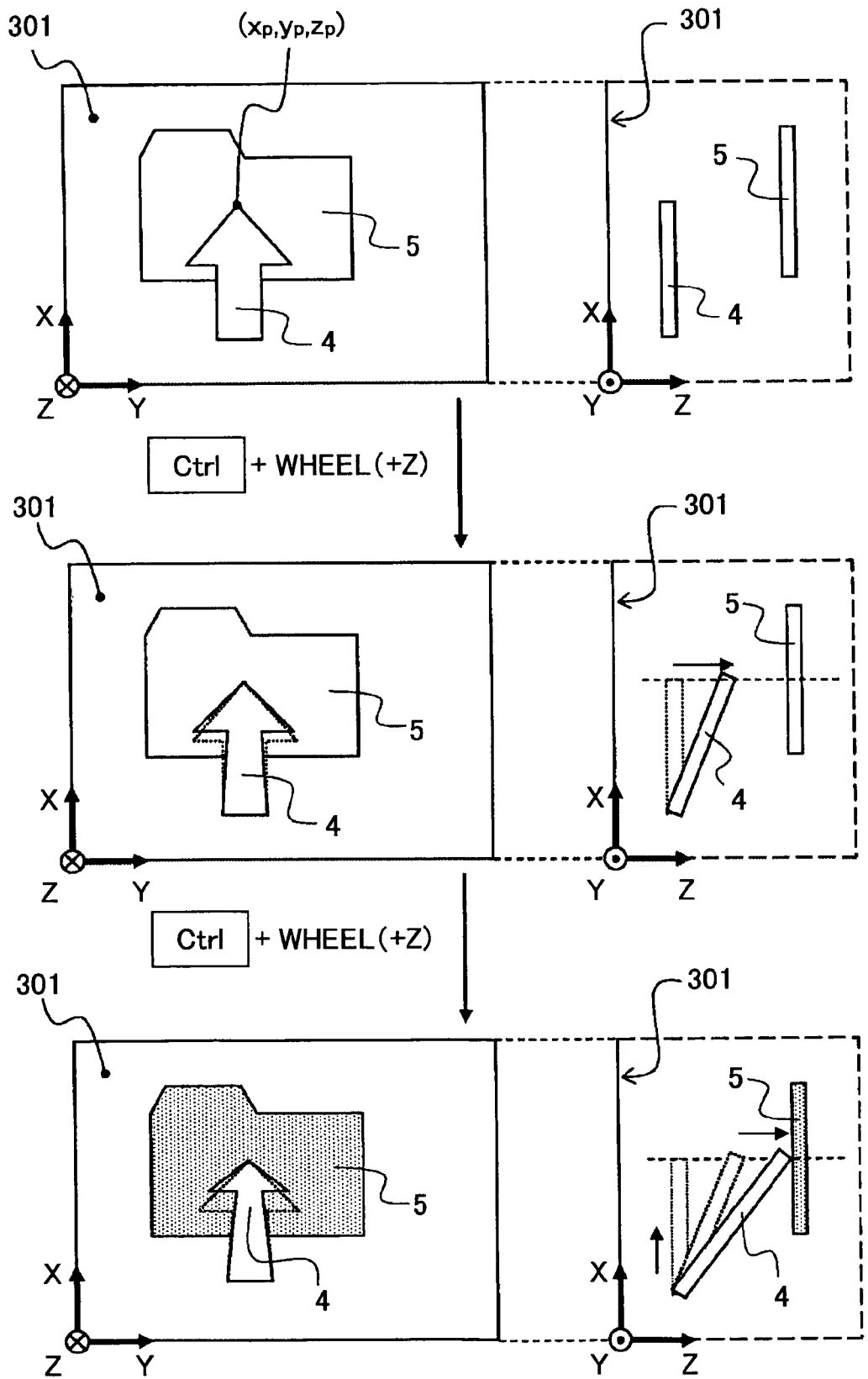
FIG. 58 is a schematic diagram for explaining a modified example of the three-dimensional pointing method of the embodiment 3-1, and shows a front view and a right side view showing change in the three-dimensional space when pointing at an object in the rear side of the pointer.

FIG. 58 is a schematic diagram for explaining a modified example of the three-dimensional pointing method of this embodiment 3-1, and shows a front view and a right side view showing change in the three-dimensional space when pointing at an object in the back of the pointer. By the way, FIG. 58 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages.

In the three-dimensional pointing method of this embodiment 3-1, as shown in the lower stage of FIG. 52, the pointer is inclined in the depth direction and displayed while keeping the whole length, shape and the like of the pointer 4 constant. Therefore, only an object located at a distance, in the depth direction, shorter than the length of the pointer 4 can be pointed at by the pointer 4 that is located at a depth position.

The three-dimensional pointing method of this embodiment 3-1 does not limit the method of inclining the pointer shown in the lower stage of FIG. 52, for example. But, the method is one for the operator to be able to recognize the inclination of the pointer and to recognize the pointing position by comparing the depth position of one end (the end of the opposite side of the tip of the arrow) of the pointer with the depth position of the tip (tip of the arrow) of the pointer. That is, any inclination method can be adopted as long as the depth position of the part different from the part for pointing is kept constant.

As an example of the inclining method different from the pointer inclining method that is shown in the lower stage of FIG. 52 and that can be realized in the three-dimensional pointing method of this embodiment 3-1, a case is described in which, as shown in the upper stage of FIG. 58, the pointer and the object are displayed at different depth positions in the three-dimensional space as seen from the viewpoint of the operator. In this case, from the viewpoint of the operator who sees the three-dimensional space from −Z direction, the pointer is seen such that it overlaps on the object. But, since depth positions between the point at which the pointer points and the object are different, the object is not pointed at.

From this state, it is assumed that the operator rotates the wheel 202A of the mouse in the +Z direction while pushing the control (Ctrl key) 201A of the key board, for example. Then, as shown in the middle state of FIG. 58 and the lower stage of FIG. 58, for example, the tip part of the arrow moves in the +Z direction while the depth position of the end of the opposite side of the tip of the arrow is kept constant so that the part of the arrow inclines in the depth direction as seen from the operator. In addition, at this time, as shown in the middle state of FIG. 58 and the lower stage of FIG. 58, the end of the opposite side of the tip of the arrow part is fixed at the same three-dimensional position as the end of the opposite side of the tip of the arrow before operation. Then, for example, when moving the pointing point of the pointer 4 in the +Z direction, by moving the point while keeping the XY coordinates ($x_p$, $y_p$) constant, the pointer 4 is inclined in the depth direction while the whole length of the pointer 4 is changed.

Also by such three-dimensional pointing method, it is possible to recognize the inclination of the pointer 4, and an effect the same as that in the case of the pointing method in which the length of the pointer is not changed as shown in the lower range of FIG. 52 can be obtained. In addition, in this case, since the length of the whole pointer changes as the pointer inclines in the depth direction, it is possible to point at an object located at a large distance in the depth direction from the pointer. By the way, in the case as shown in the middle stage of FIG. 58 and the lower stage of FIG. 58, the length (size) of the pointer 4 changes as the inclination in the depth direction changes. But, such change of the length (size) is different from change of size used as a psychological drawing method for presenting three-dimensional stereoscopic feeling to the operator when displaying the pointer in the three-dimensional space represented by the display apparatus, that is, such change of the length (size) is different from "change of size in display" in which a pointer located in the rear as seen from the operator is displayed to be small and a pointer located at a close position as seen from the operator is displayed to be large.

Figure 59:
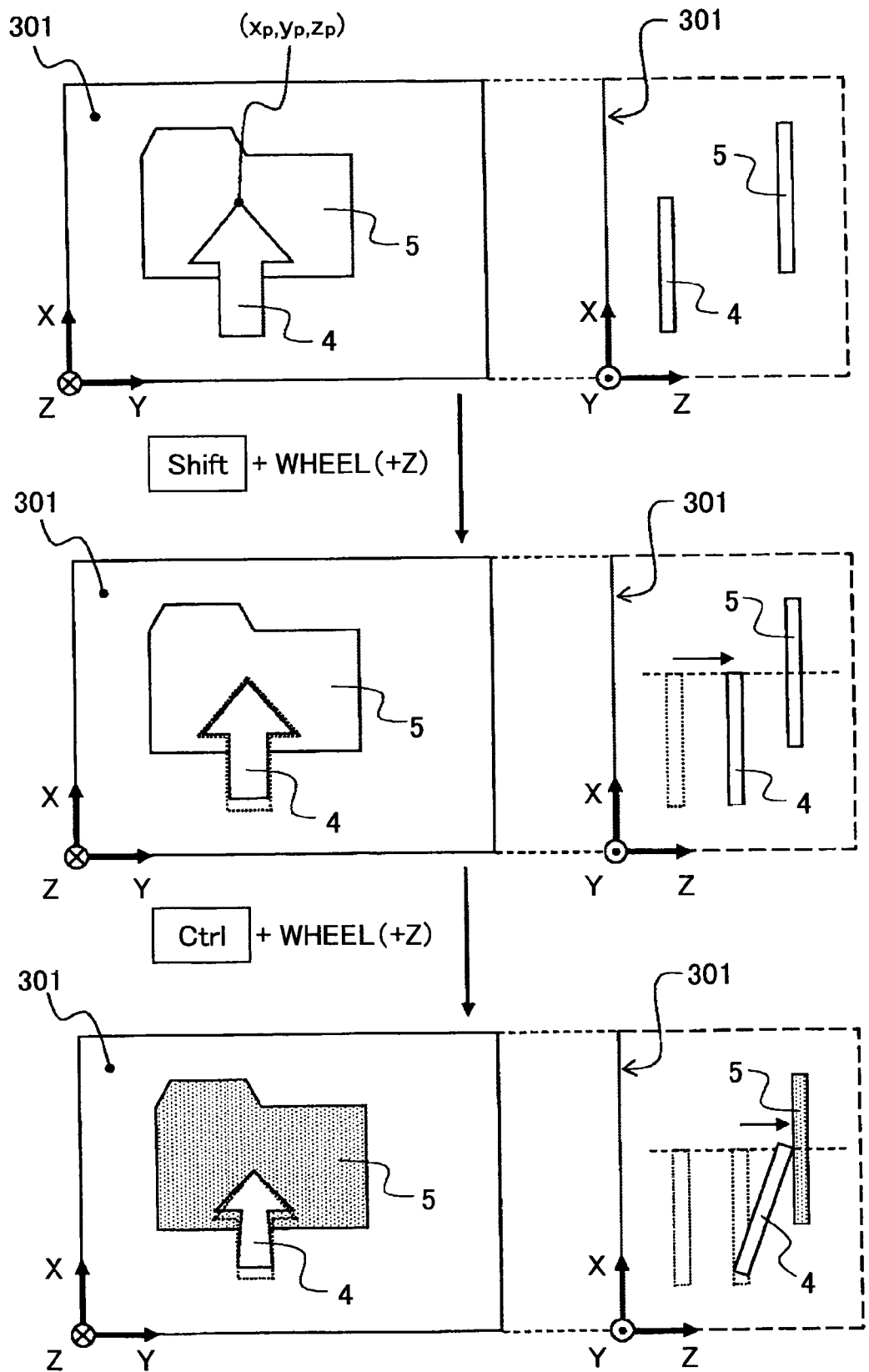
FIG. 59 is a schematic diagram for explaining a first application example of the three-dimensional pointing method of the embodiment 3-1, and shows a front view and a right side view showing change in the three-dimensional space when pointing at an object in the rear side of the pointer.

In addition, in the three-dimensional pointing method of this embodiment 3-1, as shown in FIGS. 52 and 53, although a method for pointing at an object in the different depth position by inclining the pointer 4, it may be possible to perform operation to translate the pointer 4 in the depth direction while keeping the shape of the pointer 4 in addition to inclining the pointer 4, as shown in FIG. 59.

FIG. 59 is a schematic diagram for explaining an application example of the three-dimensional pointing method of this embodiment 3-1, and shows a front view and a right side view showing change in the three-dimensional space when pointing at an object located in the rear of the pointer. By the way, FIG. 59 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages.

In the case of the three-dimensional pointing method of this embodiment 3-1, by performing the method shown in FIG. 58, for example, since the length of the whole pointer changes as the pointer inclines in the depth direction, pointing is possible even for an object located at a large displace from the pointer in the depth direction. However, even when adopting the inclining method of the pointer shown in the lower stage of FIG. 52, all objects in the three-dimensional space represented on the display apparatus 3 can be pointed at by translating the pointer in the Z axis direction while keeping the shape so as to decrease the distance between the pointer 4 and the object in the depth direction to be shorter than the length of the whole pointer, for example. In this case, the pointer 4 is translated in the +Z axis direction when the wheel 202A of the mouse is rotated in the +Z direction while pushing a key different from the control key (Ctrl key) 201A of the keyboard, that is, while pushing a shift key, for example. In addition, the pointer 4 is translated in the −Z axis direction when the wheel 202A of the mouse is rotated in the −Z direction while pushing the shift key.

As an example of such pointing method, a case is described in which, as shown in the upper stage of FIG. 59, the pointer and the object are displayed at different depth positions in the three-dimensional space as seen from the viewpoint of the operator. In this case, from the viewpoint of the operator who sees the three-dimensional space from −Z direction, the pointer is seen such that it overlaps on the object. But, since depth positions between the point at which the pointer points and the object are different, the object is not pointed at.

From this state, it is assumed that the operator rotates the wheel 202A of the mouse in the +Z direction while pushing the shift key of the keyboard, for example. At this time, as shown in the middle stage of FIG. 59, the pointer 4 translates in the +Z direction while keeping the shape and size of the pointer 4 constant so that the distance between the pointer 4 and the object in the depth direction decreases.

Then, in the state shown in the middle stage of FIG. 59, when the operator rotates the wheel 202A of the mouse in the +Z direction while pushing the control (Ctrl key) 201A of the keyboard, for example, as shown in the lower state of FIG. 59, the tip of the arrow of the pointer 4 inclines in the depth direction while the depth position of the end of the opposite side of the tip of the arrow is kept constant.

By doing so, for example, even when there is an object that cannot be pointed at only by inclining the pointer 4 since the Z axis direction in the three-dimensional space represented by the display apparatus 3, that is, the depth is large (wide), it becomes possible to point at the object 5 by translating the pointer 4 in the depth direction as shown in the middle of FIG. 59. By the way, although an example is shown in which the pointer is translated to the back side (in the +Z direction) as seen from the operator in FIG. 59, it is needless to say that the pointer can be also translated to the front side (in the −Z direction).

By the way, when translating the pointer 4 in the Z axis direction in synchronization with the rotation of the wheel 202A of the mouse, the pointer 4 may be displayed such that the pointer 4 continuously moves in synchronization with the total rotation angle of the wheel 202A, or may be displayed such that the pointer 4 moves in incremental steps of a predetermined distance in synchronization with the rotation steps of the wheel 202A.

In the three-dimensional pointing method of this embodiment 3-1, the two-dimensional movement of the body of the mouse 202 is reflected to the movement of the pointer 4 in the XY plane, and the combination of operation of the control key (Ctrl key) 201A of the keyboard 201 and the rotation operation of the wheel 202A of the mouse 202 is reflected to the inclination of the pointer 4 in the depth direction. In addition, in the pointing method shown in FIG. 59, and the combination of operation of the shift key 201A of the keyboard 201 and the rotation operation of the wheel 202A of the mouse 202 is reflected to the translation of the pointer 4 in the depth direction. Thus, in the three-dimensional pointing method of this embodiment 3-1, every point in the three-dimensional space can be pointed at by the combination of the body of the mouse 202, the key of the keyboard 201 and the rotation operation of the wheel 202A of the mouse. In addition, the pointer can be rotated in the XY plane by combining a key of the keyboard 201 other than the control key (Ctrl key) 201A and the shift key with the rotation operation of the wheel 201A of the mouse. In this case, as to the rotation of the pointer 4 on the XY plane, the pointer 4 is rotated in clockwise direction when the wheel 202A of the mouse is rotated in the +Z direction while pushing an Alt key, for example, that is a key different from the control (Ctrl key) and the shift key of the keyboard 201, and the pointer 4 is rotated in anticlockwise direction when the wheel 202A of the mouse is rotated in the −Z direction while pushing the Alt key.

Figure 60:
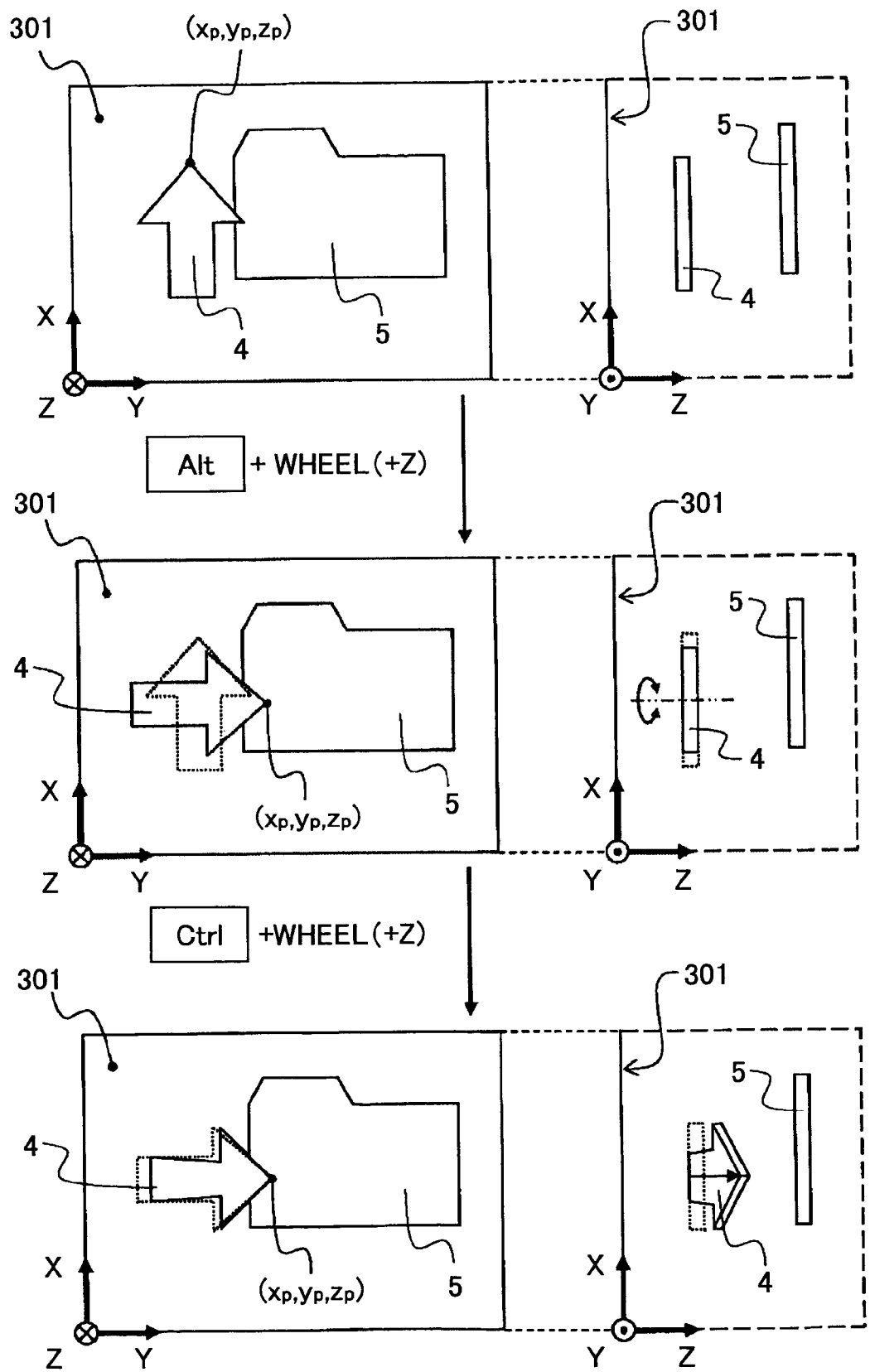
FIG. 60 is a schematic diagram for explaining a second application example of the three-dimensional pointing method of the embodiment 3-1, and shows a front view and a right side view showing change in the three-dimensional space when pointing at an object in the rear side of the pointer.

FIG. 60 is a schematic diagram for explaining a second application example of the three-dimensional pointing method of this embodiment 3-1, and shows a front view and a right side view showing change in the three-dimensional space when pointing at an object located in the rear of the pointer. By the way, FIG. 60 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages.

As an example of a pointing method to rotate the pointer in the XY plane, a case is described in which, as shown in the upper stage of FIG. 60, the pointer and the object are displayed at different depth positions in the three-dimensional space as seen from the viewpoint of the operator.

From this state, it is assumed that the operator rotates the wheel 202A of the mouse in the +Z direction while pushing the Alt key of the keyboard, for example. At this time, as shown in the middle stage of FIG. 60, the pointer 4 rotates by 90 degrees in the clockwise direction while keeping the shape of the pointer 4 constant. At this time, from the viewpoint of the operator who sees the three-dimensional space from −Z direction, the pointer is seen such that it overlaps on the object. But, since depth positions between the point at which the pointer points and the object are different, the object is not pointed at.

Then, in the state shown in the middle stage of FIG. 60, when the operator rotates the wheel 202A of the mouse in the +Z direction while pushing the control (Ctrl key) 201A of the keyboard, for example, as shown in the lower state of FIG. 60, the tip of the arrow of the pointer 4 inclines in the depth direction while the depth position of the end of the opposite side of the tip of the arrow is kept constant. In addition, although not shown in the figure, from the state of the lower stage in FIG. 60, when the operator rotates the wheel 202A of the mouse in the +Z direction while pushing the control (Ctrl key) 201A of the keyboard, the inclination of the pointer 4 becomes large, and when the tip $(x_p, y_p, z_p)$ of the arrow of the pointer 4 reaches the depth position the same as that of the object 5, the color of the object 5 changes so that the operator can recognize that the object is pointed at.

Accordingly, by adding the rotation operation of the pointer 4 in the XY plane, it becomes possible to point at the object from every direction so that the pointer can be operated with a feeling closer to that in the real space.

By the way, when rotating the pointer 4 in the XY plane in synchronization with the rotation of the wheel 202A of the mouse, the pointer 4 may be displayed such that the pointer 4 continuously rotates in synchronization with the total rotation angle of the wheel 202A, or may be displayed such that the pointer 4 rotates in incremental steps of a predetermined angle in synchronization with the rotation steps of the wheel 202A.

In the three-dimensional pointing method of this embodiment 3-1, as shown in FIG. 51, although a case is taken as an example in which the two-dimensional apparatus such as the liquid crystal display is used as the display apparatus 3, the depth position of the pointer can be recognized more accurately and more intuitively by using a three-dimensional display apparatus such as the DFD that can perform stereoscopic display as the display apparatus 3.

Figure 61:
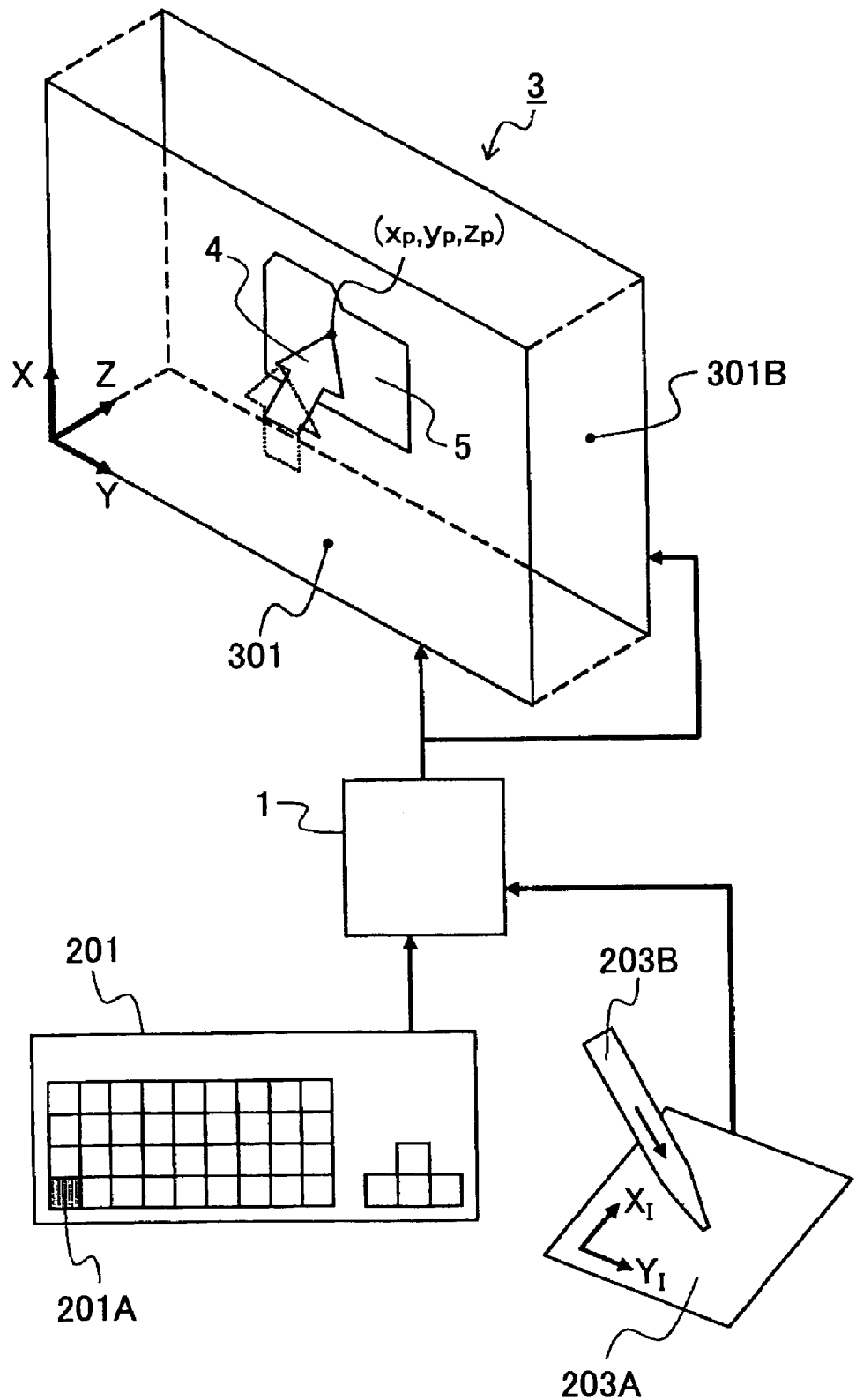
FIG. 61 is a schematic diagram for explaining a third application example of the three-dimensional pointing method of the embodiment 3-1, and shows a configuration example of the system.
Figure 62A:
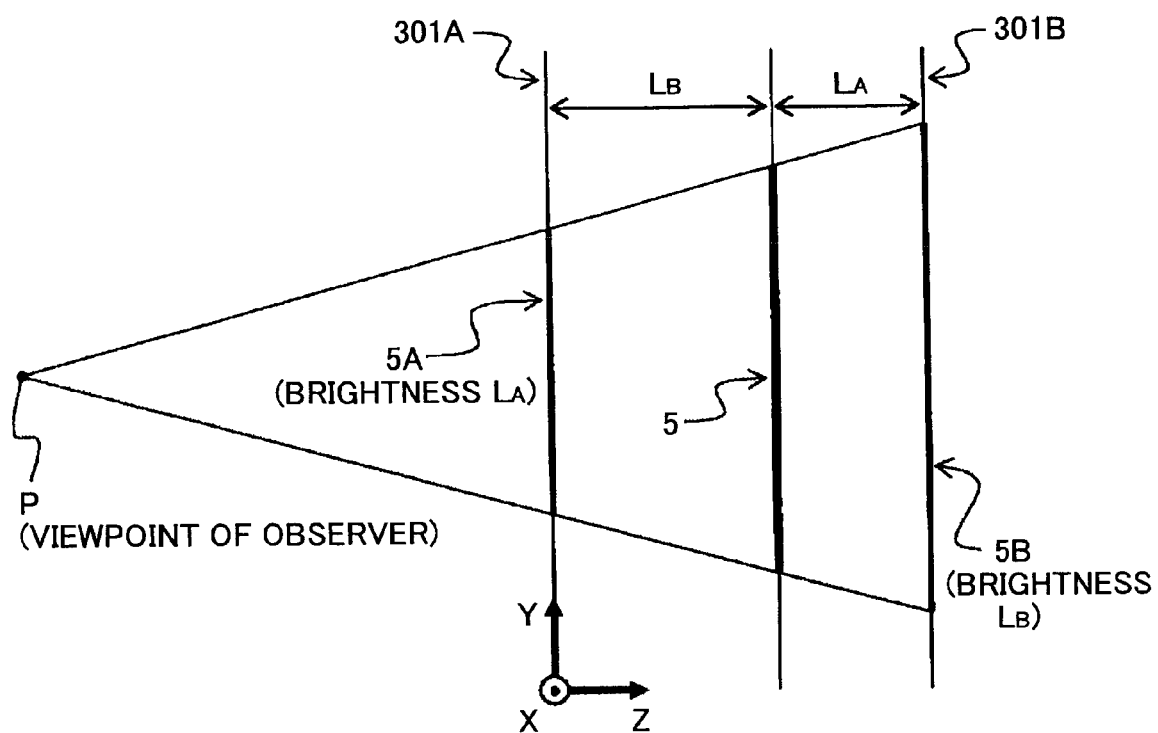
FIG. 62A is a schematic diagram for explaining a third application example of the three-dimensional pointing method of the embodiment 3-1, and for explaining operation principle of the DFD.
Figure 62B:
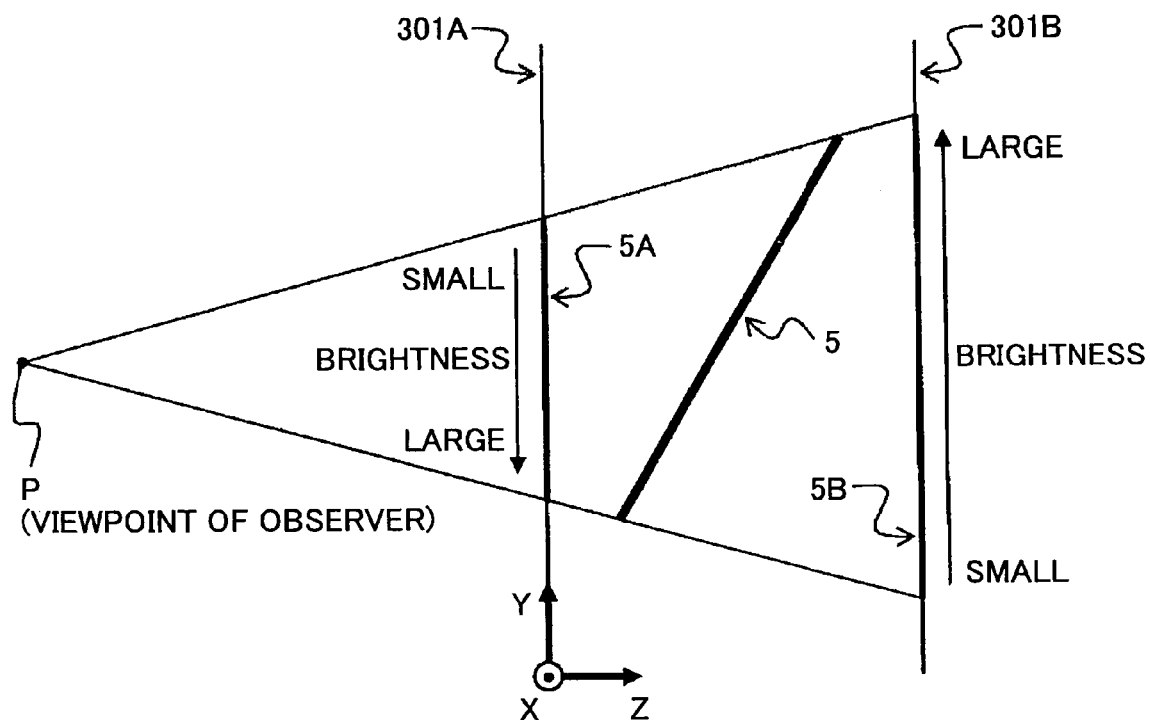
FIG. 62B is a schematic diagram for explaining a third application example of the three-dimensional pointing method of the embodiment 3-1, and for explaining operation principle of the DFD.

FIGS. 61 and 62A and B are schematic diagrams for explaining the third application example of the three-dimensional pointing method of this embodiment 3-1. FIG. 61 is a figure for showing a configuration example of the system, and FIGS. 62A and 62B are figures for explaining operation principle of the DFD.

In the three-dimensional pointing method in this embodiment 3-1, the display apparatus 3 may be any display apparatus as long as the three-dimensional space can be represented, but, it is preferable to use three-dimensional display apparatus (display) such as the DFD. As described in the first embodiment, the DFD is a display apparatus in which two or more display planes are arranged such that the display planes are overlapped when viewed from the observer (operator) (refer to Japanese Patent No. 3022558 and Japanese Patent No. 3460671, for example).

Although the operation principle of DFD is as described in the first embodiment, it is described in the following again. For the sake of simplifying explanation, as shown in FIG. 61, it is assumed that two display planes 301A and 301B are overlapped. In this case, the pointer 4 and the object 5 are displayed on the three-dimensional space between the two display surfaces 301A and 301B reflecting the depth position.

As shown in FIG. 62A, for example, the pointer 4 and the object 5 displayed on the DFD are displayed on both of the display plane 301A placed in the front side as seen from the operator and the display plane 301B placed in the back side. In this case, if the DFD is the brightness modulation type, when the object 5A of the front side display plane 301A is displayed with brightness $L_A$ and the object 303B of the back side display plane 301B is displayed with brightness $L_B$, the object 5 is seen as being displayed at a depth position wherein a ratio between distance of the position from the front side display plane 301A and distance of the position from the back side display plane 301B is $L_B : L_A$.

In addition, for example, as shown in FIG. 62B, by continuously changing the brightness in one display region of the object 5, the object 5 can be displayed as being inclined in the depth direction. In the example shown in FIG. 62B, the brightness of the object 5A of the front side display plane 301A is gradually increased from the top to the bottom on the figure surface, and the brightness of the object 5B of the back side display plane 301B is gradually increased from the bottom to the top on the figure surface. Therefore, the operator can stereoscopically observe the object 5 that is inclined such that the top part of the object 5 on the figure surface is placed in the back side and the bottom part of the object 303 is placed in the front side.

In addition, although detailed description is not given, when the DFD is the transparent type, by adjusting transparency of each point (pixel) in the region in which the object 5A is displayed on the front side display plane 301A, the stereoscopic image of the pointer 4 and the object 5 can be displayed at an arbitrary depth position between the front side display plane 301A and the back side display plane 301B in the same way as the brightness modulation type DFD.

By using the DFD as the display apparatus, the operator can not only recognize the depth based on the width of the pointer 4 represented on the display apparatus 3, but also compare the depth position of the end, of the pointer 4, whose depth position does not change with the depth position of the tip of the pointer 4, so that the operator can recognize the depth position of the pointer 4 intuitively and accurately. In addition, when using the DFD, by setting the front side display plane of the DFD or the back side display plane to be the depth position of the end of the pointer whose depth position does not change, there is a large effect that the operator can recognize the depth position of the pointer 4 more accurately and intuitively.

As to the two-dimensional display apparatus such as a general CRT display and a liquid crystal display, it is necessary to project the three-dimensional space to be represented to a two-dimensional plane and display it. On the other hand, as to the three-dimensional display apparatus such as the DFD, since it is only necessary to determine ratio of brightness of each point (pixel) on each display plane according to the depth position in the three-dimensional space, work load for the pointing apparatus (system control apparatus 1) can be reduced. In addition, as to the two-dimensional apparatus such as the general CRT display and the liquid crystal display, since the three-dimensional space is projected to the two-dimensional plane for displaying, there may be a case where it is difficult to perform pointing operation with the same feeling as in the real space for some operators. But, by using the three-dimensional display apparatus such as the DFD, pointing operation can be performed having a feeling closer to that in the real space. As described above, by using the three-dimensional apparatus such as the DFD, the operator can point at a three-dimensional depth position more accurately and quickly as compared with the case in which pointing operation is performed using a general two-dimensional display.

In addition, in FIG. 61, a case is shown in which the combination of the keyboard 201 and the pen tablet is used as the input apparatus 2, for which the technology of the first embodiment can be applied. That is, the pen tablet is an input apparatus for detecting movement, pen pressure and the like of the pen tip of the input pen 203B when the input pen (electronic pen) 203B is operated on the detection means (digitizer) 203A. Therefore, pointing by the pointer 4 can be performed with the same operation feeling as that when using the mouse 202, by reflecting the movement of the pen tip of the input pen 203B to the movement amount of the pointer 4 in the $X_I Y_I$ plane, reflecting the pen pressure when pushing the control key (Ctrl key) of the keyboard 201 to the movement amount in the +Z direction, and reflecting the pen pressure when pushing the shift key of the keyboard 201 to the movement amount in the −Z direction, for example.

In addition, the technology of the second embodiment can be applied. In this case, instead of using the pen pressure of the input pen 203B, the inclination amount of the pointer 4 is determined according to the number of times the detection means 203A is pushed with the input pen 203b, for example.

In addition, by overlapping the detection means (digitizer) 203A of the pen tablet on the display plane 301A, 301B of the display apparatus 3 (DFD), since the operator can operate the input pen 203B so as to perform pointing on the display plane 301A, 301B, the operator can recognize the depth position of the pointer 4 more accurately and more intuitively.

In addition, the three-dimensional pointing method of this embodiment 3-1 can be also applied to a case where pointing is performed using an input apparatus such as a touch panel that can be integrated with the display apparatus 3 instead of using the pen tablet. In the case of using the touch panel, for example, the pointer can be also operated by touching the screen of the display apparatus 3 with a finger of the operator instead of using the input pen 203B, so that the pointer 4 can be operated more intuitively compared with the case using the pen tablet that uses the input pen 203B.

In addition, in the three-dimensional pointing method of this embodiment 3-1, as shown in the lower stage of FIG. 52, for example, although an example is explained in which, when inclining the pointer 4, the pointing point traces a straight line-like path that extends in the depth direction while keeping the XY coordinates $(x_p, y_p)$ of the pointing point constant, the inclining method is not limited to this. The pointer 4 may be inclined such that the pointing point traces various paths.

FIGS. 63A-66B are schematic diagrams for explaining fourth application example of the three-dimensional pointing method of this embodiment 3-1, each of FIGS. 63A, 63B, 64A and 64B is a figure for showing an application example in the case for tracing the straight line-like path, and each of FIGS. 65A, 65B, 66A and 66B is a figure for showing an application example in a case for tracing an arc-like path.

Each of the FIGS. 63A, 63B, 64A, 64B, 65A, 65B, 66A and 66B show a view (right side view) in which the three-dimensional space is seen from the XZ plane side.

Figure 63A:
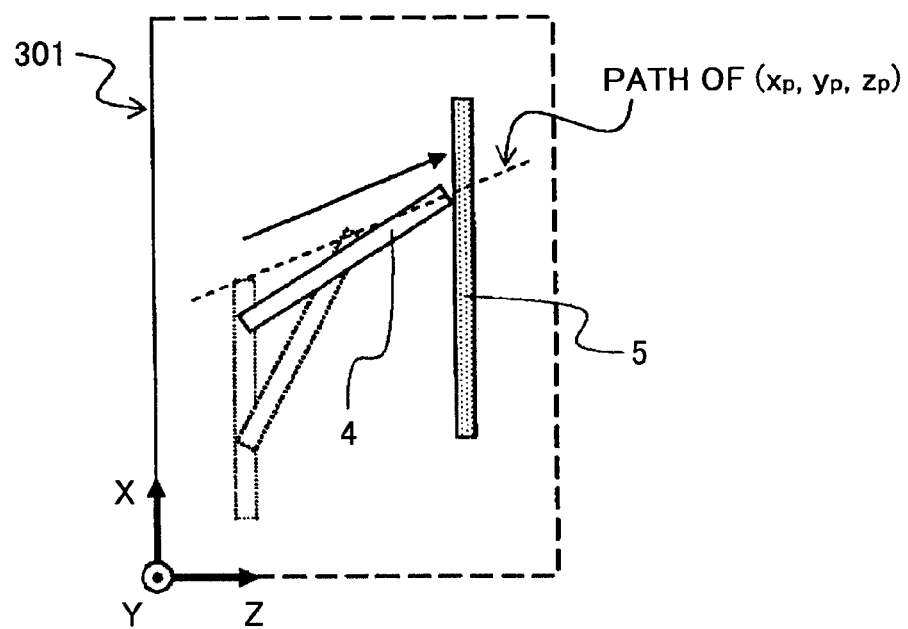
FIG. 63A is a schematic diagram for explaining a fourth application example of the three-dimensional pointing method of the embodiment 3-1, and shows an application example in the case for tracing a straight line-like path.
Figure 63B:
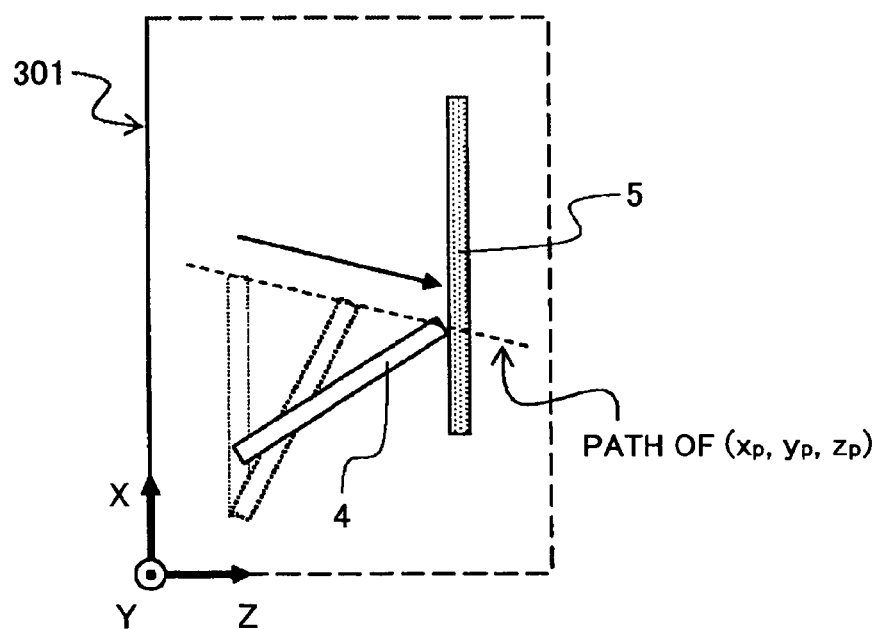
Figure 64A:
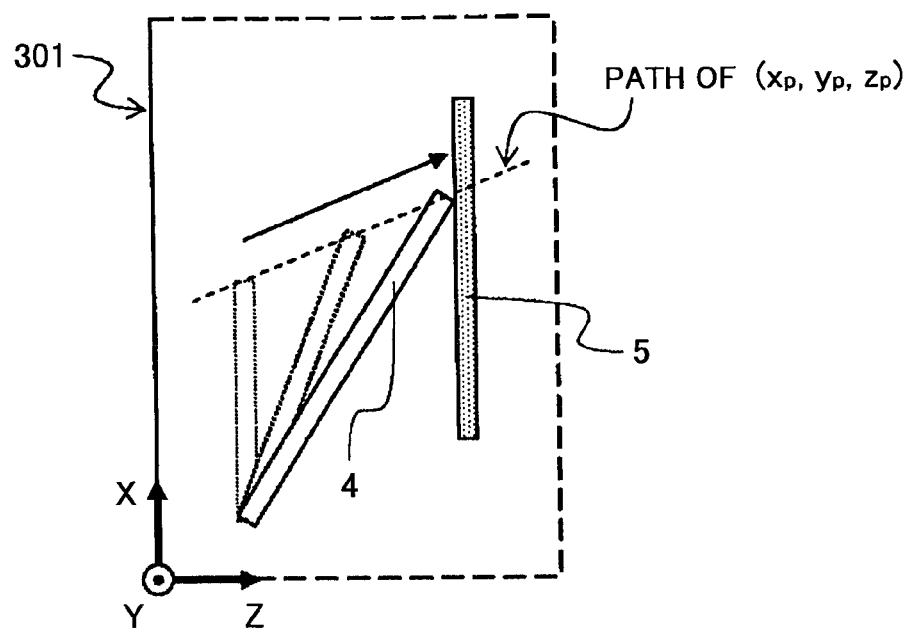
Figure 64B:
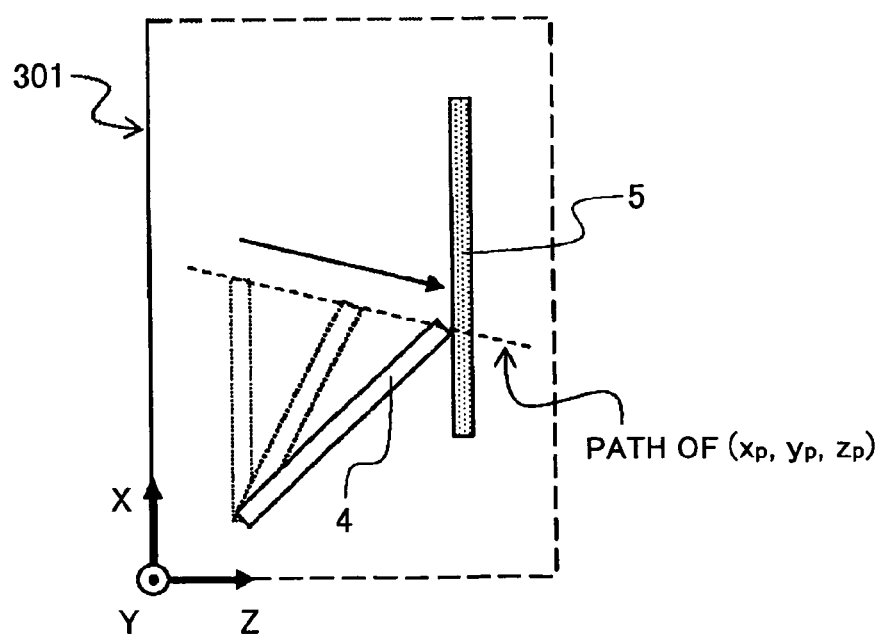

For moving the pointing point $(x_p, y_p, z_p)$ in the depth direction, the movement method is not limited to that shown in the lower stage of FIG. 52 and the like in which movement is performed while keeping the XY coordinates $(x_p, y_p)$ constant. As shown in FIG. 63A, for example, the pointing point may trace a path so as to move in the +X direction in proportion to the movement in the +Z direction. Reversely, as shown in FIG. 63B, the pointing point may trace a path so as to move in the −X direction in proportion to the movement in the +Z direction. In FIGS. 63A and 63B, although the pointer is inclined while keeping the length of the whole pointer constant, the inclining method is not limited to this. As shown in FIGS. 64A and 64B, it is also possible that the pointing point is moved in the depth direction in a state in which the three-dimensional position of the end of the pointer is fixed so as to incline the pointer in the depth direction while changing the length of the whole pointer.

Figure 65A:
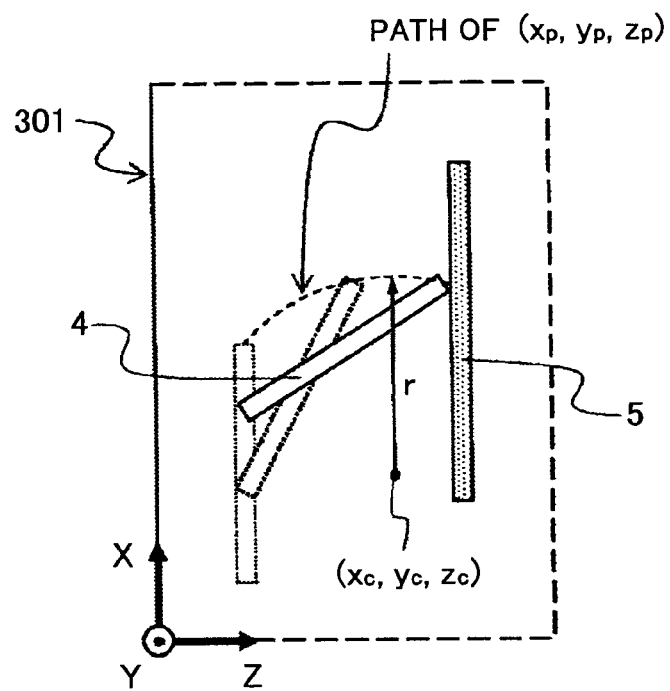
Figure 65B:
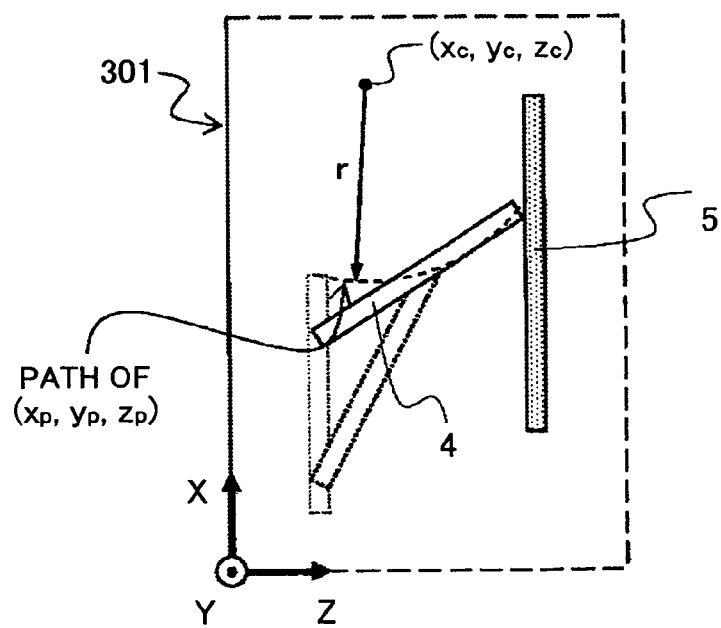
Figure 66A:
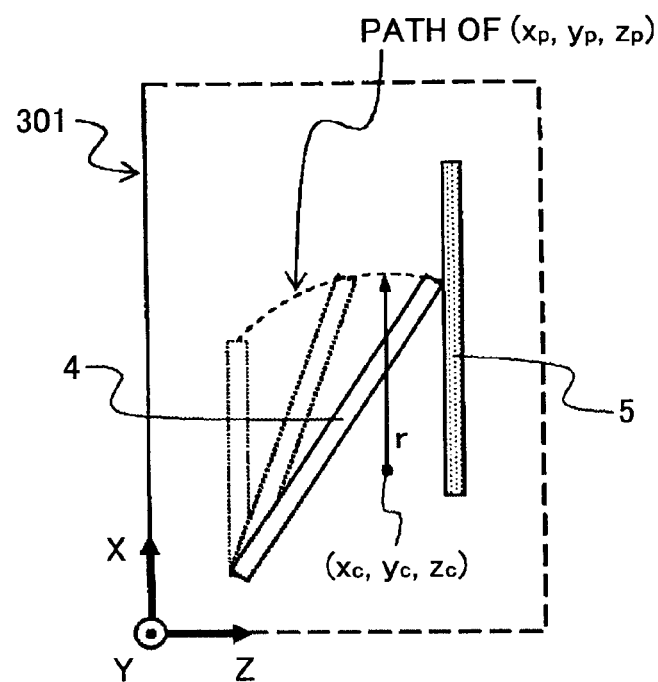
Figure 66B:
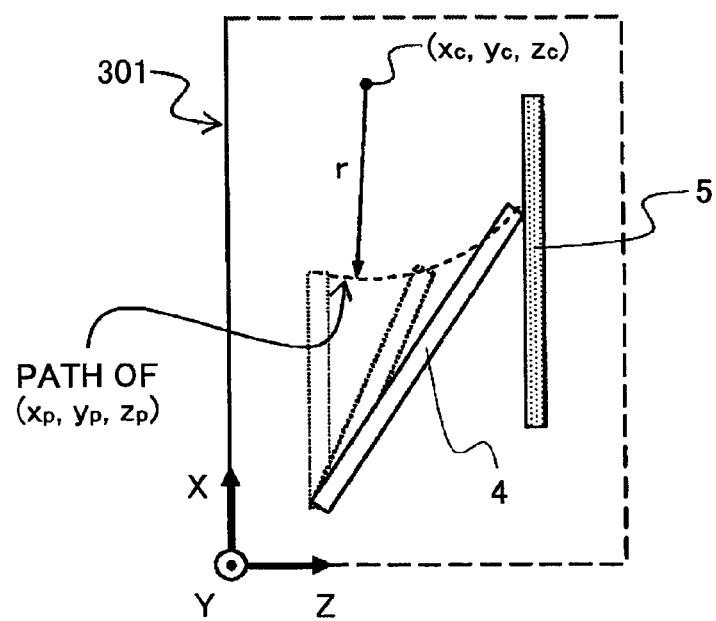

In addition, the path for moving the pointing point $(x_p, y_p, z_p)$ in the depth direction is not limited to the straight line-like path. As shown in FIGS. 65A and 65B, for example, the point may trace an arc-like path drawn with a radius r from the point $(x_p, y_c, z_c)$ to $y=y_p$ on the XZ plane in the three-dimensional space. In addition, although FIG. 65A and FIG. 65B shows a case for inclining the pointer while keeping the length of the whole pointer constant, the inclining method is not limited to this. As shown in FIG. 66A and FIG. 66B, it is also possible that the pointing point is moved in the depth direction in a state in which the three-dimensional position of the end of the pointer is fixed so as to incline the pointer in the depth direction while changing the length of the whole pointer.

In addition, the path for moving the pointing point $(x_p, y_p, z_p)$ in the depth position is not limited to the paths shown in each figure, and any path can be adopted.

Embodiment 3-2

Figure 67:
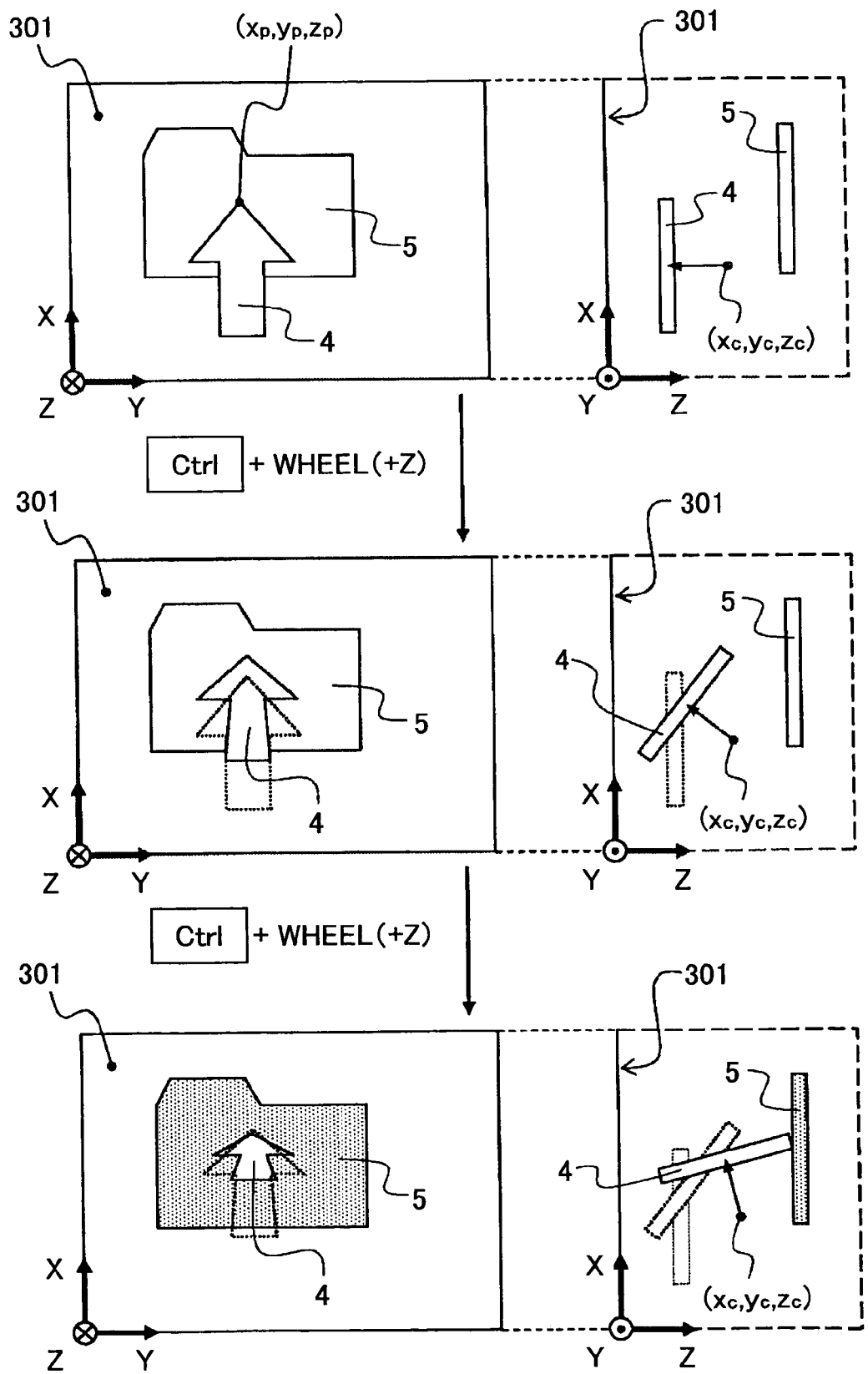
Figure 68A:
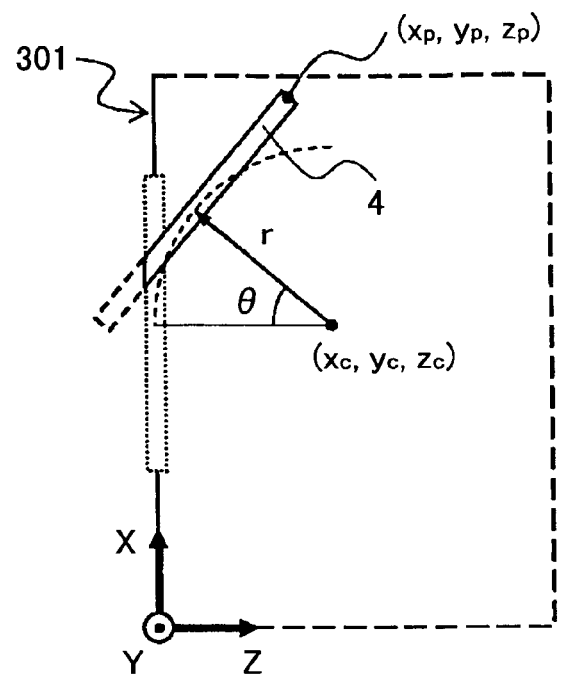
Figure 68B:
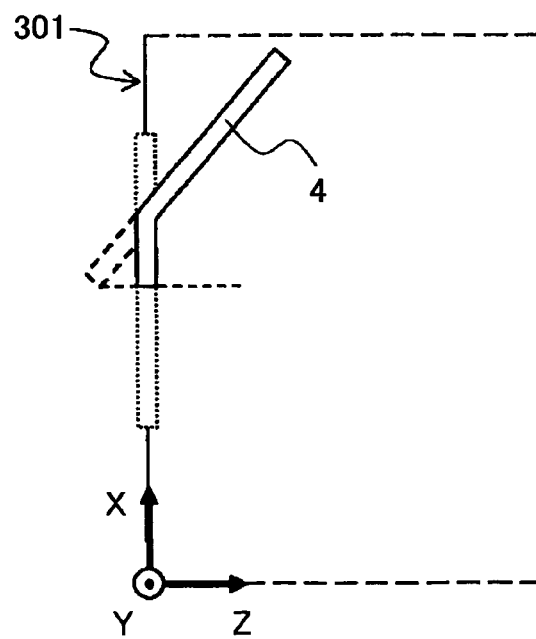
Figure 69:
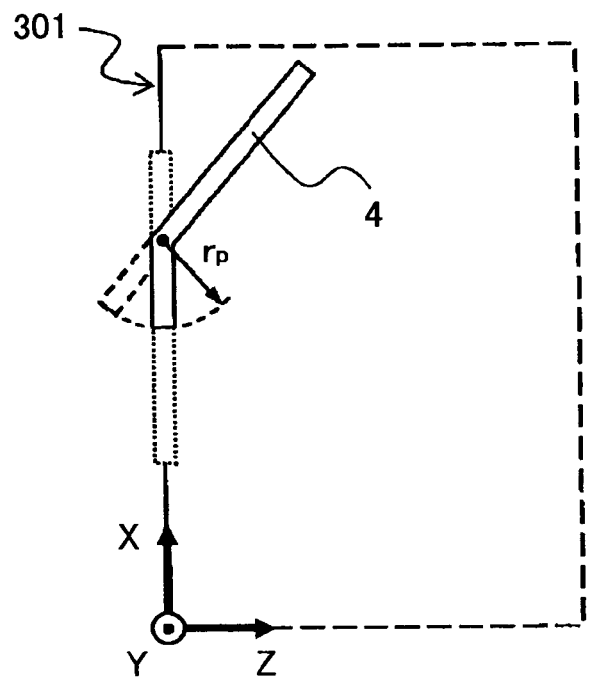

FIGS. 67-69 are schematic diagrams for describing the three-dimensional pointing method of the embodiment 3-2 of the present invention. FIG. 67 shows a front view and a right side view showing change in the three-dimensional space when pointing at an object in the back of the pointer. FIG. 68A is a figure for explaining a problem in the three-dimensional pointing method of this embodiment 3-2. FIG. 68B is a figure for explaining an example of a method for solving the problem shown in FIG. 68A. FIG. 69 is a figure for explaining a modified example of the solving method shown in FIG. 68B. By the way, FIG. 67 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages. Each of FIGS. 68A, 68B and 69 shows only a view (a right side view) in which the three-dimensional space is seen from the XZ plane side in order to make the feature of this embodiment 3-2 easy to understand.

In the embodiment 3-1, a three-dimensional pointing method is described for inclining the pointer 4 in the depth direction such that the pointing point $(x_p,y_p,z_p)$ of the pointer 4 traces a predetermined path while keeping the depth position of a part different from the pointing point constant. In this embodiment 3-2, as an example of an inclining method different from the embodiment 3-1, a three-dimensional pointing method for causing the operator to recognize the inclination of the pointer 4 and to recognize the pointing position by rotating the pointer 4 around a point $(x_c,y_c,z_c)$ as a center in the three-dimensional space and in a state in which distance between each point of the pointer 4 and the center is kept constant.

Also in this embodiment 3-2, in the system configuration for realizing the three-dimensional pointing method, although various existing input devices such as keyboard, mouse, pen tablet, touch panel and joy stick can be used as the input apparatus 2, it is assumed that the keyboard 201 and the mouse 202 are used as shown in FIG. 51. In addition, also as to the display apparatus 3, although various display apparatuses can be used such as the two-dimensional display apparatus such CRT and liquid crystal display, and the three-dimensional display apparatus such as DFD, it is assumed that the liquid crystal display (two-dimensional display apparatus) is used as shown in FIG. 51.

In addition, as shown in FIG. 51, for example, it is assumed that the display plane 301 is z=0 so that the display plane 301 is the XY plane, and that a three-dimensional coordinate system XYZ is set in which the direction heading to the back side from the display plane 301 when seen from the operation is the positive direction of the z axis. In this case, it is assumed that the moving direction and the moving distance of the pointer 4 in the XY plane displayed in the three-dimensional space are calculated (determined) based on the moving direction and the moving distance when moving the body of the mouse 202 two-dimensionally on a plane such as a desk.

In addition, as shown in FIG. 51, for example, the moving direction and the moving distance in the depth direction (z direction) are calculated (determined) based on a rotation direction and a rotation angle of a wheel 202A of the mouse 202 when rotating the wheel 202A while pushing a predetermined key 201A such as a control key (Ctrl key) of the keyboard 201. In this case, as shown in FIG. 51, for example, when rotating the wheel 202A of the mouse in the +Z direction, the part for performing pointing in the pointer is moved in the +Z direction, that is, in the direction heading to the back side seen from the operator. When rotating the wheel 202A of the mouse in the −Z direction, the part for performing pointing in the pointer is moved in the −Z direction, that is, in the direction heading to the front side seen from the operator.

In addition, in the three-dimensional pointing method in this embodiment 3-1, it is assumed that the shape of the pointer 4 is an arrow shape, and that the tip of the arrow indicates a pointing point $(x_p,y_p,z_p)$.

As an example of the three-dimensional pointing method, a pointing method is described in a case where the pointer 4 and the object 5 are displayed in different positions in the three-dimensional space as shown in the upper stage of FIG. 67. From the viewpoint of the operator who sees the three-dimensional space from −Z direction, the pointer 4 is seen such that it overlaps on the object 5. But, since depth positions between the point $(x_p,y_p,z_p)$ at which the pointer 4 points and the object 5 are different, the object is not pointed at.

From this state, it is assumed that the operator rotates the wheel 202A of the mouse in the +Z direction while pushing the control key (Ctrl key) 201A of the keyboard, for example. Then, as shown in the middle stage of FIG. 67, for example, the pointer 4 rotates such that the pointing point $(x_p,y_p,z_p)$ moves toward the back side (in the +Z direction) on the circumference of a circle of a radius r centering on a point $(x_c,y_c,z_c)$ in the three-dimensional space while keeping the distance between each point of the pointer 4 and the point $(x_c,y_c,z_c)$ to be constant.

As described above, by rotating the wheel 202A of the mouse in the +Z direction while pushing the control key 201A of the keyboard, the pointer 4 inclines such that the pointing point (the part of the tip of the arrow) goes farther as seen from the operator. In addition, at this time, by rotating the pointer 4 while keeping the shape and the size of the pointer 4, the part of the arrow of the pointer 4 is displayed such that the width of the part is narrowed. As a result, the operator can recognize that the pointer 4 inclines in the depth direction (+Z direction), and at the same time, the operator can also recognize that the pointer 4 points a position in the rear of the position before operation from the shape of the pointer 4.

Then, from the state shown in the middle stage of FIG. 67, it is assumed that the operator rotates the wheel 202A of the mouse in the +Z direction while pushing the control key 201A of the key board once again. Then, also at this time, as shown in the lower stage of FIG. 67, the pointer 4 rotates such that the pointing point $(x_p,y_p,z_p)$ moves toward the back side (in the +Z direction) along the circumference of a circle of a radius r centering on a point $(x_c,y_c,z_c)$ in the three-dimensional space while keeping the distance between each point of the pointer 4 and the point $(x_c,y_c,z_c)$ to be constant. As a result, the operator can recognize that the pointer 4 further inclines in the depth direction (+Z direction), and at the same time, the operator can also recognize that the pointer 4 points a position in the further rear side of the position before operation from the shape of the pointer 4.

In addition, at this time, as a result for continuing the operation to rotate the wheel 202A of the mouse in the +Z direction while pushing the control key 201A of the keyboard, when the pointing point (tip of arrow) of the pointer 4 reaches the depth position the same as that of the object 5 so that the xyz coordinates of the tip of the pointer 4 become the same as xyz coordinates of an arbitrary point on the surface or in the inside of the object 5 as shown in the lower stage of FIG. 67, the object 5 enters a state in which it is pointed at by the pointer 4. Therefore, as shown in the lower stage of FIG. 67, for example, the state in which it is pointed is indicated by changing the color of the object 5. By doing so, the operator can recognize the depth position of the pointer 4 and the depth position at which the pointer is pointing from the shape of the pointer intuitively and accurately. In addition, by changing the color of the object 5 when the pointer 4 points at the object 5, it can be recognized intuitively and accurately whether the pointer 4 that overlaps on the object 5 points at the object 5.

However, in the case of the three-dimensional pointing method of this embodiment 3-2, the pointer 4 is rotated by an angle θ such that the pointing point ($x_p,y_p,z_p$) moves toward the back side (in the +Z direction) or toward the front side (in the −Z direction) along the circumference of a circle of a radius r centering on a point ($x_c,y_c,z_c$) in the three-dimensional space while keeping the distance between each point of the pointer 4 and the point ($x_c,y_c,z_c$) to be constant. Therefore, as shown in the middle stage of FIG. 67, the depth position of a part (a part of the opposite side of the tip of the arrow) of the pointer 4 after the pointer 4 is inclined toward the back side is placed in the front side of the depth position before inclining the pointer 4. At this time, when the depth position of the pointer is adequately large, the part of the opposite side of the tip of the arrow of the pointer resides in the three-dimensional space represented on the display apparatus 3 after being inclined, so that the part can be displayed. However, as shown in FIG. 68A, for example, when the pointer is displayed on the display plane 301, in other words, on a border plane or on a neighborhood of the border plane between the three-dimensional space represented by the display apparatus and the real space in which the operator resides, the part of the opposite side of the tip of the arrow of the pointer 4 goes out of the three-dimensional space represented by the display apparatus 3 when the pointer 4 is inclined by being rotated, so that the part of the opposite side of the tip of the arrow of the pointer 4 cannot be displayed. Therefore, there is a problem in that the shape of the pointer 4 becomes a shape in which the part of the opposite side of the tip of the arrow lacks.

Therefore, in the three-dimensional pointing method in this embodiment 3-2, in the case where the end by which pointing is not performed lies off to a space that cannot be represented by the display apparatus as a result of rotating the pointer to incline in the depth direction, a pointer in which the lain-off part of the pointer 4 is projected on the XY plane in the three-dimensional space is generated so as to display the pointer. Accordingly, it can be avoided that the part lain off from the three-dimensional space lacks so that the shape of the pointer can be kept.

Instead of projecting the lain off part of the pointer 4 onto the XY plane of the three-dimensional space as shown in FIG. 68B, a pointer may be generated by bending the lain-off part toward the border plane (XY plane) of the three-dimensional space using a point, as an axis, on the border plane of the three-dimensional space, to display it.

For causing the system control apparatus 1 (pointing apparatus) to execute the three-dimensional pointing method of this embodiment 3-2, processes of steps 601-608 shown in FIG. 55 can be executed. However, in the three-dimensional pointing method of this embodiment 3-2, in the step 606 for inclining and displaying the pointer, when the pointer is inclined based on the calculation result of the step 605, it is determined whether there is a part lain off the three-dimensional space. When there is the part lain off the three-dimensional space, a pointer in which the lain off part is projected on the XY plane (border plane) or the lain off part is bent is generated so as to cause the display apparatus 3 to display the pointer.

In addition, in FIG. 67, although operation is described in the case where the pointer is located in the front side of the depth position of the object 5 and the pointer is inclined to the back side (in the +Z direction), the pointer can be also inclined to the front side (in the −Z direction) in the three-dimensional pointing method of this embodiment 3-2.

As described above, according to the three-dimensional pointing method of this embodiment 3-2, by rotating the pointer 4 such that the pointing point ($x_p,y_p,z_p$) moves toward the back side (in the +Z direction) or toward the front side (in the −Z direction) along the circumference of a circle of a radius r centering on a point ($x_c,y_c,z_c$) in the three-dimensional space while keeping the distance between each point of the pointer 4 and the point ($x_c,y_c,z_c$) to be constant, and causing the display apparatus 3 to display the pointer, the operator who sees the pointer 4 can recognize the depth position of the pointer 4 and the depth position at which the pointer 4 is pointing intuitively and accurately.

In addition, by adopting such pointer inclining method, since the three-dimensional length of the pointer 4 does not change, natural object display that is close to real-object display can be provided to the operator.

In the three-dimensional pointing method of this embodiment 3-2, although an example is shown in which the keyboard 201 and the mouse 202 are used as the input apparatus 2 and the pointer 4 is inclined in the depth direction by combining the operation of the control key 201A of the keyboard and the rotation operation of the wheel 202A of the mouse, the combination is not limited to the example. Other key of the keyboard 201 may be combined with the wheel 202A. A cursor key (direction key) of the keyboard may be used instead of the wheel 202A. In addition to that, the pointer may be inclined when performing predetermined operation using the pen tablet and the touch panel, and the joy stick and the like. In addition, the display apparatus 3 is not limited to the two-dimensional display apparatus such as the liquid crystal display and the like, and three-dimensional display apparatus such as the DFD can be also used.

In addition, in the three-dimensional pointing method in this embodiment 3-2, although the arrow-shaped pointer is taken as an example of the pointer 4, the shape is not limited to this. Any shape can be adopted as long as the operator can visually recognize the inclining direction and the pointing point (position) when the pointer is inclined in the depth direction.

In addition, in this embodiment 3-2, although a folder icon shaped-object shown in FIG. 51 etc. is taken as an example of an object, the shape is not limited to this. Any shape, such as icons (shortcut) of data file and an executable file, and a window and the like, can be adopted as long as the shape can be pointed at by the pointer.

In addition, in the pointing method of this embodiment 3-2, the pointing position in the depth direction of the pointer 4 can be recognized from the visual change of the shape of the pointer 4, for example. In addition to that, a reference may be displayed in the three-dimensional space on the display apparatus 3 wherein the reference is for causing the operator to recognize the amount of the inclination of the pointer 4.

By the way, in this embodiment, the center of the rotation is not necessarily at the position described in this embodiment. The center can be located in the inside or the outside of the three-dimensional space that is represented.

In addition, also in the three-dimensional pointing method of this embodiment 3-2, an operation for translating the pointer 4 in the depth direction while keeping the shape of the pointer 4 shown in FIG. 59 can be added to the operation for rotating the pointer 4 to incline it shown in FIG. 67, and also an operation for rotating the pointer in the XY plane shown in FIG. 60 can be added.

In addition, in the three-dimensional display method of this embodiment 3-2, the position of the point ($x_c,y_c,z_c$) used for rotating the pointer on the three-dimensional space is not limited to the position shown in FIG. 67, and the point can be located at any arbitrary point. In addition, the position of the point $(x_c, y_c, z_c)$ may be located in the three-dimensional space represented by the display apparatus 3 or may be located out of the three-dimensional space. In addition, the position of the point $(x_c, y_c, z_c)$ is not necessarily fixed, and may be moved in the three-dimensional space in synchronization with the rotation of the pointer.

FIGS. 70A and B are schematic diagrams for explaining an application example of the three-dimensional pointing method of this embodiment 3-2. FIG. 70A is a figure for showing a case in which the point of the center of the rotation is fixed in the three-dimensional space, and FIG. 70B is a figure for showing a case in which the point of the center of the rotation moves in the three-dimensional space.

In the three-dimensional pointing method of this embodiment 3-2, the pointer 4 is rotated such that the pointing point $(x_p, y_p, z_p)$ moves toward the back side (in the +Z direction) or toward the front side (in the −Z direction) along the circumference of a circle of a radius r centering on a point $(x_c, y_c, z_c)$ in the three-dimensional space while keeping the distance between each point of the pointer 4 and the point $(x_c, y_c, z_c)$ to be constant, so that the pointer is displayed in which the pointer is inclined to the back side or the front side. Therefore, any rotation method can be adopted as long as the operator can recognize that the pointer 4 inclines toward the back side or the front side, and recognize the depth position that is pointed at.

The simplest rotation method is to set a point $(x_c, y_c, z_c)$ as a center around which the pointer displayed at a depth position is rotated, and to rotate the pointer by fixing the position.

However, the three-dimensional pointing method of this embodiment 3-2 is not limited to such rotation method for the pointer. For example, as shown in FIG. 70B, after setting a point $(x_c, y_c, z_c)$ as a center around which the pointer displayed at a depth position is rotated, the point $(x_c, y_c, z_c)$ can be moved in the +X direction by $\Delta x$ in synchronization with the rotation of the pointer 4. In addition, not shown in the figure, the point $(x_c, y_c, z_c)$ can be moved in the −X direction by $\Delta x$ in synchronization with the rotation of the pointer 4.

Embodiment 3-3

FIGS. 71-73 are schematic diagrams for describing the three-dimensional pointing method of the embodiment 3-3 of the present invention. FIG. 71 shows a front view and a right side view showing change in the three-dimensional space when pointing at an object in the rear of the pointer. FIG. 72 is a perspective view of change of the three-dimensional space of FIG. 71, and FIG. 73 is a flowchart for explaining the process procedure when the three-dimensional pointing method of this embodiment 3-3 is executed in the system control apparatus (pointing apparatus). By the way, FIG. 71 shows three states of the three-dimensional space in the upper stage, the middle stage, and the lower stage respectively, and shows situations in which the state in the three-dimensional space changes from the upper stage to the middle stage, from the middle stage to the lower stage by performing operation indicated between the stages. FIG. 72 also shows three states in the upper stage, the middle stage, and the lower stage, each of which shows the situation in the three-dimensional space of each state of the upper stage, the middle stage, and the lower stage in FIG. 71 by a perspective view.

In the embodiments 3-1 and 3-2, the pointer 4 is inclined in the depth position so that the depth position of the part including the pointing point of the pointer 4 changes from the depth position of the end part of the opposite side of the pointing point so that the pointing depth position can be recognized easily and accurately. From the viewpoint that the pointing depth position can be recognized by changing the depth position of the part including the pointing point of the pointer 4 from the depth position of the end part of the opposite side of the pointing point, it is possible to recognize the pointing depth position not only by inclining the pointer in the depth direction while keeping the length and the shape of the whole pointer but also by moving only the pointing point and the vicinity in the depth direction (+Z direction or −Z direction). Thus, in this embodiment 3-3, a three-dimensional pointing method is described in which only the pointing point and the vicinity are moved in the depth direction (+Z direction or −Z direction).

Also in this embodiment 3-3, in the system configuration for realizing the three-dimensional pointing method, although various existing input devices such as keyboard, mouse, pen tablet, touch panel and joy stick can be used as the input apparatus 2, it is assumed that the keyboard 201 and the mouse 202 are used as shown in FIG. 51. In addition, also as to the display apparatus 3, although various display apparatuses can be used such as the two-dimensional display apparatus such as CRT and liquid crystal display, and the three-dimensional display apparatus such as DFD, it is assumed that the liquid crystal display (two-dimensional display apparatus) is used as shown in FIG. 51.

In addition, as shown in FIG. 51, for example, it is assumed that the display plane 301 is $z=0$ so that the display plane 301 is the XY plane, and that a three-dimensional coordinate system XYZ is set in which the direction heading to the back side from the display plane 301 when seen from the operation is the positive direction of the z axis. In this case, it is assumed that the moving direction and the moving distance of the pointer 4 in the XY plane displayed in the three-dimensional space are calculated (determined) based on the moving direction and the moving distance when moving the body of the mouse 202 two-dimensionally on a plane such as a desk.

In addition, as shown in FIG. 51, for example, the moving direction and the moving distance in the depth direction (z direction) are calculated (determined) based on a rotation direction and a rotation angle of a wheel 202A of the mouse 202 when rotating the wheel 202A while pushing a predetermined key 201A such as a control key (Ctrl key) of the keyboard 201. In this case, as shown in FIG. 51, for example, when rotating the wheel 202A of the mouse in the +Z direction, the part for performing pointing in the pointer is moved in the +Z direction, that is, in the direction heading to the back side as seen from the operator. When rotating the wheel 202A of the mouse in the −Z direction, the part for performing pointing in the pointer is moved in the −Z direction, that is, in the direction heading to the front side as seen from the operator.

In addition, in the three-dimensional pointing method in this embodiment 3-3, it is assumed that the shape of the pointer 4 is an arrow shape, and that the tip of the arrow indicates a pointing point $(x_p, y_p, z_p)$. Then, for performing pointing in the depth direction, only the part of the arrow moves in the depth direction (+Z direction or −Z direction), and the depth position of the part of the opposite side of the tip of the arrow is not changed. In addition, when the part of the arrow moves in the depth direction, the part of the arrow is connected to the part of the opposite side of the tip of the arrow to integrate them so that they can be recognized as one pointer.

As an example of the three-dimensional pointing method, a pointing method is described in a case where the pointer 4 and the object 5 are displayed in different positions in the three-dimensional space as shown in the upper stage of FIG.

71 and the upper stage of FIG. 72. From the viewpoint of the operator who sees the three-dimensional space from −Z direction, the pointer 4 is seen such that it overlaps on the object 5. But, since depth positions between the point ($x_p, y_p, z_p$) at which the pointer 4 points and the object 5 are different, the object is not pointed at.

From this state, it is assumed that the operator rotates the wheel 202A of the mouse in the +Z direction while pushing the control key 201A of the keyboard, for example. At this time, as shown in the middle stage of FIG. 71, the middle stage of FIG. 72, the lower stage of FIG. 71 and the lower stage of FIG. 72, only the part of the arrow including the pointing point ($x_p, y_p, z_p$) translates toward the back side (in the +Z direction). At this time, the part of the arrow of the pointer 4 is connected to the part of the opposite side of the tip of the arrow in which the depth position does not change as shown in the middle stage of FIG. 71 and the middle stage of FIG. 72, so that the pointer 4 has a shape in which an axis part between the part of the arrow and the part of the opposite side of the tip of the arrow extends and bends.

As described above, by rotating the wheel 202A of the mouse in the +Z direction while pushing the control key 201A of the keyboard, the pointer 4 inclines such that the pointing point (the part of the arrow) goes farther as seen from the operator. In addition, at this time, by rotating the pointer 4 while keeping the shape and the size of the pointer 4, the part of the arrow of the pointer 4 is displayed such that the width of the part is narrowed. As a result, the operator can recognize that the pointer 4 inclines in the depth direction (+Z direction), and at the same time, the operator can also recognize that the pointer 4 points a position in the back of the position before operation from the shape of the pointer 4.

In addition, at this time, as a result of continuing the operation to rotate the wheel 202A of the mouse in the +Z direction while pushing the control key 201A of the keyboard, when the pointing point ($x_p, y_p, z_p$) of the pointer 4 reaches the depth position the same as that of the object 5 so that the xyz coordinates of the tip of the pointer 4 become the same as xyz coordinates of an arbitrary point on the surface or in the inside of the object 5 as shown in the lower stage of FIG. 71 and the lower stage of FIG. 72, the object 5 enters a state in which it is pointed at by the pointer 4. Therefore, as shown in the lower stage of FIG. 71, for example, the state in which it is pointed is indicated by changing the color of the object 5. By doing so, the operator can recognize the depth position of the pointer 4 and the depth position at which the pointer is pointing from the shape of the pointer intuitively and accurately. In addition, by changing the color of the object 5 when the pointer 4 points at the object 5, it can be recognized intuitively and accurately whether the pointer 4 that overlaps on the object 5 points at the object 5.

For causing the system control apparatus 1 (pointing apparatus) to execute the three-dimensional pointing method of this embodiment 3-3, processes of steps 601-604, steps 607-608 and 609-610 shown in FIG. 73 can be executed. By the way, since the processes of steps 601-604 and steps 607-608 in FIG. 73 can be the same as the processes of steps 601-604 and steps 607-608 in FIG. 55, detailed description is not given.

In the step 609 shown in FIG. 73 that is for performing the process corresponding to the step 605 shown in FIG. 55, in the case of the three-dimensional pointing method of this embodiment 3-3, the moving direction (+Z direction or −Z direction) in the depth direction and the moving amount of the part (pointing part) for performing pointing in the pointer 4 are calculated.

In the step 610 shown in FIG. 73 that is for performing the process corresponding to the step 606 shown in FIG. 55, in this three-dimensional pointing method of this embodiment 3-3, the pointer generation means 103 divides the pointer 4 into a part that performs pointing and a part that does not perform pointing, changes the depth direction position of only the part that performs pointing, generates the pointer 4 by connecting the part that performs pointing and the part that does not perform pointing, and causes the display apparatus 3 to display it.

As described above, according to the three-dimensional pointing method of this embodiment 3-3, by dividing the pointer into a part that performs pointing and a part that does not perform pointing, changing the depth direction position of only the part that performs pointing, and displaying the pointer obtained by connecting the part that performs pointing and the part that does not perform pointing, the depth position of the pointer can be recognized accurately and intuitively.

For causing the system control apparatus 1 (pointing apparatus) to execute the three-dimensional pointing method of this embodiment 3-3, the pointer generation means 103 divides the pointer into a part that performs pointing and a part that does not perform pointing, changes the depth direction position of only the part that performs pointing, generates one pointer by connecting the part that performs pointing and the part that does not perform pointing, so that the pointer can be generated by relatively simple calculation processes. Therefore, compared with the pointer generation method to convert coordinates of each point on the pointer as performed in the embodiments 3-1 and 3-2, workload for pointer generation processing reduces and it becomes easy to display a pointer that changes quickly and smoothly.

In addition, in FIG. 71, although a case is explained in which there is the pointer 4 in the front side of the depth position of the object 5 as seen from the operator, and the pointer 4 is inclined to the back side (+Z direction), the pointer 4 may be inclined toward the front side (−Z direction) in the three-dimensional pointing method of this embodiment 3-3.

FIGS. 74A-D are schematic diagrams for explaining pointer connecting methods in the three-dimensional pointing method of this embodiment 3-3, and each of FIGS. 74A, 74B, 74C and 74D is a figure showing the pointer connecting method as seen from the YZ plane side.

Like the three-dimensional pointing method of this embodiment 3-3, for generating one pointer 4 by connecting the part for performing pointing and the part that does not perform pointing in which the depth positions are different, the pointer generation processing in the system control apparatus 1 becomes easy by connecting the parts with a plane as shown in the lower side of FIG. 71 and FIG. 74A. However, in the three-dimensional pointing method of this embodiment 3-3, the pointer connecting method is not limited to this. The connecting part (bending part) may be a curved plane as shown in FIG. 74B.

In addition, as to the method of connecting the pointing part and the connecting part and the method of connecting the part that does not perform pointing and the connecting part, as shown in FIG. 74C, for example, the pointing part may be connected to the connecting part smoothly, and the part that does not perform pointing may be connected to the connecting part by bending. In addition, inversely, as shown in FIG. 74D, the part that performs pointing may be connected to the connecting part by bending, and the part that does not perform pointing may be connected to the connecting part smoothly.

In the three-dimensional pointing method of this embodiment 3-3, since it is only necessary to divide the pointer into a part that performs pointing and a part that does not perform pointing, change the depth direction position of only the part that performs pointing, generate one pointer by connecting the part that performs pointing and the part that does not perform pointing and display it, the connecting method is not limited to before-described figures, and various connection methods can be used.

FIGS. 75-78B are schematic block diagrams for explaining an application example in the three-dimensional pointing method of this embodiment 3-3. Each of FIGS. 75, 76A and 76B is a figure showing an application example for moving while the shape of the part for performing pointing is kept, and each of FIGS. 75, 76A and 76B is a figure showing an application example for moving while the shape of the part for performing pointing is kept, and each of FIGS. 77A, 77B, 78A and 78B is a figure showing an application example for changing the shape of the part for performing. By the way, each of FIGS. 75, 76A, 76B, 77A, 77B, 78A and 78B sows a view (right side view) of the three-dimensional space as seen from the XZ plane side for making the path to be understood easily.

The method for moving the part that performs pointing is not limited to the method shown in the lower side of FIG. 71 in which the pointing point $(x_p, y_p, z_p)$ is moved to trace the path for moving in the +X direction in proportion to movement in the +Z direction. As shown in FIG. 75, for example, the pointing point $(x_p, y_p, z_p)$ may be moved to trace a path for moving in the −X direction in proportion to movement in the +Z direction.

In addition, the path for moving the pointing point $(x_p, y_p, z_p)$ in the depth direction is not limited to a straight line-like path. As shown in FIGS. 76A and 76A, for example, the pointing point $(x_p, y_p, z_p)$ may be moved so as to trace an arc-like path of a radius r centering on a point $(x_c, y_c, z_c)$ in the three-dimensional space.

In addition, in FIGS. 71, 75, 76A and 76B, when moving the part for performing pointing in the depth direction, the part is moved while keeping the shape for performing pointing constant, and the part for performing pointing is connected with the part that does not perform pointing according to the depth positions. But, the movement is not limited to this. As shown in FIGS. 77A, 77B, 78A and 78B, the part for performing pointing may be connected with the part that does not perform pointing with a plane that is parallel to the YZ plane, and the part for performing pointing may be enlarged or reduced or the length may be changed, according to the path on which the pointing point $(x_p, y_p, z_p)$ is moved.

The path on which the pointing point $(x_p, y_p, z_p)$ moves in the depth direction is not limited to the paths shown in each figure, and any path can be used.

In the three-dimensional pointing method of this embodiment 3-3, although an example is shown in which the keyboard 201 and the mouse 202 are used as the input apparatus 2 and the pointer 4 is inclined in the depth direction by combining the operation of the control key 201A of the keyboard and the rotation operation of the wheel 202A of the mouse, the combination is not limited to the example. Other key of the keyboard 201 may be combined with the wheel 202A, and a cursor key (direction key) of the keyboard may be used instead of the wheel 202A. In addition to that, the pointer may be inclined when performing predetermined operation using the pen tablet and the touch panel, and the joy stick and the like. In addition, the display apparatus 3 is not limited to the two-dimensional display apparatus such as the liquid crystal display and the like, and three-dimensional display apparatus such as the DFD can be also used.

In addition, in the three-dimensional pointing method in this embodiment 3-3, although the arrow-shaped pointer is taken as an example of the pointer 4, the shape is not limited to this. Any shape can be adopted as long as the operator can visually recognize the inclining direction and the pointing point (position) when the pointer is inclined in the depth direction.

In addition, in this embodiment 3-3, although a folder icon shaped-object shown in FIG. 51 etc. is taken as an example of an object, the shape is not limited to this. Any shape, such as icons (shortcut) of data file and an executable file, and a window and the like, can be adopted as long as the shape can be pointed at by the pointer.

In addition, in the pointing method of this embodiment 3-3, the pointing position in the depth direction of the pointer 4 can be recognized from the visual change of the shape of the pointer 4, for example. In addition to that, a reference may be displayed in the three-dimensional space on the display apparatus 3 wherein the reference is for causing the operator to recognize the amount of the inclination of the pointer 4.

In addition, also in the three-dimensional pointing method of this embodiment 3-3, as shown in FIG. 71, in addition to the operation for translating only the part for performing pointing in the pointer 4 in the depth direction, operation for translating the pointer 4 in the depth direction while keeping the shape of the pointer 4 may be added as shown in FIG. 59, or operation for rotating the pointer 4 in the XY plane may be added as shown in FIG. 60.

In addition, the pointing apparatus for executing the three-dimensional pointing method described in each embodiment is not necessarily a specific apparatus. The pointing apparatus can be realized by a computer and a program. In this case, it is only necessary that the program includes instructions for causing the computer to execute processes described in each embodiment, and the program can be recorded in any of magnetic, electrical, and optical recording mediums. In addition, the program is not only provided by recording it in the recording medium but also can be provided via a network such as the Internet.

The pointing technology described in the third embodiment can be carried out in combination with the technology for controlling the pointer using the input pen in the first and second embodiments, FIG. 61 shows an example.

In addition, in embodiments described with reference to FIGS. 5A-6C in the first and second embodiment, the pointing technology described in this third embodiment is applied in which an object located in the back side is pointed at while fixing the depth position of a part of the pointer.

Another embodiment for combining the first and second embodiments and the third embodiment is described next. This embodiment shows an example in which the technology for performing pointing while keeping the x,y coordinates of the pointing point to be constant which technology is described with reference to FIGS. 52-69 in the third embodiment is combined with the technology of the embodiments 1-1 and 2-1 described with reference to FIGS. 5A-6C in the first and second embodiments.

In this example, FIGS. 79-C shows front views and right side views showing changes of the pointer in the three-dimensional space when performing pointer operation using the input pen. The method for setting coordinates and assigning references in FIGS. 79A-C is the same as the first and second embodiments. In addition, basic conditions of apparatuses to be used are the same as those of the embodiments 1-1 and 2-1. The operation of the input pen is as described in the first and second embodiments, so that pointer control is performed by the pen pressure of the input pen, contacting time of the pen tip, operation amount of the operation means attached to the input pen, inclination of the input pen and the like.

However, in this embodiment, the pointer position/rotation angle calculation means in the first and second embodiments calculates the position, rotation angle and the like of the pointer while keeping the x, y coordinates of the pointing point to be constant in the same way as processes performed by the pointing position/deformation amount calculation means in the third embodiment. Next, the pointing operation in this example is described with reference to FIGS. 79A-C.

After the operator contacts the pen tip 201P of the input pen 201 with the display plane so that the pointer is displayed, from the state shown in FIG. 79A, the operator operates the input pen 201, for example (increase pen pressure, change inclination, operate operation means attached to the input pen 201, etc.). According to this operation, as shown in FIGS. 79B and 79C, the tip of the arrow moves in the −Z direction while the depth position of the end of the opposite side of the tip of the arrow of the pointer 303 is kept constant, so that the part of the arrow inclines toward the back side as seen from the operator. However, XY coordinates of the tip of the arrow are the same as the XY coordinates of the pen tip 201P, and are constant.

In the embodiments 1-1 and 2-1 (FIGS. 5A-6C), the pointer 303 exists on the extension of the pen tip 201P, and in this case, by inclining the input pen, the x, y coordinates of the pointing position (the tip part of the arrow) are changed even in a case where the position of the pen tip 201P does not change. On the other hand, in the example shown in FIGS. 79A-C to which the third embodiment is applied, the x, y coordinates of the pointing position are always the same as the x, y coordinates of the pen tip 201P, and only the depth position changes. At this time the pointer rotates according to the inclination of the input pen, but the pointing point is not changed. Accordingly, it becomes possible to determine the x, y coordinates of the pointing position using the position of the pen tip, and to control the depth position by the operation of the input pen.

Fourth Embodiment

Next, the forth embodiment of the present invention is described. The forth embodiment corresponds to the third object of the present invention.

In the three-dimensional display control method in the fourth embodiment, when a position of a pointer displayed in the three-dimensional space represented on the display apparatus is changed three-dimensionally, an object placed in the front side of the depth position of the pointer as seen from the observer of the three-dimensional space is transparentized and displayed. Accordingly, even when the pointer moves to the back side of an object as seen from the observer, the position of the pointer can be recognized. In addition, by transparentizing an object placed in the front side of the depth position of the pointer, an object hidden in the back side of another object can be pointed at without operation for moving or hiding the front side object, so that pointing operation of the observer (operator of the pointer) becomes easy and convenience of the observer improves.

In addition, in the three-dimensional display control method of the fourth embodiment, when transparentizing and displaying the object placed in the front side of the depth position of the pointer as seen from the observer, by transparentizing only a predetermined region centering on a point, of the object, overlapping with a pointing position of the pointer as seen from the observer, the position of the pointer can be recognized while recognizing a type and a state of the object placed in the front side of the depth position of the pointer.

In addition, instead of transparentizing only a predetermined region centering on the point, of the object, overlapping with a pointing position of the pointer as seen from the observer, by restoring the transparentized object to an opaque state before being transparentized when input information on operation of the pointer is not received for a predetermined time, the position of the pointer can be recognized while recognizing a type and a state of the object placed in the front side of the depth position of the pointer.

In addition, in the three-dimensional display method in the fourth embodiment, as to an object selected for performing operation such as moving, even when the object is placed in the front side of the depth position of the pointer, the object is not transparentized, so that it can be recognized that the object is in a selected state.

FIGS. 80-84 are schematic diagrams for explaining a three-dimensional display control method of the fourth embodiment of the present invention. FIG. 80 is a figure showing an outline configuration of a computer system to which the three-dimensional display control method of the fourth embodiment is applied, FIG. 81 is a figure for explaining the operation principle of the display apparatus (DFD) that can represent the three-dimensional space, FIG. 82 shows a front view and a right side view of an example of the three-dimensional space represented on the display apparatus, FIG. 83 is a perspective view (a bird's-eye view) of an example of the three-dimensional space represented on the display apparatus, and FIG. 84 is a figure showing an example of a method for operating the pointer.

In FIG. 80, 1 indicates a system control apparatus, 101 indicates an input information obtaining means, 102 indicates a pointer position calculation means, 103 indicates a pointer generation means, 104 indicates an object change determination means, 105 indicates an object generation/transparentizing means, 106 indicates a display control means, 107 indicates a process control means, 108 indicates a storing means, 2 indicates an input apparatus, and 3 indicates a display apparatus. In FIG. 81, 301A is a display plane in the front side as seen from the observer, 4 indicates an object recognized by the observer, 4A indicates an object displayed on the front side display plane, 4B indicates an object displayed on a back side display plane, and P indicates a viewpoint of the observer. In FIGS. 82 and 83, 401 indicates a pointer, 402a-402g indicate folder icons (objects), and 403a-403c are windows (objects). In FIG. 84, 201 indicates a mouse and 201A indicates a wheel of the mouse.

The three-dimensional display control method of the fourth embodiment is a method for controlling display of the pointer and the object in a case where the pointer displayed in the three-dimensional space represented on the display apparatus connected to the system control apparatus such as a PC, for example, is operated by the input apparatus such as the mouse to perform pointing (selection), moving, processing and the like for the object displayed in the three-dimensional space. By the way, the pointer can be considered to be one kind of the object, but, in this specification, the pointer is regarded as an object for pointing at an arbitrary point in the three-dimensional space, and is differentiated from other objects such as icon, window, pull down menu and the like.

As shown in FIG. 80, for example, the system control apparatus 1 includes an input information obtaining means 101 for obtaining input information from the input apparatus 2, a pointer position calculation means 102 for, when the information obtained by the input information obtaining means 101 is information (pointer operation information) on operation of the pointer, calculating a display position of the pointer based on the pointer operation information, a pointer generation means 103 for generating a pointer to be displayed at a position calculated by the pointer position calculation means 102, an object change determination means 104 for determining whether to change the display method of the object based on the position calculated by the pointer position calculation means 102, an object generation/transparentizing means 105 for generating a new object or transparentizing or opacifying an already generated object, and a display control means 106 for causing the display apparatus 3 to display the pointer generated by the pointer generation means 103 or the object generated or transparentized or ofacified by the object generation/transparentizing means 105.

In addition to the processes for generating the pointer, generating the object, transparentizing and opacifying, the system control apparatus 1 can processes such as launching and operating application software. Therefore, as shown in FIG. 80, the system control apparatus 1 includes a process control means 107 for controlling each process based on input information and the like from the input apparatus 2. In addition, the system control apparatus 1 includes a storing means 108 for storing executable programs of the application software and data for performing processing using the application software. The system control apparatus 1 determines types of the input information obtained by the input information obtaining means 101. When the information is the pointer operation information, the information is passed to the pointer position calculation means 103 to calculate a display position of the pointer. On the other hand, when the information is information other than the pointer operation information, the information is passed to the process control means 107 so as to cause it to perform processes such as execution of the application software.

The display apparatus 3 may be any apparatus as long as it is a display apparatus (display) that can represent the three-dimensional space. That is, the display apparatus is not limited to the three-dimensional display apparatus such as the DFD that can display a stereoscopic image. The display apparatus may be a two-dimensional display apparatus such a general CRT or liquid crystal display. When the display apparatus is the DFD, by displaying the pointer and the object at depth positions corresponding to respective three-dimensional positions, placement of the pointer and the object can be ascertained three-dimensionally.

As described so far, the DFD is a display apparatus in which plural display planes are arranged such that the display planes are overlapped when viewed from the observer. As shown in FIG. 81, for the sake of simplifying the explanation, assuming that two planes 301A and 301B are overlapped with each other, the image of the pointer or the object is displayed on both of the display planes 301A and 301B such that they overlaps as seen from the viewpoint P of the observer. If the DFD is the brightness modulation type, when the object 4A of the front side display plane 301A is displayed with brightness $L_A$ and the object 303B of the back side display plane 301B is displayed with brightness $L_B$, the object 4 is seen as being displayed between the display planes 301A and 301B and at a depth position wherein a ratio between distance of the position from the front side display plane 301A and distance of the position from the back side display plane 301B is $L_B:L_A$. Therefore, by changing the ratio between brightness $L_A$ of the object 4A displayed on the front side display plane 301A and brightness $L_B$ of the object 4B displayed on the back side display plane 301B, the object 4 can be displayed between an arbitrary depth position between the display planes 301A and 301B. In addition, although not shown in the figure, by gradually increasing the brightness of the object 4A of the front side display plane 301A from the top to the bottom on the surface of FIG. 81, and by gradually increasing the brightness of the object 4B of the back side display plane 301B from the bottom to the top on the surface of FIG. 81, the object is seen as if the upper part of the object 4 inclines to the back side.

In addition, although not shown in the figure, when the DFD is the transparent type, by increasing the transparency of each pixel that displays the object 4A on the front side display plane 301A, the object 4 is seen as being displayed near the back side display plane 301B, and by decreasing the transparency of each pixel that displays the object 4A on the front side display plane 301A, the object 4 is seen as being displayed near the front side display plane 301A. Thus, by changing transparency of each pixel that displays the object 4A on the front side display plane 301A, the object 4 can be displayed at an arbitrary depth position between the display planes 301A and 301B.

When the display apparatus 3 is a two-dimensional display apparatus such as the liquid crystal display, placement of the pointer and the object can be ascertained three-dimensionally by placing the pointer and the object three-dimensionally in the virtual three-dimensional space set in the system control apparatus 1, and after that, by generating an image that is obtained by projecting the state onto a two-dimensional display plane, and displaying the image.

As shown in FIGS. 82 and 83, for example, the system control apparatus 1 to which the display apparatus 3 that can represent the tree-dimensional space is connected, can display a three-dimensional desktop that three-dimensionally places (displays) objects such as a pointer 401, folder icons 402a-402g, and windows 403a-403c. At this time, the observer (operator) can use application software executable in the system control apparatus 1 by using the three-dimensional desktop as GUI.

At this time, a space between the front side display plane 301A and the back side display plane 301B is regarded as the three-dimensional desktop space. As shown in FIGS. 82 and 83, for example, assuming that a three-dimensional coordinate system XYZ is set in which the depth position of the front side display plane 301A is z=0 and in which the display planes 301A and 301B are in parallel to the XY plane, and in which the direction going from the front side display plane 301A to the back side display plane 301B is set to be the positive direction of the Z axis, the position at which the pointer 401 points is specified as coordinates $(x_p, y_p, z_p)$. Therefore, by determining the coordinates $(x_p, y_p, z_p)$ of the position at which the pointer 401 points by using the input apparatus 2, the pointer can be moved to an arbitrary point in the three-dimensional desktop space, so as to be able to point at objects such as the folder icons 402a-402g and the windows 403a-403c placed in the three-dimensional desktop space.

As the input apparatus 2 for moving the pointer three-dimensionally, an existing input apparatus such as a mouse with a wheel function (to be referred to as mouse) can be used, for example. For moving the pointer three-dimensionally using the mouse, as shown in FIG. 84, for example, a moving amount $(+x_I$ or $-x_I)$ in the $X_I$ axis direction when moving the body of the mouse on the plane such as a desk is reflected to a moving amount of the pointer 401 in the X axis direction, and a moving amount $(+y_I$ or $-y_I)$ in the $Y_I$ axis direction is reflected to a moving amount of the pointer 401 in the Y axis direction, so that XY coordinates $(x_p, y_p)$ of the pointer 401 are determined. In addition, a rotation amount $(+z_I$ or $-z_I)$ in a rotation direction of the wheel 201A of the mouse 201 is reflected to a moving amount in the Z axis direction of the pointer 401, so that the depth position (Z coordinate) $z_p$ of the pointer 401 can be determined.

In addition, the input apparatus 2 is not limited to the mouse. An input apparatus such as the keyboard and the pen tablet and the like can be used, for example. In addition, by combining the mouse and the keyboard, a rotation direction and a moving amount when rotating the wheel 201A while pushing a specific key on the keyboard can be reflected to the moving amount of the pointer 401 in the Z axis direction.

By the way, this embodiment for controlling display of other objects according to the three-dimensional position of the pointer can be applied to the first-third embodiments. That is, for the first and second embodiments, when moving the pointer by the operation of the input pen, display of other objects is controlled by applying the technology of the fourth embodiment. As for the third embodiment, when performing pointing in the depth direction with the pointer, display of other objects are controlled according to deformation and movement of the object.

In the following, methods for controlling display of the pointer and the object in the three-dimensional space (three-dimensional desktop) represented on the display apparatus is described taking a case, as an example, in which the mouse is used as the input apparatus, and the DFD is used as the display apparatus.

Embodiment 4-1

FIGS. 85-87 are schematic diagrams for describing the three-dimensional display control method of the embodiment 4-1 of the present invention. FIGS. 85 and 86 are figures showing situations of change of the three-dimensional space when the display control method of this embodiment 4-1 is applied, and FIG. 87 is a figure showing a situation of the change of the three-dimensional space for describing a conventional display control method for comparing with the display control method of this embodiment 4-1. By the way, each of FIGS. 85 and 86 shows three states in the upper stage, the middle stage, and the lower stage respectively, in which a state changes to another state by performing operation indicated in the figure. In addition, each state shows a front view and a right side view when an observer views the three-dimensional space.

In this embodiment 4-1, a display control method is described in which, when three-dimensionally moving a pointer 401 displayed in the three-dimensional desktop space shown in FIGS. 82 and 83, for example, and pointing at an arbitrary point in the three-dimensional desktop space, an object placed in the front side of the depth position of the pointer as seen from the observer (operator) is transparentized.

In addition, in this embodiment 4-1, for the sake of simplifying the explanation, as shown in the upper side of FIG. 85, for example, a case where the three-dimensional desktop space displays three objects of the pointer 401, folder icons 402a and 402b, and the window 403 is taken as an example in the description. Relationship among the three objects of the pointer 401, folder icons 402a and 402b, and the window 403 is as shown in the upper stage of FIG. 85, first, in which the pointer 401 is displayed in the front side of the depth position of the window 403 as seen from the observer. In addition, the folder icon 402 is placed in the back side of the window 403 as seen from the observer so that the folder icon 402b is hidden from the observer.

At this time, when the operator rotates the wheel of the mouse so as to move the pointer 401 in the +Z (z>0) direction, the pointer 401 comes close to the window 403 as shown in the middle stage of FIG. 85. Then, when the pointer 401 reaches a depth position within a predetermined range from the depth position of the window 403, the window 403 enters a state in which it is pointed at, and the display changes for indicating that it is pointed at, e.g., the color of the window 403 is changed, as shown in the middle stage of FIG. 85, for example.

From this state, when the operator further rotates the wheel of the mouse so as to move the pointer 401 in the +Z (z>0) direction, the pointer 401 passes through the window 403 and continues to move toward the back side display plane 301B. Then, the pointer that passes through the window 403 separates from the depth position of the window 403 by a depth distance more than a predetermined range, the window restores from the state in which it is pointed at to a state in which it is not pointed at, and the color of the window is restored to the original color, for example.

However, at the same time when the pointer 401 passes through the window 403, the window through which the pointer 401 passes is displayed in the front side of the depth position of the pointer 401 as seen from the observer. Thus, the system control apparatus 1 transparentizes the window 403 that is displayed in the front side of the depth position of the pointer 401 and displays it as shown in the lower stage of FIG. 85. As a result, the observer (operator) can easily recognize the position of the pointer 401 even when the pointer 401 moves to a position that is in the back side of the window 403. In addition, only by moving the pointer 401 in the +Z (z>0) direction, it can be recognized whether another object is hidden in the back side of the window 403 and the position of the hidden folder icon 402b can be recognized.

In addition, as shown in the lower side of FIG. 85, in a state in which the window 403 located in the front side of the depth position of the pointer 401 is transparentized, when the wheel of the mouse is rotated in the reverse direction for example, the display of the window 403 changes to a display indicating it is pointed at the time when the pointer 401 reaches a depth position within a predetermined range from the depth position of the window 403 as shown in the middle stage of FIG. 85. Then, when the pointer 401 is further moved toward the front side display plane 301A so that the pointer 401 separates from the depth position of the window 403 by a distance within a predetermined range, the display of the window 403 is restored to the original standard display as shown in the upper stage of FIG. 85. As a result, the observer (operator) can restore the transparentized window 403 to the original opaque display only by moving the pointer 401 in the −Z (z<0) direction.

In the example shown in FIG. 85, the pointer 401 is overlapped with the window 403, and the window 403 is transparentized when the pointer 401 passes through the window 403 so as to move to a position in the back side of the window 403. But, the transparentizing method is not limited this. As shown in the upper stage of FIG. 86, for example, the window 403 can be also transparentized also when the depth position of the pointer 401 is changed at a position in which the pointer 401 is not overlapped with an object such as the window 403. In this case, in the state shown in the upper stage of FIG. 86, when the pointer 401 is moved toward the back side display plane 301B so that the relationship between the depth position $z_p$ of the pointer and the depth position $z_o$ of the window 403 becomes $z_p > z_o$, the window 403 is transparentized and displayed as shown in the middle stage of z FIG. 86. As a result, the observer (operator) can recognize the position of the folder icon 402b hidden in the back side of the window 403 only by moving the pointer 401 in the +Z (z>0) direction, so that the folder icon 402b can be easily pointed at with the pointer 401. In addition, according to the above-mentioned method, when the pointer 401 is further moved toward the back side display plane 301B from the state shown in the middle stage of FIG. 86 so that the relationship between the depth position $z_p$ of the pointer and the depth position $z_f$ of the folder icon 402a becomes $z_p > z_f$, the folder icon 402a is transparentized as shown in the lower stage of FIG. 86. Then, inversely, from the sate shown in the lower stage of FIG. 86, when the pointer 401 is moved toward the front side display plane 301A, the state returns to the original state in which the opaque folder icon 402a and the window 403 are displayed as shown in the upper stage of FIG. 86 via the state shown in the middle stage of FIG. 86. As a result, the observer (operator) can recognize the position of the pointer 401 also when the pointer 401 moves to the position in the back side of the window 403. In addition, only by moving the pointer 401 in the +Z (z>0) direction, it can be recognized whether another object is hidden in the back side of the window 403 and the position of the hidden folder icon 402b can be recognized.

In a conventional display control method of the three-dimensional desktop space, as shown in FIG. 87, for example, when the pointer is moved to the position in the back side of the window as seen from the observer, the pointer 401 is hidden behind the window 403, so that the observer cannot recognize the position of the pointer 401. Therefore, for recognizing whether another object is hidden in the back side of the window 403, for recognizing the position of the hidden object, and for performing operation such as selection, for example, in the conventional display control method, the observer must perform operation for moving the window 403, reducing the display region, or setting the display region to be a non-display status. Then, after performing the operation, for checking information displayed in the window 403, the operator must perform operation for restoring the window to an original position, enlarging the display region or for restoring the display region to the display state. As a result, operation becomes complicated and convenience of the observer (operator) is bad when the observer selects an object displayed in the back side as seen from the observer in the three-dimensional desktop space that displays many objects such as the folder icons 402a-402g, and windows 403a-40sc as shown in FIGS. 82-83, for example.

On the other hand, according to the display control method of this embodiment 4-1, the object in the front side of the depth position of the pointer 401 is transparentized only by moving the pointer 401 in the direction toward the back side as seen from the observer. Therefore, even when the pointer 401 moves to a position in the back side of the transparentized object, the position of the pointer 401 can be easily recognized. In addition, only by moving the pointer toward the back side as seen from the observer, the object in the front side of the depth position of the pointer 401 is transparentized, so that the state of the back side of the object can be recognized. Therefore, another object hidden behind an object can be easily pointed at. Then, only by moving the pointer 401 toward the front side as seen from the observer, the object that becomes in the back side of the depth position of the pointer 401 returns to the opaque state so that the display information of the transparentized object can be recognized.

For realizing such three-dimensional display control method of this embodiment 4-1 by using the system control apparatus shown in FIG. 80, it is only necessary that the system control apparatus 1 execute processes of steps 501-510 shown in FIG. 88.

FIG. 88 is a flowchart showing a process procedure in the apparatus for realizing the three-dimensional display control method of this embodiment 4-1.

In the system configuration apparatus 1 having the configuration shown in FIG. 80, for controlling display for the pointer 401 and the objects 402a, 402b and 403, the pointer 401 and the object are displayed on the display apparatus 3, first, as shown in FIG. 88 (step 501). Then, when the observer (operator9 operates the input apparatus 3 such as a mouse, the input information obtaining means 101 obtains input information (operation information) from the input apparatus 2 (step 502). When the input information obtaining means 101 obtains the input information, the input information obtaining means 101 determines whether the input information is information (pointer operation information) on operation of the pointer, for example (step 503). When the input information is not the pointer operation information, the process control means 107 executes another process according to the input information (step 504).

On the other hand, when the input information is the pointer operation information, the input information obtaining means 101 passes the input information to the pointer position calculation means 102 to cause it to calculate a moving amount of the pointer and to calculate a new display position $(x_p, y_p, z_p)$ of the pointer (step 505).

Then, after the pointer position calculation means 102 calculates the new display position $(x_p, y_p, z_p)$ of the pointer, the pointer position calculation means 102 causes the pointer generation means to generate a pointer to be newly displayed on the display apparatus, and the pointer is displayed on the display apparatus via the display control means 106 (step 506).

In addition, after the pointer position calculation means 102 calculates the new display position $(x_p, y_p, z_p)$ of the pointer, the pointer position calculation means 102 causes the object change determination means 104 to determine whether there is any object that is pointed at and whether the object is placed in the front side of the depth position of the pointer, namely, the pointer position calculation means 102 causes the object change determination means 104 to determine whether xyz coordinates of a point at which the pointer points are within a predetermined range from xyz coordinates of an arbitrary point on the surface or the inside of the object, and whether there is an object that includes a point, on its surface or in its inside, having z coordinate smaller than z coordinate of the point at which the pointer points (steps 507 and 509). Then, when there is the object that is pointed at, the object generation/transparentizing means 105 changes the state of the object to a state in which the object is pointed at, so as to cause the display apparatus 3 to display the object via the display control means 106 (step 508). In addition, when the object exists in the front side of the depth position of the pointer, the object generation/transparentizing means 105 change the transparency of the front side object to a predetermined transparency α, so as to cause the display apparatus 3 to display the object via the display control means 106 (step 510).

In the example shown in FIG. 88, although it is determined first whether there is an object that is pointed at, process order is not limited to this. It may be determined first whether there is an object in the front side of the depth position of the pointer.

By performing such processes in the system control apparatus 1, it becomes possible to control display for the pointer 401 and the objects 402a-403 shown in FIG. 85 or 87.

As described above, according to the three-dimensional display control method of this embodiment 4-1, by transparentizing the object placed (displayed) in the front side of the depth object of the pointer, even when the pointer moves to a position in the back side of the object, the position of the pointer is not lost and can be easily recognized.

In addition, by moving the pointer 401 toward the back side as seen from the observer, the object can be transparentized, so that it becomes easy to perform operation for recognizing whether another object is hidden behind an object or recognizing the position of the object hidden behind the object compared with the conventional method. In addition, by moving the pointer 401 toward the front side as seen from the observer, the transparentized object can be restored to the original opaque state, so that it becomes easy to perform operation for recognizing display information of the transparentized object compared with the conventional method. That is, by applying the three-dimensional display control method of this embodiment 4-1, the convenience of the observer (operator) improves.

In addition, in the three-dimensional display control method of this embodiment 4-1, as shown in FIG. 86, for example, the object placed (displayed) in the front side of the depth position of the pointer is transparentized irrespective whether the object overlaps with the pointer as seen from the observer, the method is not limited to this example. Only an object that is in the front side of the depth position of the pointer and that overlaps with the pointer as seen from the observer may be transparentized.

FIGS. 89-90 are schematic diagrams for describing an application example of the three-dimensional display control method of the embodiment 4-1. FIG. 89 is a figure showing situations of change of the three-dimensional space when the application example is applied, and FIG. 90 is a flowchart showing a process procedure in the apparatus for realizing the application example. By the way, FIG. 89 shows three states in the upper stage, the middle stage, and the lower stage respectively, in which a state changes to another state by performing operation indicated in the figure. In addition, each state shows a front view and a right side view when an observer views the three-dimensional space.

For describing a case where only an object that is in the front side of the depth position of the pointer and that overlaps with the pointer as seen from the observer is transparentized, it is assumed that the display state of the three-dimensional desktop is in a state in which the pointer 401 is in the front side of the depth position of the window 403 as seen from the observer, but the pointer is not overlapped with the window 403 as shown in the upper stage of FIG. 89. In this state, it is assumed that, for example, the pointer 401 is moved toward the back side as seen from the observer and the depth position of the window 403 becomes in the front side of the depth position of the pointer 401 as shown in the middle stage of FIG. 89. In the three-dimensional display control method of this embodiment 4-1, as shown in the middle stage of FIG. 86, the window 403 is transparentized irrespective of whether the pointer 401 is overlapped with the window 403 as seen from the observer.

However, in the display state shown in the middle stage of FIG. 89, since the observer can recognize the position of the pointer 401 without transparentizing the window 403, it is not necessary to transparentize the window 403.

However, in the display state shown in the middle stage of FIG. 89, for example, when the pointer 401 is moved to a position in the back side of the window 403, since the window is displayed as opaque, the pointer 401 is hidden behind the window 403 as shown in FIG. 87 so that the position of the pointer 401 cannot be recognized as it is.

Thus, as shown in the lower stage of FIG. 89, after moving the pointer 401, when there is a window 403 in the front side of the depth position of the pointer 401 and that overlaps with the pointer 401 as seen from the observer, the window 403 is transparentized. Accordingly, similar to the three-dimensional display control method of this embodiment 4-1, the pointer that moves to a position in the back side of the object can be recognized easily. In addition, it becomes possible to recognize whether another object is hidden in the back side of the object or to recognize the position of the another object hidden in the back side of the object.

For realizing such three-dimensional display control method by using the system control apparatus shown in FIG. 80, it is only necessary that the system control apparatus 1 executes processes of steps 510a-510c shown in FIG. 90 in the step 510 in the process procedure shown in FIG. 88.

That is, in the determination of step 509 shown in FIG. 88 by the object change means 104, when it is determined that objects exist in the front side of the depth position of the pointer 401, the display region of the front side object is checked before the object generation/transparentizing means 105 transparentizes the object (step 510a).

Then, next, it is determined whether there is an object, of objects existing in the front side, that overlaps with the pointer 401 as seen from the observer (step 510b). In the 510b, for example, it is checked whether a part (a point) of the object is displayed at a XY position of the object in a depth position that overlaps with a display position $(x_p, y_p)$ of the pointer as seen from the observer. When it is determined that there is the overlapping object, the object is displayed on the display apparatus 3 with the transparency α (step 510c).

By doing so, it becomes possible that an object that does not overlap with the pointer 401 is kept to be displayed as opaque even when the object is in the front side of the depth position of the pointer 401.

In the before-mentioned three-dimensional display control method of this embodiment 4-1, since every object that is in the front side of the depth position of the pointer 401 is transparentized, there is a case where an object for which transparentizing is unnecessary is transparentized. Then, for checking display information of the transparentized object, it is necessary to move the pointer 401 toward the front side as seen from the observer so as to restore the transparentized object to the opaque state.

On the other hand, according to the three-dimensional display control method as shown in FIG. 89, when the pointer 401 moves to the position in the back side of the object, only the object hiding the pointer 401 is transparentized. Therefore, by displaying the pointer 401 at a position that does not overlap with objects, every object is displayed to be opaque as usual so that only an object for which transparentizing is necessary can be transparentized. Accordingly, operation for restoring the transparentized object to the opaque display becomes two-dimensional operation in the XY plane. Thus, it can be considered that convenience of operation improves compared with the three-dimensional display control method of the before-mentioned embodiment 4-1.

Embodiment 4-2

FIGS. 91-93 are schematic diagrams for describing the three-dimensional display control method of the embodiment 4-2 of the present invention. FIG. 91 is a figure showing situations of change of the three-dimensional space when the display control method of this embodiment 4-2 is applied, FIG. 92 shows an example of a method for determining a transparency, and FIG. 93 is a flowchart showing a process procedure in the apparatus for realizing the three-dimensional display method of the embodiment 4-2. By the way, FIG. 91 shows three states in the upper stage, the middle stage, and the lower stage respectively, in which a state changes to another state by performing operation indicated in the figure. In addition, each state shows a front view and a right side view when an observer views the three-dimensional space.

In this embodiment 4-2, a display control method is described in which, when transparentizing the object in the back side of the depth position of the pointer 401, the transparency is changed according to the distance from the pointer, so as to increase degree of recognition for the depth position of the pointer 401 and for an object that is in the front side of the depth position of the pointer 401 wherein the depth position of the object is close to the depth position of the pointer 401.

In addition, in this embodiment 4-2, for the sake of simplifying the explanation, as shown in the upper side of FIG. 91, for example, a case where the three-dimensional desktop space displays three objects of the pointer 401, folder icons 402a and 402b, and the window 403 is taken as an example in the description. Relationship among the three objects of the pointer 401, folder icons 402a and 402b, and the window 403 is as shown in the upper stage of FIG. 91, first, in which the pointer 401 is displayed in the front side of the depth position of the window 403 as seen from the observer. In addition, the folder icon 402b is placed in the front side of the window 403 as seen from the observer. In addition, the folder icon 402b is placed in a position in the back side of the window 403 as seen from the observer so as to be hidden from the observer.

At this time, when the operator rotates the wheel of the mouse so as to move the pointer 401 in the +Z (z>0) direction so that the depth position of the pointer 401 becomes in the back side of the depth position of the window 403 as seen from the observer as shown in the middle stage of FIG. 91, the window 403 is transparentized. However, in the display control method of this embodiment 4-2, as shown in the middle stage of FIG. 91, when the distance (difference) between the depth position of the pointer 401 and the depth position of the window 403 is small, the window is not completely transparentized, but the window is displayed with a transparency such that the state of the back side of the window 403 can be recognized.

From this state, when the operator further rotates the wheel of the mouse so as to move the pointer 401 in the +Z (z>0) direction so that the distance (difference) between the depth position of the pointer 401 and the depth position of the window 403 becomes large as shown in the lower stage of FIG. 91, the transparency of the window 403 gradually becomes high, and finally, the window is completely transparentized. At this time, as shown in the lower stage of FIG. 91, for example, the folder icon 402a is also transparentized. But, since the distance between the depth position of the pointer 401 and the depth position of the folder icon 402a is smaller than the distance between the depth position of the pointer 401 and the depth position of the window 403, the folder icon 402a is displayed with a transparency smaller than that of the window 403.

As a result, the observer (operator) can easily recognize the position of the pointer 401 even when the pointer 401 moves to a position that is in the back side of the window 403. In addition, only by moving the pointer 401 in the +Z (z>0) direction, it can be recognized whether another object is hidden in the back side of the window 403 and the position of the hidden folder icon 402b can be recognized. In addition, from the transparency of the transparentized object, the depth position of the pointer, and the object that is in the front side of the depth position of the pointer wherein the depth position of the object is close the depth position of the pointer can be easily recognized.

In addition, as shown in the lower side of FIG. 91, in a state in which the window 403 and the folder icon 402a located in the front side of the depth position of the pointer 401 are transparentized, by rotating the wheel of the mouse in the reverse direction for example, when the pointer reaches the depth position of the folder icon 402a, the display of the folder icon 402a is changed to the original opaque display as shown in the middle stage of FIG. 91. At this time, since the depth direction distance between the pointer 401 and the window 403 becomes small, the transparency of the window 403 becomes small. Then, when the pointer 401 is further moved toward the front side display plane 301A so that the pointer 401 reaches the depth position of the window 403, the window 403 is changed to be displayed opaque as original as shown in the upper stage of FIG. 91. As a result, the observer (operator) can restore the transparentized window 403 to the original opaque display only by moving the pointer 401 in the −Z (z<0) direction.

As to the transparency α of the object, when it is assumed that α=0 corresponds to completely transparent, and that α=1 corresponds to completely opaque, for transparentizing an object in the front side of the depth position of the pointer 401, it is only necessary that, as shown in the solid line in FIG. 92 for example, α is continuously changed between 1 and 0 in proportion to the depth direction distance of the object in the front side of the pointer 401, and the object is completely transparentized (α=0) when the distance is maximized, that is, when the object is displayed on the front side display plane 301A of the DFD and the pointer 401 is displayed on the back side display plane 301B. In addition, as shown in the dotted line in FIG. 92, the transparency may be set to be α=0 when the distance is $Z_c$ that is smaller than the maximum distance. In addition, although not shown in the figure, the transparency α may be set such that it becomes smaller in reverse proportion to square of the distance.

For realizing such three-dimensional display control method by using the system control apparatus shown in FIG. 80, it is only necessary that the system control apparatus 1 executes processes of steps 501-510 shown in FIG. 88. However, in the three-dimensional control method of this embodiment 4-2, in the step 510 in the process procedure shown in FIG. 88, steps 510d-510h shown in FIG. 93 are performed.

That is, for realizing the three-dimensional display control method of this embodiment 4-2, in the determination of step 509 shown in FIG. 88 by the object change determination means 104, when it is determined that objects exist in the front side of the depth position of the pointer 401, before the object generation/transparentizing means 105 transparentizes the object, one object to be transparentized is selected first (step 510d).

Next, depth direction distance between the selected object and the pointer 401 is calculated (step 510e). Then, the transparency a of the selected object is calculated based on the calculated depth direction distance (step 510f).

After calculating the transparency α of the selected object in step 510f, an object with the transparency calculated by the object generation/transparentizing means 105 is generated, and the object is displayed by the display apparatus 3 via the display control means 106 (step 510g).

Accordingly, after displaying the selected object with the transparency α according to the distance, it is determined whether there is another object to be transparentized or another object for which the transparency is changed (step 510*h*), when there is such object, the procedure returns to the step 510*d* so that processes of steps 510*d*-510*g* are repeated.

By performing such processes in the system control apparatus 1, it becomes possible to control display for the pointer 401 and the objects 402*a*-403 shown in FIG. 91.

As described above, according to the three-dimensional display control method of this embodiment 4-2, by transparentizing the object placed (displayed) in the front side of the depth object of the pointer, even when the pointer moves to a position in the back side of the object, the position of the pointer is not lost and can be easily recognized.

In addition, by moving the pointer 401 toward the back side as seen from the observer, the object can be transparentized, so that it becomes easy to perform operation for recognizing whether another object is hidden behind an object or recognizing the position of the object hidden behind the object compared with the conventional method. In addition, by moving the pointer 401 toward the front side as seen from the observer, the transparentized object can be restored to the original opaque state, so that it becomes easy to perform operation for recognizing display information of the transparentized object compared with the conventional method. That is, by applying the three-dimensional display control method of this embodiment 4-2, the convenience of the observer (operator) improves.

In addition, in this embodiment 4-2, when transparentizing the object that is in the front side of the depth position of the pointer 401, by changing the transparency of the front side object according to the depth direction distance between the pointer 401 and the front side object, it becomes easy to recognize the depth position of the pointer 401 or to recognize an object of which the depth position is close to the depth position of the pointer 401.

Embodiment 4-3

FIGS. 94-95A,B are schematic diagrams for describing the three-dimensional display control method of the embodiment 4-3 of the present invention. FIG. 94 is a figure showing situations of change of the three-dimensional space when the display control method of this embodiment 4-3 is applied, and FIGS. 95A and 95B are figures showing an example of a method for determining the transparency. By the way, FIG. 94 shows three states in the upper stage, the middle stage, and the lower stage respectively, in which a state changes to another state by performing operation indicated in the figure. In addition, each state shows a front view and a right side view when an observer views the three-dimensional space.

In the embodiment 4-3, a display control method is described in which, when transparentizing an object in the front side of the depth position of the pointer 401, only the inside of a region centering on the pointing position $(x_p, y_p, z_p)$ of the pointer 401 as seen from the observer is transparentized, so as to decrease visual botheration due to transparentizing and opacifying the object.

In addition, in this embodiment 4-3, for the sake of simplifying the explanation, as shown in the upper side of FIG. 94, for example, a case where the three-dimensional desktop space displays three objects of the pointer 401, folder icons 402*a* and 402*b*, and the window 403 is taken as an example in the description. Relationship among the three objects of the pointer 401, folder icons 402*a* and 402*b*, and the window 403 is as shown in the upper stage of FIG. 94, first, in which the pointer 401 is displayed in the front side of the depth position of the window 403 as seen from the observer. In addition, the folder icon 402 is placed in the back side of the window 403 as seen from the observer so that the folder icon 402*b* is hidden from the observer.

At this time, when the operator rotates the wheel of the mouse so as to move the pointer 401 in the +Z ($z>0$) direction, the pointer 401 comes close to the window 403 as shown in the middle stage of FIG. 94. Then, when the pointer 401 reaches a depth position within a predetermined range from the depth position of the window 403, the window 403 enters a state in which it is pointed at, and the display changes for indicating that it is pointed at, e.g., the color of the window 403 is changed, as shown in the middle stage of FIG. 94, for example.

From this state, when the operator further rotates the wheel of the mouse so as to move the pointer 401 in the +Z ($z>0$) direction, the pointer 401 passes through the window 403 and continues to move toward the back side display surface 301B, as shown in the lower stage of FIG. 94. Then, the pointer that passes through the window 403 separates from the depth position of the window 403 by a depth distance more than a predetermined range, the window restores from the state in which it is pointed at to a state in which it is not pointed at, and the color of the window is restored to the original color, for example.

However, at the same time when the pointer 401 passes through the window 403, the window through which the pointer 401 passes is displayed in the front side of the depth position of the pointer 401 as seen from the observer. Thus, the system control apparatus 1 transparentizes the window 403 that is displayed in the front side of the depth position of the pointer 401 and displays it as shown in the lower stage of FIG. 94. In addition, at this time, the whole of the window 403 is not transparentized as described in the embodiment 4-1, but only the inside of a circle of a radius a centering on a position overlapping with the pointing position (tip of the arrow, for example) of the pointer 401 is transparentized. As a result, the observer (operator) can easily recognize the position of the pointer 401 even when the pointer 401 moves to a position that is in the back side of the window 403. In addition, only by moving the pointer 401 in the +Z ($z>0$) direction, it can be recognized whether another object is hidden in the back side of the window 403 and the position of the hidden folder icon 402*b* can be recognized. In addition, as shown in the lower side of FIG. 94, only the neighborhood of the region that overlaps with the pointer 401 is transparentized/opacified in the window 403. Therefore, for example, when the pointer 402 is moved drastically in the depth direction, only a part of the window 403 is transparentized/opacified so that visual botheration can be reduced.

When transparentizing only the inside of the circle of the radius a centering on the point overlapping the pointing position $(x_p, y_p, z_p)$ of the pointer 401 as seen from the observer, the transparency may be changed like delta function, e.g, the transparency may be changed such that transparency is $\alpha=0$ (completely transparent) in the inside of the circle of the radius a and transparency is $\alpha=1$ (completely opaque) in the outside of the circle of the radius 1, or, as shown in FIG. 95A, for example, the transparent may be changed such that transparency is $\alpha=0$ (completely transparent) in the inside of the circle of the radius a and transparency is gradually changed in the outside of the circle of radius a in proportion to the distance so as to become $\alpha=1$ (completely opaque). Other than these, as shown in FIG. 95B, for example, the transparent is set to be $\alpha=0$ (completely transparent) at the point (center) that overlaps with the pointing position $(x_p, y_p, z_p)$ of the pointer 401 as seen from the observer, and the transparency can be changed, to $\alpha=1$ (completely opaque), in proportion to square of the distance from the center. In addition, although not shown in the figure, the transparency α may be changed from 0 to 1 like step function according to the distance from the center.

In addition, the radius a may be increased in proportion to the depth direction distance between the pointer 401 and the object. Accordingly, the depth direction distance between the pointer 401 and the object can be easily estimated from the size of the transparentized region on the object.

In addition, the region to be transparentized in the object is not limited to the circle region of the radius a shown in the lower stage of FIG. 94. It may be any predetermined shape such as an ellipse region or a polygon region.

For realizing such three-dimensional display control method by using the system control apparatus shown in FIG. 80, it is only necessary that the system control apparatus 1 executes processes of steps 501-510 of FIG. 88. However, in the three-dimensional display control method of this embodiment 4-3, in the step 510 in the process procedure shown in FIG. 88, processes of steps 510a-510c shown in FIG. 89 are performed. In addition, in the step 510c in the process procedure shown in FIG. 89, instead of transparentizing the whole object that is in the front side of the depth position of the pointer 401 and that overlaps with the pointer 401, only a predetermined shape of the region is transparentized, such as the circle region, the ellipse region, or polygon region centering on the point overlapping the XY position $(x_p, y_p)$ pointed at by the pointer 401 as described before.

As described above, according to the three-dimensional display control method of this embodiment 4-3, by transparentizing the object placed (displayed) in the front side of the depth object of the pointer, even when the pointer moves to a position in the back side of the object, the position of the pointer is not lost and can be easily recognized.

In addition, by moving the pointer 401 toward the back side as seen from the observer, the object can be transparentized, so that it becomes easy to perform operation for recognizing whether another object is hidden behind an object or recognizing the position of the object hidden behind the object compared with the conventional method. In addition, by moving the pointer 401 toward the front side as seen from the observer, the transparentized object can be restored to the original opaque state, so that it becomes easy to perform operation for recognizing display information of the transparentized object compared with the conventional method. That is, by applying the three-dimensional display control method of this embodiment, the convenience of the observer (operator) improves.

In addition, in this embodiment 4-3, when transparentizing the object that is in the front side of the depth position of the pointer 401, since the object is partially transparentized centering on the point overlapping the position that is pointed at by the pointer 401, visual botheration due to continuous change of transparentizing and opacifying of the object can be reduced.

Embodiment 4-4

FIGS. 96 and 97 are schematic diagrams for describing the three-dimensional display control method of the embodiment 4-4 of the present invention. FIG. 96 is a figure showing situations of change of the three-dimensional space when the display control method of this embodiment 4-4 is applied, and FIG. 97 is a flowchart showing a process procedure in the apparatus for realizing the three-dimensional display method of this embodiment 4-4. By the way, FIG. 96 shows three states in the upper stage, the middle stage, and the lower stage respectively, in which a state changes to another state by performing operation indicated in the figure. In addition, each state shows a front view and a right side view when an observer views the three-dimensional space.

In the embodiment 4-4, a display control method is described in which, after transparentizing the object existing in the front side of the depth position of the pointer 401, when the pointer stands still for a predetermined time, the transparentized object is restored to the original opaque state so as to be able to easily recognize the display information of the transparentized object.

In addition, in this embodiment 4-1, for the sake of simplifying the explanation, as shown in the upper side of FIG. 96, for example, a case where the three-dimensional desktop space displays three objects of the pointer 401, folder icons 402a and 402b, and the window 403 is taken as an example in the description. Relationship among the three objects of the pointer 401, folder icons 402a and 402b, and the window 403 is as shown in the upper stage of FIG. 96, first, in which the pointer 401 is displayed in the front side of the depth position of the window 403 as seen from the observer. In addition, the folder icon 402 is placed in the back side of the window 403 as seen from the observer so that the folder icon 402b is hidden from the observer.

At this time, when the operator rotates the wheel of the mouse so as to move the pointer 401 in the +Z (z>0) direction so that the depth position of the pointer 401 becomes in the back side of the depth position of the window 403 as seen from the observer as shown in the middle stage of FIG. 96, the window 403 is transparentized. As a result, the observer (operator) can recognize the position of the pointer 401 easily even when the pointer 401 moves to a position in the back side of the window 403. In addition, only by moving the pointer 401 in the +Z (Z>0) direction, the observer can recognize whether another object is hidden in the back side of the window 403 and can recognize the position of the hidden folder icon 402b.

Then, the operator stops operation of the mouse in this state, and when the state where the operator does not move the body of the mouse and the wheel continues for one second, for example, the transparentized window 403 is restored to the original opaque state as shown in the lower stage of FIG. 96. As a result, the observer (operator) can recognize the display information of the window 403 even though the observer does not perform operation for moving the pointer 401 to the front side of the depth position of the window as described in the embodiments 4-1-4-3.

In addition, from the state shown in the lower stage of FIG. 96, when the operation of the mouse is restarted, the window 403 in the front side of the depth position of the pointer 401 is transparentized again, so that the pointer 401 and the folder icon 402b that were hidden behind the window 403 can be recognized as shown in the middle stage of FIG. 96.

For realizing the three-dimensional display control method of this embodiment 4-4 by the system control apparatus 1 shown in FIG. 80, processes of steps 501-513 shown in FIG. 97 can be performed in the system control apparatus 1.

By the way, since the steps 501-510 in the process procedure shown in FIG. 97 can be the same as the processes of steps 501-510 in the process procedure shown in FIG. 88, detailed description is not given here. In addition, when transparentizing the object using the method described in embodiments 4-2 and 4-3, processes of steps 510d-510h shown in FIG. 93 or processes of steps 510a-510c shown in FIG. 90 can be performed in the step 510. Thus, the description is not given here.

For realizing the three-dimensional display method of this embodiment 4-4 in the system control apparatus 1 having the configuration shown in FIG. 80, after the process of step 510 shown in FIG. 97 ends, in other words, after the process for transparentizing the object in the front side of the depth position of the pointer 401 and displaying it, it is checked whether the information (pointer operation information) on operation of the pointer continues to be obtained (step 511). Then, when the pointer operation information continues to be obtained, processes of steps 505-510 are repeated as shown in FIG. 97, so as to continue to move the display position of the pointer, to change display of the object that is pointed at, and to transparentize the object in the front side of the depth position of the pointer.

On the other hand, in step 511, when it is determined that the obtaining of the pointer operation information stops, it is checked whether predetermined time has elapsed after the obtaining of the pointer operation information stops (step 512). When the predetermined time has not elapsed, the procedure returns to step 511 and the checking is performed again.

In steps 511 and 512, when it is determined that the obtaining of the pointer operation information stops and that the predetermined time has elapsed after the stop, the object generation/transparentizing means 105 restores the transparentized object to the original opaque state, and causes the display apparatus 3 to display the object via the display control means 106 (step 513).

By performing such processes in the system control apparatus 1, it becomes possible to control display of the pointer 401 and the objects 402a, 402b and 403 as shown in FIG. 96.

As described above, according to the three-dimensional display control method of this embodiment 4-4, by transparentizing the object placed (displayed) in the front side of the depth object of the pointer, even when the pointer moves to a position in the back side of the object, the position of the pointer is not lost and can be easily recognized.

In addition, by moving the pointer 401 toward the back side as seen from the observer, the object can be transparentized, so that it becomes easy to perform operation for recognizing whether another object is hidden behind an object or recognizing the position of the object hidden behind the object compared with the conventional method. In addition, by moving the pointer 401 toward the front side as seen from the observer, the transparentized object can be restored to the original opaque state, so that it becomes easy to perform operation for recognizing display information of the transparentized object compared with the conventional method. That is, by applying the three-dimensional display control method of this embodiment 4-1, the convenience of the observer (operator) improves.

In addition, as described in the 4-4, by restoring the transparentized object to the original opaque state and displaying the object when the predetermined time elapses after the obtaining of the pointer operation information stops, display information of the object displayed in the front side of the pointer 401 can be recognized without performing the operation for moving the pointer 401 in the front side direction as seen from the observer.

In addition, since the transparentized object is opacified while the pointer 401 is displayed in the back side of the depth position of the transparentized object and the opacified object is transparentized again at the time when the obtaining of the pointer operation information restarts, it becomes unnecessary to perform the operation for moving the pointer in the depth direction for checking the display information of the transparentized object, so that convenience of the observer (operator) further improves.

Embodiment 4-5

FIGS. 98 and 100 are schematic diagrams for describing the three-dimensional display control method of the embodiment 4-5 of the present invention. FIG. 98 is a figure for showing a method for selecting an object, FIG. 99 is a figure showing situations of change of the three-dimensional space when the display control method of this embodiment 4-5 is applied, and FIG. 100 is a flowchart showing a process procedure in the apparatus for realizing the three-dimensional display method of this embodiment 4-5. By the way, each of FIGS. 98 and 99 shows three states in the upper stage, the middle stage, and the lower stage respectively, in which a state changes to another state by performing operation indicated in the figure. In addition, each state shows a front view and a right side view when an observer views the three-dimensional space.

In this embodiment 4-5, a display control method is described in which, when moving the pointer in a state in which an object displayed in the three-dimensional space is selected, the selected object of objects located in the front side of the depth position of the pointer is not transparentized, so that the selected object can be recognized as being selected.

For operating the pointer in the three-dimensional space in the display apparatus 3, in addition to the operation for moving the pointer 401 in the three-dimensional space to point at an object as described in the embodiments 4-1-4-4, operation for selecting one or more objects and moving the selected object in the three-dimensional space can be also performed.

Thus, in this embodiment 4-5, as shown in the upper side of FIG. 98, for example, a case where the three-dimensional desktop space displays three objects of the pointer 401, folder icons 402a and 402b, and the window 403 is taken as an example for describing operation to move the object in the three-dimensional space. Relationship among the three objects of the pointer 401, folder icons 402a and 402b, and the window 403 is as shown in the upper stage of FIG. 98, first, in which the pointer 401 is displayed in the back side of the depth position of the window 403 as seen from the observer. That is, since the window 403 is located in the front side of the depth position of the pointer 401, the window 403 is transparentized.

At this time, when the operator operates the body of the mouse and the wheel while pushing a left button of the mouse, for example, as shown in the middle stage of FIG. 98, folder icons 402a and 402b can be selected. In addition, at this time, display of the folder icons 402a and 402b changes from normal display to display indicating that the folder icons are selected. Then, the operator stops to push the left button of the mouse, and after pointing the folder icon 402a with the pointer 401, when the operator rotates the wheel while pushing the left button of the mouse again, the selected folder icons 402a and 402b can be moved toward the front side as seen from the observer while keeping relative position relationship as shown in the lower stage of FIG. 98.

Then, it is assumed that, after the operator moves the folder icons 402a and 402b as shown in the lower stage of FIG. 98 or the upper stage of FIG. 99, the operator moves the pointer 401 toward the folder icon 402b while the state of selecting the folder icons are kept as shown in the middle stage of FIG. 99. At this time, as shown in the middle stage of FIG. 99, when the depth position of the pointer 401 is in the back side of the folder icon 402b, the folder icon 402b is transparentized in the display control method in the embodiments 4-1-4-4. However, if the folder icon 402*b* is transparentized, the observer cannot recognize that the folder icon 402*b* is in the state of being selected. In addition, as shown in the middle stage of FIG. 99, when the pointer 401 is located between the depth positions of the two selected folder icons 402*a* and 402*b*, the folder icon 402*b* is transparentized and the folder icon 402*a* is opacified. Thus, it cannot be recognized whether only the folder icon 402*a* is selected or other object is also selected together.

Thus, in this embodiment 4-5, as shown in the middle stage of FIG. 99, even though the object (folder icon 402*b*) is in the front side of the depth position of the pointer 401, if the object is in the selected state, the object is not transparentized and is displayed in the opaque state. As a result, the observer can easily recognize that the folder icons 402*a* and the 402*b* are in the selected state.

Then, when the operator releases selection, e.g., by performing operation of pushing the left button of the mouse in a state in which the object is not pointed at, display of the folder icons 402*a* and 402*b* restores from the display indicating that they are selected to normal display as shown in the lower stage of FIG. 99. Then, at the same time when the folder icon 402*b* located in the front side of the depth position of the pointer restores to the normal display, the folder icon 402*b* is transparentized.

For realizing the three-dimensional display control method of this embodiment 4-5 by the system control apparatus 1 shown in FIG. 80, processes of steps 501-506, and steps 514-517 shown in FIG. 100 can be performed in the system control apparatus 1.

By the way, since the steps 501-506 in the process procedure shown in FIG. 100 can be the same as the processes of steps 501-510 in the process procedure shown in FIG. 88, detailed description is not given here.

For realizing the three-dimensional display method of this embodiment 4-5 in the system control apparatus 1 having the configuration shown in FIG. 80, after the process of step 506 shown in FIG. 100 ends, in other words, after the process for displaying the pointer 401 at a new display position ends, the pointer position calculation means 102 causes the object change determination means 104 to determine whether there is an object that is a candidate to be transparentized in the front side of the depth position of the pointer 401 (step 514). When there is no object that is the candidate to be transparentized, the procedure returns to the step 502, and the system waits until next input information is obtained.

On the other hand, when there is the object that is the candidate to be transparentized, the object change determination means 104 determines whether there is an object that is in a selected state in objects that are candidates to be transparentized (step 515). When there is no object that is in the selected state, the object generation/transparentizing means 105 transparentizes all objects that are candidates to be transparentized, and the display apparatus 3 displays the objects via the display control means 106 (step 516). At this time, any one of the transparentizing methods described in the embodiments 4-1-4-3 is selected so as to transparentize the objects.

When there is an object in the selected state in the objects that are candidates to be transparentized, the object generation/transparentizing means 105 transparentizes only objects that are in non-selected state excluding the selected object, and the display apparatus 3 displays the objects via the display control means 106 (step 517). In step 517, any one of the transparentizing methods described in the embodiments 4-1-4-3 is selected so as to transparentize the objects.

By performing these processes in the system control apparatus 1, it becomes possible to control display of the pointer 401 and the objects 402*a*, 402*b* and 403 as shown in FIG. 100.

By the way, in the process procedure shown in FIG. 100, although steps 507 and 508 in the process procedure shown in FIG. 88 are not shown, these processed may be incorporated. In addition, when transparentizing the object using the method described in embodiments 4-2 and 4-2, processes of steps 510*d*-510*h* shown in FIG. 93 or processes of steps 510*a*-510*c* shown in FIG. 90 can be performed in the step 510.

As described above, according to the three-dimensional display control method of this embodiment 4-5, by transparentizing the object placed (displayed) in the front side of the depth object of the pointer, even when the pointer moves to a position in the back side of the object, the position of the pointer is not lost and can be easily recognized.

In addition, by moving the pointer 401 toward the back side as seen from the observer, the object can be transparentized, so that it becomes easy to perform operation for recognizing whether another object is hidden behind an object or recognizing the position of the object hidden behind the object compared with the conventional method. In addition, by moving the pointer 401 toward the front side as seen from the observer, the transparentized object can be restored to the original opaque state, so that it becomes easy to perform operation for recognizing display information of the transparentized object compared with the conventional method. That is, by applying the three-dimensional display control method of this embodiment, the convenience of the observer (operator) improves.

In addition, in transparentizing the object, when there is a selected object in objects that are candidates to be transparentized, namely, in objects located in the front side of the depth position of the pointer, the selected object is not transparentized so that it can be easily recognized that the object is in the selected state.

In addition, in each embodiment, although a method for controlling display of the pointer and the object is described by taking, as an example, a case where the mouse with the wheel function is used as the input apparatus 2 and the DFD is used as the display apparatus 3, it is needless to say that existing various apparatuses can be used as the input apparatus 2 and the display apparatus 3. As the input apparatus 2, apparatuses such as a keyboard, a pen tablet or a game pad can be used. In addition, the input apparatus is not limited to one kind. For example, by combining the keyboard and the mouse and by operating the mouse while pushing a specific key of the keyboard, it can be also possible to perform operation to move the pointer three-dimensionally, to perform selection operation and the like. In addition, as to the display apparatus 3, not only the three-dimensional display such as the DFD that can display an object stereoscopically, but also a two-dimensional display such as the existing CRT, liquid crystal display, plasma display and the like can be used. When the two-dimensional display is used as the display apparatus 3, the display control means 106 of the system control apparatus 1 sets a three-dimensional virtual space and places the pointer and the object in the three-dimensional space, and after that, generates an image obtained by projecting the three-dimensional space onto a display plane of the two-dimensional display so as to display the image on the two-dimensional display.

In addition, the three-dimensional display control method of the present invention can be easily realized by combining existing input apparatus, control apparatus and display apparatus without using a special input apparatus, control apparatus and display apparatus. In addition, the control apparatus to which the three-dimensional display control method is applied can be realized by a computer and a program. In this case, it is only necessary that the program includes instructions for causing the computer to execute processes described in embodiments 4-1-4-5, and the program can be recorded in any of magnetic, electrical, and optical recording mediums. In addition, the program is not only provided by recording it in the recording medium but also can be provided via a network such as the Internet.

The present invention is not limited to the specifically disclosed embodiments, and variations and modifications may be made without departing from the scope of the invention.

The invention claimed is:

1. A three-dimensional pointing method, comprising:
  pointing at a desired point in a virtual three-dimensional space represented on a display apparatus based on two-dimensional coordinates on a predetermined detection plane of the display apparatus of a position that is pointed at by a pen tip of an input pen in a real three-dimensional space, pen pressure that is pressure applied to the pen tip of the input pen, an inclination angle that is an angle between an axis of the input pen and the detection plane in the real three-dimensional space, and a direction angle that is an angle between a projection of the axis of the input pen onto the detection plane and a predetermined line on the detection plane;
  generating an extension of the axis of the input pen in the real three-dimensional space in the virtual three-dimensional space, based on the inclination angle and the direction angle of the input pen in the real three-dimensional space, by extending the axis of the input pen from the real three-dimensional space into the virtual three-dimensional space;
  displaying a three-dimensional pointer on the display apparatus on the extension of the axis of the input pen into the virtual three-dimensional space; and
  changing a coordinate of the three-dimensional pointer in the direction of the extension into the virtual three-dimensional space according to the pen pressure of the input pen, and displaying the three-dimensional pointer on the display apparatus based on the changed coordinate.

2. A three-dimensional pointing apparatus, comprising:
  a display apparatus to represent a generated pointer at a desired point in a virtual three-dimensional space;
  an input information obtaining unit configured to obtain information of two-dimensional coordinates on a predetermined detection plane of the display apparatus of a position that is pointed at by a pen tip of an input pen in a real three-dimensional space and a pen pressure, which is pressure applied to the pen tip of the input pen;
  a pointer position/rotation angle calculation unit configured to calculate a position and a rotation angle of the pointer to be generated and displayed in the virtual three-dimensional space represented on the display apparatus based on the information obtained by the input information obtaining unit;
  a pointer generation unit configured to generate the pointer based on the calculation result of the pointer position/rotation angle calculation unit;
  a pointing determination unit configured to determine whether there is an object that is pointed at by the pointer generated by the pointer generation unit in the virtual three-dimensional space represented on the display apparatus;
  an object generation unit configured to generate the object to be displayed in the virtual three-dimensional space represented on the display apparatus; and
  a display control unit configured to display the pointer generated by the pointer generation unit and the object generated by the object generation unit in the virtual three-dimensional space represented on the display apparatus, wherein
  the pointer position/rotation angle calculation unit changes a depth direction coordinate of the three-dimensional pointer to be displayed in the virtual three-dimensional space according to the pen pressure of the input pen in the calculation,
  in addition to the information of the two-dimensional coordinates and the pen pressure, the input information obtaining unit obtains an inclination angle that is an angle between an axis of the pen and the detection plane, and an direction angle that is an angle between a projection of the axis of the input pen onto the detection plane and a predetermined line on the detection plane, and
  the pointer position/rotation angle calculation unit (1) generates an extension of the axis of the input pen in the real three-dimensional space in the virtual three-dimensional space, based on the inclination angle and the direction angle of the input pen, by extending the axis of the input pen from the real three-dimensional space into the virtual three-dimensional space, (2) sets a position of a three-dimensional pointer to be on the extension in the virtual three-dimensional space, and (3) performs the calculation by changing a coordinate of the three-dimensional pointer in the direction of the extension in the virtual three-dimensional space according to the pen pressure of the input pen.

3. A non-transitory computer readable storage medium including three-dimensional pointing instructions for causing a computer to execute processes in each unit of the three-dimensional pointing apparatus as claimed in claim 2.

* * * * *